US011887036B2

(12) United States Patent
Wang

(10) Patent No.: US 11,887,036 B2
(45) Date of Patent: Jan. 30, 2024

(54) METHOD AND SYSTEM FOR ON-DEMAND CUSTOMIZED SERVICES

(71) Applicant: OPERR TECHNOLOGIES, INC., Flushing, NY (US)

(72) Inventor: Kevin Sunlin Wang, Flushing, NY (US)

(*) Notice: Subject to any disclaimer, the term of this patent is extended or adjusted under 35 U.S.C. 154(b) by 154 days.

(21) Appl. No.: 17/356,843

(22) Filed: Jun. 24, 2021

(65) Prior Publication Data

US 2021/0319378 A1    Oct. 14, 2021

Related U.S. Application Data

(62) Division of application No. 15/239,783, filed on Aug. 17, 2016, now Pat. No. 11,049,059.

(60) Provisional application No. 62/325,602, filed on Apr. 21, 2016, provisional application No. 62/290,778, filed on Feb. 3, 2016.

(51) Int. Cl.
*G06Q 10/0639*     (2023.01)
*G06Q 50/30*       (2012.01)
*G06F 3/0482*      (2013.01)
*G06Q 10/08*       (2023.01)

(52) U.S. Cl.
CPC ....... *G06Q 10/0639* (2013.01); *G06F 3/0482* (2013.01); *G06Q 10/08* (2013.01); *G06Q 50/30* (2013.01)

(58) Field of Classification Search
CPC .... G06Q 10/0639; G06Q 10/08; G06Q 50/30; G06Q 10/06395; G06Q 10/083; G06Q 10/0833
See application file for complete search history.

(56) References Cited

U.S. PATENT DOCUMENTS 6,430,496 B1    8/2002    Smith et al.
8,533,215 B2    9/2013    Szabo et al.
8,554,608 B1    10/2013   O' Connor
(Continued)

OTHER PUBLICATIONS

Intini, P., Berloco, N, Colonna, P., Ranieri, V. The Impact of Route Familiarity on Drivers' Speed, Trajectories and Risk Perception. Statens vag-och transportforsknings Institut, May 2016, 12 Pages, 17th International Conference Road Safety on Five Continents (RS5C 2016), Rio de Janeiro, Braziil. (Year: 2016).

(Continued)

*Primary Examiner* — Stephanie Z Delich

(57) ABSTRACT

The invention is related to pairing a customer with the best service provider upon a selection from the customer in on-demand transportation service. A platform in the invention provides a graphical representation of the electronic interface displaying sets of indicators that reflect transportation service relevant data corresponding to each of the available service providers and containing two or more identifications through at least a Global Positioning System (GPS) receiver. The display is corresponding to the one or more inputs provided by the customer to the two or more search parameters including a maximum number of available service providers and at least one of the following groups comprising the one or more available service providers within a time span or a distance span for arrival to a pick-up location of the customer. The sets of indicators corresponding to each of the available service providers that match the preset preferences.

16 Claims, 45 Drawing Sheets

(56) References Cited

U.S. PATENT DOCUMENTS

| | | | |
|---|---|---|---|
| 8,990,288 B2 | 3/2015 | Hendrey | |
| 9,151,614 B2 | 10/2015 | Poppen et al. | |
| 9,392,418 B2 | 7/2016 | Lubeck et al. | |
| 9,706,367 B2 | 7/2017 | Tao et al. | |
| 2001/0037174 A1 | 11/2001 | Dickerson | G08G 1/202 701/400 |
| 2005/0038696 A1 | 2/2005 | Kalevik et al. | |
| 2006/0059023 A1 | 3/2006 | Mashinsky | G06Q 10/02 705/5 |
| 2008/0033652 A1 | 2/2008 | Hensley et al. | |
| 2008/0195428 A1 | 8/2008 | O'Sullivan | G06Q 10/00 705/6 |
| 2009/0204547 A1 | 8/2009 | Rowan | G06Q 30/06 705/80 |
| 2011/0153629 A1 | 6/2011 | Lehmann | G06Q 10/06 707/758 |
| 2012/0058775 A1 | 3/2012 | Dupray | G01S 5/0257 455/456.1 |
| 2012/0239452 A1 | 9/2012 | Trivedi | G06Q 10/00 705/7.22 |
| 2013/0132140 A1 | 5/2013 | Amin | G06Q 10/02 705/7.13 |
| 2013/0132246 A1 | 5/2013 | Amin | G06Q 40/10 705/34 |
| 2013/0132887 A1 | 5/2013 | Amin | G06F 3/048 715/781 |
| 2013/0246301 A1 | 9/2013 | Radhakrishnan | G06Q 30/0282 705/347 |
| 2014/0067491 A1 | 3/2014 | James | G06Q 50/30 705/13 |
| 2014/0129302 A1 | 5/2014 | Amin | G06Q 50/30 705/13 |
| 2014/0129951 A1 | 5/2014 | Amin | G06Q 50/30 715/738 |
| 2014/0229258 A1 | 8/2014 | Seriani | G06Q 30/08 705/14.23 |
| 2014/0278838 A1 | 9/2014 | Novak | G07B 15/063 705/13 |
| 2015/0099461 A1 | 4/2015 | Holden | G01C 21/367 455/39 |
| 2015/0161564 A1 | 6/2015 | Sweeney | G06Q 10/063114 705/338 |
| 2015/0161752 A1 | 6/2015 | Barreto | G06Q 50/30 705/7.15 |
| 2015/0339923 A1 | 11/2015 | Konig | G08G 1/202 701/522 |
| 2016/0042303 A1 | 2/2016 | Medina | G06Q 10/02 705/5 |
| 2016/0078516 A1 | 3/2016 | Alnuwaysir | G06Q 30/0641 705/26.62 |
| 2016/0364823 A1 | 12/2016 | Cao | G06Q 10/1095 |

OTHER PUBLICATIONS

Search Report and Written Opinion of ISA for PCT/US2017/053330, dated Jan. 19, 2018 (20 pages).

Search Report & Written Opinion of ISA for PCT/US2017/015226, dated Mar. 2, 2017 (22 pages), corresponding to present application.

| Service Request ID | Requested Pickup Location | Actual Pickup Location | Pickup Time | Requested Drop Off Location | Actual Drop Off Location | Drop Off Time | Payment | Service Request Status | Created Time |
|---|---|---|---|---|---|---|---|---|---|
| 20160 7201 | 89 E 42nd ST New York, NY 10017 | (40.752017, -73.977354) | 07/20/ 2016 07:25 AM | 136-20 38th Ave. Flushing, NY 11354 | (40.761054, -73.829817) | 07/20/ 2016 08:01 AM | $33.00 | Completed | 07/20/ 2016 07:22 AM |
| 20160 7202 | 1000 5th Ave. New York, NY 10028 | N/A | 07/20/ 2016 08:00 AM | 4 Pennsylvania Plaza New York, NY 10001 | N/A | N/A | N/A | Cancelled at 08:05AM | 07/20/ 2016 07:57 AM |

FIG. 3D

| User Type | Category | Sub-Category |
|---|---|---|
| A. IP: Service Provider | Regular | Transport Service - RPT/FPT |
| | | Delivery Service - RPD/FPD |
| | | Both Transport and Delivery Service - RPB/FPB |
| | Favorite | |
| B. IC: Customer | Regular | Transport Service - RCT/FCT |
| | | Delivery Service - RCD/FCD |
| | Favorite | Both Transport and Delivery Service - RCB/FCB |

FIG. 71

| Indicator Set | Subcategory | Indicator | Explanation | Note |
|---|---|---|---|---|
| C. AOP | Transport | RPT/FPT-AOP15 | "AOP" for "Availability of a Service Provider"; "15" for "Service Provider Will Become Available in Approximately 15 Minutes to Provide the Service". | "RPT/FPT" for "Regular Service Provider for Transport Service / Favorite Service Provider for Transport Service"; "RPD/FPD" for "Regular Service Provider for Delivery Service / Favorite Service Provider for Delivery Service"; "RPB/FPB" for "Regular Service Provider for Both Transport and Delivery Service / Favorite Service Provider for Both Transport and Delivery Service". |
|  | Delivery | RPD/FPD- AOP15 |  |  |
|  | Transp.-Deliv. | RPB/FPB- AOP15 |  |  |
| D. AOC | Transport | RCT/FCT-AOC15 | "AOC" for "Availability of a Customer"; "15" for "The Customer is Available for Negotiation and the Service Request Will Expire in Approximately 15 Minutes". |  |
|  | Delivery | RCD/FCD-AOC15 |  |  |
|  | Transp.-Deliv. | RCB/FCB-AOC15 |  |  |
| E. TRP | Transport | RPT/FPT-TRP40 | "TRP" for "Total Number of Service Requests Completed by a Service Provider"; "40" for Actual Number Completed. |  |
|  | Delivery | RPD/FPD-TRP40 |  |  |
|  | Transp.-Deliv. | RPB/FPB-TRP40 |  |  |
| F. SPC | Transport | RPT/FPT -SPC10Min | "SPC" for "Search Parameter Preset by a Customer"; "10Min" for the Actual Search Parameter Preset by a Customer by Time. | "RCT/FCT" for "Regular Customer for Transport Service / Favorite Customer for Transport Service"; "RCD/FCD" for "Regular Customer for Delivery Service / Favorite Customer for Delivery Service"; "RCB/FCB" for "Regular Customer for Both Transport and Delivery Service / Favorite Customer for Both Transport and Delivery Service". |
|  | Delivery | RPD/FPD-SPC10Min |  |  |
|  | Transp.-Deliv. | RPB/FPB-SPC10Min |  |  |
| G. SDC | Transport | RPT/FPT-SDC30/3 | "SDC" for "Supply and Demand for a Customer", "30"/"3" for "Total Number of Potential Available Service Providers" vs. "Total Number of Potential Available Customers". |  |
|  | Delivery | RPD/FPD-SDC30/3 |  |  |
|  | Transp.-Deliv. | RPB/FPB-SDC30/3 |  |  |
| H. PPR | Transport | RPT/FPT-PPR G/Y/R-$11;10%↑;$1↑ | "PPR" for "Service Provider's Price Response"; "G/Y/R" for "Green/Yellow/Red"; "$11;10%↑;$1↑" for "The Price is $11 and it is 10% or $1 Higher than The Default Price". |  |
|  | Delivery | RPD/FPD-PPR G/Y/R-$11;10%↑;$1↑ |  |  |
|  | Transp.-Deliv. | RPB/FPB-PPR G/Y/R-$11;10%↑;$1↑ |  |  |

FIG. 7J

| Indicator Set | Subcategory | Indicator | Explanation | Note |
|---|---|---|---|---|
| I. PIP | Transport | RPT/FPT-PIP-G/Y/R-$11;10%↑;$1↑ | "PIP" for "Price Initiated by a Service Provider"; "G/Y/R" for "Green/Yellow/Red"; "$11;10%↑;$1↑" for "The Price is $11 and it is 10% or $1 Higher than The Default Price". | "RPT/FPT" for "Regular Service Provider for Transport Service / Favorite Service Provider for Transport Service"; "RPD/FPD" for "Regular Service Provider for Delivery Service / Favorite Service Provider for Delivery Service"; "RPB/FPB" for "Regular Service Provider for Both Transport and Delivery Service / Favorite Service Provider for Both Transport and Delivery Service". |
| | Delivery | RPD/FPD-PIP-G/Y/R-$11;10%↑;$1↑ | | |
| | Transp.-Deliv. | RPB/FPB-PIP-G/Y/R-$11;10%↑;$1↑ | | |
| J. TPP | Transport | RPT/FPT-TPP☐☐ | "TPP" for "Total Number of Service Requests Completed by a Service Provider in Requested Pickup location"; "☐☐" for Applicable Tier. | |
| | Delivery | RPD/FPD-TPP☐☐ | | |
| | Transp.-Deliv. | RPB/FPB-TPP☐☐ | | |
| K. TPD | Transport | RPT/FPT-TPDΔΔΔ | "TPD" for "Total Number of Service Requests Completed by a Service Provider in Requested Drop Off Location"; "ΔΔΔ" for Applicable Tier. | |
| | Delivery | RPD/FPD-TPDΔΔΔ | | |
| | Transp.-Deliv. | RPB/FPB-TPDΔΔΔ | | |
| L. PFR | Transport | RPT/FPT-PFR10% | "PFR" for "Service Provider's Familiarity with Route"; "10%" for "Percent of the Familiarity". | |
| | Delivery | RPD/FPD-PFR10% | | |
| | Transp.-Deliv. | RPB/FPB-PFR10% | | |
| M. TMP | Transport | RPT/FPT-TMP231 | "TMP" for "Total Number of Mutual Service Requests with a Service Provider"; "231" for Actual Number Completed. | |
| | Delivery | RPD/FPD-TMP231 | | |
| | Transp.-Deliv. | RPB/FPB-TMP231 | | |
| N. ETA | Transport | RPT/FPT-ETA28 | "ETA" for "Service Provider's Estimated Time of Arrival"; "28" for Actual Minutes of Travel. | |
| | Delivery | RPD/FPD-ETA28 | | |
| | Transp.-Deliv. | RPB/FPB-ETA28 | | |

FIG. 7K

| Indicator Set | Subcategory | Indicator | Explanation | Note |
|---|---|---|---|---|
| O. ETT | Transport | RCT/FCT-ETT33 | "ETT" for "Customer's Estimated Travel Time"; "33" for Actual Minutes of Travel. | |
| | Delivery | RCD/FCD-ETT33 | | |
| | Transp.-Deliv. | RCB/FCB-ETT33 | | |
| P. CRL | Transport | RCT/FCT CCL | "CRL" for "Customer Service Request Location"; "CCL" for "Customer's Current Location"; "CPL" for "Customer's Pickup Location"; "CDL" for "Customer's Drop Off Location". | |
| | Delivery | RCD/FCD CPL | | |
| | Transp.-Deliv. | RCB/FCB CDL | | |
| Q. TRC | Transport | RCT/FCT-TRC40 | "TRC" for "Total Number of Service Requests Completed by a Customer"; "40" for Actual Number Completed. | |
| | Delivery | RCD/FCD-TRC40 | | |
| | Transp.-Deliv. | RCB/FCB-TRC40 | | |
| R. SPP | Transport | RCT/FCT-SPP10Mi | "SPP" for "Search Parameter Preset by a Service Provider"; "10mi" for the Actual Search Parameter Preset by a Service Provider by Distance. | |
| | Delivery | RCD/FCD-SPP10Mi | | |
| | Transp.-Deliv. | RCB/FCB-SPP10Mi | | |
| S. SDP | Transport | RCT/FCT-SDP23/3 | "SDP" for "Supply and Demand for a Service Provider"; "23"/"3" for "Total Number of Potential Available Service Providers" vs. "Total Number of Potential Available Customers". | |
| | Delivery | RCD/FCD-SDP23/3 | | |
| | Transp.-Deliv. | RCB/FCB-SDP23/3 | | |
| T. PIC | Transport | RCT/FCT-PIC-G/Y/R-$11;10%↑;$1↑ | "PIC" for "Price Initiated by a Customer"; "G/Y/R" for "Green/Yellow/Red"; "$11;10%↑;$1↑" for "The Price is $11 and it is 10% or $1 Higher than The Default Price". | "RCT/FCT" for "Regular Customer for Transport Service / Favorite Customer for Transport Service"; "RCD/FCD" for "Regular Customer for Delivery Service / Favorite Customer for Delivery Service"; "RCB/FCB" for "Regular Customer for Both Transport and Delivery Service / Favorite Customer for Both Transport and Delivery Service". |
| | Delivery | RCD/FCD-PIC-G/Y/R-$11;10%↑;$1↑ | | |
| | Transp.-Deliv. | RCB/FCB-PIC-G/Y/R-$11;10%↑;$1↑ | | |

FIG. 7L

| Indicator Set | Subcategory | Indicator | Explanation | Note |
|---|---|---|---|---|
| U. CPR | Transport | RCT/FCT-CPR G/Y/R-$11;10%↑;$1↑ | "CPR" for "Customer's Price Response"; "G/Y/R" for "Green/Yellow/Red"; "$11;10%↑;$1↑" for "The Price is $11 and it is 10% or $1 Higher than The Default Price". | "RPT/FPT" for "Regular Service Provider for Transport Service / Favorite Service Provider for Transport Service"; "RPD/FPD" for "Regular Service Provider for Delivery Service / Favorite Service Provider for Delivery Service"; "RPB/FPB" for "Regular Service Provider for Both Transport and Delivery Service / Favorite Service Provider for Both Transport and Delivery Service". |
| | Delivery | RCD/FCD-CPR G/Y/R-$11;10%↑;$1↑ | | |
| | Transp.-Deliv. | RCB/FCB-CPR G/Y/R-$11;10%↑;$1↑ | | |
| V. TCP | Transport | RCT/FCT-TCP∘∘ | "TCP" for "Total Number of On-Demand Services Requested by a Customer in Requested Pickup Location"; "∘∘" for Applicable Tier. | |
| | Delivery | RCD/FCD-TCP∘∘ | | |
| | Transp.-Deliv. | RCB/FCB-TCP∘∘ | | |
| W. TCD | Transport | RCT/FCT-TCD☆☆ | "TCD" for "Total Number of On-Demand Services Requested by a Customer in Requested Drop Off Location"; "☆☆" for Applicable Tier. | |
| | Delivery | RCD/FCD-TCD☆☆ | | |
| | Transp.-Deliv. | RCB/FCB-TCD☆☆ | | |
| X. TMC | Transport | RCT/FCT-TMC123 | "TMC" for "Total Number of Mutual Service Requests with a Customer"; "123" for Actual Number Completed. | "RCT/FCT" for "Regular Customer for Transport Service / Favorite Customer for Transport Service"; "RCD/FCD" for "Regular Customer for Delivery Service / Favorite Customer for Delivery Service"; "RCB/FCB" for "Regular Customer for Both Transport and Delivery Service / Favorite Customer for Both Transport and Delivery Service". |
| | Delivery | RCD/FCD-TMC123 | | |
| | Transp.-Deliv. | RCB/FCB-TMC123 | | |
| Y. ETP | Transport | RPT/FPT-ETP50 | "ETP" for "Estimated Travel Time for a Service Provider"; "50" for Actual Minutes of Travel. | |
| | Delivery | RPD/FPD-ETP50 | | |
| | Transp.-Deliv. | RPB/FPB-ETP50 | | |
| Z. PRL | Transport | RPT/FPT | PCL | "PRL" for "Service Provider's Service Request Location"; "PCL" for "Service Provider's Current Location"; "CPL" for "Customer's Requested Pickup Location"; "CDL" for "Customer's Requested Drop Off Location"; "PPL" for "Service Provider's Preset Return Location". | |
| | Delivery | RPD/FPD | CPL | | |
| | | | CDL | | |
| | Transp.-Deliv. | RPB/FPB | PPL | | |

FIG. 7M

Preference 900:
- Pickup/Drop Off Location — 901
- Make, Model, and Type of Vehicle — 902
- Years of Driving Experience — 903
- Number of Completed Service Requests — 904
- Seating Capacity — 905
- Gender — 906
- Language Spoken — 907
- Service Provider Category — 908
- Accessibility Preference — 909
- Pets Accommodation — 910
- Baby Seat Availability — 911
- ETA (Estimate Time of Arrival) Preference — 912
- Familiarity — 913
- Price Negotiations Preference — 914
- Type of Goods — 915
- Weight of Goods — 916
- Size of Goods — 917

FIG. 9A

| Customer Category Limitation | 919 |

| Service Time Limitation | 920 |

| Return Location and Time Limitation | 921 |

| Service Area Limitation | 922 |

| Accessibility Limitation | 923 |

| Number of Passengers Limitation | 924 |

| Type of Goods Limitation | 925 |

| Weight of Goods Limitation | 926 |

| Size of Goods Limitation | 927 |

| Allergy Limitation | 928 |

| Pets Accommodation Limitation | 929 |

| Baby Seat Limitation | 930 |

| Price Negotiations Limitation | 931 |

| Payment Method Limitation | 932 |

Limitations
918

FIG. 9B

METHOD AND SYSTEM FOR ON-DEMAND CUSTOMIZED SERVICES

TECHNICAL FIELD

The present invention is generally related to a method and system for providing on-demand services through the use of on one or more computing devices. More specifically, the invention is a method and system for on-demand customized services between customers and service providers based on their preferences and limitations.

CROSS-REFERENCE TO RELATED APPLICATIONS

The present application is a divisional of and claims priority to granted U.S. patent application Ser. No. 15/239,783, filed on Aug. 17, 2016, and titled "METHOD AND SYSTEM FOR ON-DEMAND CUSTOMIZED SERVICES", now U.S. Pat. No. 11,049,059, which claims the benefit of U.S. Provisional Patent Application No. 62/290,778, filed Feb. 3, 2016, titled "METHOD AND SYSTEM FOR ON-DEMAND TRANSPORTATION SERVICE," and U.S. Provisional Patent Application No. 62/325,602, filed on Apr. 21, 2016, titled "METHOD AND SYSTEM FOR ON-DEMAND PREFERRED TRANSPORTATION SERVICE," the entire disclosures of which are incorporated herein by reference.

BACKGROUND OF THE INVENTION

On-demand service management mobile applications that allow for electronic requests for services are becoming more popular. These mobile applications allow a customer to book service providers directly through mobile applications that can be downloaded on mobile communication devices. Since the demand for on-demand services is universal, the capability to expand worldwide allows for continuous growth. A customer may enjoy the convenience compared to other conventional on-demand service companies.

Current practices involving on-demand services use the concept of trying to find the closest service provider to dispatch a service request. In addition, if a service provider rejects or refuses to accept a service request, he or she may be subject to a penalty (e.g., a service provider's rating may go down, a service provider may be banned from receiving service requests for a period of time or may lose a bonus etc.), which has the effect of forcing a service provider to take all or most of the service request dispatches he or she receives. Alternatively, a service request could be dispatched to a certain number of service providers within a certain distance from the customer, and whichever service provider accepts the service request first will receive the service request. Additionally, current on-demand service systems do not allow a customer to request a preferred service provider all the time, as the current on-demand service systems are based on the concept of proximity to the requesting customer and not on the customer's preferences. A service provider also cannot keep the same customer, because he or she is being dispatched based on proximity to the requesting customer without having a say as to which customer he or she wants to provide service for.

The current on-demand services have many deficiencies in the way they operate. For example, they don't take into account the complexity of services and base dispatching of service providers on vicinity to the requesting customers; it is common to dispatch the service provider closest to a customer so that the service is performed as quickly as possible. This principle may have some shortfalls, as not necessarily the closest service provider is also the best match to perform the service for the customer. It is also not always the case that the fastest speed in finding a service provider means the best service. Speed may be but one factor among many when providing efficient services.

Furthermore, current on-demand service systems do not consider a service provider's location limitations with justifiable reasons for being unable to accept a service request. Rather, a service provider is often penalized or not given service requests for a certain time if his or her acceptance rate falls below a certain percentage. A service provider often has justifiable reasons for not being able to accept a service request. These reasons may include any arrangement, appointment, or event that is on a service provider's agenda, including but not limited to doctor appointments, weddings, friend or family gatherings or any other possible prior arrangement on a service provider's schedule.

Another shortfall of current on-demand service systems is that they do not take into account service providers' time limitations. For example, current on-demand transport systems may dispatch a service provider at 5:30 pm to drive from C to D regardless of the fact that the ride will take one hour, and the service provider's shift ends at 6 pm in D. That means that the service provider either has to refuse the service request and make a customer unhappy, or accept the service request and not be able to finish the shift on time. Both of the scenarios lead to the service provider's dissatisfaction or the added potential of monetary penalties or lower ratings.

In current on-demand service systems, a customer doesn't get to see a service provider's full profile. The only information usually available is a service provider's photo, name and service-related information. Even though that may give a customer some basic knowledge about a potential available service provider, a customer is still not sure whether the service provider has the sufficient experience and skills to provide the requested services.

In current on-demand service systems, it is customary to have star ratings for a service provider and a customer directly. However, bad ratings or negative feedback in general may occasionally cause verbal or physical altercations between a service provider and a customer.

In current on-demand service systems, the price rate is fixed at most times. However, the price may fluctuate where a fixed price is increased by a specific amount or percentage or it may be multiplied in some circumstances without a transparent basis for such a surge. A customer doesn't know when the prices will go up and has no choice but to accept the price offered by the service systems. As a result, surging prices may represent a significant disadvantage for a customer.

Therefore, there is a need in the art for a method and system that provide a marketplace whereby bath customers and service providers can customize services they request or provide, respectively, whereby the system uses a matrix that accounts for all preferences preset by customers and limitations preset by service providers to identify and match them to each other in service requests. There is also a need in the art for a method and system that provide a marketplace whereby users may create lists of favorite service providers or customers who they want to be matched up with again or lists of service providers or customers who they do not want to be matched up with again. Furthermore, there remains a need in the art for a method and system that provide a marketplace whereby the price for the service may be negotiated between a service provider and a customer, so that both accept the cost of the service. And there remains a need in the art for a method and system whereby marketplace information is displayed and exchanged between a customer and a service provider by means of various sets of indicators in an efficient, convenient, and easily understood way.

SUMMARY OF THE INVENTION

Accordingly, it is an object of exemplary embodiments of the present invention to provide an on-demand service method and system whereby a service provider and a customer are appropriately matched based on a matrix of known customer's preferences and known service provider's limitations. Exemplary embodiments of the present invention are configured to provide customized services and solve the aforementioned deficiencies of other current on-demand service systems.

It is also an object of the present invention to provide a system configured to dynamically update a database to indicate changes in a customer's and a service provider's presets, settings, preferences, limitations, feedback or other information in order to provide quality services.

Exemplary embodiments of the present invention may be configured to provide a service provider that is the best match for a particular customer's service request depending on the customer's known preferences. Customers may want to customize options within the system based on the types of preferences they have in order to receive the best service from the best matching service provider. When taking into account both the customer's preferences and service provider's limitations, exemplary embodiments of the present invention offer a more customized experience that accommodates both sides without leaving the service provider or a customer unsatisfied with the service, because all details regarding the service request are accounted for and preset by the users.

It is further an object of the present invention to facilitate the development and nurturing of a relationship between a customer and a service provider by creating a favorites list based on the feedback they give each other to improve the quality of service. Customer may choose one or more favorite service providers, and favorite service providers may then be given priority to accept requests from their favorite customers who are on their favorites lists. Further, it is an object of the present invention to create blacklists whereby service providers will be skipped over in dispatching service requests from customers who put them on their blacklists.

Another object of the present invention is to overcome the surging shortfalls of the pricing methods presented in current on-demand service systems. The disclosed exemplary embodiments present an electronically implemented platform for customers and service providers to set or negotiate prices for requested services on their own initiations with reference to a default price based at least in part on supply and demand.

It is also an object of the present invention to provide various sets of indicators to facilitate a customer in selecting a best matching service provider for his or her service request in a convenient and efficient way.

The foregoing summary of the exemplary embodiments of the present invention should not be construed to limit the scope of the invention. It should be understood and obvious to one skilled in the art that the exemplary embodiments of the invention described herein are just for illustrative purpose and may be further modified without departing from the spirit and scope of the invention.

BRIEF DESCRIPTION OF THE DRAWINGS

FIG. 3D depicts exemplary service request tracking records;

FIG. 7I depicts an exemplary indicators matrix of user classification;

FIGS. 7J-7M depict exemplary indicators matrixes for a service provider and a customer;

FIG. 9A depicts exemplary service preferences for a customer;

FIG. 9B depicts exemplary service limitations for a service provider;

DETAILED DESCRIPTION OF THE INVENTION

Figure 1:
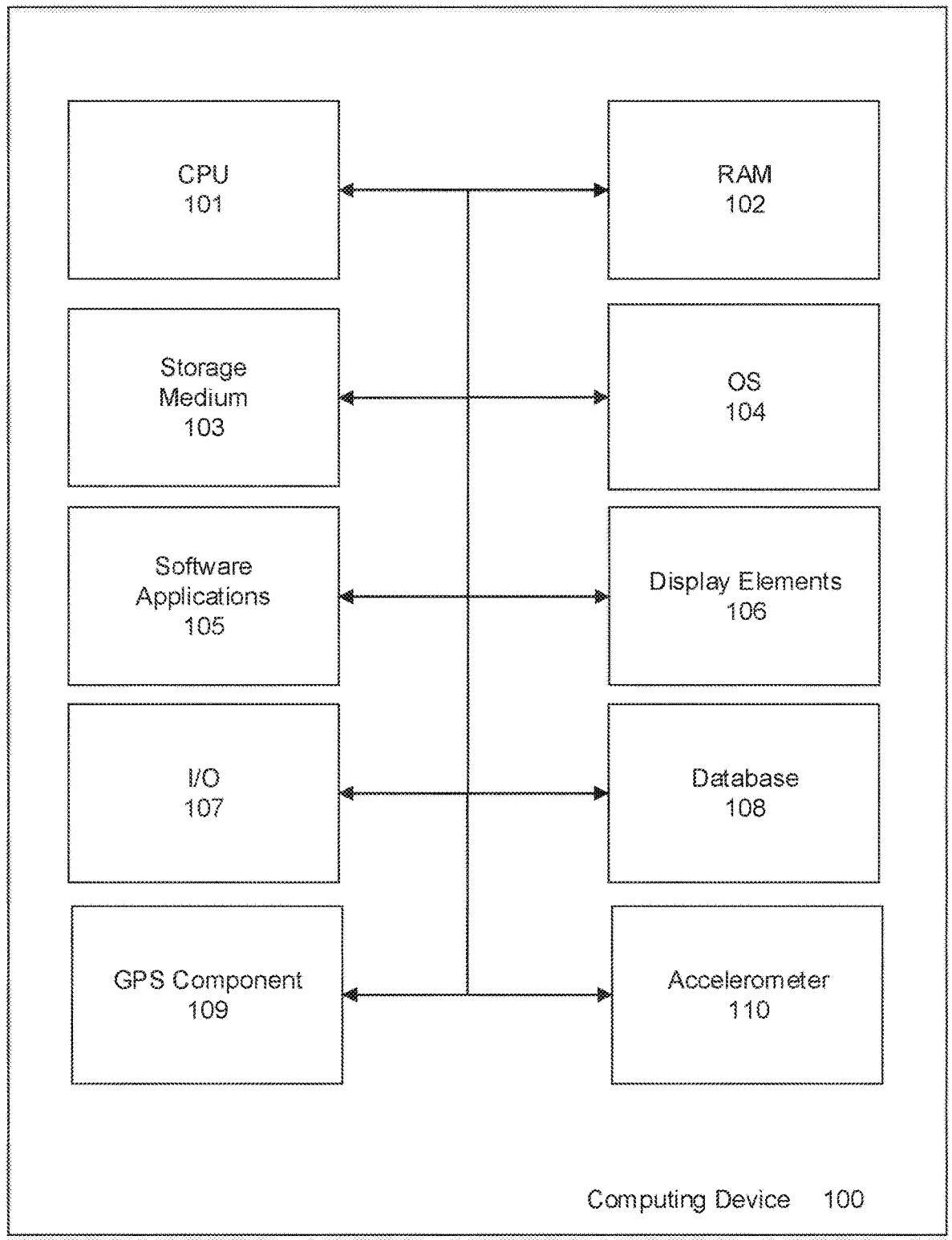
FIG. 1 depicts a schematic diagram of an exemplary computing device.

According to an exemplary embodiment of the present invention, the method and system disclosed herein provide a means for on-demand customized services. "Services" herein refers to three types of services: transport service for riders, delivery service of goods; and both transport and delivery service. Those services can be requested on-demand. "On-demand" herein is meant to further define when the services take place—in real-time, as requested. "On-demand" is used in opposition to the notion of being prescheduled or occurring at a future fixed time, such as a couple hours or days later; on-demand services happen at the moment, whereas prescheduled services take place at a predetermined time, date, or during a predetermined timeframe.

Furthermore, "customized" further modifies the nature of the services. It refers to the preferences of a customer or the limitations of a service provider involved in the services, on an individual basis. Regardless of the type of service, a "service provider" herein may be a single individual, a group of people or an affiliate of a private business entity or of a public or non-profit organization who can be summoned to provide transport service or delivery service or both transport and delivery service. The service provider's ability to provide service depends on what tools he or she has at the disposal. For example, in the case of driving a customer somewhere, a vehicle would be necessary, whereas a request for a delivery service can be provided not only by vehicle, but also by someone on foot, or someone on a bicycle.

A "customer" refers to anyone, either individual or individuals from an entity, who requests or orders services, regardless of which type of services that may be, whether transport service, delivery service or both.

As customers and service providers alike use the method and system described herein, both may generally be referred to as a "user" or "users," in addition to being referred to by specific user type corresponding to the role they play in the service request. There are two types of users: user type one is a service provider, and user type two is a customer.

The term "system" herein is referred to the implementation through a combination of hardware and software that operates a portable computing device, which comprises various pre-programmed features combined and integrated with basic components including but not limited to one or more servers, databases, mobile end applications, web portals, network settings, etc. With the support of these components, the system provides the services through user interfaces, such as a website or a mobile application. In addition, the system may have more than one server that may be in a distributed structure with support from data centers that may be located anywhere around the world. These implementations may be communicatively linked and cross platform so that a user on a mobile device may be provided with the information relevant to their service request, such as the electronic map display, indicators which display travel times, routes, pricing information, profile and setting information, etc. Features of the system can be implemented through computing devices that allows steps of the method to be processed and output by a processor.

According to an embodiment of the present invention, customization is in part based on customers' preferences and service providers' limitations. The term "preferences" means that a customer may make certain aspects of the service request a priority. These preferences may be ideal conditions for the service request, or they may be preconditions. The term "limitations" means any type of a constraint that a service provider may wish to place upon the service. These limitations may include two broad categories of limitations: first are personal limitations, regarding what, when, where, how, and to whom a service provider provides services. Personal limitations may relate to different types of service; limitations in delivery service, for instance, may relate to vehicle size or capacity or the service provider's ability to handle certain goods.

Also, personal limitations may include location limitations which are based on a service provider's reluctance to provide services in certain geographic zones. Or, these location limitations may be based on a service provider's desire to limit on-demand service areas to certain geographic zones. These geographic zones can be defined by one or more streets, zip codes, town, city, borough or county, state or any other region defining feature.

Herein, a request for any type of service will generally be referred to as a "service request." The essential meaning behind those words is a customer entering a request for specific on-demand service on a web or mobile application that uses connectivity to service providers, which specifies at least a type of service and a pickup or drop off location.

In addition to personal location limitation, a service provider may preset personal time limitations which may relate to his or her work shift. Secondly; this may be legal limitations which are imposed on the service provider by law, ordinance or other regulation resulting in the service provider not being able to provide services in certain geographic zones or at certain times. For example, based on the rules imposed by the New York City Taxi and Limousine Commission (TLC), TLC drivers are not allowed to work more than twelve consecutive hours per day or more than seventy-two hours per week. The reason that two different terms are used for the two user types, "preferences" and "limitations," is that a service provider and a customer have different relationships with potential service requests. A service provider has incentive to accept as many service requests as possible, whereas a customer may more selectively choose a service provider who fits as many of the specified preferences as possible. Essentially, a customer's preferences make up a basis, whereby a customer would not want to have a service provider who doesn't fulfill at least the preferences. On the other hand, a service provider may be willing to accept any service request until a certain point, a limit, such as limitation to a maximum time the service provider is willing to travel.

The core concept of preferences relates to giving customers options to put conditions on service requests. It is to be understood by one skilled in the art that the term "preference" is not intended to restrict the core concept in any way. Other terms such as "condition," "filter conditions" or "qualification" may be used in its place. Nor is the term "limitation" intended to restrict the core concept of enabling a service provider to set limits on accepting service requests in any way. Terms such as "restriction" or "boundary" may be used in place of this term. Furthermore, the terms "preference" and "limitation" may be used in contrast to each other herein; this contrast is intended to portray the difference in user types, not to place "preferences" and "limitations" as fundamentally opposite, as a customer who has preferences may also have some sort of limitations, or a service provider who has limitations may also have certain preferences.

According to an exemplary embodiment of the present invention, an "indicator" is a means to transmit or display information related to on-demand services to a customer or to a service provider or both in a simple, fast, and convenient way.

According to an exemplary embodiment of the present invention, a customer is able to search for a potential best matching service provider by using "search parameters" or a "search radius" to identify potential available service providers. What is meant by these terms herein is a zone or region whose span is decided by the user's preference regarding its size on the electronic map display. The preference may be determined by a customer limiting a search to a desired number of service providers he or she wants to negotiate with, or to service providers who are within a certain distance from the pickup location or who can arrive to the pickup location within a certain amount of time. The term "search parameters" is used in reference to a "search region" or "geographic zone" may not necessarily be uniform, such as a search for all service providers within a certain time away from the pickup location. In some instances, the search region may be more uniform, such as when based on distance, where a customer may be searching for potential available service providers within two miles from the pickup location. In this case, a search parameter based on a radius of distance is referred to herein as "search radius." Meanwhile, the functionality of search parameters is also provided to a service provider, who may identify potential customers on an electronic map display through its use. By means of search parameters, a service provider may limit a search to a desired number of customers who he or she wants to make deals with, or to customers who are within a certain distance from the current location or whose pickup location is within certain travel time away from the current location.

Unless otherwise stated, a personal limitation may be referred to by the term "personal limitation" or simply by "limitation," There is an important distinction between "personal" and "legal" limitation; however, as there are legal limitations that apply to service providers, those limitations are imposed onto the service provider based on jurisdiction, whereas personal limitations are input and preset based on the service provider's discretion. "Limitations" herein refer to personal limitations unless specifically referred to as "legal limitations," which refers to the limitations imposed on the service by law or regulation.

The electronic map display can be generated by using a mapping application programming interface (API), such as Google® Maps or Waze®. In some implementations, the map can be displayed on a mobile device's touch screen, which would allow a user to specify the current location, pickup location, drop off location or return location by interacting with the electronic map display interface, enabled by touch screen sensors. A mapping functionality is crucial to dispatch, as it mines GPS data or geolocations to assist a service provider in identifying the customer's pickup location. In addition, with an electronic map display functionality, especially on a touch screen mobile device, a customer may more easily identify the location that is relevant to the service request, in addition to location search functions that may be provided by the same one or more other APIs. Furthermore, APIs may provide information such as distances, routes and estimated times of travel between locations indicated in a service request, which can in part be used to make price estimates, used by a service provider in evaluating potential available customers and used to find other valuable or relevant information for a service provider and a customer. Relevant sets of indicators that apply to mapping or locations may also be laid over the electronic map display of the surrounding area and interacted with by users. These location identifications can be entered through features such as a text box or search box input.

The touch screen display enables a customer to make selections regarding a service request, as sensors within the touch screen display react to touch. The signals that are received by the sensors within the touch screen display are what the processor may receive as input, and those signals may be turned into output, such as carrying out the selection a customer or the service provider has made. Further, the touch screen interactivity features may be of use when a customer and a service provider are in communication with each other, such as in negotiating a price for the service request, where certain system executions can be transmitted, for example a button where a service provider accepts the price proposal of a service request or a button where a customer rejects a price proposal. The touch screen display may also be implemented to communicate other information to a customer or a service provider, such as notifications or feedback. The touch screen display may also vary in what the user can interact with at certain times, such as when a service provider or a customer have agreed on a deal, indicators and information about other service providers and customers are removed from the display. In addition, a customer and a service provider may use the touch screen to interact with the various settings or limitations that are to be preset. These settings or limitations may be changed or turned on or off by functions such as manipulating a toggle or sliding scale provided on the touch screen display.

According to an exemplary embodiment of the present invention, based on the type of service requested by a customer, the system will propose a default price for the requested service. The system is able to take into account many discrete factors that go into presetting a price rate or price calculation method for the service in advance. When the system uses this price information to create a default price, this default price is then shown to a customer and a service provider as a reference point so that they have comprehensive information that relates to how much that service request would normally cost.

According to an exemplary embodiment of the present invention, users are grouped into two main user types based on the function they provide: service providers and customers. In addition to this division, service providers are divided into two categories: a regular service provider and a favorite service provider. Customers are divided into two categories: a regular customer and a favorite customer. customer and a service provider may add each other to a favorites list if they have a positive relationship. In addition, each of the categories is divided into three subcategories based on the type of service including transport service, delivery service and both transport and delivery service, a hybrid of the first two. User type one categories can be divided into three subcategories: a service provider for transport service, a service provider for delivery service, and a service provider for both transport and delivery service. Categories related to the user type two can be divided into three subcategories: a customer for transport service, a customer for delivery service, and a customer for both transport and delivery service. Service providers and customers can respectively offer or employ any of the aforementioned service subcategories.

Determination of whether a service request is a transport service, delivery service or both transport and delivery service is based on how the service request is categorized through an evaluation of the "goods" in question. For instance, the service request for a delivery of a suitcase from a customer's house to another location could be requested and carried out as a delivery service request, as a suitcase is a material item that could be grouped as a "good." However, if the service request involves a customer requesting transport service to the airport with the same suitcase and carry-on bag, it would be carried out as a transport request, as the bags are accompanying the customer, and this does not constitute an independent delivery of goods. An example of a hybrid request would be a customer who went to the furniture store and purchased a bed, table, and a set of chairs. In this case, the goods are central to the service request. However, if there is still a customer riding along in the vehicle, this request would be carried out as both transport and delivery service, where the price includes not only the price for the transport service request, but a surcharge or other fee based on the nature of the goods. How these service requests are to be carried out-whether as a transport service or a delivery service request or both—may also depend on local laws, regulations, or ordinances.

According to an exemplary embodiment of the present invention, users register with the system as a precondition to making or carrying out a service request or otherwise using any other functionality of the application or system. For a customer's registration process, the system prompts a customer for the information it needs, such as date of birth, address, gender, an email address or a phone number. The system may require a payment method or a home billing address or a credit card information. Other profile information may be added during the registration process, for instance: language spoken, a profile picture or any other relevant information that can be provided by the customer. A customer who has specific needs may also enter those needs into the system at the time of registration. For example, a customer may need to have a wheelchair accessible vehicle, or a customer may have a service animal to bring along, such as a seeing-eye dog or other type of service animal. The customer's profile information is not limited to just what is listed-relevant information may include any other relevant data or information that would help the system identify, match, and dispatch a service provider to carry out that customer's service request based on his or her preference.

According to an exemplary embodiment of the present invention, service providers register in the system prior to being able to carry out service requests or using any functionality of the application or system, in addition to passing verification process such as a background check. In this service provider's registration process, the system may prompt the service provider to enter information, such as a copy of a service provider's driver's license or ID, a credit card, other billing information or bank information for online money transfer. This information may include any biographical or historical details about the service provider and the service provider's driving history, including status of vehicle registration, and insurance licensing information or a security background review. Biographical details may include prompts to input information regarding a service provider's background: a service provider's gender, country of origin, native language and second language proficiency, if any. A service provider may provide comprehensive information about his or her vehicle or other method of providing service including but not limited to vehicle's make, model, and year as well as color, any details about the interior or exterior of the vehicle or the vehicle's accessibility and passenger capacity. Other information should be provided by a service provider that may be a factor in a delivery service request, such as method of delivery, for instance by bicycle or by foot or using public transportation, any limitations related to weight and size of goods to be delivered or any other information related to the delivery service. The service provider may input information about affiliations with other organizations as well. The more profile information is available about the service provider, the easier it is for the system to identify a match in pairing a service provider with a customer in a service request.

According to an exemplary embodiment of the present invention, the system uses data stored in the database to independently track a service provider's credentials to ensure that all required licenses and other required documents are valid and up to date. These documents may include but are not limited to a service provider's licenses, automobile insurance, other documentation (e.g., a Taxi & Limousine Commission license from the New York City Taxi &. Limousine Commission or other regulatory agencies), or any combination thereof. According to an exemplary embodiment of the present invention, expiration dates for these documents may be entered and stored within the system. If an expiration date is approaching, the system will automatically send a notification to the service provider at a pre-determined time before the expiration date. The notification may be sent by phone call, text message, email and/or any other form of communication. If the service provider does not provide the required documentation to prove it has been renewed and is valid, the system may automatically suspend the service provider and will not dispatch any service requests to the service provider until the service provider has provided new documentation that the relevant documentation has been renewed and is valid. There will be no disruption of dispatching of service requests if the service provider provides documentation of the renewal in a timely manner.

According to an exemplary embodiment of the present invention, having both service providers and customers register is necessary for the system, not only for the provision of on-demand services, but also for tracking and recording service transactions. If there is a dispute regarding a payment or any other subject, the system will provide a way to track who was involved in the transaction or when and where it occurred. A means of identification may be used by the system when information regarding service providers and customers is provided.

According to an exemplary embodiment of the present invention, once a customer or a service provider is registered with the system, he or she may begin making service requests or carrying out service requests. A customer makes a service request depending on needs and preferences, whether he or she needs transport service, delivery service, or both transport and delivery service. According to an exemplary embodiment of the present invention, a new customer who has just registered with the system is provided with the same features as a user who has been using the system extensively. A new customer, however, may not have the use of a favorites list upon making his or her first service request, as a favorites list and a blacklist have to do with past service requests unless the new customer has accepted a referral of a service provider provided by another customer.

The process of a customer presetting preferences however is the same for both new and established customers, where a customer may select the preferences and how important each one is, along with entering the search parameters for the service request. Then, the new customer, like an established customer, is given options for choosing a best matching service provider to carry out the request. In order for the system to generate an estimated price, it needs at least a pickup location and drop off location or destination location, whether the service request is for transport service, delivery service or both transport and delivery service, if, however, a customer does not know the exact address of either the pickup location or drop off location, a third party API such as Foursquare® or Google® Maps may assist with generating an exact address. A service provider, based on the type of service provided and the limitations he or she presets, may accept or reject any of the service requests. The process is different for customers and service providers, as the function they provide is different. For customers, making a service request begins once the settings and preferences have been preset. Depending on the service request type, a customer makes a service request. When the service request is made, the system will process it. In contrast, according to an exemplary embodiment of the present invention, when service providers have entered their limitations such as schedule needs, which type of request they prefer to carry out etc., they wait for the system to dispatch them a service request.

After a service request has been completed, the system will update indicators relevant to the information about the service, the service provider, and a customer and store updated information in the database. Examples of relevant information include the number and time of service requests and the geographic zones in which they take place. Also, there are ways for a customer to build a network of preferred service providers. For example, at the end of the service, a customer can add the service provider he or she liked to the list of favorite service providers. A customer can also accept a referral of a service provider from other customers, whether transport service, delivery service or both, and add this service provider to the favorites list once an authorization form the referred service provider has been obtained. A service provider can also build his or her network of preferred customers by accepting referrals of customers from other service providers, or he or she can choose to request that a customer be added to his or her favorites list at the end of the service. Favorites list additions require the consent of both parties, so being a good customer or providing good service is essential in building a network for customers and service providers, respectively.

According to an exemplary embodiment of the present invention, a customer may preset preferences, which detail the type of service to book. Customization allows for a customer to feel comfortable and satisfied with the quality of services he or she receives. Some examples of preferences for transport service include but are not limited to whether a route includes tolls or no tolls, time (e.g., take shortest route), a service provider's language skills or capabilities, a service provider's experience, a service provider's driving skills, a service provider's familiarity with certain areas, or any combination thereof. Examples of preferences for delivery service may include but are not limited to the method of delivery, whether by foot, bicycle, or vehicle such as a car, truck, motorbike or even an aircraft, to specific size of the vehicle, time (e.g., time of delivery of goods-urgent or not urgent), a service provider's language capabilities, a service provider's experience in delivering specific types of goods or the method with which the service provider delivers the goods, a service provider's skills, a service provider's familiarity with certain areas, the service provider's estimated time of arrival to the pickup location or any combination thereof. Essentially, there are several options that factor into providing the best service and the best service provider match for a customer. For example, a customer may want the service provider to deliver a piece of oversized furniture from point A to B and therefore only service providers with matching vehicle parameters could be dispatched to accept the service request to deliver that type of furniture.

A service provider's language capabilities may be important for both a customer and the service provider because knowing the same language fosters better communication between them and decreases the chances for misunderstandings. A service provider's gender may be important because, for example, a female customer may feel more comfortable and may prefer a female service provider when she is booking a service request during later hours at night. In addition, the number of customers cannot be beyond the limit of a service provider's vehicle's passenger capacity. If that's the case, the service request will be sent to another service provider whose vehicle does have the proper passenger capacity. The type of vehicle may also be a factor in order to determine the appropriate vehicle for a given service (e.g., number of seats available or size of the vehicle). Vehicle size is an important parameter for delivery service as delivery of some goods may require a larger vehicle than delivery of some smaller goods. Additionally, the make or model of the vehicle may be important because there are customers who prefer a specific kind of vehicle for their transport service or some customers may have more expensive tastes when picking a vehicle. A service provider's country of origin may also be important for communication purposes between the service provider and a customer because if the language they speak is common to both of them, they may share common interests or may be able to talk about common subjects. According to an exemplary embodiment of the present invention, preferences may also include gender and age of the service provider, language preference, etc. Even though some of preset preferences may mean longer waiting times for service, it nevertheless provides a higher level of security and customer customization and satisfaction, as these preferred options may be more desirable to a customer than shorter pickup times. Accordingly, the customized experience a customer receives results in quality personalized on-demand service.

If a customer chooses, he or she can either manually request one of the service providers from in the past or let the system identify the best matching service provider based on preset preferences. Depending on the type of service, a customer will be given a display that shows which service providers are near him or her and those service providers' estimated times of arrival, along with historical data that shows each service provider's familiarity with the route a customer has indicated in the service request. Taking many different factors and preferences from a customer into account in picking a service provider to fulfill a service request is important in providing excellent, tailored service. Exemplary embodiments of the present invention take into account all of these factors and provide the system for the customers to input their preferences through their computing devices.

Preferences allow a customer to preset desired parameters regarding the service provider and vehicle as well as indicate how long he or she is willing to wait for a desired service provider with matching parameters. A service provider accepts service requests at his or her own discretion. If a service provider doesn't match the criteria specified by the customer, the system will automatically skip the service provider and find the next matching service provider. According to an exemplary embodiment of the present invention, a service provider does not necessarily have to meet all of the criteria identified by a customer to be the best matched, particularly where there are no direct matches to the customer's request. A customer may be presented with a user interface that identifies all of the potential available service providers that are partial matches that do match with the criteria preset by the customer. In addition to preference matches, the information a customer is presented with may include other relevant information including but not limited to when a service provider should arrive or how familiar a service provider is with the area indicated in the service request. For delivery service, the customers may be looking for specific type of service providers' skills and vehicle characteristics. For example, a customer may be looking for a service provider for a delivery request who is experienced and comfortable in transporting certain types of goods such as valuable, fragile glass items and whose vehicle could accommodate those items.

According to an exemplary embodiment of the present invention, a platform is provided for customers to not only indicate in a transport service request how many people are travelling at once but also to describe their specific needs, such as a baby seat or an accessible vehicle. This same disclosure of needs also applies to delivery service: the system will find the next best matching service provider who may be driving a larger vehicle, for example a mini-van, in order to match the customer's needs with the service provider's capabilities. This is also applicable to customers who may be traveling with luggage. A large sized suitcase or a large volume of luggage will require a larger vehicle to accommodate a customer's needs. Other preferences may include time of a pickup and delivery of goods, experience in transporting fragile or hazardous materials, experience in transporting pets or ability to accommodate pets or kids, etc.

Having the system analyze past service requests and make matches based on the details from the past service requests allows for the provision of the best match. The best match will more likely be able to make a customer more comfortable with the service provider since the service provider has prior experience for the same or similar service request, and potential experience with transporting the same customer or delivering the same type of goods. The service provider may be able to avoid traffic and get to the destination efficiently, which lets a customer enjoy the ride or give a customer peace of mind that the goods will be delivered on time and safely.

According to an exemplary embodiment of the present invention, customers may change their preferences at any time at their own discretion. The system will then dynamically update the database to reflect these changes. According to an exemplary embodiment of the present invention, a customer may adjust the settings regarding the preferences. A customer may adjust the preferences in multiple ways. First, he or she can choose whether a preference is a precondition for a service provider to be a potential best matching service provider. For instance, a preference such as language may be used: a customer who is only able to speak Mandarin has the discretion to stipulate that all service providers among whom he or she may choose are able to speak Mandarin. In another example, a customer may preset in the settings to choose a best matching service provider among service providers who have at least certain percent route familiarity indication, such as 50 percent. Any service provider who does not meet this condition is precluded from being a possible service provider for a customer for that specific request, and any service provider from 50-100 percent may be included.

According to an exemplary embodiment of the present invention, in order to adequately consider the service provider's personal limitations, the system will prompt the service provider to input information that may affect the quality of service.

Any input limitations will be entered into the database of the system. This information is useful to match the service provider up with service requests; both a customer and the service provider can be better matched when there is more information available. Not only are the service provider's disposition and language ability important for the system to make a good match, but also important is historical information such as how familiar a service provider is with certain areas, or whether a service provider doesn't like to drive or deliver items to certain areas. It's reasonable that a service provider would like to be able to control or limit to a certain extent where he or she provides service, as he or she may have prior arrangements or meetings or other scheduling demands set on his or her schedule; providing on-demand service can be unpredictable, and without constraints a service provider's duties may make him or her unable to meet those demands unless the service provider presets one or more service limitations.

According to an exemplary embodiment of the present invention, service provider profiles may include not only photos of the service providers themselves but also photos of the vehicle that is being used by the service provider for carrying out on-demand service. The service provider can take multiple pictures from different angles of the vehicle. Different pictures are necessary because vehicles may look alike from the outside. Service providers may also upload pictures of the inside of the vehicle as well to enable the system to provide more comprehensive information about their vehicles.

According to an exemplary embodiment of the present invention, a service provider may preset the type of service requests the service provider would like to provide prior to being dispatched to carry out the requests. Some service providers may not have a service type limitation, and would carry out both transport service of customers and delivery service of goods. Some service providers may prefer to limit which type of service they provide, and prefer to only do one type of service. There are many reasons that service providers may want to exclusively carry out certain types of service requests, and they are given the discretion to choose to do so; as service requests types differ, so do service providers. In addition to a delivery-only or transport-only settings, eligible service providers with vehicles and the correct licensure and insurance status may also further limit or broaden who and what they would like to have in their vehicle. For instance, a service provider may limit transport requests that would involve having a dog in the vehicle. In another situation, a service provider whose vehicle capacity could hold up to four passengers in a transport request can preset that he or she cannot accommodate a baby or toddler, as he or she does not have a child seat. Along with transport service limitations, there are limitations regarding the delivery of goods. A service provider's vehicle may not have the capacity for a large item such as a bed, mattress or table, or a package may be too heavy or unwieldy for a service provider on a bicycle to handle, so they may limit the size of the goods. The service provider may also limit based on weight of goods and the number of goods. Another service provider may have an allergy to an item that another service provider does not. Service providers are also able to specify whether they can accommodate pets. The goods to be delivered may be disclosed so that a service provider may properly be dispatched based on the parameters of the goods.

According to an exemplary embodiment of the present invention, service providers may set limitations for transport service or delivery service they will provide, for instance, by selecting to only be provided requests with pickup and drop off locations that are within certain locations, more specifically within predefined geographical locations where the service provider prefers to provide service. For example, a service provider may only prefer to provide service within ten miles of certain neighborhoods within the borough of Queens in New York City. However, location cannot always be cleanly separated from time. In certain circumstances, when a provider provides a location limitation that has a connection to a certain time, such as needing to be at a location at a certain time for an appointment, the service provider will be able to set a time limitation in accordance to a location limitation. As opposed to other current on-demand service applications, which do not have a system that is focused around identifying the service providers' limitations, this system takes into account convenience and personal limitations for service providers.

Exemplary embodiments of the present invention differentiate from the current practice in that a service provider enter location limitations into the system. The preset location limitations can include the service provider's location and also the time by which he or she needs to return. For example, the service provider may preset in the settings to only accept service requests within Borough A because he or she needs to be back at a certain time and is unwilling to stray too far from where he or she needs to be later. When the system receives a request from a customer, it will only dispatch a service provider whose settings match the service request, which is calculated by determining the estimated travel time, or how long a service provider needs to complete that request, including the total estimated travel time from the service provider's initial location to the pickup location, from the pickup location to the drop off location and from the drop off location to the service provider's preset return location, if there is one. Naturally, this will also depend on the service and the service provider. For instance, a service provider who may be delivering a small package by foot may take longer than a service provider driving a vehicle would need on the same route. The system accounts for these different variables associated with the service request type and service provider.

According to an exemplary embodiment of the present invention, service providers may be assisted by the system in presetting these location limitations. Location exclusions can be based on one or more streets, zip codes, town, city, borough or county, state or any other region defining feature as location limitations in which a service provider is unwilling to provide service. For example, a service provider who would like to exclude the borough of Manhattan from service requests does not have to preset a list of all of its zip codes. The system may group zip codes into borough or county, town, city, or state into mapping data in the database. Once the system identifies the zip codes or other limitation information, it will skip a service provider with relevant location limitations by not sending a service request that involves areas within the limitations. For example, a service provider would preset to limit service to not include the borough of Manhattan. With that information, the system is able to exclude any zip code that is relevant to that grouping a service provider would like to exclude. A service provider who has preset to provide service only in the boroughs of Queens and Brooklyn will know that he or she will be skipped over for any service which takes place in Manhattan.

According to an exemplary embodiment of the present invention, the system will further analyze service providers' limitations. Service providers who do not match the parameters will not receive the dispatch request from a customer. Location limitations can be changed by the service provider at any time. This allows a service provider to freely indicate preferred locations in the event they change according to a schedule. For example, a service provider's shift may end in the next hour to the next three hours, and the service provider may change his or her location limitations to a different area that may be a location or area that is closer to where he or she lives or will be going after or during the shift. The service provider can then possibly receive a service request where the destination is within this location preset by the service provider. Accordingly, the service provider can take the service request knowing that he or she is still heading towards where he or she will be going to anyway after or during the shift without changing plans.

According to an exemplary embodiment of the present invention, the system will also use information stored in the database to determine if a service request could be completed by a service provider with matching location limitations within his or her time limitations. Time limitations and location limitations may not always have a clear or absolute division, as the time limitations are often tied to locations. Therefore, when a service provider presets the time limitations, he or she will accordingly set a location limitation which may be a specific address, zip code, landmark, business name, government or commercial building or other building name where the service provider wants the shift to end. The system will then calculate the estimated time needed for the service provider to complete the service request to determine whether the service provider will be able to complete the request on time according to the preset time limitations. In this exemplary embodiment of the present invention, if it is determined that the service request cannot be completed within the time limitations of that service provider, then the system will automatically skip the service provider and move to the next service provider whose time limitations as set within his or her profile allow the service provider to complete the service request.

According to an exemplary embodiment of the present invention a service provider can preset time limitations to allow only the service requests that are within time limitations. Time limitations could be fixed. If a service provider chooses to set fixed time limitations, he or she would not receive dispatch requests that fall beyond those time limitations. If service providers choose not to set any limitations, the system will assume that the service providers have no time limitations and will dispatch such service providers at any time while they are currently on duty, subject to the acceptance of the service provider. Presetting time limitations allow service providers to work around whatever schedule demands they may have unless law or regulation has different requirements, and the system may accommodate those service providers' schedule demands by purposefully notifying them of service requests that particularly match their limitations.

According to an exemplary embodiment of the present invention various available methods may be incorporated, including third party APIs, such as Google® Maps, to estimate the time required to complete the service request, taking into account current and/or future predicted traffic and other events that could impact travel time (e.g., construction, road closures or accidents) that may impact the time or location limitation preset by the service provider. According to an exemplary embodiment of the present invention, a service provider's actual speed while traveling will be used, in addition to available traffic information and other factors, to determine a more accurate estimated time of arrival or travel time. The system will determine if a service request can be completed by the service provider with matching location limitations within his or her time limitations. If it is determined that the service request cannot be completed within the time limitations of that service provider, then the system will automatically skip the service provider and move to the next service provider whose time limitations as set within his or her profile may allow the service provider to complete the service request. According to an exemplary embodiment of the present invention, service providers may change their time or location limitations at any time at their own discretion. The system will then dynamically update the database to reflect these changes.

According to an exemplary embodiment of the present invention, the system may also provide notifications to a service provider that there are several service requests available for him or her to choose from. The service provider may then see all available service requests, including but not limited to pick up and drop off location and choose the best service request from all available options. As soon as a service provider accepts one service request, all the other requests will be removed for that service provider. As soon as a service provider completes the accepted service request, the service provider may receive a notification about new available service requests. According to an exemplary embodiment of the present invention, a service provider is able to limit the amount of customers they may see in their pool of potential available customers. A service provider may limit the amount of potential available customers in multiple ways. A service provider is able to specify by the number of potential compatible customers displayed on a mobile device.

According to an embodiment of the present invention, some potential available customer-service provider matches may be prohibited by law or ordinance. In this case, the service provider who may be potentially breaking the law will be automatically passed over in being possibly dispatched as a best matching service provider. Regardless of how a service provider's limitations and profile information match with a customer's service request or a customer's preferences, the service provider will nonetheless be skipped over. Examples of a situation may be if a service provider providing transport service is in a certain kind of vehicle in a certain geographic zone or region (such as a green cab being disallowed from lawfully providing hail service below West 110th Street and East 96th Street in New York City) that is not allowed to provide service, or service at certain times of day. Further, a service provider for transport may not be allowed to take over a certain amount of people at once. Another is a service provider not being able provide transport service when one of the passengers is a child when local regulation calls for the use of a special child seat. This is a limitation imposed on service providers; it is not a preset that service providers choose to enact. Rather, this is implemented system wide, and the system may be adjusted accordingly to comply with certain rules, regulations or laws imposed in various jurisdictions.

In certain jurisdictions, there may be legal limitations that regard prohibiting disclosing certain information to certain parties before a service request is accepted. For instance, in jurisdictions that stipulate that the service provider cannot know the exact destination before accepting a service request, the system will automatically adjust to that situation. The destination will have to be revealed to the service provider, as he or she will have travel to the drop off location eventually; however, it will be hidden until the service provider has accepted the request. For instance, in this situation, the system would hide the exact drop off location that a customer may have indicated, but still supply information such as the estimated travel time and the possible mileage of the service request. Service providers will still be provided with various sets of indicators with other information so they may make as informed as choice as lawfully allowed. In a jurisdiction such as this, a customer may provide the drop off location to the system, and the system will be adjusted to provide all necessary information to service providers while maintaining legal compliance.

Providing feedback is an important function of improving service. Feedback is given through not only a rating system but also through allowing users to add other users they have interacted with to different lists. Exemplary embodiments of the present invention provide methods of important, dynamic feedback to maintain quality service, whether from the point of view of the service provider or a customer. There are three types of feedback positive, neutral and negative. One skilled in the art would appreciate that these may be terms such as "good" feedback" or "bad feedback" or "OK feedback," these terms are meant to be illustrative ideas to convey the underlying meaning and core concept of different levels of feedback, from excellent to satisfactory to unsatisfactory. Positive feedback is given by a customer or a service provider when service was good. Neutral feedback is for service that wasn't bad or good, simply adequate. When customers or service providers rate each other as neutral, it will not affect the level of priority in being matched up in a future service request. Negative feedback is given when customers or service providers would never like to be matched up with their counterpart ever again, as service was bad.

Preset reasons for rating are provided to customers and service providers. Preset reasons differ based on the nature of the feedback but are an easy way for customers and service providers to provide feedback to the other party. Reasons for positive feedback may also differ based on whether the party being given feedback is a customer or a service provider. A customer may be rated positively by a service provider for reasons such as politeness, promptness, generousness, considerateness or any other reason or reasons the service provider was satisfied with a customer. For a service provider, feedback may include but is not limited to reasons such as vehicle cleanliness, air quality, driving skills, familiarity with routes and locations, language or communication capabilities, service provider's demeanor, efficiency of services, professionalism, willingness to accommodate a customer or any other reason or reasons why a customer was satisfied with the service or the service provider. According to an exemplary embodiment of the present invention, customers or service providers can provide their own comments and remarks about the other party, in addition to preset reasons or messages. This is optional, as a user does not necessarily have to give a rating if they do not want to. Feedback is intended to be information that users may use to evaluate each other, so providing the opportunity for customized feedback to be given is important. Regardless of whether the feedback that is given is positive, neutral or negative feedback, customers may enter their message in their own words in addition to the reasons that have been preset by the system. There may be situations in which a customer or a service provider may want to explain in their own words why the other party was exceptional, or what they thought was bad about the service. Allowing users to enter their own feedback is important in providing dynamic feedback in any situation, and furthermore it may be attached to a user's profile or otherwise associated with him or her to use when making a referral to another customer or service provider.

According to an embodiment of the present invention, preset reasons for negative feedback may stem from a wide range of possibilities, also based on user type in a service request. For service providers it may include but is not limited to: vehicle uncleanliness, not showing up, playing music too loud or being too loud in general, verbal or physical abuse, poor driving skills, lack of familiarity with the conditions on the street or traffic conditions, badly following instructions, improperly handling goods, broken or lost goods, late delivery or any other reason that left a customer unhappy or dissatisfied with the service provided. For customers, these reasons could include but are not limited to uncleanliness, loudness or obtrusiveness, being a no-show, verbal or physical abuse or refusal of payment or any other reason that made the service provider unhappy or dissatisfied with a customer. These preset reasons for negative feedback do not make an exhaustive list but represent examples of possible scenarios and behaviors that would elicit a negative response from a service provider or a customer.

According to an exemplary embodiment of the present invention, feedback is incorporated into the database and associated with the user who received it. This association allows a customer or a service provider to access the feedback the other party has received if they would like to make determinations based on a past service record. Exemplary embodiments of the present invention provide a platform where the feedback of service providers and/or customers are sent through the system, then are processed and stored by the system. The more relevant feedback options available to a user, the more customized experience he or she may receive in the future.

According to an exemplary embodiment of the present invention, feedback will be sent to the service provider who completed the service request. The system may provide preset reasons relevant to user type that a customer or a service provider can choose from in providing feedback. Positive and negative feedback can be provided in form of a message that can be submitted through email, text message or notification. Service providers and customers will be informed about what the other party thought about their service or service request, vehicles, driving skills, safety, attitudes, efficiency and quality of delivery service, or anything else. In the case of negative feedback, however, it may not be visible immediately to the party who receives it. Instead, the negative feedback will be forwarded at a later time for the service provider or customer to view, to lessen the likelihood of direct confrontation between a service provider and a customer. When the service provider or customer views the negative feedback, there will be no name indicated, as the negative feedback will be given anonymously. Negative feedback that has been provided may be grouped with other negative feedback, so the user may not know exactly which provider submitted specific feedback. In this manner, the service providers would then be made aware of what they may change in order to improve their service, and customers would be made aware of what they may do differently to be better customers. This helps to improve the overall performance and overall satisfaction.

Furthermore, repeatedly negative feedback may cause the service provider or a customer to be suspended for a predetermined period of time-users are notified of the reasons they have been provided negative feedback, and if the same negative feedback persists for a period of time for the same user, he or she may be suspended. Suspending a service provider or customer, however may not be only based on negative feedback. If a service provider or customer breaks or grossly violates the law or makes any other serious violation or offense during service, the service provider may be suspended based on that act. In addition to providing feedback, service providers and customers may, if they choose, add the other party to a favorites list or blacklist. This is not a mandatory function of providing feedback; instead, it is a way to build a network of service providers or customers which can be customized based on relationship: blacklists allow users to block another party, while a favorites list allows users to establish a customer-service provider relationship with another party.

According to an exemplary embodiment of the present invention, terms used herein to refer to a customer who has an established positive relationship with a service provider is a "favorite customer," who is on a service provider's "favorites list," and a service provider who has an established positive relationship with a customer is referred to as a "favorite service provider," who is on a customer's "favorites list." Though "favorite" is a semantically narrow term, what is really meant by it is that it refers to any customer or service provider who is given a preferred status relating to a service request by being on a "favorites list." It is to be understood by one skilled in the art that this concept may be, for example, referred to as a "friend," "top" or "priority" service providers list, or any other word that may be used by service providers or customers to define what is meant by the list; whatever the word, the intention is to denote a concept regarding a positive service provider-customer relationship where they can prioritize service to each other. This preferred method could include, but isn't limited to, concepts such as a favorite service provider being provided notification early or sooner about an available service request, being given special status or consideration in carrying out a request, being proposed a better price, being assigned a different indicator compared to other service providers, or establishing a direct connection with a favorite customer for a direct service request. For a customer, being a "favorite customer" may mean he or she is prioritized to the service provider, may be assigned a different indicator compared to other regular customers on the service provider's mobile device or establishing a direct connection with a favorite service provider for a direct service request. A service provider may have one or more favorite customers on his or her favorites list, and a customer may have one or more favorite service providers on his or her favorites list.

According to an exemplary embodiment of the present invention, feedback is given partly through a list system. There are two lists: the favorites list and the blacklist; the favorites list, based on positive feedback, and the blacklist, based on negative feedback. Both provide ways for a customer or a service provider to control whom he or she requests service from or whom he or she provides service to. Adding to the favorites list directly or indirectly increases the likelihood of repeating an earlier good experience for either party, while adding to the blacklist directly or indirectly guarantees that a previous bad experience won't be relived. Or, if customers or service providers deem the service to be simply adequate, they may choose to rate the other party however they like whenever they want to. Favorites lists and blacklists are based on subcategory and user type. The first user type for service providers is divided into three subcategories: favorite service provider for transport service, favorite service provider for delivery service, or favorite service provider of both transport and delivery service. The second user type for customers is divided into three subcategories: favorite customer for transport service, favorite delivery service customer, or favorite customer for both transport and delivery service.

In an exemplary embodiment of the present invention, customers can send requests to service providers to add them to their favorites lists. A customer's favorites list enables customers to add service providers they like or are comfortable with to a list, and those service providers who accept being on the list are given special privileges regarding service requests. The favorites list may apply to any subcategory-delivery service, transport service, or both.

According to an exemplary embodiment of the present invention, customers may add one or more service providers to their favorites list. In order for a customer to add the service provider to the favorites list, a customer may obtain authorization from the service provider; the service provider will receive a message asking whether the service provider authorizes this action, and this authorization is based on the subcategory a customer requests to add the service provider to, whether transport, delivery or both. If the service provider confirms, then the service provider will be added to a customer's favorites list. The service provider is also given a choice to accept or reject being added to the favorites list in certain service subcategories. If a customer requested broadly that the service provider be added to all subcategories, the service provider may choose to accept one, two or any subcategory requests at his or her own discretion. Authorization goes two ways: firstly, it authorizes the addition of the service provider to a customer's favorites list. Secondly, authorizing the addition to someone else's favorites also places him or her on the authorizer's favorites list. In essence, an authorization adds a second user to a first user's favorites list while at the same time adding the first user to the second user's favorites list.

By adding to the favorites list, a customer makes sure that he or she can get the service provided by the service providers he or she had positive service experiences with in the past. That would also increase a customer's and a service provider's satisfaction because the service providers would be more familiar with the routes and specifics of delivery service, which would eliminate uncertainties and provide for fast and efficient service. Customers would also feel more comfortable with the service since they have had experiences with the service provider in the past. Having a service provider on a customer's favorites list is a dynamic process; customers may add or remove service providers to/from their favorites lists at any time at their own discretion.

When a customer has sent a request to add a service provider to his or her favorites list and the service provider has accepted it, a special working relationship is marked between those two parties; the relationship grants certain privileges regarding service requests. Favorite service providers will be notified and given priority over other, non-favorite service providers in carrying out a service request if a customer has preset it as a default setting regarding service requests. Favorite service providers are also displayed to a customer and a customer can see their information in a service request; which allows them to make an informed decision when choosing a best matching service provider. This may also depend on the type of service request the favorite service provider is carrying out. Some favorite service providers may only transport riders and others may only deliver goods. A service provider who is displayed as available will differ depending on the subcategory the service he or she provides belongs to. According to an exemplary embodiment of the present invention, when booking a service, a customer may check whether there is a favorite service provider or available favorite service provider who may be able to provide the requested service. In the event the customer does not have a favorite service provider on his or her favorites list, since it may be a customer's first time placing a service request, a customer may use the search function to filter through regular service providers and find a regular service provider who may be the best fit. If a customer has no a favorite service provider available, a customer may use the service request search function to filter regular service providers to find the best matching service provider to provide service. It is to be understood by the skilled in the art that the "favorites" lists may be separate lists for service, where the list may be for transport service, delivery service or synchronized to reflect both transport and delivery service, as described above.

According to an exemplary embodiment of the present invention, a service provider is allowed to add one or more customers into a favorites lists after having completed service requests for those one or more customers. The service provider's favorites list is a list of customers service providers may put customers on, which establishes a service provider-customer working relationship with certain priority positions. This favorites list allows a service provider to have a more consistent set of customers. When a service provider would like to add a customer to the favorites list, the system will send a request to the customer asking whether he or she authorizes the addition to that service provider's favorites list. This authorization could apply to a favorites list that is for delivery service only, transport service only, or a favorites list of both; it is the service provider's decision to ask for authorization for each category. According to an exemplary embodiment of the present invention, if a customer confirms, then a customer will be on the service provider's favorites list in the applicable subcategory transport or delivery, or both if applicable. In an exemplary embodiment, a customer may accept the request first in order to be added to the favorites list, for either one category or both. A customer may, in the alternative, reject the request. When a customer authorizes a service provider's favorites list request, the service provider will also be added to a customer's favorites list. Service providers may also remove a customer from the service provider's favorites list at any time through interaction with the system. While the present invention may require authorization for adding a service provider/customer to a favorites list, no authorization is required for removal from such lists. A service provider adding a customer to a favorites list is a dynamic process; a service provider may request to add or decide to remove customers to or from the favorites list at any time at his or her own discretion, regardless of which list a customer may be on.

The favorites list allows for greater customer service and overall satisfaction with the service. Service providers can complete more service requests since they are more familiar with a customer's requirements and know more about a customer if they are matched up more frequently with them. In accordance with an exemplary embodiment of the present invention, the system recognizes indicators of favorite customers and automatically connects the matching favorite service providers with customers in order to improve efficiency of service. The favorites list also serves as an incentive tool because service providers are more likely to improve their overall service if they know they can get more business from favorite customers on a more frequent basis. According to exemplary embodiments of the present invention, the service provider's "blacklist" and a customer's "blacklist" refer to a list that prevents a match between a service provider and a customer in the future. It is to be understood by one skilled in the art that other terms may be used to describe this concept, such as "block list" or "ban list" or "dislike list"; whatever the terms are or may be, the concept remains the same-a way for a service provider to control which customers he or she does not want to provide service to or contact and a way for a customer to control service providers he or she does not want to seek service from. There could be many reasons a service provider may not want to come into contact with a customer, not only limited to past conflicts or confrontation; service providers and customers have absolute discretion in choosing whether they come into contact with someone, and that discretion is given to them through being able to make additions to or removals from their blacklists.

According to an exemplary embodiment of the present invention, a customer will be able to one or more service providers to his or her blacklist. As disclosed above, it is to be understood by one skilled in the art that the "customer's blacklist" may be separate list for transport service and delivery service or be synchronized to include both transport and delivery service. A blacklist within the system will allow customers who do not have a good working relationship with certain service providers to block contact with those service providers. A blacklist will contain all the service providers that a customer had bad experiences with, though the service providers who have been put on a blacklist do not need to know who put them on the blacklist-they will just be alerted by the system regarding the reasons that led to an anonymous negative rating.

When customers indicate that they want to add a service provider or service providers to their blacklist, they input the reason why they are doing it. Perhaps the service provider was disagreeable to the customer or was otherwise unpleasant. Perhaps the service provider's vehicle was dirty or he or she drove recklessly or damaged the goods to be delivered. In another example, a service provider could have taken the wrong route and gotten lost, or maybe was taking a longer route than necessary. Whatever the case, a customer inputs the reasons for the adding the service provider to his or her blacklist, and the system gathers these reasons for improving service. This addition to the blacklist may be for transport service or for delivery service or for both transport and delivery service. For example, if a service provider was blacklisted because the interior of the vehicle was dirty, the system will know that in the past the service provider had a dirty vehicle. The system will recognize the identification of blacklisted service providers and automatically program the dispatch to skip the blacklisted service provider in finding a best matching service provider in a service request from a customer. Skipping over certain blacklisted service providers automatically improves the efficiency of service for the customer. The blacklist will also serve as an incentive tool because service providers will be more likely to improve their overall service if they continue to be blacklisted by customers on a frequent basis, as being frequently blacklisted will cause business to slow down for that particular service provider, and the service provider may realize that he or she needs to improve service in order to gain more business.

Customers may add service providers to or remove service providers from the blacklist at any time; the blacklisted service providers don't need not stay on the blacklist forever, unless a customer would like them to be. Neither of these actions require any authorization from the service provider, no matter whether it is adding or removing a service provider to or from the blacklist.

It is possible to have incidents ending in confrontations and arguments between service providers and customers. The present invention will assist in avoiding confrontations and improving the overall service by allowing the system to delay notification to the blacklisted service provider. The delay may be for a certain time after service completion, for example, two hours, after which, the notification indicates that the service provider was put on the blacklist because the service provider has a bad attitude, is rude or didn't deliver the goods on time, etc. The system will send the customer's reasons to the service provider so the service provider will know why he or she has been placed on a blacklist and can improve service accordingly. The name of a customer or any other identifying information will not be disclosed to the service provider.

Some service providers may be affiliated with other business entities. If a customer has a bad experience with or does not like those business entities that one or more service providers belong to, he or she may choose also to add those entities including any service providers who have an affiliation with them to the blacklist. According to an exemplary embodiment of present invention, a customer requesting that a corresponding service provider be added to the blacklist precludes that same blacklisted service provider from being added to the customer's favorites list. In essence, a blacklisted service provider can't be on a customer's blacklist at the same time as being on the same customer's favorites list.

According to an exemplary embodiment of the present invention, service providers are given the option of adding customers to their blacklists. As disclosed above, it is to be understood by those skilled in the art that the "service provider's blacklist" may be a separate list for transport service or delivery service or be synchronized to include both transport and delivery service. When a service provider adds a customer to the blacklist, the service provider is skipped over by the system in searching for a best matching service provider for that same customer's service request. A service provider may add a customer to the blacklist without having to obtain authorization from a customer if such customer is rude or offensive or any other reason that may discourage the service provider from providing service for this customer again. A service provider provides at least one preset explanation or adds a one or more new reasons as to why the customer was blacklisted, and the system will then send the customer a message with the reasons why he or she was put on the blacklist after a delay of a certain time, such as one hour or one or more days. These reasons could be one or more or any combination of the following: the customer may have made the interior of the vehicle dirty or may have been rude to the service provider or, in case of delivery service, has requested prohibited goods to be delivered, or for any other possible reason. Whatever the reason, the service provider provides them to when blacklisting one or more customers. In this case the customer can be conscious of those reasons. To avoid confrontation, when the system receives a service request from a customer who was put on the blacklist it will automatically send the request to another service provider, automatically skipping the service providers who had put such customers on the blacklist.

Service providers may add customers to or remove customers from the blacklist at any time; the blacklisted customers don't need not stay on the blacklist indefinitely, unless the service provider would like them to be. Neither of these actions require any authorization from a customer.

According an exemplary embodiment of present invention, a service provider requesting that a corresponding customer be added to the blacklist precludes that same blacklisted customer from being added to the service provider's favorites list. In essence, a blacklisted customer can't be at the same time for the same service provider a favorite customer, to improve satisfactory service.

Referrals may happen between parties-a customer referring a service provider to a second customer, or a service provider referring a customer to a second service provider. These referrals may happen regardless of service type, whether customers or service providers are only involved in transport service or delivery service or both transport and delivery service. Referrals may happen regardless of whether a customer or a service provider being referred is on a blacklist or a favorites list. Regardless of the case, users may make referrals to other users, as long as both users are registered with the system. This referral can be initiated in two different ways: a user can make a referral, or a user can ask another user to make a referral to him or her. Included also may be a reason for the referral for both favorites list referrals and blacklist referrals. This reason may be chosen from a preset reason or may include another way of conveying reasons, such as a note that a customer or a service provider may type in. For example, if a customer is looking for a service provider for transport who can drive well in snow, he or she may ask a second customer to recommend a service provider from his or her favorites list who is good at driving in the snow. For users who are receiving a blacklist or a favorites list referral, the information about the service provider or customer being referred to them will be available, such as profile information or the total number of transactions they have made. And in a favorites list request, where consent from a customer or a service provider may be required, the referred party is likewise provided information about the user to whom they are being referred. For example, the second customer who is receiving information about a service provider may see in the rating information of that service provider that he or she has been a no-show, and a customer may choose not to add that service provider to the favorites list. If there is referral that happens, whether it regards a customer or service provider putting another party on a favorites list or a blacklist, and the system identifies that the other party is already on the second user's favorites list or blacklist, then no referral happens, as there is no need for it to happen; if a service provider is already on the second customer's favorites list, then there is no need for the referral to take place. In addition, if a user being added to a favorites is on the second user's blacklist, the second user must remove the user from the blacklist first before proceeding with the favorites list addition. If a user being added to a blacklist is on the second user's favorites list, it is the second user's discretion to add the user the blacklist.

According to an exemplary embodiment of the present invention, a customer may refer the service provider from his or her favorites list to another customer, where a referring customer may refer individual service provider, groups of service providers or entire favorites lists to one or more other customers, and a customer may include one or more preset reasons or a note to describe why he or she is referring the service provider or service providers.

The process of referring a favorite service provider to another customer involves at least two customers and at least one service provider on the customer's favorites list it may start one of two ways: either the first customer initiates the process, identifying the service provider on the favorites list to be referred as well as identifying the second customer, who is the customer receiving the referral, or the second customer can request that the first customer send him or her a referral. After a favorite service provider and a second customer have been identified, the system may transmit the authorization request. This authorization request may go to the favorite service provider, who can either accept the referral or reject the referral at his or her own discretion—the favorite service provider being referred may provide his or her authorization prior to being added to the favorites list. If the favorite service provider accepted the request, the referral goes into the next step, where the system sends the referral to the second customer. The second customer is then given the choice to accept or reject the request; only upon confirmation from both parties may the favorite service provider be added to the customer's favorites list. If a customer is making a referral of the same service provider who is on his or her favorites list for both subcategories, the second customer may choose to limit the scope of the referral to just one subcategory. There are no limitations as to the number of service providers who may be referred and the number of service provider referrals that may be accepted by the customers, and there is no restriction regarding whether referral or acceptance is for customer's favorites list of service providers who provide transport service, delivery service or both.

For example, Customer A wants to refer Service Provider B and Service Provider C to Customer D. Customer D will then decide on whether or not to accept the referred service providers, where Customer D has discretion in making full or partial acceptance of the referred service providers. For example, Customer D may be willing to only accept Service Provider B but not to accept Service Provider C, where Customer D doesn't need not provide explanation as to why the referral of Service Provider C was rejected. If the second customer's blacklist includes the service provider being referred to him or her, it is the second customer's discretion whether to accept it; he or she must first remove the service provider from his or her blacklist for the referral to continue. According to an exemplary embodiment of the present invention, there are situations in which a customer has only requested one type of service from a provider. If this customer is referring that same service provider to a second customer, the second customer may need to seek extra authorization from the referred service provider if he or she wants to change or broaden the favorites list category from one type of service to another or from one type to both. Referring service providers to other customers lets customers build their networks.

According to an exemplary embodiment of the present invention, a customer may refer the service providers from his or her blacklist to another customer, where a referring customer may refer an individual service provider, groups of service providers or entire lists of blacklisted service providers to one or several other customers if these one or more service providers were not on the blacklist of another customer before.

The process requires at least two customers and one service provider. The referral of a blacklisted service provider can be initiated one of two ways. Either the first customer can send the referral to the second customer, or the second customer can send a request to the first customer that indicates he or she would like a referral of a blacklisted service provider. The second customer and the blacklisted service provider are identified by the first customer. Then, the first customer sends the referral request to the second customer, which may include the reasons that he or she blacklisted the service provider. When the second customer receives this request, he or she chooses whether or not to add the blacklisted service provider to his or her blacklist. If the second customer makes the addition to the blacklist, the system will not match them up for a future service request. Whether the service providers on the blacklists were blacklisted regarding transport service, delivery service or both transport and delivery service does not affect the customer's ability to refer those service providers. Furthermore, there are no limitations as to the number of blacklisted service providers who may be referred and the number of blacklisted service provider referrals that may be accepted by the customers. The blacklisted service providers need not provide their authorization prior to being added to somebody else's blacklist, irrespective of which type of blacklist the service providers are on. For example, Customer A wants to refer Service Provider B and Service Provider C to Customer D. Customer D will then decide on whether or not to accept the referred service providers, where Customer D has discretion in making full or partial acceptance of the referred service providers. For example, Customer D may be willing to only accept Service Provider B but not to accept Service Provider C, where Customer doesn't need to provide explanation as to why the referral of Service Provider C was rejected.

According to an exemplary embodiment of the present invention, service providers may refer the customers from their favorites list to other service providers, where a referring service provider may refer an individual customer, groups of customers or entire favorites lists to one or several other service providers. These customers may be from a favorites list for transport service, delivery service or both transport and delivery service, and the service provider may include one or more preset reasons or a note to describe why he or she is referring the favorite customer or customers. The process begins with at least two service providers and a customer. The referral can be initiated two distinct ways: either the first service provider may make a referral to the second service provider, in which he or she includes the favorite customer. Or, the referral may be initiated by the second service provider, where he or she asks the first service provider to refer possible favorite customers to him or her. Whichever way the referral is initiated, the first service provider identifies a favorite customer he or she wants to refer to the second customer. The favorite customers will receive a notification that indicates to them who is making a referral, and to whom they are being referred. The favorite customer either accepts or otherwise refuses to authorize by rejecting this referral. The next step is sending the referral, which has been authorized by the favorite customer, to the second service provider. The second service provider can then choose to accept or reject this referral. If the service provider accepts the referral, then the favorite customer of the first service provider is added to the second service provider's favorites list. In addition, the customer is added to the second service provider's favorites list.

According to an exemplary embodiment of the present invention, there are situations in which a service provider has only provided one type of service to a customer. If this service provider is referring that same customer to a second service provider, the second service provider may seek extra authorization from a customer if he or she wants to change or broaden the favorites list category, from one type of service to another or from one type to both. For example, Service Provider X has provided service five times for Customer Y, and all five of those services have been transport service. If Service Provider X refers Customer Y to Service Provider Z, and Service Provider Z wants to add Customer Y to her favorites list for both transport service and delivery service, extra authorization from Customer Y is needed to broaden the scope, from transport service only to a favorites list for transport service and delivery service. Only upon confirmation from both parties may a customer be added to the service provider's favorites list. If a service provider is making a referral of the same customer for both subcategories, the second service provider may choose to limit the scope of the referral to just one favorites list.

According to an exemplary embodiment of the present invention, service providers may refer the customers from their blacklist to a second service provider, where referring service providers may refer individual customers, groups of customers or entire lists of blacklisted customers to one or several other service providers, regardless of type of service, whether transport service, delivery service or both. The referral can be initiated by the first service provider, or it may be initiated by the second service provider, where the second service provider asks for a referral from of a blacklisted customer from the first service provider. In both of these types of referral initiation, the first service provider chooses at least one blacklisted customer to refer to the second service provider, and he or she may include reasons that he or she added a customer to the blacklist. The second service provider receives the referral, and decides whether or not to add the first service provider's blacklisted customer to his or her blacklist. If the second service provider adds the blacklisted customer to his or her blacklist, then the system will not match them up for a future service request. There are no limitations as to how many blacklisted customers may be referred and how many referrals may be accepted by the service providers, nor are there limitations regarding whether a customer is on a service provider's blacklist regarding delivery service or transport service or both. There is also no customer authorization required in order to make a referral from any type of blacklist, nor is there customer authorization required to change or broaden the blacklist subcategory of service type.

According to exemplary embodiments of the present invention, the system provides multiple sets of indicators to better assist a customer to select a best matching service provider for the service request. Extensive customization will be allowed for both a customer and a service provider.

However, various information including but not limited to pricing, identification of the number of completed service requests, familiarity with a route in a service request, etc. may get complicated for a user to navigate when making a deal for a service request. Therefore, the system provides users with various sets of indicators which help streamline this information. Indicators depict this information through one or more or combination of means such as letters, numbers, icons, symbols or other graphic representations of the information, which can be displayed on the user's interface. As a customer and service provider need different information, the indicators will differ depending on what that information may need to be. Service providers and customers are able to customize their experience, expectations and preferences through various sets of indicators. Exemplary embodiments of the present invention provide at least twenty six customizable sets of indicators to streamline this comprehensive information. The system will display unified indicators to avoid confusion, but users may also elect to change certain sets of indicators. For example, users may want to replace a default symbol or icon that represents an indicator with their own symbol, such as an emoticon or abbreviation for his or her own user ID. Furthermore, explanations about what each indicator means are also provided, and both customers and service providers have the option of turning these explanations on or off, or temporarily hiding them. If they turn them off, they are still able to turn any or all back on. For example, new users may prefer to have the explanations on, while those who have used the service for a while and are very familiar with them may not need the explanations for the meanings of the various sets of indicators. Customers and service providers may also change the orders in which the indicators are displayed if they would like to prioritize one set of indicators over another.

In addition, any indicator that is based at least in part on countable numbers may also be reflected in terms of tiers. Tiers assigned by the system will be ranges of numbers with minimum and maximum amounts depending on whether it is applied to customers or to service providers, and also depending on whether it is applied to transport service, delivery service or both transport and delivery service. They may be displayed as letters, shapes or colors or any other way that shows the difference between each tier. Some customers' and service providers' indicators will have different meanings. The indicators indicate activity relative to their user type, category and subcategory. Since the system stores service request records in the database of the system, it is able to quantify when they were made or carried out by using time stamps and where they were carried out by request details. These records regarding the time or other numbers, however, may be. They can be scaled up or down, where a customer may divide the time frame of relevance, such as one or more days, one or more months or one or more years. All of these different adjustable search parameters regarding time or timeframe or zone or other numbers are designed as customizable so that a customer and a service provider can individualize and prioritize the information they want to see.

According to an exemplary embodiment of the present invention, a customer and a service provider have different indicators display on their own interfaces. Some of these indicators are relevant to the type of user, whether providing or requesting service. Preferably, some indicators are intended to be of most use to customers, whereas some are of most use to service providers. However, indicators are not intended to be displayed to only service providers or to only customers exclusively, as indicators that are preferably displayed to one party may reflect information useful for party, and they may also exchange their information as well. If users choose, however, they can look at their own information through the system. If they are interested in seeing their own indicators or their service request history to make sure that the indicators other users see regarding their service request history are correct, they may do so through their profile information or any other means designated by the system, which shows all the indicators that apply to them. This service request history may include information that other parties can see, such as indicators regarding total number of service requests completed or requested. The service request history may also provide information that other parties cannot see, such as private information such as how much money they have earned or spent if the user selects not to show other users. All these indicators are intended to provide a customer and a service provider with customizable information that would help them choose a best matching a service provider or a customer, respectively, to make a best deal for each other for on-demand service.

A first set of indicators is for identification of service providers. User type one, service providers, is categorized by two categories, which regard the service provider's identification status: the first category is a regular service provider and the second category is a favorite service provider. This relates what relationship the service provider has with customers, depending on whether a customer has put him or her on a favorites list as a priority service provider, or if the service provider is a regular service provider, who receives no priority. The regular service provider category is divided into three subcategories as follows: regular service provider for transport service, regular service provider for delivery service, and regular both transport and delivery service provider. The favorite service provider category is divided into three subcategories as follows: favorite service provider for transport service, favorite service provider for delivery service, and favorite both transport and delivery service provider. This set of indicators is displayed to a service request to one or more customers, who are able to tell by this set of indicators what type of service a service provider provides. If a service provider chooses to change the preset subcategory, the set of indicators will be updated dynamically in accordance with that change.

According to an exemplary embodiment of the present invention, a second set of indicators is for the identification status of customers. User type two, customer, is categorized by regular customer and favorite customer. The regular customer category is divided into three subcategories as follows: regular transport service customer, regular delivery service customer, and regular both transport and delivery service customer. The favorite customer category is divided into three subcategories as follows: favorite transport service customer, favorite delivery service customer, and favorite both transport and delivery service customer. This set of indicators is not displayed only to a customer but also one or more service providers. In this manner, indicators can clearly show different user types of specific categories and specific subcategories. "Identification status" herein refers to the status of a service provider or a customer. The core concept of the term is that it conveys how a user is identified to another based on user type, and how the user type is related to different favorites list or blacklist statuses as well as service subcategories. Other terms could convey the same concept, such as "identification listing" or "identification position," etc.

According to an exemplary embodiment of the present invention, a third set of indicators may be provided that identifies the availability of service providers. This set of indicators is shown to customers who are looking for potential best matching service providers so they know who is a potential available service provider for their service request. This set of set of indicators may be shown on an electronic map, and a service provider will only be shown on the electronic map when he or she is active. This set of indicators may also be shown to service providers as well, as they may want to know the competition from other service providers for providing service requests they may have in that they preset. This set of indicators may also include additional information about the service provider's availability, based what the service provider has preset. For instance, this set of indicators shows availability and how long the period of availability may last, or whether it is indefinite availability. This set of indicators may be removed if the service provider is not available for a service request.

According to an exemplary embodiment of the present invention, a fourth set of indicators is provided to identify whether a customer is currently requesting a service request. This set of indicators is shown to service providers on an electronic map display, who may know based on it whether a customer is active or not. A customer may further specify details that regard their activity that let service providers know additional details, such as how long they expect a service request to be live until they select a best matching service provider, or how long it may be until the service request expires. This set of indicators may also be shown to customers, who may want to know how much demand may be in the area where the customer's pickup location, where the customer is located, and how much competition from other customers for service providers that may mean. This set of indicators may be removed if a customer selects a best matching service provider for a service request, as the service request is no longer available.

According to an exemplary embodiment of the present invention, a fifth set of indicators may be based on the service request volume that a service provider has carried out, where numbers regarding historical data are connected. The set of indicators may be displayed as numbers, tiers or a combination of numbers and tiers. The tiers are based on the total number of service requests a service provider has completed. For example, a low tier, E, would be a range such as 0-99, the next tier D 100-199, then tier C 200-299, tier B 300-399 and tier A 400 or above. A customer or a service provider may use this information to determine how many service requests providers have completed, and this may be divided by a certain time frame, such as one or more days, one or more months or one or more years. This information may be used by a customer in determining both how experienced a service provider is, or how frequently a service provider provides service requests in general. It may be used by service providers in evaluating how many requests they have completed in total or by time period, which may be useful to a service provider who would like to identify times of high or low demand.

According to an exemplary embodiment of the present invention, a sixth set of indicators may be provided to a customer to show one or more or any combination of geographic zones based on one or more or any combination of corresponding search parameters preset by the customer. More specifically, this set of indicators allows the customer to view a pool of potential available service providers and a pool of potential available customers who are also requesting service in the same subcategory as the customer identified who fall within one or more or any combination of those search parameters on the electronic map display. The customer has an option to choose from three search parameters to identify potential available service providers: by number, by time and by distance. Each search parameter differs in generating different pools of potential available service providers and pools of potential available customers. The search parameter based on number identifies a certain desired number of potential available service providers the customer is willing to make a deal with. The search parameters based on time identifies potential available service providers who can get to the customer's pickup location within a certain amount of time. The search parameter based on distance identifies potential available service providers within a certain distance from the customer's pickup location.

In presetting the search parameter based on a number, the customer presets a desired number of service providers among whom he or she wants to select for the service request. The system then searches for the desired number of potential available service providers within the geographic zone of this search parameter and displays them to the customer. The center point for this geographic zone is the customer's pickup location and the extreme point is the location of a service provider who is furthest away from the center point. The system will also identify a pool of potential available customers who are requesting the same type of service within the same geographic zone identified by this search parameter based on a number preset by the customer.

The second option is to preset the search parameter based on a time. In setting the search parameter based on time, the customer presets the time within which he or she expects the pickup to occur, for example, ten minutes. The system, with the assistance of a third party API, such as Waze®, will identify current real-time traveling speed, such as a road speed along a potential route. The system will multiply the speed by the preset time to find the furthest distance along a certain route. It will calculate this furthest distance for each potential route leading from the center point, which is the customer's pickup geolocation, to identify all potential available service providers within the geographic zone of this search parameter who are able to arrive at the pickup location within the preset time along those routes. The service provider whose current location is the furthest distance away from the center point is used as the extreme point for this search parameter. In some situations, available service providers may be located within the search parameter but are not able to reach the pickup location within the preset time. Those service providers are not included in the pool of potential available service providers. Only service providers who provide the same type of service that as the service type in the customer's service request will be included in the pool of potential available service providers. The system will also identify a pool of potential available customers who are requesting the same type of service within the same geographic zone identified by this search parameter based on a time preset by the customer.

The third option is to preset the search parameter based on distance. This distance is the distance from the pickup location which the customer wants the potential available service providers to be within. In setting the search parameter based on distance, the customer presets the distance, for example, one mile, and the system generates a one-mile radius whose extreme point is one mile away from the center point, which is the geolocation of the customer's pickup location. The system will identify all potential available service providers within the geographic zone of this search parameter, and those potential available service providers will constitute the pool of potential available service providers for the customer. The system will also identify a pool of potential available customers who are requesting the same type of service within the same geographic zone identified by this search parameter based on a distance preset by the customer.

All these three search parameters can be preset individually, paired or all put together or any combination thereof for displaying a pool of potential available service providers for the customer by geographical zone. Each of the above three options can also be can be a geographic zone that is identified by a circle, different colors, label identification or any depiction that at least conveys the difference between each if displayed together; in other cases, the search region may not be displayed at all and presented in another form such as a message or list. One skilled in the art may appreciate that there are numerous ways to produce and display potential available service providers and potential available customers within the same search parameters the customer presets for a search to the customer.

According to an exemplary embodiment of the present invention, a seventh set of indicators is based on the data and information provided by the sixth set of indicators to further compare the total number of potential available service providers with the total number of potential available customers. These numbers are drawn from each respective pool within each geographic zone—the pool of potential available service providers and the pool of potential available customers, and the geographic zones based on search parameters including number, time and distance or any combination thereof. The seventh set of indicators is used to display supply and demand information in each region or geographic zone, and the customer may preset to view each or any combination pool of available potential service providers on his or her mobile computing device. Preferably, this set of indicators may be displayed to the customer on his or her device's electronic map display. The customer may limit potential available service providers to either favorite service providers or regular service providers or both. This set of indicators helps the customer evaluate supply and demand factors, which may be one of the critical factors in setting prices, as the customer may propose lower prices at times of lower demand or higher prices at times of higher demand. This set of indicators helps the customer price proposals or negotiate price proposals from service providers based on supply and demand information. The count of available service providers who can provide the service and customers currently requesting service may be dynamically updated to reflect the actual amount. Any service provider who provides the same type of service as the type of service in the customer's service request will be included in the pool of potential available service providers as long as the service provider is within the geographic zone. No service provider who provides a type of service that differs from the type of customer's service request will be included in any pool of potential available service providers, regardless of search parameter, nor will customers who are requesting service in other service subcategories be included in the pool of potential available customers. In addition, this set of indicators may be turned on or turned off. If the customer has turned this set of indicators off, he or she will not see it on the display; however, the customer's service requests will still be counted in the census of all available requests within the proper subcategory they belong to. This set of indicators may also be useful to a service provider, who may set a price for the service request based at least on such information.

The service provider may also want to see the search supply and demand the customer sees; the system allows the customer and the service provider to exchange in full or in part information that they see if they would like. This allows for parties to have an even more transparent negotiation process.

According to an exemplary embodiment of the present invention, the system may connect numbers regarding pricing to use an eighth set of indicators to help streamline pricing information regarding a service provider's response to a price proposal from a customer; this set of indicators would be displayed in the situation of a customer sending a service request along with a quoted price to a service provider. The "response" is the response to the quoted price as initiated by the customer. This response may be acceptance or denial of a price that was set as a non-negotiable price, or it may be a counter in response to a negotiable price, in which case the negotiation may go back and forth until a final deal or no deal can be made.

The system may connect numbers regarding pricing to use a ninth set of indicators to display information regarding a price that has been initiated by a service provider in the case a customer sends the service request without a quoted price, and the service provider responds with an proposed price, which may be either negotiable or non-negotiable. If the proposed price is negotiable, the negotiation may go back and forth until a final deal or no deal can be made. Preferably, this set of indicators may be provided for a customer, who may evaluate at least the difference between a service provider initiated price or response price and its default price.

The eighth and ninth sets of indicators apply to different situations regarding who initiates a price proposal. The indicators themselves could be anything that conveys the essential difference of three situations: whether a price proposal is above, below, or equal to the default price provided by the system. For example, the system may display a green indicator or an upward arrow for an initiated price above the default price or a red indicator or a downward arrow for a price that lies below. Perhaps prices that exactly match the default price will be displayed as yellow or as a dot. Those three different colors convey the difference in each situation, and a clear difference in indication allows users to sort more quickly, based on an easy-to-see visual representation, what would otherwise take longer. Included in the representation is the actual price proposed, along with information that compares the difference between the price proposal and the default price as a dollar amount or as a percentage. This set of indicators may be turned off, or it may selectively have one or any parts displayed; it is up to the user's discretion. Users may also set limits on which price proposals are automatically rejected, by presetting a price threshold higher or lower than the default price. Preferably these sets of indicators are displayed to both a customer and a service provider. This set of indicators may be displayed to any user type in the system. A customer who requests price proposals from a service provider may preset in the settings not to see any price proposal that is higher than or equal to 50 percent above the default price; otherwise, the price proposals may be automatically rejected. A customer has discretion in choosing which price indicators to see depending on price difference.

According to an exemplary embodiment of the present invention, a tenth set of indicators connects historical data and geolocation data to reflect information regarding zone information based on the total number of service requests completed by a service provider within the geographic zone in which a customer indicates the pickup location the service request. This set of indicators is provided to inform a customer about a service provider's experience or familiarity in the pickup location, which may help inform a customer about which service provider may be better suited for their service requests because of more experience with the area at the start of the service request. However, the set of indicators may additionally be useful to a service provider in determining areas of more potential business, where he or she may see where he or she may be carrying out service requests by pickup location.

According to an exemplary embodiment of the present invention, an eleventh set of indicators connects historical data and geolocation data to reflect information regarding zone information based on the total number of requests completed by a service provider within the geographic zone in which a customer indicated the drop off location in the service request. A customer may use this information to determine the experience or familiarity that a service provider has directly in the area indicated by the drop off location in the service request. Preferably, this set of indicators are useful for a customer to see how much experience a service provider has in the drop off zone, which is useful in determining a service provider's experience directly applicable to the service request. However, the set of indicators may also be useful to a service provider in determining areas of more potential business, where he or she may see where he or she may be providing the most service requests by drop off location.

The tenth and eleventh sets of indicators, may be based on zones as specific as a zip code or may apply to a larger zone like borough or county, or city or state. These sets of indicators show the real number of service requests a provider has completed in the zone for pickup or drop off separately or as a total number or reflected through tiers, in addition to the option of having numbers and tiers displayed together. In addition, each total number of transactions that have been completed may be further divided by subcategory or according to a period of time such as within one or more days or one or more months, or one or more years.

According to an exemplary embodiment of the present invention, a twelfth set of indicators may be provided that conveys the familiarity of a service provider with the route of the service request, represented at least through percentage or any other depiction such as tiers. This set of indicators is generated by connecting requested route information with a service provider's service records stored in a database. For a transport request, this information may include the service provider's familiarity with the route indicated in the service request; for delivery service, this may be information such as the service providers experience or familiarity with the route. Regardless of the service request type, the indicator is adjusted to display information relevant to the situation. The percentage may be displayed by itself as a percentage, or it may be divided into tiers, for example; tier E standing in for familiarity between 0-19 percent, tier D for 20-39 percent: tier C for 40-59 percent, tier B for 60-79 percent and tier A for 80-100 percent. The representation of tier need not be limited to A through E or even letters at all, as tiers may be shown as any single one or combination of depictions that divides the familiarity percentages by tier. The tier and percentage may also be shown together. For a service provider, this may be a useful indicator in evaluating where he or she has picked up many customers, or where he or she picked up only a few customers. This set of indicators may be used by service providers to evaluate where they have the most experience or may be the most valuable, or it may be used by a customer in selecting a best matching service provider based on the experience he or she may have with the service request.

According to an exemplary embodiment of the present invention a thirteenth set of indicators will be based on how many times a customer and a service provider have been matched and have completed a transaction together. As this set of indicators is based on a number of transactions, it may be either displayed as simply the number or as a tier or both together in addition to the number or tier being able to be scaled up or down by applicable time frame, per the customer's preference. This set of indicators can be applied to subcategories, which can change the indicator to display data regarding transport service, delivery service, or both transport and delivery service. As the indicator regarding past transactions between a service provider and a customer is provided to a customer; this set of indicators may also convey other transaction information such as average price or total amount of money exchanged between the two. This average price total may be displayed as a dollar amount, as a tier or both as a dollar amount with a tier. It may also be divided by time, scaled up or down, such as one or more days, one or more months or one or more years. Preferably, this set of indicators is provided to a customer, who may customize his or her experience with a service request based at least on his or her ability to adjust what is displayed to, such as by number of times matched together or the total transaction amount. This information is helpful to a customer in selecting a best matching service provider based on preferences, as a customer may like to request service from a service provider with whom the customer has more experience.

According to an exemplary embodiment of the present invention, an fourteenth set of indicators connects the location information of the service provider with location information of the customer's pickup location to display the time within which a service provider can pick up the customer, an estimated time of arrival (ETA). This is further based on the speed or how quickly the service provider may be able to get there, where the ETA may be determined by a third-party API such as Google® Maps directly or indirectly, which means the system may use the third party's information as a basis to calculate the ETA. Preferably, this set of indicators is displayed to a customer to assist in selecting a best matching service provider. The service provider may want to know by this set of indicators how long it will take him or her to get to the pickup location of the customer.

According to an exemplary embodiment of the present invention, a fifteenth set of indicators is provided based on the estimated travel time (ETT) from the customer's pickup location to the customer's drop off location indicated in a service request. This set of indicators connects location information regarding the customer's pickup location and the customer's drop off location in a service request. Preferably, this set of indicators will be displayed to a customer to advise about the estimated time in transit. This set of indicators is based on the estimated time it will take to get from the pickup location to the drop off location, which may be provided by a third-party mapping API such as Google® Maps.

According to an exemplary embodiment of the present invention, a sixteenth set of indicators will connect geolocation data to reflect at least the customer's pickup and drop off locations indicated in the service request. This set of indicators is displayed on the touch screen electronic map display, and it will show the relative locations indicated to give a customer a visual concept or context relating to the distance between the pickup location and the drop off location. This set of indicators may also provide route information between two or more locations. In addition, in the case where a customer is requesting service in a different place than the location he or she indicates as the pickup location, this set of indicators may indicate that location as the current location as well on the touch screen electronic map display. As it may be private information a customer may not want others knowing, a customer may also choose to hide the display of the current location from other users if the current location is different than the pickup location.

A seventeenth set of indicators may convey information about total number of service requests requested and completed by a customer. This set of indicators would reflect the total number of service requests a customer has requested and completed in any subcategory or in total from all subcategories, depending on what the service provider would like to see. The number of completed requests could be displayed as a number or as a tier or as both. The information relayed by tiers would be that a customer has requested at least the number that is the minimum floor number of a tier and at most the number that is the maximum ceiling. For instance, a tier could be from 0-9 service requests in one subcategory, where the indicator assigned to the tier would only apply to a customer who requested between 0 and 9 service requests. In addition, this set of indicators may be divided by a certain time or time frame, such as one or more days, one or more months or one or more years. Preferably, this set of indicators is displayed to service providers who can see how often a customer generates business, which is information a service provider may find helpful in choosing a best matching customer, as he or she may want to give priority to a more frequent future customer. However, it may also be useful to a customer who may be interested in seeing his or her own past service request history.

According to an exemplary embodiment of the present invention, an eighteenth set of indicators may be provided to a service provider to identify one or more or any combination of geographic zones based on one or more or any combination of search parameters preset by the service provider. More specifically, this set of indicators allows the service provider to view different pools of potential customers and a pool of potential available service providers who provide the same type of service subcategory as the service provider who fall within the geographic zones identified on the electronic map display by one or more or any combination of those search parameters. The service provider has an option to choose one or more from any of at least three different search parameters to identify potential customers: by number, by time and by distance. However, the service provider does not initiate making a deal with the potential available customers who are identified on the electronic map display unless the service provider receives a service request with a request for a price proposal from one or more customers.

The first option is to preset the search parameter based on a desired number of customers the service providers is willing to make a deal with. The method of setting up a geographic zone based on this is described by the following method. In setting the search parameter by number, the service provider presets a desired number of customers with whom he or she wants to make deals with. The system then searches for potential customers in the service provider's area until it has identified the desired amount, and identified potential available customers are then displayed to the service provider. The center point for this geographic zone is the service provider's current location and the extreme point is the location of a customer who is furthest away from the center point. No customer who requests the type of service that differs from the type of service this service provider provides will be included in the pool of potential available customers. The system will also identify a pool of potential available service providers who are providing the same type of service within the same geographic zone identified by this search parameter based on a number preset by the service provider.

The second option is to preset search the parameter based on time. In presetting the search parameter based on time, the service provider presets the maximum time he or she is willing to travel to get to the pickup location, for example, ten minutes. The system, with the assistance of a third-party API, such as Waze®, will identify current real-time traveling speed, such as a road speed along a potential route. The system will multiply the speed by the preset time to find the furthest distance along a certain route. It will calculate this furthest distance for each potential route leading from the center point, which is the service provider's current geolocation, to identify all potential customers within the geographic zone of this search parameter who are currently requesting services, which constitutes the pool of potential available customers. The customer whose pickup location is the furthest distance away from the center point is used as the extreme point for this search parameter. No customer who requests the type of service that differs from the type of service this service provider provides will be included in the pool of potential available customers. The system will also identify a pool of potential available service providers who are providing the same type of service within the same geographic zone identified by this search parameter based on a time preset by the service provider.

The third option is to preset the search parameter based on distance. In presetting search the parameter based on distance, the service provider presets the maximum distance he or she is willing to be away from a customer's pickup location, for example, one mile, and the system generates a one-mile radius whose extreme point is one mile away from the center point, and the center point is the geolocation of the service provider's current location. The system will identify all potential customers within the geographic zone of this search parameter, and those potential customers for the service provider will constitute the pool of potential customers for this service provider. No customer who requests the type of service that differs from the type of service that this service provider provides will be included in the pool of potential customers. Further, the system will also identify a pool of potential available service providers who are providing the same type of service within the same geographic zone identified by this search parameter based on a distance preset by the service provider.

All three search parameters create a geographic zone on the service provider's touch screen electronic map display. If the service provider would like to use multiple search parameters to view potential available customers, there will be sufficient labeling or identification so the user who is viewing the information or display from this set of indicators is able to tell the difference between each geographic zone, if there is one.

According to an exemplary embodiment of the present invention, a nineteenth set of indicators is based on the eighteenth set of indicators to further display the number of potential available service providers compared to the number of potential available customers. These numbers are drawn from each respective pool within each geographic zone—the pool of potential available service providers and the pool of potential available customers, and the geographic zones based on search parameters including number, time and distance or any combination thereof. This set of indicators provides information about supply and demand within each geographic zone based on the search parameters, which may be factored into setting prices. A customer or a service provider who is requesting or providing another service subcategory is included in neither the pool of potential available customers nor the pool of potential available service providers: both pools are based on relevance to service subcategory. Preferably, this set of indicators is displayed to the service provider, as this supply and demand information assists the service provider in at least two distinct ways. First, this set of indicators provides a supply and demand comparison to help the service provider decide on what price to ask based at least on supply and demand information. However, this set of indicators may also be of use to the service provider in finding business or optimizing prices, as this set of indicators is in part geographically based—the service provider may better identify places with more service requests where there may be higher prices or more business. Service providers may also limit this display to show only requests from favorite customers, requests from regular customers or from both favorite customers and regular customers. The purpose of this set of indicators is to display to service providers relevant information about how many requests there are and how many service providers are available to provide them, which can be used by service providers to evaluate pricing information and negotiations. However, this set of indicators may also be of use to the customer, who may also want to evaluate supply and demand from the service provider's perspective in setting prices. The count of customers currently requesting service and available service providers may be dynamically updated to reflect the actual amount.

There are possible situations in which the service provider sees a different amount of supply and demand based on the search parameters than the customer sees. For instance, the service provider's settings display to him or her all customers he or she can pick up within 30 minutes, where the customer presets that the indicator show service providers currently available who are within the search parameter based on time, such as service providers who can get to the pickup location within 10 minutes. The customer, in this example, is negotiating a price with the service provider who is within the search parameter based on a time of 10 minutes, in which there are 2 requests but 10 service providers. The service provider may see a different ratio based on the service provider's search parameters, where there are 25 requests and 10 Service providers. In this situation, the service provider and customer see clearly different levels of supply and demand. Regardless of the situation and regardless of presets, the system may provide a way to deal with the differences in expectations between the customer and the service provider. In these circumstances, users may exchange information to have the supply and demand information they see be displayed to the other party so that they may be on the same page in negotiations by sharing the supply and demand information. Transparency is one of the keys in having the customer and the service provider agree on a price, and exchanging information about supply and demand is a way for both parties to further understand the circumstances of the other, which makes for a better compromise. This set of indicators is used to maintain a setting for negotiation that not only responds to fluctuations in supply and demand, but is able to respond to fluctuations in two different geographic zones, one of the customers and the other regarding the service provider.

According to an exemplary embodiment of the present invention, the system may use a twentieth set of indicators to help streamline the display of the price proposals a customer initiates, where numbers regarding pricing information are connected and displayed. A customer initiating a price is when a customer provides route information and includes a price quote based on the default price. As this set of indicators relates to customer pricing, it is preferably displayed one or more service providers who have been selected and sent price proposals from the customer. The system provides its default price, so it is able to display if a price proposed by a customer is higher or lower than or equal to the default price. This set of indicators is used preferably by a service provider to quickly and efficiently evaluate a customer's price proposals in comparison to the default price.

According to an exemplary embodiment of the present invention, the system may also use a twenty first set of indicators to provide details about a customer's proposed price that comes as a response to a service provider proposed price, where numbers regarding pricing information are connected and displayed by this set of indicators. This set of indicators is relevant in a situation in which a customer included no price in the initial service request, instead asking a service provider to initiate a price. When the service provider makes the price proposal, a customer responds depending on the parameters of the price proposal: if the price proposal is non-negotiable, a customer responds with acceptance or rejection. As this set of indicators relates to customer pricing, it is displayed to a service provider and the customer who made the price proposal. If the price proposal is negotiable, a service provider may, in addition to acceptance or rejection, counter, in which case the negotiation may go back and forth until a final deal or no deal can be made. The pricing information relating to the counter is displayed by this set of indicators. This is used by service providers to quickly and efficiently evaluate a customer's response price proposal.

Both the twentieth and twenty first sets of indicators convey pricing information, which is preferably information that service providers may need. Where they differ is the situation in which they are displayed to service providers: the twentieth set of indicators is shown when a customer has initiated a price, whereas the twenty first set of indicators is displayed when a customer is providing a response. Instead of having the service providers sort through price proposals simply by reading each individual price proposal displayed, the system may provide them with indicators relaying information about the difference between a proposed price and its default price. Both the twentieth and twenty first sets of indicators could be displayed as anything that conveys the essential difference of three situations: higher, lower, or equal to the default price. These sets of indicators are shown to a service provider and a customer as an easy distinction through indication to allow him or her to sort price proposals quickly. However, though these sets of indicators are provided for the perspective of a service provider, a customer may possibly be provided useful information as well. The indicators may further display how much higher or how much lower a price is, shown as a percentage or as an amount. As a method of customization, a service provider can set limits to which price proposals they would like to see for both the twentieth and twenty first sets of indicators he or she can adjust them at any time dynamically; since the indicators may be either percentage or amount, a service provider may specify what prices to see, whether higher or lower than or equal to the default price, where when price proposals don't meet the price parameters, they are automatically rejected by the system.

According to an exemplary embodiment of the present invention, a twenty second set of indicators will connect historical data regarding a customer's service request history and geolocation data to identify a customer by how many service requests he or she has requested and completed based on pickup location geographic zones. This geographic zone relates to the pickup location of a service request. This set of indicators may be preferably displayed to service providers. This geographic zone may be based on one or more streets, zip codes; town, city; borough or county, state or any other region defining feature, and the indicator may be displayed as a number or is based on tiers; it may also be displayed on both. Service requests will be stored by the system and geographic information relating to them may be used to generate this set of indicators. When a service provider is provided this information, it can be used to determine which customer it may be beneficial to add to a favorites list, as a service provider may generate much business if it is indicated that the pickup location in prior service requests is often in a certain geographic zone. Though it relates chiefly to information about a customer and therefore service providers may preferably see this set of indicators, it may also be provided to a customer in certain situations.

According to an exemplary embodiment of the present invention, a twenty third set of indicators may identify a customer by how many service requests he or she has requested and completed based on drop off location geographic zones, where geolocation data and historical service request data are connected. This geographic zone relates to the drop off location of a service request. This geographic zone may be based on one or more streets, zip codes, town, city, borough or county, state or any other region defining feature, and the service provider also has the choice to see this as a number or as a tier or both together. The twenty third set of indicators may preferably be used by service providers to gauge whether a customer may or may not be a good addition to a favorites list, as a service provider may want to know how often a customer has been dropped off or had goods delivered in a certain location. But this set of indicators may also be of use to a customer to analyze his or her service request history, such as the number of completed service requests that ended in a certain location.

The twenty second and twenty third sets of indicators are both based on zones where a customer requests service, either from a standpoint of pickup location or drop off location, geolocation data and where historical service request data are connected. The sets of indicators show the real number of services requests a customer has made which take place in the zone, for pickup and drop off separately. Both indicators may also be divided with regard to the time they apply such as one or more days, one or more months or one or more years. A customer may also use these sets of indicators in addition to a service provider, as a customer may want to see where he or she is ordering the most service or may want to see the tier based on geographic zone that is attributed to him or her.

According to an exemplary embodiment of the present invention a twenty fourth set of indicators will connect historical service request data to display the number of times a service provider and a customer have been matched with each other and completed a transaction together. Preferably this set of indicators is displayed to service provider or a customer, as it relates information regarding a service provider's service request history with a customer, and this set of indicators can be applied to regular customer and favorite customer categories and subcategories for transport service, delivery service, or both transport and deliver service, respectively. In addition to being able to view the total number of transactions completed between a customer and a service provider, this information can show further details regarding those transactions. It can be specified how much money in total a service provider has received, respectively. This set of indicators may be based on number or based on tiers or may include both numbers and tiers displayed together, and it may also be divided by time, scaled up or down, such as one or more days, one or more months or one or more years. This information may be very useful while negotiating prices for service requests, as service providers who have a good relationship with a customer may want to give that customer a good price.

According to an exemplary embodiment of the present invention, a twenty fifth set of indicators identifies the estimated travel time to complete a service request for a service provider. From the point of view of the service provider, it may be the time from the current location to the pickup location and from the pickup location to the drop off location. And if applicable, the time it would take the service provider to return to the preset return location from the drop off location, if an applicable return location limitation was preset by the service provider. This set of indicators is preferably for service providers so that they will know the total time it may take to provide a service request, but it may also be of value to a customer, who would like to know the total time underway. From the service provider's point of view, the ETT also means the time to complete a service request; however, a completed request from the customer's point of view is only the time from the pickup location to the drop off location. This is an important factor in giving the service provider options in choosing the best matching service request or best matching customer.

According to an exemplary embodiment of the present invention, a twenty sixth set of indicators will connect geolocation data of a service provider and the geolocation data of service provider's preset return location after carrying out a service request, if the service provider preset a return location. This set of indicators is provided with the goal of showing a service provider or a customer location information that is easily understood and visualized; this set of indicators is provided on the touch screen electronic map display, and in addition to showing certain locations relative to the service provider, it may show the locations the customer has indicated as pickup and drop off locations. This set of indicators is based at least in part on service type subcategory, and the set of indicators may be changed to reflect whether the service provider provides or will provide transport service, delivery service or transport and delivery service. This return location may be hidden by the service provider to not have it be displayed to another user and only display to himself or herself, as it may have private information contained within it.

According to an exemplary embodiment of the present invention, a customer and a service provider can choose to filter and sort information based on preference. Some sets of indicators differ depending on whether a user is a customer or a service provider, but they can be sorted in the same manner. If a user is only concerned about the price or the timing, the user can choose to have the system always sort price proposals by that parameter, whether sorted high to low or low to high. Users may choose to have indicators sorted how they would like, for example, pricing indicator shown first and the indicator that displays transactions completed with the other party next, and so on.

A customer can filter the price proposals received from the service provider in multiple ways. First, a customer can limit the number of price proposals that are displayed to him or her. For instance, a customer may not want to see more than ten price proposals at a time or may instruct the system to list the lowest proposed price first. Which information is most important to a customer in selecting a service provider can be used to sort and filter service request price proposals from service providers. Furthermore, users, whether a service provider or a customer, a user is able to choose which indicators the user is willing to see by turning them on or off to make them active or inactive, and the system will be dynamically updated according to that setting; the user is given ultimate discretion in whether to see one or more or any combination of indicators. Furthermore, indicators may be turned on or turned off in regard to who is able to see these indicators. If a customer would not like service providers to see certain indicators or information, the customer can choose to hide those indicators from service providers. A service provider may also choose to hide indicators that are assigned to him or her from prospective customers. Being able to turn one or more sets of indicators off at the user's discretion protects any information that a user deems private or any information that is not relevant to conducting business.

A service provider may also preset and filter which customer information seen. The system may automatically filter out requests that do not meet their preset limitations. For example, a service provider who is only interested in seeing prices above a certain amount may instruct the system to display only that information. In addition to just price, a service provider may sort service requests and price proposals by any relevant information regarding them, such as sorting by distance or estimated travel time or proximity to the pickup location.

According to an exemplary embodiment of the present invention, users are allowed to sort the information and indicators that are displayed to them how they want, a further way to accommodate around preferences and limitations, respectively, of a customer or a service provider. As a user finds different aspects of service important any indicator or any combination of indicators may be turned off. As indicators may be activated or deactivated as means of customization by a service provider and a customer, there are times at which the system may adjust the provision or service requests around those customizations. If, for instance, both a service provider and a customer have all of their price indicators deactivated, the system may automatically set the service request price as the default price.

The various sets of indicators are not displayed during the entire duration of the service. As they are chiefly meant to assist a customer and a service provider in evaluating the other party and their qualifications, they are shown before the service requests have been accepted or before the service requests have expired. At the moment when the service request price is accepted by confirmation and the selected service provider dispatched to carry out the service request, the relevant sets of indicators for this transaction are removed from the electronic map display.

One of ordinary skill in the art would appreciate that the core purpose for any one or more sets of indicators is to display relevant information for on-demand service in a convenient, transparent and simple way to a user. The numbers or names of the sets of indicators are for the purpose of illustration and may be deleted, combined, amended or otherwise changed; however, without departing form the core purpose of use and ease of helping a customer choose a best matching service provider for a service request in a fast, convenient and efficient way, as information delivered to any customer or service provider in the form of an indicator is intended to be made clearer.

According to exemplary embodiments of the present invention a customer may select a best matching service provider by running a multi-stage analysis that includes but is not limited to price and other information represented by various sets of indicators and limitations preset by service providers and preferences preset by the customer.

According to an exemplary embodiment of the present invention at the beginning of the process of identifying a best matching service provider a customer may have the option to select the type of on-demand service, which may include transport service, delivery service or both transport and delivery service. A customer may then preset at least preferences related to the service request, such as the type of vehicle, language spoken by service provider, etc. Once the preferences are preset, a customer identifies the category of a service provider the customer wants the service request be carried out by, whether that service provider is to be chosen from among regular service providers, favorite service providers or from a pool of both regular and favorite service providers. Furthermore, the system determines certain search parameters in the electronic map provided by Google® Maps. The system then searches for and identifies one or more available service providers matching the customer's service request within the certain search parameters, where the system skips any non-matching service providers. However, a service provider may preset many limitations for services, or maybe they do not preset any at all. The fewer the limitations a service provider has, the more the service provider will be considered as available by the system.

According to an exemplary embodiment of the present invention, a customer choosing a service provider from his or her favorites list if there is one. The favorites lists give a customer another medium they can use to customize their experience, by prioritizing who provides the service. If a customer wants the service request to be carried out by a favorite service provider from the favorites list, but the system identifies that there are no favorite service providers available to carry out such request or the customer has no favorites list at all, a customer can have the system choose from among regular service providers. There are foreseeable situations in which a customer may not have a favorites list at all, such as a customer who is using the system for the first time. In addition to that, favorite service providers may not be available at the time to provide service. In this case, the system will allow a customer to widen the pool by selecting the best matching service provider from among regular service providers. Upon completing the service, a customer may add to the favorites list by adding the service provider upon the authorization from the service provider.

The system displays to a customer one or more identified service providers to compare in the order of customer's priorities based on the price and other information provided by one or more sets of indicators associated with one or more identified service providers. A customer may see potential available service providers on the touch screen electronic map display. However, a customer and one or more service provider are only displayed to each other if they have been identified by the system as compatible. The system takes into account a service provider's preset limitations and a customer's preset preferences in determining this compatibility. For example, a service provider with no preset limitations and a customer with no preset preferences would be identified by the system as compatible and therefore result in a possible best match. If any setting, whether a service provider's limitations or any of a customer's preferences, precludes parties from being matched up, the parties are deemed incompatible. For instance, if a customer presets to request transport service with a service provider for transport who has a wheelchair accessible vehicle, a service provider who does not have a wheelchair accessible vehicle will be deemed incompatible with that customer and that customer's service request. Incompatibility may also stem from sending a service request to only favorite service providers or only regular service providers, from presets about the subcategory of service, in addition to being blacklisted or having another party blacklisted. Incompatibility is calculated by comparing all of the service provider's limitations and the customer's preferences, and when at least one requirement is not met, it is deemed incompatible.

According to exemplary embodiments of the present invention, the system determines incompatibility between a customer and a service provider for a service request by comparing various factors relating to each user's limitations, preferences, and profile information. For instance, if a service provider has not indicated that he or she can speak Mandarin and a customer prefers a Mandarin-speaking service provider preference for all potential available service providers, where all service providers who do not speak Mandarin are incompatible. In comparing the service provider's preset time limitations with the estimated travel time of the customer's service request, which includes the entire time the service provider will be underway from traveling to the pickup location to the drop off location to the preset return location; if applicable; if the estimated travel time will be beyond the service provider's time limitations-making the service provider unable to get to where he or she needs to be by a certain time—the service provider will be deemed incompatible. The system also compares the service provider's location limitations, where if the service provider has preset not to go to certain areas, and in situations in which the customer's pickup and drop off location involves one or two of those areas the service provider is deemed incompatible.

According to an exemplary embodiment of the present invention, the number of potential available service providers a customer sees on the electronic map display can be controlled in multiple ways. If a customer presets time or distance search parameters which result in too many service providers to be displayed on the electronic map display, the system will prompt a customer to revise the search parameters. A customer may have an option to limit a search radius such as from ten miles to one mile or from thirty to ten minutes. In addition, a customer has an option to preset a number of service providers to negotiate with which will limit the number of potential available service providers on the electronic map display; such as to a maximum number of five. This number can be changed to increase or otherwise limit the number of service providers a customer wants to negotiate with and have displayed to him or her. Moreover, the system may automatically adjust the search parameters on behalf of a customer if the search results in too many potential available service providers to fit on the screen of the electronic map display. All in all, there are three factors that affect the size of search parameters for a customer: desired number of service providers to make a deal with, time, and distance.

A customer presets the desired number of displayed service providers, which affects the size of search parameter based on number in that the system will make the search region large enough to identify the desired number of potential available service providers that a customer wants to negotiate with. If a customer wants to negotiate with ten service providers, the system will look far enough to identify the desired number, which is ten service providers. The amount of time affects the size of the search parameter based on time in a way that the system will search for any and all potential available service providers who can get to the customer's pickup location within the specified time; the more time, the large the search parameter. Amount of distance affects the size of search parameter based on distance in a way that the system will search for any and all potential available service providers whose current location is within a certain predetermined distance away from the customer; the larger the distance, the larger the search parameter. A customer can choose to use one or more or any combination of these three search parameters. This choice allows a customer to customize the method for finding a best matching service provider.

According to an exemplary embodiment of the present invention, a customer can preset that to see all potential available service providers based on all three search parameters-number, time and distance—the system creates a search parameter for each, searching within three distinct a region. The center of each of these regions is the customer's pickup location. How large these regions are will vary by the area and the time, as it is depending on how many service providers are near the customer's pickup location. However, the basis of creating this search is to find and display a pool potential available service provider to the customer, from whom a customer chooses. The size of the pool is based on a number of service providers that a customer specifies to deal with; therefore, finding the correct number that a customer would like to deal with may take precedence relating to the distance or time search parameters. There are at least three situations in which search region created by the search parameter based on number can be compared to the other two search parameters: when it is the smallest search region, when it is the medium sized search region and when it is the largest search region.

If the number of service providers identified when searching by time and distance is more than a certain number preset as a desired number of service providers that a customer wants to negotiate with, the system will automatically shrink the search parameters to the smallest sized search region. Essentially, when the search parameter based on number creates the smallest search region, it will display the closest service providers of all the service providers who may have been identified in other search regions that are larger. Those service providers identified by time and distance search parameters whose current location falls outside this smallest sized region may have remained visible to a customer or may have been removed and not displayed based on the customer's preference, but they would have not been included in the pool of potential available service providers with whom a customer would have negotiated.

The search region created by the search parameter based on number may be the medium-sized region, when it is either bigger than distance while smaller than time or bigger than time while smaller than distance. Essentially, size of the region based on the number of service providers a customer wants to negotiate with falls between the number of service providers identified when searching by time and distance, the system will identify the desired number of service providers whose estimated time of arrival is the shortest. As a result, all service providers identified by time search parameter whose current location is outside this medium sized search region may remain visible to a customer but will not be included in the pool of potential available service providers that a customer will negotiate with. The same would be true if the largest sized search region was a result of a search using the distance search parameter, and the smallest sized search region was a result of a search using the time search parameter. In this situation, all service providers identified by the distance search parameter whose current location was outside the medium sized search region may have remained visible to a customer or may have been removed and not displayed based on the customer's preference, but they would have not been included in the pool of potential available service providers with whom a customer would have negotiated.

The search parameter based on number may create the largest sized search region compared to the distance and time, when the search region is larger than both distance and time. If the number of service providers identified when searching by time and distance is less than a certain number preset as a desired number of service providers that a customer wants to negotiate with, the system will automatically expand the search parameters to the largest sized search region. The estimated time of arrival of the additional four service providers might therefore exceed the desired estimated time of arrival, such as an expanded search region of arrival within twenty minutes compared to ten minutes. Nevertheless, since all service providers identified by time and distance search parameters fall within this largest sized search region, they will be included in the pool of potential available service providers that a customer will negotiate with. The system will update all the indicators and corresponding data accordingly to reflect the changes in the pool of potential available service providers.

According to an exemplary embodiment of the present invention, regardless of how many search parameters a customer presets at a time, whether one or more or a combination of any, along with potential available service providers, the system will also identify other customers whose current locations is within the preset search parameters and who are currently requesting the same type of service as the type of service this customer wants to request. Displaying the amount of available service providers and customers requesting service is the basis of the supply and demand, which a customer and a service provider may use in determining a price, whether they are accepting: rejecting or making a counter offer on a price proposal.

According to an exemplary embodiment of the present invention, a service provider chooses a best matching customer based on preset limitations and other information provided by various sets of indicators. Comprehensive disclosure of service request details will improve the experience of both a customer and a service provider; full disclosure allows the system to use more detail in finding a best matching service request from the point of view of a service provider. The more disclosure, the better the match is likely to be. The system takes into account the limitations that service providers have input, and these limitations may also include but are not limited to constraints on time, location and who may accept a customer's service request. Essentially, the limitations a service provider presets on workload, profile and other relevant aspects of it are automatically accounted for by the system. For example, if a service provider has limited the requests to be notified of to only transport requests, the system will only provide notifications about transport requests—not any delivery requests. The accommodation around a service provider's needs allows for a service provider to select a best matching customer based on his or her determination or preference.

According to an exemplary embodiment of the present invention, a service provider can preset various limitations which are meant to limit the scope of on-demand services a service provider would not like to provide and which are taken into consideration when identifying matching a service provider or matching customer. If a service provider's limitations that relate to distance from the pickup location prevent the system from displaying those service providers whose current distance from the requested pickup location exceeds the distance those service providers have preset as their location or distance limitation. As a result, a service provider who is not willing to accept any service requests with a pickup location beyond a certain distance away from the current location will not receive such service requests and will not be displayed to that customer. Limitations that relate to the estimated time of arrival to the requested pickup location prevent the system from selecting those service providers whose preset estimated time of arrival limitations do not meet the estimated time of arrival associated with that customer's service request, such as a service provider who is willing to spend no more than ten minutes when getting from the current location to the requested pickup location will not receive any service requests that do not meet that requirement.

A service provider who is not willing to accept any service requests with an estimated travel distance that is longer or shorter than a certain travel distance he or she is willing to travel may not receive any service requests that do not meet his or her estimated travel time limitations. Thus, the service provider might find it accommodating to be able to preset time limitations to not receive any service requests that will potentially result in a service provider working past a certain time, or to be able to preset location limitations to not end up providing on-demand services in any undesirable areas. There might be a service provider who does not want to put too much mileage on a vehicle and therefore prefers service requests with shorter travel distances. Or, oppositely, there might be a service provider who may want only service requests with longer travel distances. In addition, service providers can limit the number of passengers they can transport at a time for personal reasons or for reasons of any applicable rules or regulations that impose limits on how many passengers a service provider can legally have in the vehicle at a time.

According to an exemplary embodiment of the present invention, there might be numerous limitations specific to on-demand delivery services. For instance, a service provider might limit the type of goods to deliver, such as excluding any fragile, poisonous, or valuable goods. Or, if a service provider is not willing to handle multiple goods at a time, he or she can limit the number of goods he or she would potentially accept for delivery. It is understandably easier to handle only one or two items at a time, as keeping an eye on multiple items might for some people be a task hard to manage. Moreover, weight of goods can be something to consider when carrying out delivery service. For example, mainly female service providers will more likely not be willing to accept heavy goods for delivery as lifting these goods might pose a physical challenge for them. Size of goods might also be considered since not all service providers will be able to transport large or extra-large items, as a service request for delivery of such items might not only require a service provider to have a vehicle but for that vehicle to have appropriate space capacity. As for service requests involving pets, some service providers might choose to opt out of such service requests for reasons of pet allergy or for not having proper accommodation, such as a special crate. Transporting children can be unacceptable for some service providers, as young babies usually require a special baby seat, the requirement that has to be met according to the law.

Some of the limitations arising from service providers' personal desire to limit the scope of on-demand service requests they are willing to carry out might conflict with some of the related legal limitations. In this situation, the system will make sure that a service provider follows any legal limitations applicable to the type of on-demand service by skipping that service provider in assignment of service requests which are subject any such legal limitations. Skipping will occur even if personal limitations preset by a service provider allow him or her to carry out a service request not allowable in view of applicable legal limitations. For example, if the service provider has preset to have no more than five passengers in the vehicle at a time, and legal allowable number of passengers for the type of vehicle is four, this service provider will be precluded from receiving transport service requests for transporting more than four passengers at a time.

According to an exemplary embodiment of the present invention, if a service provider is incompatible with a customer's service request based on that service provider's limitations, the system will skip over that service provider in the process of identifying possible matches for that customer's service request. When a customer is found to be incompatible with a service provider based on that customer's preferences and that service provider's limitations, the system will skip over a customer in displaying potential available customers to the service provider. Service providers, however, may be skipped for a customer's service request based on the at least one or more or any combination thereof, including but not limited to preset limitations, the category of service providers they belong to, the type of on-demand services they choose to provide and whether they are on that customer's blacklist. If a customer submits a request for transport service and would like that transport service request be carried out by one of his or her favorite service providers for transport service, all service providers on that customer's blacklist, all service providers who do not meet the category of the service request or do not meet the type of service request will be skipped for that customer's service request.

According to an exemplary embodiment of the present invention, a service provider presets a search parameter based on pickup time or a search parameter based on distance, which are centered on the current location. The size of the search parameters is preset to include all service requests within a certain limitation: the search parameters may be all requests within a certain estimated time from the service provider's geolocation, or it may be a radius that is based on a distance from the service provider's geolocation. A service provider can further select to see all requests, or all requests regarding a certain type of service. Furthermore, a service provider can focus the requests he or she is notified about to favorites lists if they want. Once there is a service request from a customer that falls within the service provider's preset radius, the service provider can look on the electronic map display to view the locations for the pickup and drop off destination locations depending on the zip code or specific address given by the customer, whether the pickup involves a customer or goods or a customer with goods. When a service provider opens the system, he or she may preset various sets of indicators and any limitations based on preference, receive one or more service requests from one or more customers on the electronic map display, and then the service provider evaluates the service requests and decided which service request to accept or provide. The service request information may be displayed through the various sets of indicators regarding this service request, such as the price proposed by a customer if applicable, as well as route information, pickup or drop off location or the estimated travel time for the service request.

According to an exemplary embodiment of the present invention, the search parameters that are established based on a service provider's presets also provide information regarding supply and demand. The service provider may calculate all available requests in conjunction with how many service providers are available within the same search parameters, which is used to evaluate how much demand there may be for service, which may be a factor that affects how in determining a price proposal; once a service provider knows information about supply, he or she may then start to decide on a best matching service request based at least on price, or any other factors the service provider deems important in selecting the best matching himself or herself.

According to an exemplary embodiment of the present invention, a service provider has an option to search for potential customers to evaluate supply and demand conditions in the area surrounding the current location. The search is based on search parameters, of which there are at least three: a search parameter based on number, a search parameter based on time and a search parameter based on distance. These three different search parameters lead to different situations, and each search may generate a search region or geographic zone displayed on the electronic map. How large these regions are will vary by the area and the time, as it is depending on how many customers are near the service provider's current location. The basis of creating this search is to find and display a pool potential available customer to the service provider, which the service provider may see. The size of the pool of potential available customers is based on a number of customers that the service provider specifies to see on the display; therefore, finding the correct number that the service provider would like to see may take precedence relating to the distance or time search parameters in some situations. There are at least three situations in which search region created by the search parameter based on number can be compared to the other two search parameters: when it is the smallest search region, when it is the medium sized search region and when it is the largest search region.

If the service provider has preset to have all three search regions active at once, the search regions may vary in size based on their parameter. If the search region that is based on the number of customers is the smallest compared to the time and distance search parameter regions, using this search parameter based on number, the system then identifies the desired number of customers who are the shortest travel time away from the service provider's current location. Essentially, the system creates a search region, the smallest sized out of all, with the service provider's current location as the center point and the furthest location of one or more of the customers as the extreme point. The system in this situation automatically limits the pool of available customers geographically because the number of customers the service provider wanted to see was fulfilled before reaching the limits of the other search parameters.

The search region or geographic zone created by the search parameter based on number may be the medium-sized region in some situations, when it is either bigger than distance while smaller than time or bigger than time while smaller than distance. The system creates search regions based on the service provider parameters. When the search parameter based on number is the medium sized search region, with the service provider's current location as the center point and the furthest location of one or more the customers as the extreme point. All customers identified by the time search parameter whose current location is outside this medium sized search region may remain visible or may be removed in the display to the service provider but will not be included in the calculation of supply and demand within the search region. If the largest sized search region was a result of a search using the distance search parameter, and the smallest sized search region was a result of a search using the time search parameter, the customers within the medium sized region, and therefore within the smaller sized region, would be included, while the customers outside of the medium sized region would be excluded from the supply and demand. In this situation, all customers identified by the distance search parameter whose current location was outside the medium sized search region would have remained visible to the service provider but would have not been included in the calculation of supply and demand within this medium sized search region.

The search parameter based on number may create the largest sized search region compared to the distance and time, when the search region is larger than both distance and time. Since all customers identified by time and distance search parameters fall within this largest sized search region, they will be included in the calculation of supply and demand within that largest sized search region, but if there are not enough customers that the service provider wants to see, the service provider may extend the search parameters to search more potential available customers to fulfill the desired number that the service provider would like to see. The system will update all the indicators and corresponding data accordingly to reflect the changes in the pool of potential customers.

According to an exemplary embodiment of the present invention, regardless of how many search parameters the service provider presets at a time, whether one or more or a combination of any, along with potential customers, the system will also identify other service providers whose current location is within the preset search parameters and who are currently available to provide the same type of service as the type of service this service provider has preset to provide. The system will compare the total number of identified other service providers with the total number of identified potential customers to present current supply and demand conditions to the service provider. The service provider may perform a search to then evaluate at least the current supply and demand information in the surrounding area and other information reflected by one or more sets of indicators. If the supply is determined as high and the demand as low, he or she might consider accepting a lower price or changing the current location to the one with lower supply and higher demand to potentially be able to make more deals. If the service provider has already received a service request, he or she may evaluate current supply and demand conditions to decide whether to accept, decline, or negotiate the service request. If the supply is determined as high and demand as low while the service provider has a service request pending, he or she might consider accepting the request at the price initiated by a customer or, if a customer requests him or her to initiate the price, the service provider might consider asking an average price or a lower price. If, on the opposite, the supply is determined as low and demand as high, the service provider might consider negotiating the service request to potentially receive a higher price for it.

According to an exemplary embodiment of the present invention, other information reflected by one or more sets of indicators may affect the price proposal and, ultimately, the final price of customer's service request. The price may be one of the largest factors among others in determining a best matching service provider. Much of the information provided to a customer and a service provider, through various sets of indicators or otherwise, assist them in finalizing a price. The system provides all customers and service providers, regardless of how selective they are, credible information based on historical data and real-time data in the database of the system they can use to evaluate other parties, and the order of this information and these various sets of indicators are provided to a customer or a service provider based on priority. Setting priorities does not automatically result in the best match between a customer and one or more service providers. Setting priorities, however, will allow the system to filter one or more service providers in the order of the customer's priorities. As a result, a customer can not only choose to set certain priorities but to also set the order in which to implement those priorities. The various sets of indicators along with other information that the system provides allows for a customer to pick and choose a best matching service provider fully at his or her own.

For example, a customer can set to prioritize service providers based on the following three priorities: favorite service providers who are available to carry Out his or her service request, whose estimated time of arrival is within ten minutes, and whose response to the price proposal initiated by a customer is the lowest. A customer can then set favorite service providers as the first priority, price as a second priority, and the estimated time of arrival as a third. A customer can also expand or otherwise shrink the number of priorities to implement at a time. A customer can then set to display the results of the search in the manner he or she prefers. For example, a customer can set to view only three service providers who are best matching the priorities. This number, however, can be any number of the resulting service providers that a customer prefers to view at a time. This number can also be changed to view more or less depending on the customer's liking.

The first set of indicators, which shows the identification of a service provider, may affect the price, as a customer may want to offer more—or less—to a service provider the customer knows from the favorites list, especially in cases of bad weather, where a customer may get a good deal from a favorite service provider compared to another regular service provider who is basing the price on low supply and very high demand. According to an exemplary embodiment of the present invention, if it is important for a customer to find a service provider who has provided on-demand services for that customer in the past and who has left a customer very satisfied with the quality of service provided, a customer can set to prioritize service providers from the favorites list who have preset to carry out the same type of service that a customer has preset to request and who are currently available to carry out the service request, where a favorite service provider of this customer would be sorted and displayed as the first priority, service providers from that customer's favorites list who are identified as available within the search parameters preset by that customer and whose service type subcategory matches the subcategory of that customer's service request are being prioritized over any regular available service providers.

The third set of indicators that displays the availability of a service provider. A service provider can provide on-demand service when available. A customer can prioritize by available service providers in the settings. Prioritizing this way allows a customer to sort based on how long a potential available service provider may be available, if the service provider provides specific information about how much longer he or she may be available. This may be an important factor for a customer, as a customer who likes to negotiate may prefer a service provider who has enough time available to complete negotiation of the price for a service request price with the customer.

The fifth set of indicators may also help a customer evaluate the value of a service provider regarding the number of total service requests completed in total, which may influence a customer to propose a higher price for more experience or propose a lower price for less experience, and the service provider may also want to see it as it applies to her or him, to get a better idea of market information. This set of indicators allow a customer to consider the qualifications of different service providers, which may be compared to the qualifications of other service providers on the touch screen display. If it is important for a customer that a service provider has a great deal of experience providing on-demand services of the same type that a customer has preset to request, a customer can prioritize the service providers with the highest number of carried out service requests of that same type. For instance, if a customer has preset to request transport service, he or she may set to prioritize an available service provider for transport who is within the search parameters preset by that customer and who has a record of completing the highest total number of transport service requests. This total number of completed transport service requests is calculated by tracking all the transport service requests that each of the identified service providers for transport has completed from the time of his or her registration with the system for all the customers regardless of pickup and drop off locations and regardless of who those past transport service requests were carried out for. The total number of completed transport service requests is then compared to the number associated with each respective other identified transport service provider, resulting in service providers for transport with the highest numbers of completed transport service requests being prioritized over other identified service providers for transport whose total numbers of completed transport service requests are lower.

From the sixth set of indicators, a customer is assisted in choosing a best matching service provider based at least in part on the service provider's proximity to the pickup location, displayed through the set of indicators that displays to a customer a pool of potential available service providers, among whom a service provider is chosen. A customer may pay a premium price when a service provider is closer to the pickup location, as he or she may not have to wait for a longer time. A service provider may also want to see this; as the service provider may want information regarding the competition. The display of potential available service providers to a customer depends on the customer's preferences; the number of service providers a customer may see can be controlled in multiple ways. There is a possibility that a customer may see too many service providers displayed to him or her if the search parameters are too wide or if no special priority is given to any factor. In the situations that a customer wants to limit the number of available service providers he or she sees, the customer can limit the search parameters, such as limiting the search parameter based on distance from ten miles to half a mile. In addition; a customer may limit the number of potential available service providers to see at once, such as a maximum amount of five; if he or she in unsatisfied with those five, the preset preferences can be adjusted to see other service providers by presetting a larger number. Finally, a customer may specify which factors are most important. For instance, a customer can preset to see proposed prices below a certain amount where the service provider also can be at the pickup location within a certain time. These various ways to limit the amount of potential available service providers helps a customer customize the method to find a best matching service provider.

A customer may evaluate supply and demand provided through a seventh set of indicators based data from the sixth set of indicators about the number of potential available service providers and available potential customers in each geographic zone based on a search parameter. The supply and demand information also affects the price: in times of high demand for service providers of on-demand services within the same service type subcategory, a customer may end up paying more for the service request than in times of low demand, since a customer might need to initiate a higher price proposal to secure a service provider or a service provider might respond with a higher price proposal when receiving a service request without a customer initiated price proposal when the demand is high. Service providers, too, may be interested in seeing this, as it may affect how much they may want to charge if they know the supply and demand information that a customer is seeing.

The eighth set of indicators connects with a number or amount to display information about response a service provider provides to a price proposal that a customer proposed for on-demand service. Based on the price proposed by a service provider, a customer may accept, reject or continue to negotiate the price for on-demand service.

The ninth set of indicators that shows information about service providers' price proposals regarding the customer's service request. The display of the price information is a cornerstone in a customer being provided information to select a best matching service provider, as he or she cannot select a best matching service provider without accepting a price proposal or making one that is accepted. If price is a critical factor for a customer in selecting a best matching service provider, whether the price is proposal or a response, a customer can set to prioritize service providers whose initiated price proposals are the lowest. Or, a customer can set to prioritize service providers whose responses to the price proposal initiated by a customer are equal to or below that price proposal, or whose responses are the lowest. For instance, a delivery service customer may first set a priority to search for all service providers for delivery available within the search parameters preset by that customer who are also on that customer's favorites list. The system will identify those favorite service providers for delivery. If the system in this example identified ten of such favorite service providers for delivery, the customer will then send a price proposal to all of these service providers within the search parameters. Once one or more of these service providers respond to the price proposal, the customer can set to list these service providers based on the response price, for instance, from lowest to highest. The customer can also set to only list one service provider with the lowest price response. The customer can then select a best matching service based on the lowest price.

According to an embodiment of the present invention, the tenth set of indicators that connects with data and information to display to a customer the service providers' experience within the zip code of the pickup location of the service request. For example, a customer may be more willing to choose and possibly add a service provider to the favorites list who frequently picks up customers in a certain location, such as his or her workplace, the customer may often request service. If it is important for a customer to have the service request carried out by a service provider who has a good knowledge of the requested pickup location, the customer can set to prioritize service providers with the highest number of service requests carried out within the geographic zone of the requested pickup location. There might be times when the exact address of the requested pickup location is not specified, such as if a customer does not know the exact address of the pickup location, instead describing the pickup location by what surrounds it. There might be other times when the address of the requested pickup location is specified, but because the pickup location lies within the area known to have weak or no GPS signal, the exact address becomes less useful. Unless a service provider is familiar with the geographic zone of the requested pickup location and its surroundings, his or her ability to arrive at the pickup location on time might be compromised. Referring to an exemplary embodiment of the present invention, the more service requests a service provider has carried out in the requested pickup location, the more familiar with it the service provider is considered to be.

Further, the service providers' experience at the drop off location, shown through the eleventh set of indicators connecting with data and information from the database, may affect a customer choosing a service provider, as it may be valuable to a customer to have a service provider on his or her favorites list who makes a lot of drop offs at the same location. If it is important for the customer to have the service request carried out by a service provider who has a good knowledge of the requested drop off location within the same zip code of the service request, the customer can set to prioritize the service provider with the highest number of service requests carried out within the geographic zone of the requested drop off location. There might be times when the exact address of the requested drop off location is not specified and is instead described by what surrounds it. Or, there might be other times when the address of the requested drop off location is specified but because the drop off location lies within the area known to have a weak or no GPS signal, the exact address becomes less helpful. What becomes more helpful is a service provider who has previously carried out service requests in the geographic zone of the drop off location and is therefore less likely to get lost and waste time trying to find the requested drop off location. Referring to an exemplary embodiment of the present invention, the more service requests a service provider has carried out in the requested drop off location the more familiar he or she is considered to be with it, and the more helpful that is to a customer.

The twelfth set of indicators, which connects with data and information to show familiarity with the service request route, may affect the customer's price proposal or selection of a service provider, as the service provider having extensive experience with the route may be of more value to a customer. Further, sets of indicators may help a service provider in accepting or rejecting a price, as he or she is able to know what her value is based on experience, whether with the route or by location. If it is vital for a customer to have the service request carried out by a service provider who is less likely to get lost along the requested route, a customer can prioritize service providers who are most familiar with the route between the requested pickup and drop off locations, where familiarity of each such service provider can be shown as a percentage. A service provider's familiarity is contextualized in two ways, by "direct" or "indirect" familiarity, and each type is distinct. Direct familiarity is a calculation of how familiar the service provider is with a certain route, as in the route from the pickup location to the drop off location-all done in one trip. Indirect familiarity, in contrast, is a calculation of how familiar a service provider is with the route between the pickup and drop off location, but this familiarity may be through piecemeal experience with the route. For example, two service providers have 100 percent familiarity with a route; the first service provider has provided service of this same route for a customer previously, from the same pickup location to the same drop off location. This is direct familiarity, and in addition to the 100 percent rating for matching, it may be indicated by number or by tier that this service provider has provided service using the same route. The second service provider also has a 100 percent familiarity-however, the one part of the route he or she provided for a different customer in the past, and another part of the route was also included as part of the route in another service request. Even though the service provider has traversed the length of this entire route, it was not from the same pickup location to the same drop off location. The familiarity the service provider has with the route is indirect. The degree of familiarity with the requested route, whether direct or indirect, will be calculated by comparing the requested route with the routes of service requests previously completed by the same service provider by tracking how common all or any parts of the requested route are to the routes of previously completed service requests. The service provider's familiarity with the requested route would especially matter at times when any part of the requested route lies within the area known to have weak or no GPS signal, or when the service request takes place after dark making it harder to follow navigation directions.

The thirteenth set of indicators will connect with data and information to informs a customer know how many times he or she has had a service request completed by a service provider may affect the price, as a service provider's service a customer is very familiar with may be of more value, which may also be of value to a service provider who would like what a customer sees about him or her in the selection process. If it is important for a customer to have an established relationship with a service provider and to know that a service provider can be trusted with the service request; a customer can set to prioritize service providers with the most number of service requests completed with that customer. Some customers may prioritize based simply on whom they have had more experience with; whoever has provided more service is selected. Other customers, however; may be more enticed to have service provided by a new service provider if they would like to expand their networks, or build on a new relationship. This determination is up to the decision or preference of the customer.

Further, the fourteenth set of indicators connects timing information and data to help a customer evaluate a service provider based on time arrival. A service provider may want to see this set of indicators as well, as a service provider may want to know how long the service takes from pickup to drop off. If the customer is pressed for time and needs the service provider to arrive at the requested pickup location as soon as possible, the customer can prioritize the service provider whose estimated time of arrival is the shortest. There might be times when there is an urgent need for a transport service. These are the times when service provider's estimated time of arrival supersede all other possible priorities a customer would otherwise implement in selecting a best matching service provider, including price. In contrast, however, there may be times when a customer may want to request service, but not the closest service provider, such as if the customer is off work in fifteen minutes and wants to have a vehicle for a transport service request arrive when leaving; in this case, the customer would prefer a longer ETA such as fifteen minutes over a shorter ETA, like five minutes. The customer's choice in a service provider does not always have directly to do with money—in some instances it may be driven by convenience or other preference.

The fifteenth set of indicators connects to data and information regarding time to assist a customer in selecting a route by looking at the time. A customer can preset to prioritize how long it takes him or her to get to the drop off location, the estimated travel time (Err). This has to do with the route indicated in the service request. A customer can preset that the route be prioritized to be the fastest possible route between the pickup location and drop off location. ETT may affect a customer's selection of a best matching service provider because a service provider may not provide the service request when the ETT is longer than the time limitations preset by the service provider and it also affects the customer's route selection, if he or she would like to arrive as soon as possible.

The sixteenth set of indicators identifies the information that provides a customer an idea of where the pickup location is in relation to the drop off location by connecting mapping data and information to the display, which may affect the decision in making a service request as well. This set of indicators may also help the service provider in seeing where the drop off location is compared to the return location, if any, that may be preset by the service provider. A customer may get a good rate because he or she would not be leaving the service provider with an empty leg if the service provider is heading in the same direction or to the same location of the planned return location.

These sets of indicators and other information help a customer decide what prices to propose or which price proposals to accept, as they can use these various sets of indicators to evaluate the potential available service providers in order to select a best matching service provider. A customer may evaluate a service provider with the assistance of one or more sets of indicators. This evaluation ultimately affects the price of the service request, and, it also affects the selection of the best matching service provider.

According to exemplary embodiments of the present invention, various sets of indicators will also provide useful and credible information to service providers, which helps them be informed about which price proposals to accept or reject the price proposals from one or more customers or how much their own price proposals should be. In addition, these various sets of indicators will help the service provider eventually choose a best matching customer, based on which customer the service provider prefers, based at least on the provided information. The service provider's decision of whom to enter into negotiation with, whom to select or whom to provide service is at least in part assisted by the various sets of indicators available to him or her. A customer is ultimately responsible for initiating negotiation by sending a service request to a service provider, and is given extensive means of customizing the display of potential available service providers. A service provider is also allowed to prioritize the display of potential available customers who are requesting services, but a customer is the party who initiates the process of finalizing a deal.

A service provider's decision may be influenced by indicators such as the seventeenth set of indicators that connects data and information about the total number of requests a customer has made; if given the choice between a customer who has a very long service request history and a customer who has rarely used the service, the service provider may be more inclined to choose a customer who will generate more business for him or her in the future. A customer may also know his or her value based on this set of indicators if he or she sees it.

A service provider's decision may also by influenced by the eighteenth set of indicators that connects information and data regarding service provider limitations and customer preferences and availability to identify potential available customers based on the preset search parameters, as the service provider may want to negotiate with a customer by searching with different search parameters. Based on different search parameters, different geographic zones will be shown based on the center point, which is the service provider's geolocation.

Further, the nineteenth set of indicators that connects data and information regarding supply and demand information may affect a service provider's willingness to accept certain price proposals-if services are in high demand, a higher price from a customer who is more willing to pay a higher price can be demanded, and a customer may want to know what the service provider seems to know to adjust the proposal price. This set of indicators clues in a service provider as to how in demand the services may be, whether high or low by comparing the number of service providers within one or more search parameters to the number of customers within the same search parameters.

According to an exemplary embodiment of the present invention, the service provider is provided a twentieth set of indicators connecting data and information to display to him or her how a price proposal proposed by a customer compared to the default price for the service request, which influences the decision to accept it, reject it or counter it. service providers are provided with comprehensive pricing information to inform them about what the value of a customer's price proposal is.

The twenty first set of indicators connects data and information to display to the service information about price proposal responses from a customer and how they measure against the default price, which affects their decision to accept or reject the price proposal. Both the twentieth and twenty first sets of indicators affect rejection or acceptance of the price proposal, or whether the service provider wants to negotiate the price. The service provider being dispatched to provide a service request is based on the service provider's preference.

According to an exemplary embodiment of the present invention, the twenty second set of indicators that connects data and information about where a customer indicates a pickup location may affect a service provider's ultimate acceptance of him or her, in a situation such as a service provider who is frequently in the same area may have an interest in accepting the service request and later requesting a possible addition to the customer's favorites list. the service provider's selection of a customer is further affected by sets of indicators that provide information about the customer's service request history and where different parts of it occur.

The same applies to the twenty third set of indicators that connects data and information about the customer's drop off location indicated in the service request: a service provider who ends his or her shifts near or at that location may be willing to accept a lower price because of the convenience of not having an empty leg. Whatever situation may apply, the service provider is provided with this information to make the best informed decision as possible.

The twenty fourth set of indicators that connects data and information about the service provider's service request history with a customer affects the price he or she accepts. For example, if a service provider has two similar offers from two different customers, his decision to accept one may be influenced by the past history he has with them; the service provider may be inclined to choose a customer he or she knows well—or may be inclined to choose a new customer. The set of indicators that displays to the service provider may also affect the ultimate decision to accept a price or to make a price offer, and ultimately in selecting a customer.

According to an embodiment of the present invention; a service provider is also provided a twenty fifth set of indicators that affects the decision to accept or reject a service request by connecting data and information based on the time it would take the service provider to complete it—the estimated time he or she would travel. A service provider may use this set of indicators; for instance, to know which service request may take longer compared to another or whether it conflicts with a preset time limitation. A customer may also want to know this information, as he or she may want to propose a more competitive or less competitive price based on other offers that the service provider may be getting.

In addition, the twenty sixth set of indicators that connects data and information about locations may affect a service provider's decision in pricing proposals or accepting price proposals from one or more customers, as it may show that the customer's drop off location is closer to where the preset return location is than another request, for example. If the service provider allows a customer to see his or her preset location, the service provider's preset location and time may affect the decision in choosing a service provider. According to an exemplary embodiment of the present invention, a customer can set to prioritize service providers who have preset a return location which is in close proximity to the requested drop off location, where the customer's estimated time of arrival matches the return time at which a service provider has preset to arrive at that return location or falls within the time frame within which that service provider has preset to arrive at that return location. Service providers who have preset a return location might be willing to carry out a service request for a lower than usual price since that is the location they will otherwise go to empty. Being able to select a service provider whose preset return location and preset return time coordinate with the customer's service request is beneficial for both the customer, who may pay a better price, and for that service provider, who gets to make money on a leg that may usually be empty.

Exemplary embodiments of the present invention allow a service provider to make a decision based at least on one or more indicators displaying a wide array or different information, and the same goes for a customer: the indicators directly and indirectly influence the prices that service providers and customers propose to each other and negotiate with each other, in addition to directly and indirectly influencing the ultimate choice of a best matching customer. The customer's and the service provider's decisions about pricing and selection may be different based on whether or not the price proposal they receive is negotiable or non-negotiable. In a non-negotiable price proposal; a customer or a service provider decides yes or no depending on the indicators and what they display about the request and the other party. However, in the situation of a negotiable request, the various sets of indicators give a customer and a service provider an idea of what they may value the price of the service to be, and they ultimately accept the one which provides them with the most value. This valuation is done through having relevant information provided by means of these various sets of indicators, which may give the service provider or customer reasons to propose certain prices or leverage to command a higher price or propose a lower price. And in addition to all the indicators that a service provider and a customer are given regarding the other party, seeing any part or all of the indicators the other party sees may affect their decision making regarding choosing a price and service provider or service request.

After a customer and a service provider have preset preferences and limitations and have been displayed potential available service providers and potential available customers, they begin the price setting process that will determine the ultimate price of the customer's service request. A customer and a service provider may also choose to send the information through various sets of indicators to the other party, if they choose, in full or in part. This may be done through system functionality such as taking a screenshot or otherwise transmitting information. A customer evaluates supply and demand information for on-demand services within the service type subcategory of the requested on-demand service by comparing the total number of service providers currently available to provide on-demand services within the same service type subcategory with the total number of customers currently requesting on-demand services within the same service type subcategory within a certain search parameter determined by a customer through the system. Based at least in part on the supply and demand information and other information provided by one or more sets of indicators displayed to the customer, a customer can then set a price for the on-demand service request and initiate the price proposal to one or more identified available service providers. To negotiate the price initiated by the customer, a service provider may also first evaluate current supply and demand information for the on-demand services within the service type subcategory of the requested on-demand service by comparing the total number of service providers currently available to provide on-demand services within the same service type subcategory with the total number of customers currently requesting on-demand within certain search parameters determined by the service provider through the system.

According to an exemplary embodiment of the present invention, there are at least three options to set prices are available for a customer in the process of price negotiation, who can choose which option to proceed with: the first option is when a customer makes a price proposal, which a service provider accepts or rejects. The second option is to have a service provider propose a price based on information about the customer's service request, which a customer may accept or reject. A customer and a service provider can set their price proposals to be either negotiable or non-negotiable. Non-negotiable price proposals are either accepted or denied. Regardless of who proposes the price in the first place, a negotiable price proposed from any user can be negotiated. Customers are also given the third option, based on the first two: to negotiate a price proposal. A customer and a service provider then propose until they both agree on a price, no flatter who proposed the price first. Since price is an important factor in each of these options, the system provides customers and service providers with the "default price" they may use partly as a basis for proposing prices. The "default price" refers to regular rates, prices and other information that both the service providers and customers know or are notified of in advance of setting prices. In calculating the default price, the type of service request should be identified, because different types of service usually charge different rates; a factor to be considered in the default price are different rates or rate books-such as prices or rates from a zip code to another zip code; prices or rates that can be per mile or per minute or a combination thereof; or prices or rates that are fixed or flat (such as from a certain pickup point to the airport, or from the airport to a certain drop off location). Also, other factors considered in the default price may be other market information such as what prices are charged by third parties that provide similar services. Service providers and customers are made aware of this pricing information before the initiation of any on-demand business or deals; anybody who makes or accepts, denies or negotiates price proposals or makes other types of pricing decisions is made aware of relevant pricing information through the default price and may use it as a guideline or point of reference.

According to an exemplary embodiment of the present invention, rate for calculating the default price of the service request is usually fixed; the default price will not be changed moment to moment based on changing supply and demand. A price that may go up or down depending at least on traffic conditions and routes is referred to as the "estimated price." The "estimated price" is a tool that would give a customer an idea of what a service request may cost. This may be given in the form of an estimated minimum-maximum range or number. For example, a route in a transport request, which can be changed based on different driving-time rate or different mileages. Furthermore, the estimated price may be a function of the estimated travel time and where the trip takes place. The estimated price may be based on a rough estimate of location or it could be an exact address or location as provided by a third-party location API such as Foursquare® if a customer does not know a specific address. The estimated trip time may differ depending on traffic conditions or other factors that contribute to the time it takes to complete a service request. The estimated price is a means of displaying an approximate cost for the service request in a non-binding way, as some customers may like to check the price before they start the service to avoid uncertainty.

After the initial evaluation and the customer's decision on how much to offer in a price proposal or whether to let the service provider make a price proposal first, one or more identified service providers then receive the customer's on-demand service request with or without customer initiated price proposal. The system then transmits the customer's service request with or without a customer initiated price proposal to one or more service providers within certain search parameters preset by the customer, where the customer's service request specifies at least the type of service requested; pickup location or drop off location or the route between the requested pickup location and drop off location. If there is some information lacking in a service request, such as only having a pickup location but no drop off location, then some sets of indicators may not have enough information to display all its proper parts, the system can still proceed with the partial information available to find a best matching service provider.

According to an exemplary embodiment of the present invention, the system, however, may transmit the customer's service request to one or more identified service providers without customer initiated price proposal, if a customer wants one or more identified service providers to set prices and initiate their price proposals to the customer. If a customer presets the price proposal as non-negotiable; one or more identified service providers who receives the customer's on-demand service request with that non-negotiable price proposal have an option to either accept or reject the request. A customer may be able to choose or negotiate which route to take with one or more service providers; a route that has been predetermined by a customer and a service provider can help avoid a possible dispute about what route the service provider should take during the transport service request.

According to an exemplary embodiment of the present invention, if one or more identified service providers receive the customer's on-demand service request with a customer initiated price proposal, one or more identified service providers, with the assistance of one or more sets of indicators, are able to see whether the price initiated by a customer is higher or lower than, or equal to the default price indicated as an amount or a percentage. As part of the settings, a customer or a service provider may preset whether he or she wants the system to automatically reject price proposals from the service providers if such price proposals are higher or lower than a price threshold preset by the customer. For example, a customer may instruct the system to automatically reject all price proposals from the service providers that are 15% higher than the default price for such service request.

If a customer presets the price proposal as negotiable, one or more identified service providers who receive the customer's service request with that negotiable price proposal have an option to either accept the request at a customer initiated price, reject the request, or negotiate the price initiated by the customer.

Based at least in part on the current supply and demand information and other information provided by one or more sets of indicators displayed to the service provider, the service provider can then set a response price to the price initiated by the customer. The system will then transmit one or more response prices from one or more identified service providers to the customer.

According to an exemplary embodiment of the present invention, if one or more service providers receive the customer's service request without a customer initiated price proposal, one or more identified service providers have an option to reject the service request or to respond to the service request with a price proposal. Alternately, if one or more service providers who receive the customer's service request without a price proposal respond to the service request with a non-negotiable price proposal, a customer has an option to either accept or reject the price proposal. If a service provider responds to the customer's service request with a price proposal, the customer, with the assistance of one or more sets of indicators, is able to see whether the price initiated by one or more service providers is higher than, equal to or lower than the default price indicated as an amount or a percentage.

A customer can preset automatic rejection of any service provider's price proposal that is higher or lower than a price threshold preset by that customer. In addition, a customer or a service provider can provide a price range where with a price falling between a range, a customer or a service provider may have that price automatically accepted, which can be based on the default price or it can be any other amount they want to set. Setting a price range is a way customers or service providers may quickly set a target price.

According to an exemplary embodiment of the present invention, a service provider and a customer may enter into one or more negotiations at a time. However, once a customer and a service provider agree on a price for a service request together and the service provider is dispatched, they may no longer negotiate with other parties upon confirmation of the selection of the service request from both involved parties. At that point, all other negotiations that these two parties and the relevant indicators associated with them are removed from the display on the interface. That is, once a price has been set between a customer and a service provider, the service request is to be carried out between those two parties. This applies to all customers and service providers, and it also applies to each subcategory of service request.

If one or more service providers who receive the customer's service request without a customer's price proposal respond to the service request with a negotiable price proposal, a customer has an option to either accept the service provider's price proposal as is, reject the service provider's price proposal, or negotiate the service provider's price proposal until the deal is reached or no deal can be made. If no deal is reached between a customer and a service provider, the customer's service request expires. In this situation, a customer may reinitiate the service request or initiate a new service request with new information. The price accepted by both a customer and the best matching service provider becomes a final price for the customer's on-demand service request. Determining the best matching service provider for a service request is confirmed by agreeing upon a price between a customer and the service provider. The system then receives this final price and dispatches the customer's on-demand service request to the best matching service provider.

According to an exemplary embodiment of the present invention, better service and price setting procedures are allowed by allowing greater discretion and autonomy to a service provider and a customer to set their own prices for service, the service may be better and leave both sides more content with the quality and cost of such service. Furthermore, a supply and demand model allow for a customer who is willing to pay more to attract better service at a rate the customer feels comfortable with, and allow for a service provider to charge a price at which the service provider can provide service. Since price is an important factor in identifying a best matching service provider, the system provides a customer and a service provider with numerous types of information they both may use at least in part to set and negotiate prices for the service.

In order to find a best matching service provider based on a customer's preferences and needs, in accordance with exemplary embodiments of the present invention, the system may use a set of databases (or data storage medium) to provide and maintain an on-demand service application. The database may contain several data categories or groupings. The database contains information for both delivery and transport service, where the delivery and transport sections of the database may be independent or synchronized in order to retrieve information from both sections at the same time. This data could include rules and procedures data, administrative data, customer data, service provider data, group data comprising base data, company's data, or group of individuals' data, and other types of data such as data relating to user types. According to an exemplary embodiment of the present invention, all historical information and database may be categorized and stored in the database and may be retrieved from the database. Historical data is kept track of partly by assigning a tracking number, service ID number or trip ID number that would be assigned to each service request to help the system refer back to the service request if it comes into question. Information that could be held within this identification may be information such as what type of service request it was, who requested it and carried it out, where it took place, such as a zip code, borough, city or state and what was the route that was taken, how much the service request cost along with when and how the payment for the service took place, what type of feedback was given, whether either party is added to a favorites list or the blacklist. For example, if a customer has a question regarding the service request and would like to refer back to its details, the tracking number would recall service request information stored in the database. All information regarding a customer's or service provider's preferences or limitations, feedback, pricing and indicator settings and other customizable information may be stored within the database of the system.

It is to be understood by one skilled in the art that the database updates and syncs dynamically whenever there are changes or updates in data blocks; the server and database may dynamically update the data to reflect the latest changes. Any backup database related to the database may also change accordingly to also reflect the latest changes. In an exemplary embodiment of the present invention, such information may be organized or structured in a manner allowing for effective sorting and retrieval. In another exemplary embodiments, the information may be stored in a non-relational or unstructured manner. One of ordinary skill in the art would appreciate that there are numerous methods for providing, storing and organizing data in a database or other data storage medium; and exemplary embodiments of the present invention are contemplated for use with any appropriate database or data storage medium. In addition to that, there is at least one backup database that may back up the primary database frequently in case of data loss in the primary database.

Other information such as rules and procedures for service requests and pricing them, procedures for service providers' and customers' settings, indicators settings rules and procedures or rules and procedures for price negotiation, feedback and referrals, or the rules and procedures for how the system manages itself.

According to an exemplary embodiment of the present invention, the comprehensive database may store administrative data and other information. The administrative data includes any information or data which is part of the on-demand service application, comprising system data such as contact and FAQ information, registration details regarding customers and service providers, for instance, billing information or other relevant information relating to administering the on-demand service application, for example how long users have been registered with the system or how frequently they use the on-demand service application. Administrative data could also include information such as price and rate information for routes from different organizations. Other information includes rules and procedures for service requests and pricing them, procedures for service providers' and customers' settings, indicators settings rules and procedures or rules and procedures for price negotiation.

According to an exemplary embodiment of the present invention, records of completed service requests are also stored and maintained within the database based on the user type; category and subcategory to which they belong. The system may automatically store records of historical data for any completed service requests in a comprehensive database. The database may be updated as services are booked and completed. The database may store an index of each service request that has been requested and completed; including the registration numbers or user identifications of customers and service providers can be retrieved for reference if needed at any time; the comprehensive database may also store the details of service requests for each particular service provider for future reference. The database also includes data about service provider's vehicle, such as type of the vehicle, model, color, seating capacity and accessibility, insurance status and even pictures of the vehicle. Additional information in the service provider's profile may include such information as service provider's favorites list and blacklist, preferences and limitations such as zip codes, time or location limitations, and price preferences as well as service data and records. All of those historical data will be used by the system to identify the indicators for each customer and service provider. This service provider may be very familiar with the route compared to another service provider whose service request history does not include the same or a similar route. Better service may be provided in this manner. For example, convenient and time-saving routes may be built based on historical routes from the historical data. Corresponding data and information for a customer may also be stored in the database, including data and information relating to settings, service request history and other historical information regarding the service request history or profile information such as billing address, credit card/bank account information or any other information about a customer given in the registration process.

Additionally, the specific data such as times of the service requests and prices of the service requests may be used as a reference to find average prices for customers to receive fair prices when booking services. Data which is entered and stored in the database is subject to be verified again. Maintaining a comprehensive database also allows for the accurate tracking of service requests that may be in dispute by a customer or a service provider. Service request records may be retrieved in an efficient manner from the database in order for any claims to be resolved in a timely manner.

According to an exemplary embodiment of the present invention, additional data which may be input into the database includes, but is not limited to, locations where customers traveled to, favorites lists or blacklists, locations, other transaction data and details, historical data, insurance policy expiration dates, inspection dates, service provider's license expiration dates or any combination thereof. This data may include information relating to indicators and the display thereof: the service requests that all of customers or service providers have completed in a certain area such as one or more streets, zip codes, town, city, borough or county, state or any other region defining feature, or how many times a customer and a service provider have been paired by the system to compare the service request.

According to an exemplary embodiment of the present invention, the data stored in the database may be analyzed to obtain other information useful for the efficient booking and dispatch of on-demand transport service, as well as to remind the service providers when their license, insurance or inspection are approaching expiration, or map data for all on-demand service requests that are identified by the GPS.

The GPS determines the location of the computing devices in different ways, for example through receiving location-based resources.

According to an exemplary embodiment of the present invention, some of the comprehensive database may temporarily store some data while the transaction is being made. This information may include data such as the prices that customers propose for service, the prices service providers propose for service requests or the prices customers and service providers agree on in negotiation after a final deal has been made. This information may also include data about the indicators that are displayed based on pricing, for example, indicators that show when prices are higher or lower than or equal to the default prices and by how much, whether as a percentage or amount. This data and other data relevant to on-demand service is stored in the database temporarily.

According to an exemplary embodiment of the present invention, indicators in this on-demand service system are generated based on the exploration and analysis of all of the data that stored in the database. Since the indicator related icons, shapes or other depictions are stored in the database, then based on the results of the exploration and analysis of the data and the icon, shape or other depiction assignment rules, the icons, shapes or other depictions will be displayed with other indicators to customers and/or service providers accordingly. In addition, the display of the indicators related color may be determined by the result of the exploration and analysis of the data by using the color codes that stored in the database.

According to an exemplary embodiment of the present invention, when a user of the system is through one or more sets of indicators displayed the information about of another user, based on the identification information of the user, the system may explore the database and retrieve related data about the various sets of indicators. After the analysis of the data, the system may display the processed result for each user.

According to an exemplary embodiment of the present invention, the system stores all routes and service providers in the database and mines the database for this information to dispatch service providers based on their experience in specific areas. The system utilizes a multi-level optimization method to analyze the preferences preset by a customer and see who the best matching service provider is with the most experience matching the customer's preferences.

Every time the system gets the input/request from a customer or a service provider who wants to see the indicator of themselves or the other party, the system will first open a safe access channel with database(s)/database center and then it sends out the query sentences through the access channel to database management module. If it is a relational database, then the data tables may have one kind of relationships, such as One to Many Relationships, Many to Many Relationships and One to One Relationships with other data table(s). Based on the relationships between data tables, the database(s) management module exactly follows the query sentences and finds the specific data table(s) by using ID(s), table names and columns names of the tables with/without joining two or more data tables together; if it is a non-relational database, instead of data tables, the data stored in key-value pairs, then the database management module exactly follows the query sentences and finds the specific data by using keys that query sentences provides.

Whether it's a relational or non-relational database, after database(s) management module retrieves the targeted data, then it sends the search result back to the server through the secured access channel. Then the secured channel is closed until next time it is open. For example, based on the retrieved historical data, such as indicators rules data, trip history data, customers' preferences data, service providers' limitations data and the data from the customers; like customer's ID, customer's entered pickup location and drop off location. The system could find out whether this service provider and a customer are on each other's favorites lists, the service provider has served this customer for how many times, whether this service provider has experiences of providing services with its pickup location and drop off location is exactly the same with this new request or its pickup location and drop off location fall in the same zones of this new request's pickup and drop off location zones based on the zip codes.

According to an exemplary embodiment of the present invention, the system may be implemented through a combination of hardware and software that operates on a computing device, such as portable computing device and computers, generally with one or more connections to a wireless wide area network (WAN) (e.g., the Internet). The system may be configured to communicate with network service that coordinates on-demand service through communication means.

An on-demand service system needs the pre-programmed features combined based on certain protocols/methods of integration of basic components; such as servers, databases, mobile end applications, web portals, network settings, etc. Where the applications could be Android Applications; iOS Applications, Windows Phone Applications, etc. The system also needs to be maintained by maintenance specialists with related monitoring and/or management tools and to be upgraded by engineers with using related programming languages and skills with every certain amount period of time.

The on-demand service system also could arrange the service between a customer and a service provider based on the preset method and settings. In some examples, on-demand service can include transport service, delivery service, or both. Once the on-demand service has been completed, a customer can typically pay for the service through system's payment module.

According to an exemplary embodiment of the present invention, the system is cross-platform and it can be accessed through different computing devices, such as web portal and/or mobile applications, at the same time if necessary. The different components within the computing device, which in modern times can be in many different forms-tablets, smartphones, laptops, PCs, or even servers, interact and communicate to share information. Users who use the system interact with the system through the modules provided to them through the application on their computing devices. Whether a user is a customer or a service provider will impact how the user interacts with the system interface, as a customer module is different from the service provider module. The administration of the system will also be done through another module different from the ones used by customers and service providers. The various functionalities are provided for what each user needs from the system; a customer would not need the same features as a service provider, nor would the service provider need the same features as a customer or administrator. One of ordinary skill in the art would appreciate the many different forms and functions of computing devices and understand that the exemplary embodiments of the present invention could be used with any, and also understand that the different types of users demand different functionalities. Also given for the provision of features are the different application functionalities needed depending on service request type: before making a request, a customer will select which panel or module of the application he or she uses; the selection will be based on which type of service they need-transport service for one or more riders or delivery service of goods. This selection will affect the functionality of the application: what the display may look like, what options or settings a customer may be given or any other relevant features. The same is true for service providers; the display and settings they may see or choose will depend on the type of service request they would like to or have been chosen to carry out. A user, regardless of whether the user is a service provider or customer, is enabled through the interface of the application to interact and make selections, presets or change settings relevant to preferences or limitations.

According to an exemplary embodiment of the present invention, the communications mean of the system may be, for instance, any means for communicating data over one or more networks or to one or more peripheral devices connected to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with exemplary embodiments of the present invention, and exemplary embodiments of the present invention are contemplated for use with any communications means.

According to an exemplary embodiment of the present invention, a customer module, the means by which a customer interacts with the system, is dynamic and may be adjusted according to specific location. The customer and service provider modules may be connected through server, for instance, through bi-directional wireless communication configured to show location data on the electronic map display and other data as input from a customer or a service provider. Displayed features may be specific to the location or region that the computing device is located in, so that region-specific information may be provided on the display interface.

Exemplary embodiments of the system may also adjust customer module features, including the content displayed as part of a customer interface features, based on other customer selections and preferences. Exemplary embodiments of the system may include an on-demand transport service application or on-demand delivery service application, a map component, a map database, and a location identifier unit, such as, for example, a GPS module or other circuitry for providing location-based services (LBS) data. One of ordinary skill in the art would appreciate that there are numerous means for providing location identification and location-based services, and exemplary embodiments of the present invention are contemplated for use with any such means. A GPS-enabled system or device allows the applications' tracking components to identify the location of customers and service providers individually who are making a service request or are looking to provide service. Based on the customer's current location or service location, the application manager may cause region-specific customer interface feature to be output by a customer interface component. A region that is specific to a customer includes the current location or service location in which on-demand service may be provided to the customer. The region may be identified by a zip code or a city name or a metropolitan area name in which the computing device is currently located and may be an area having a predetermined distance radius from current location, e.g., one mile, or may be an area that is specifically partitioned from other areas. Based on the customer's region, the application manager may cause region-specific information about the on-demand service to be provided on one or more customer interface features. Region-specific information about the on-demand service may be provided, in part, by the on-demand service system. Preferences or limitations which are locationally based depend in part on GPS-enabled devices. As discussed, the on-demand service application may provide location information to the on-demand service system so that the on-demand service system may arrange a service to be provided to a customer.

According to an exemplary embodiment of the present invention, and based on the customer-specified region, the on-demand service system may provide information about available service providers who can perform the on-demand service in that region. For example, information provided for a service request may include available vehicles information, which service providers are able to perform a transport service, which service providers are available to provide services now, the current locations of the vehicles, the directions of the vehicles, etc., so as to properly arrange the transport service between customers and service providers.

According to an exemplary embodiment of the present invention, and based at least in part on the current location of the computing device, the on-demand service application may use the customer's information, such as the customer's home address, the customer's place of business, the customer's preferences, etc. and historical information, such as the information of the previous locations that a customer requested service to provide recent and/or recommended points of interest to the customer. When a customer selects one of the entries of a recommended point of interest as a current location and/or pickup location, the on-demand service application may provide the location data to the on-demand service system.

According to an exemplary embodiment of the present invention, using the information maintained about the customer, service and the service providers, the on-demand service system may provide relevant information to the on-demand service application. Service information may correspond to information about the particular on-demand service that can be arranged by the on-demand service system. Service provider information may correspond to information about the available service providers themselves, such as profile information about the service providers, the current location or movement of the delivery vehicles, transport vehicles or vehicles providing both transport and delivery service or a particular distance or particular pickup time from the customer. The on-demand service system may transmit relevant service information (e.g., cost for the service, promotions in the area) and relevant service provider information (e.g., vehicle information) to the on-demand service application so that the on-demand service application may cause region-specific information to be presented to the customer.

In an exemplary embodiment of the present invention, the components of the system can combine to provide customer module features that are specific to customer selections and customer locations, and/or real-time conditions to enable a customer to request on-demand service. For instance, the on-demand service application can correspond to a program that is downloaded onto a smartphone or other portable computer device such as a tablet or PDA. A customer or a service provider can download and install the on-demand service application on a computing device and register the computing device with the on-demand service system.

Technical aspects of the present invention are further described in details below and the important function of identifying, finding, matching, referring, or routing users is done by the system through interfacing discrete communications aspects. According to an exemplary embodiment of the present invention, an on-demand service application can include a server, a customer interface component, a service provider interface component and a server interface.

The server interface handles communications exchanged between server and the on-demand service applications (for service provider and for customer) instead of directly connecting the two applications, and all the management and process of the data will through the service system server. The server, through the server interface, receives customer input information, location information and service request information to configure content as well as the information from the service provider-location information, limitations information and historical information.

The server sends information to one or more computing devices through server interfaces and information will be output to a display of the computing devices. This could be content features that are region-specific if there is particularly relevant regional information, especially in service request mapping or routing. A customer interface may pass indicators to be displayed on the maps, where each indicator signifies different customers or other customer input and/or other information received by system from the on-demand service application. A customer application features can also provide dynamically synchronized content based on customer selections provided via a customer input. For example, a customer interface component uses a customer interface framework that can be configured with various content, such as customer interface content provided by the on-demand service system server and content as a result of customer input.

According to an exemplary embodiment of the present invention, for service providers, the service provider interface component configures the service provider interface with location information and that location information will be passed to customer interface component through server, using the same framework as a customer interface component. Essentially, important and relevant information is routed from the service provider to a customer and from the service provider interface through the server, whether service providers are carrying out transport service or delivery service. Eventually, a customer interface component would implement the service provider tracking function, which may be used to see real-time updates about the service provider's location, and, if applicable, the real-time location of a delivery. According to an exemplary embodiment of the present invention, customer interfaces include but are not limited to a home page customer interface, a service request panel that is used for customers to identify the details of the service requests, like type of services, filter details, etc., a summary customer interface, a location suggestion customer interface, a location search customer interface, a confirmation customer interface, or a combination of any of the features described. For example, a customer interface component can cause a home page customer interface to be displayed that identifies the service(s) that a customer can request using the on-demand service application. One of ordinary skill in the art would appreciate that there are numerous customer interfaces that could be utilized with exemplary embodiments of the present invention, and exemplary embodiments of the present invention are contemplated for use with any appropriate customer interface.

The home page of the customer interface may also provide certain service selection options or types that are available in the customer's region. In this manner, based on the current location of the computing device, the on-demand service application can cause location-specific customer interfaces and content to be presented to the customer. In many instances, a geographic region that is specific to a customer can be based on the customer's current location (e.g., the current location of the computing device) or the customer's requested service location (e.g., the pickup location and drop off location for a transport service or a delivery service). For example, in some cases, the current location can be different from the requested service location, so that a customer can manually select a particular pickup location that is different from the current location of the computing device.

According to an exemplary embodiment of the present invention, the customer's current location or service request location can be determined by a location identifier. The location identifier can determine the location of the computing device in different ways. In one example, the location identifier can be accomplished through processing of received global positioning system (GPS) data from location-based/geo-aware resources of the computing device. In addition, the location identifier can also receive GPS data from other applications or programs that operate on the computing device. For example, system can communicate with one or more other applications using one or more application program interfaces (APIs). The on-demand service application can use the location information to cause a customer interface component to configure a customer interface framework based on the location information. In addition, the on-demand service application can provide the customer's location data to the on-demand service system.

As an addition or alternative, the on-demand service application can identify the customer's current location or delivery pickup location, for instance, (i) by using location data provided by the on-demand service system, (ii) by using customer location or delivery pickup input provided by a customer and/or (iii) by using customer info and/or historical info stored in one or more databases. For example, the on-demand service system can cross-reference the location data received from the on-demand service application with the other sources or databases, e.g., third party servers and systems that maintain location information to obtain granular/specific data about the particular identified location. One of ordinary skill in the art would appreciate that there are numerous methods for the on-demand service application to identify the customer's current location or pickup location, and exemplary embodiments of the present invention are contemplated for use with any appropriate method.

In some cases, by cross-referencing data, the on-demand service system can identify specific locations (e.g., stores, restaurants, apartment complexes, venues, street addresses) that are proximate to and/or located at the identified location, and provide this specific location information customer interface as location data to the on-demand service application. The application manager can cause a customer interface component to provide the specific location information as part of a customer interface so that a customer can select a particular store or venue as the current location or the service performance location (e.g., a pickup location or delivery location). The on-demand service application can also receive customer location input provided by a customer to determine the service location of the customer.

According to an exemplary embodiment of the present invention, the on-demand service application can cause a customer interface component to present a location search customer interface on the display. customer can input a search term to identify specific locations (e.g., stores, restaurants, venues, addresses) that a customer wishes to request the on-demand service. The on-demand service application can perform the search by querying one or more external sources to provide the search results to the customer. In some variations, a customer can manually provide location input by entering an address (e.g., street number, street name, city, state) or by manipulating and moving a service location graphic/icon on an electronic map display that is displayed as part of a customer interface. In response to a customer selection, the on-demand service application can provide the location data to the on-demand service system.

According to an exemplary embodiment of the present invention, the on-demand service application can retrieve a customer's information and other historical data that is stored in the database. The database can include records of the customer's previous on-demand service requests as well as the customer's preferences or filters. In some implementations, the database can be stored remotely at the on-demand service system and customer information can be retrieved from the on-demand service system database(s). The on-demand service application can use the data stored in the database to identify previous service locations for the customer. Further, while referenced as a database, one of ordinary skill in the art would appreciate that in practice this could be implemented in numerous manners, including but not limited to a data storage medium, whether structured or unstructured, relational or otherwise. One of ordinary skill in the art would appreciate that there are numerous methods of providing databases and data storage media for the organization and retrieval of specific information, and exemplary embodiments of the present invention are contemplated for use with any appropriate database or storage means.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like. Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context. The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on, whether the steps are performed automatically or not.

It will be appreciated that computer program instructions may include computer executable code. A variety of languages for expressing computer program instructions are possible, including without limitation C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

Detailed description of the figures herein with the figures are supplemental for further detailed description of the invention, to explain the invention for better understanding. Accordingly, the following descriptions and figures are to be regarded as illustrative in nature and not restrictive.

FIG. 1 depicts a schematic diagram of an exemplary Computing Device (100) appropriate for use with embodiment of the present invention. Computing Devices may generally be comprised of one or more of a Central Processing Unit (CPU) (101), Random Access Memory (RAM) (102), a Storage Medium (e.g. hard disk drive, solid state drive, flash memory, cloud storage) (103), an Operating System (OS) (104), one or more Software Applications (105), one or more Display Elements (106), one or more Input/Output Component (107) and at least one Database (108), GPS Component (109) and Accelerometer (110). Examples of computing devices usable with embodiment of the present invention may include but are not limited to mobile computing devices, such as smartphones, laptops, tablets, PCs and servers. The term computing device may also describe two or more computing devices communicatively linked in a manner as to distribute and share one or more resources, such as clustered computing devices or server banks/farms. A mobile computing device is any device that is created using mobile components, such as mobile hardware and software. Mobile computing devices are portable devices capable of operating, executing and providing service and applications like a typical computing device. Mobile computing devices also may be known as portable computing devices or handheld computing devices. Exemplary embodiments of the present invention use the mobile devices in a similar manner as the regular PCs, including the use of similar hardware and software components as those used in personal computers, such as processors, random access memory and storage, Wi-Fi, and a base operating system. They may, however, use a mobile architecture that is built to enable portability.

One of ordinary skill in the art would appreciate that exemplary embodiments of the present invention may be contemplated for use with a different kind of a computing device, and that a computing device may vary in components from the ones described therein.

Figure 2:
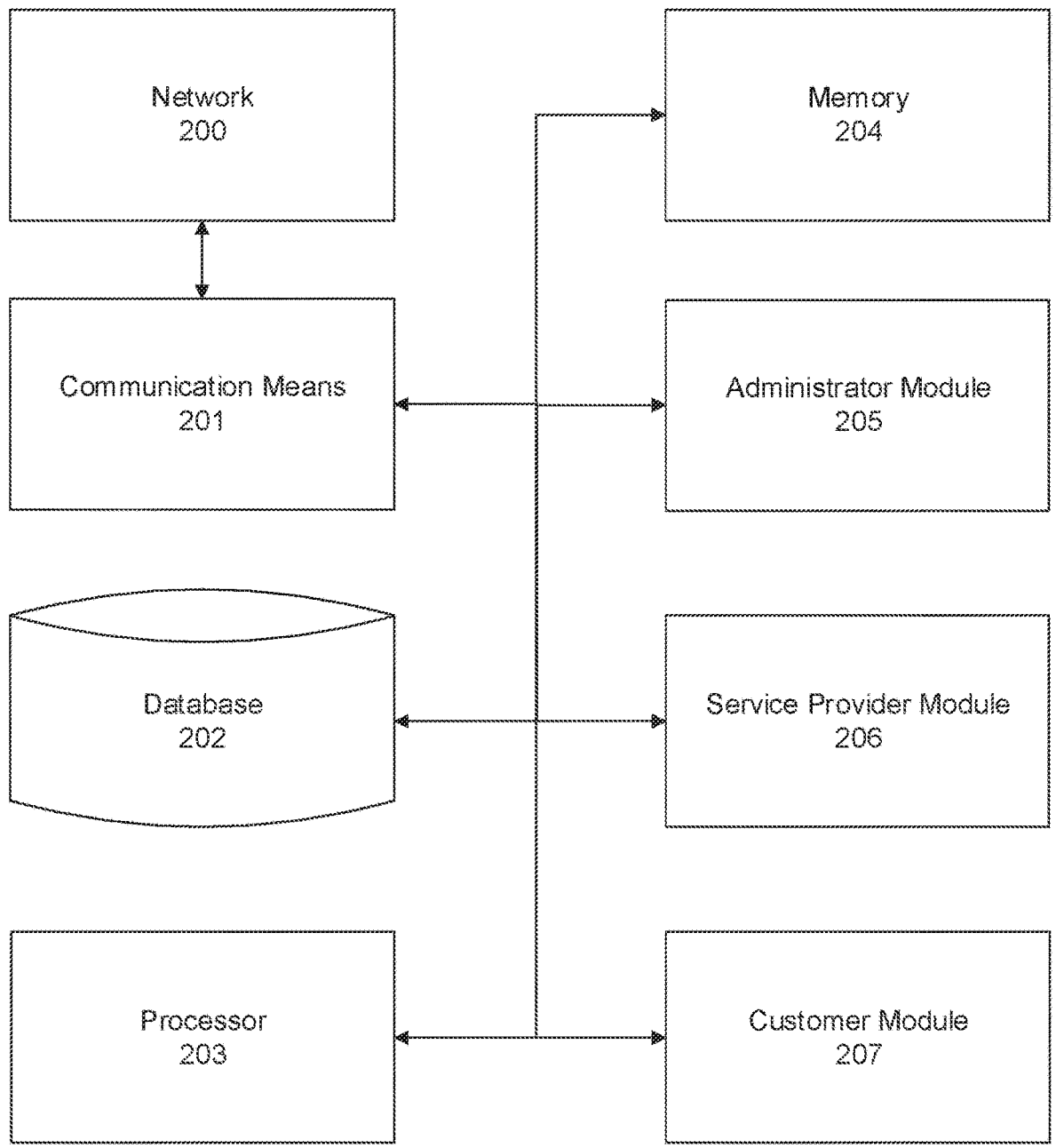
FIG. 2 depicts a schematic diagram of exemplary system components.

FIG. 2 depicts a schematic diagram of exemplary system components comprised in the system of the present invention. A system component is a process, program, utility, or another part of a computer's operating system that helps to manage different areas of the computer. There are multiple system components at work in a computer operating system, each serving a specific function. Together, they allow the operating system and computer to function correctly and efficiently. In the exemplary embodiment of the present invention, the system components may be comprised of: Communication Means (201), Database (202), Processor (203), Memory (204), Administrator Module (205), Service Provider Module (206), and Customer Module (207). The Administrator Module (205), Service Provider Module (206), and Customer Module (207) interact with other components of the computing device, such as the Communication Means (201), Database (202), Processor (203), and Memory (204) in order to affect the provisioning and display of various functionalities associated with the system and method detailed herein. In general, communication between the system components and Network (200) occurs through Communication Means (201).

One of ordinary skill in the art would appreciate that Service Provider Module (206) and Customer Module (207) may include at least two sub-modules: one for transport service and one for delivery service. These sub-modules may work independently or be synchronized to work together. Also, one of ordinary skill in the art would appreciate that system components may vary from the ones described herein, as FIG. 2 only describes the core elements of the system components of the present invention.

Figure 3A:
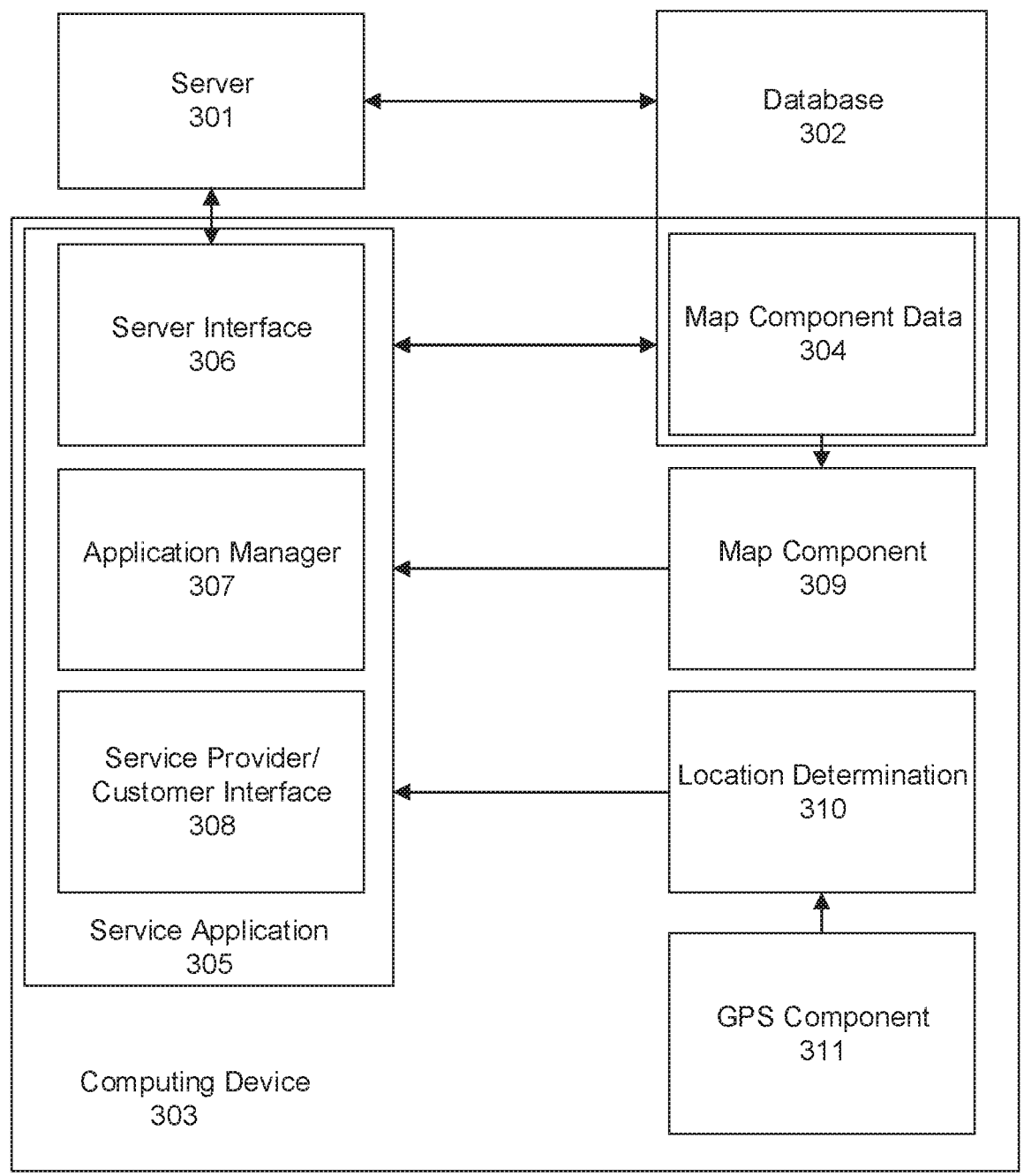
FIG. 3A depicts a schematic diagram of an exemplary system structure.

FIG. 3A depicts a schematic diagram of an exemplary system structure that comprises three main components: Server (301), Database (302), and Computing Device (303). The Server (301) continuously interacts with the Database (302). The Database (302) may have some data stored in the Computing Device (303), for example, part of or a whole Map Component Data (304). The Computing Device (303) may have a Service Application (305) installed on it. The Service Application (303) has three main components that include Server Interface (306), Application Manager (307) and Service Provider/Customer Interface (308). Any interaction between the Service Application (305) and the Server (301) occurs through the Server Interface (306). The Application Manager (307) is managing operation of Service Application (305) and is in charge of retrieving data from the Database (302) for Service Application (305). Any interaction between the Service Application (305) and service provider/customer occurs through Service Provider/Customer Interface (308). The Computing Device (303) could help Service Application (305) with Map Component (309), for example, to display the service provider's/customer's location on the map of the Service Application (305). The Map Component Data (304) could be retrieved from the Database (302). Computing Device (303) also provides support of Location Determination (310) to Service Application (305), where the location is identified by means of the GPS Component (311) located within Computing Device (303). One of ordinary skill in the art would appreciate that the system structure depicted in FIG. 3A is not exclusive, and that there could be other variations thereof.

Figure 3B:
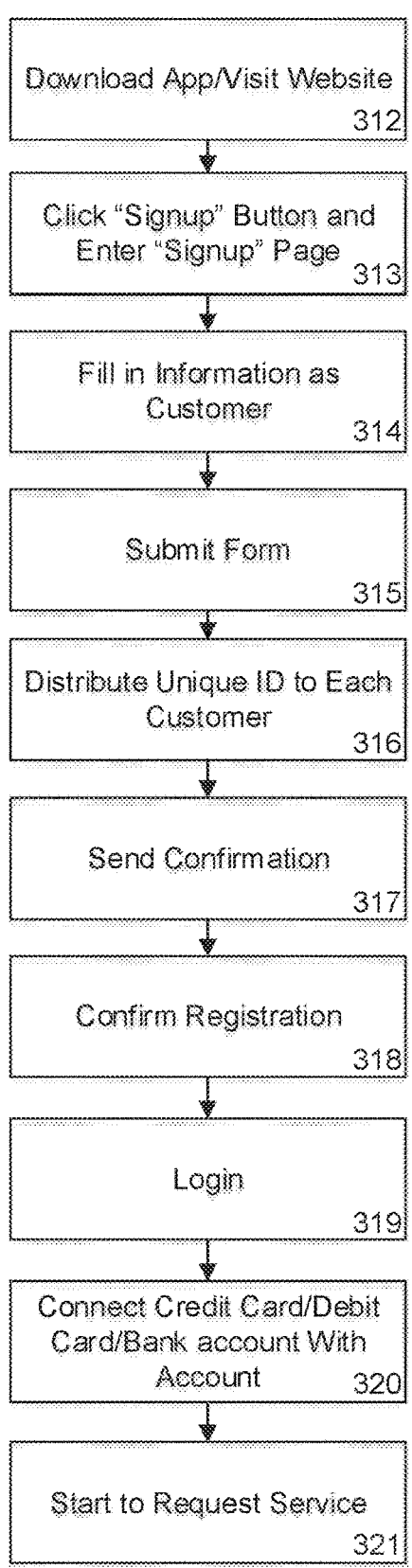
FIG. 3B depicts an exemplary workflow for a customer's registration.

FIG. 3B depicts an exemplary workflow for a customer's registration. The process begins with the customer downloading the app or visiting the website (Step 312). The customer then clicks the "signup" button and enters the "signup" page (Step 313). The customer then fills in his or her information (Step 314) and submits the form to the system (Step 315). The system distributes unique IDs to each customer (Step 316) and sends a confirmation of registration to the customer (Step 317). The customer confirms registration (Step 318) and then logs in into the system (Step 319). The customer then has an option to connect a payment method, which may be a credit/debit card, bank account or any other payment method, with his or her account (Step 320). Once the customer connects a payment method, he or she is all set to start requesting service (Step 321).

One of ordinary skill in the art would appreciate that the process described in FIG. 3B is not exclusive, and that the customer's registration process could include the steps that differ from the steps described therein. In addition, one of ordinary skill in the art would appreciate that the process depicted herein does not require the particular order shown to achieve desirable results.

Figure 3C:
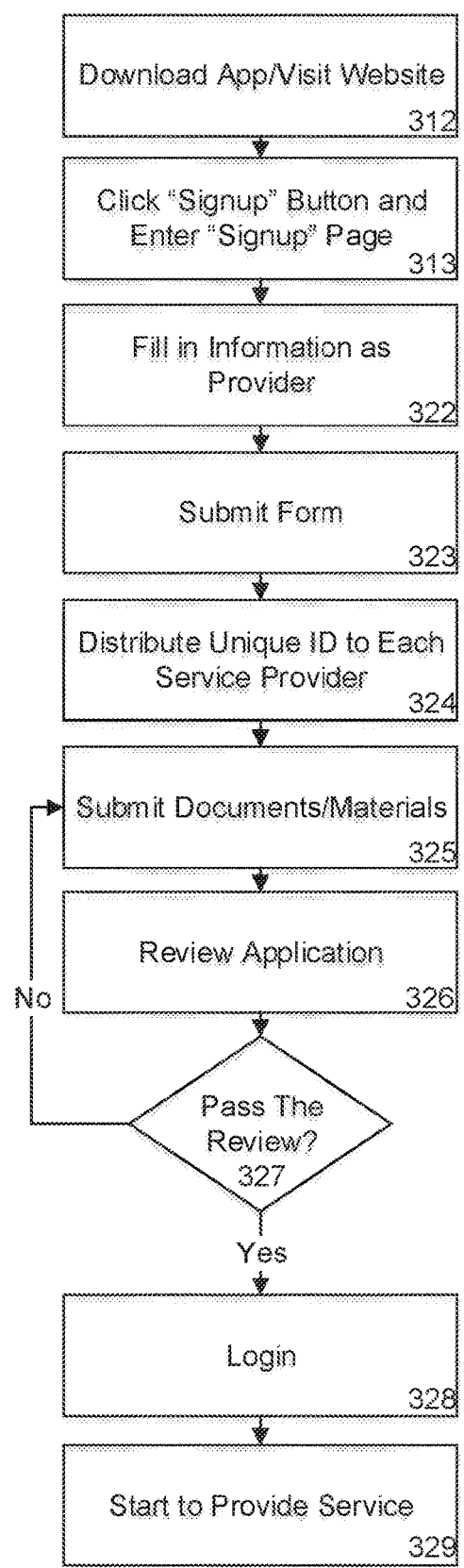
FIG. 3C depicts an exemplary workflow for a service provider's registration.

FIG. 3C depicts an exemplary workflow for a service provider's registration. The process begins with the service provider downloading the app or visiting the website (Step 312). The service provider then clicks the "signup" button and enters the "signup" page (Step 313). The service provider then fills in his or her information (Step 322) and submits the form to the system (Step 323). The system distributes unique IDs to each service provider (Step 324) and requests the service provider to provide information (e.g., documents/materials) for review as part of his or her application (Step 325). The application is then reviewed (Step 326) and decision is rendered as to whether the service provider has passed the document/materials review stage or not (Decision 327). One of the ordinary skills in the art would appreciate it is to be understood that there are numerous types of documents that could be required from service providers depending on different geographic locations and jurisdictions, where service providers would have to submit documents specific to their jurisdiction. If the service provider hasn't passed the review, the process cycles back to providing more information (Step 325). If the service provider has passed the review, he or she can log in into the system (Step 328). The service provider may then start providing service (Step 329).

One of ordinary skill in the art would appreciate that the process described in FIG. 3C is not exclusive, and that the service provider's registration process could include the steps that differ from the steps described therein. In addition, one of ordinary skill in the art would appreciate that the process depicted herein does not require the particular order shown to achieve desirable results.

FIG. 3D depicts exemplary service request tracking records. The process starts by assigning a unique service request ID to each service request. For example, the system may generate a tracking number that includes current year, month, and day according to when the service request was placed followed by a number to identify the order in which the service request was received, which, in the first example, is 201607201.

One of ordinary skill in the art would appreciate that the unique service request ID may be any system of identification that would allow the system to track each service request. Also, one of ordinary skill in the art would appreciate that there could be numerous ways to implement unique service request IDs, and that embodiments of the present invention are contemplated for use with any unique service request IDs.

Further, the system identifies the requested pickup location and the actual pickup location, as these two locations may not necessarily be the same. The actual pickup location may be identified, for instance, based on latitude and longitude coordinates. In the first example the requested pickup location is the Grand Central Terminal at the address 89 E 42nd Street New York, N.Y. 10017, and the actual pickup location is (40.752017, −73.977354). One skilled in the art would appreciate that customer's requested and actual pickup and drop off locations could be identified with the assistance of different means including but not limited to interactions with third party software, such as through application programming interfaces (APIs) (e.g., Google® Maps, Foursquare®) or any other software and/or hardware that is used for location identification purposes.

Next, the system identifies the pickup time including the month, day, and year, followed by the hour and minute of the day, for example, Jul. 20, 2016 at 07:25 am. The system then identifies the requested drop off location and the actual drop off location. For example, the requested drop off location is 136-20 38th Ave. Flushing, N.Y. 11354, and the actual drop off location is (40.761054, −73.829817). The system then identifies the drop off time including the month, day, and year, followed by the hour and minute of the day, for example, Jul. 20, 2016 at 08:01 am. At the following step, the system receives and stores payment information, for example, $33.00. The system may store payment information of all service requests for each individual customer to further provide information about the total amount paid for all services requested by each individual customer along with an average price for each service request. The system then identifies the service request status, which, in the first example, is "Completed." At the final step, the system assigns a timestamp corresponding to the date and time when the record was created, for example, Jul. 20, 2016 at 07:22 am.

In a preferred embodiment, service requests are tracked in a similar way regardless of whether they are transport or delivery requests. The only difference in the service request's tracking information may be in their statuses. For example, a service request may be cancelled as it is in the second example of the service request with ID number 201607202. Its status will be reflected as "Cancelled at 08:05 am." In this case, the system would still assign the ID number to the request and save the requested pickup location, for example Metropolitan Museum of Art at the address 1000 5th Ave New York, N.Y. 10028, requested drop off location, for example Pennsylvania Station at the address 4 Pennsylvania Plaza New York, N.Y. 10001, and pickup time, for example Jul. 20, 2016 at 08:00 am, of the service request, and a timestamp, for example, Jul. 20, 2016 at 07:57 am. However, in case of cancellation, the actual pickup location, actual drop off location, drop off time, and payment information would be missing.

One of ordinary skill in the art would appreciate that the elements of service request tracking records depicted in FIG. 3D could vary depending on the preferences of the system administrator. The present invention can be configured to include other elements of the service request based on the administrator's preferences.

Figure 4A:
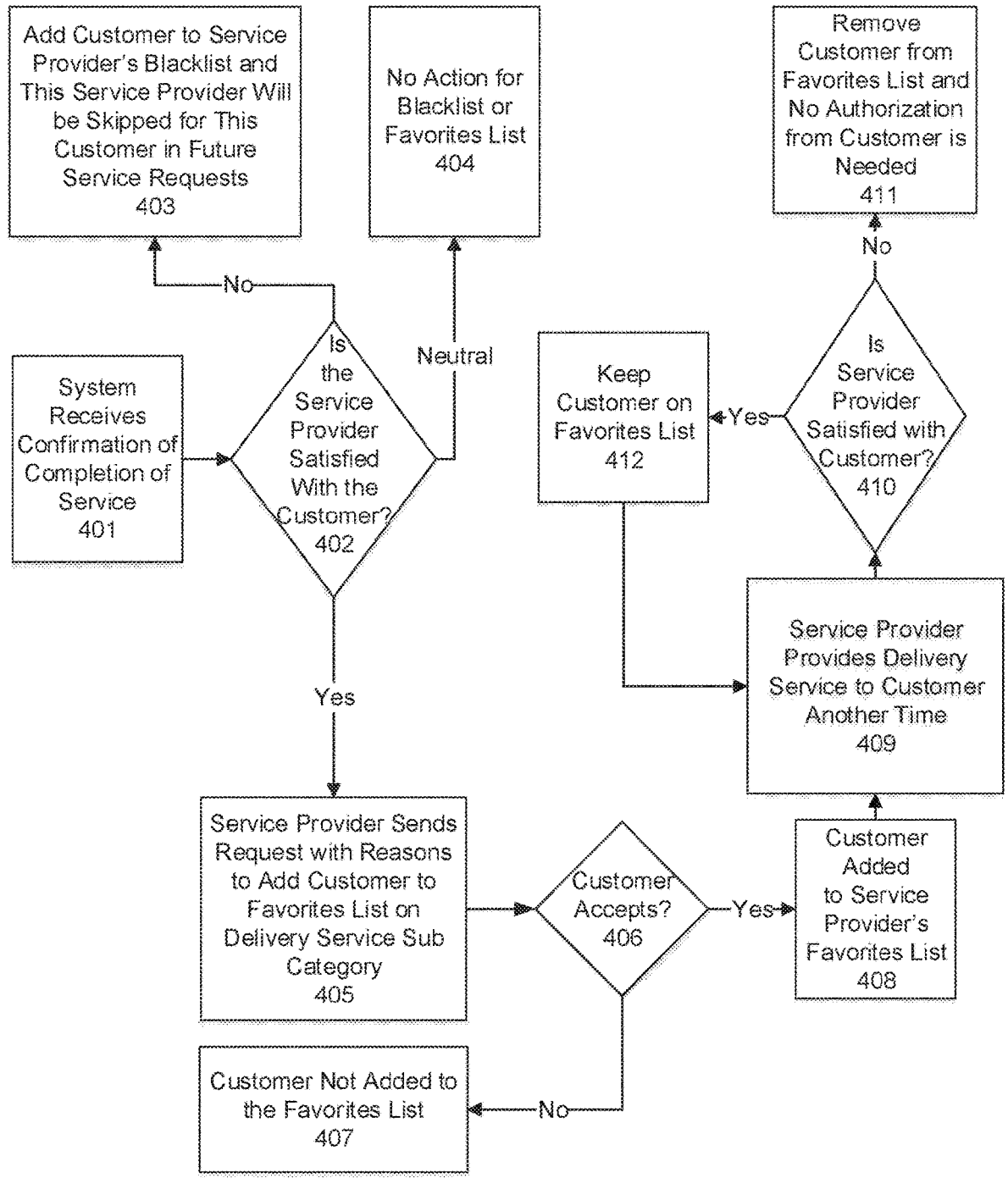
FIG. 4A depicts an exemplary workflow of a service provider's favorites list and blacklist management.

FIG. 4A depicts an exemplary workflow of a service provider's favorites list and blacklist management. For simplicity, FIG. 4A only depicts the workflow of service provider's favorites list and blacklist management for delivery service. One of ordinary skill in the art would appreciate that the same process flow applies to transport service and to both transport and delivery service. When the system receives a confirmation that service has been completed (Step 401), the service provider is queried whether he or she is satisfied with the customer (Decision 402). If the service provider is, for whatever reason, dissatisfied with the customer and never wants to provide service for this customer again, he or she has an option of adding this customer to his or her blacklist and providing reasons why the customer was blacklisted. In this case, this customer-service provider match will be skipped by the system in the assignment of subsequent service requests from this customer, until this service provider chooses to remove this customer from his or her blacklist (Step 403). The customer will be notified that he or she has been added to a blacklist and provided with reasons why, but the system will delay notification for a certain time to reduce possibility of a conflict since the blacklisted customer might be still in the process of making a payment for the requested service. If the service provider has a neutral opinion about the customer, he or she may choose not to add the customer to neither his or her blacklist nor favorites list (Step 404), and the customer and service provider will not be given priority in a best match later, nor will the system skip over the service provider in assignment of subsequent service requests from this customer. If the service provider is satisfied with the customer, the service provider has an option of sending that customer a request to add that customer to his or her favorites list for delivery service subcategory with reasons (Step 405). The customer will receive that request and decide whether or not he or she would like to be added to that service provider's favorites list for that subcategory (Decision 406). If not, then the customer is not added to the favorites list (Step 407). If the customer is likewise satisfied with the service provider, then he or she accepts the request and is added to the favorites list of that service provider for that subcategory (Step 408). This favorites list relationship will be recognized by the system in assignment of subsequent service requests, and this service provider and this customer will be given priority when the system is looking for a best match for a service request in the future. When the service provider carries out a delivery service request another time for the same customer (Step 409), the service provider is once again queried whether he or she is satisfied with the customer (Decision 410). If yes, then that customer stays on that service provider's favorites list for delivery service subcategory (Step 412), and the process repeats, wherein every time the customer rides with the service provider (Step 409), the service provider is asked if he or she is satisfied with the customer (Decision 410). If the service provider becomes dissatisfied with the customer at any point, he or she can remove that customer from his or her favorites list for delivery service subcategory (Step 411). No authorization is needed from that customer for the service provider to remove that customer from his or her favorites list.

The workflow in FIG. 4A depicts the scenario where the service provider wants to add the customer to either his or her favorites list or blacklist. In some cases, however, a service provider may prefer to simply provide feedback about the customer, where feedback may be positive, negative or neutral, rather than adding the customer to either his or her favorites list or a blacklist. When providing feedback, a service provider may choose from a variety of preset feedback options or enter his or her own customized feedback message. This feedback will be stored in the database of the system and may be used for multiple purposes, for example, in selecting a best matching customer for a service provider, in improving quality of service for both customers and service providers or for referral purposes as further disclosed in FIGS. 6C and 6E.

One of ordinary skill in the art would appreciate that favorites lists and blacklists may each be separated based on the type of service e.g., for transport service, delivery service, or for both transport and delivery service. In some cases, the service provider may choose to add a customer to his or her favorites list for transport service only or for delivery service only, whereas in some other cases the service provider may choose to add a customer to his or her favorites list for both transport and delivery service. In certain embodiments, whenever the service provider chooses to add a customer to the blacklist, the system may provide a means for the service provider to provide reasons why he or she is adding that customer to the blacklist. One of ordinary skill in the art would also appreciate that whenever the service provider adds a customer to his or her favorites list, that service provider is automatically added to that customer's favorites list as well. Similarly, whenever the service provider removes a customer from his or her favorites list, that service provider is automatically removed from that customer's favorites list as well.

The same logic applies to adding a customer to the blacklist. The service provider may choose to add a customer to a backlist for transport service only, for delivery service only or for both transport and delivery service. Different interfaces would be used by the service provider to perform the steps of adding a customer to his or her favorites list from that of adding a customer to his or her blacklist. In certain embodiments, whenever adding a customer to a blacklist, the system may provide a means for a service provider to provide reasons why he or she is adding that customer to his or her blacklist.

One of ordinary skill in the art would appreciate that the same workflow would apply if the service providers decide to add a customer to his or her favorites list or blacklist a long time after completion of the service. To do so, a service provider would have to retrieve a customer he or she wants to add to his or her favorites list or blacklist from his or her service request history. Upon retrieval of the customer, the service provider would follow the same steps starting with Step (402) to complete the process. One of ordinary skill in the art would appreciate that any number of customers could be added to or removed from either a favorites list or blacklist at any time upon service provider's discretion. In addition, one of ordinary skill in the art would appreciate that the process depicted herein is not exclusive nor does it require the particular order shown to achieve desirable results.

Figure 4B:
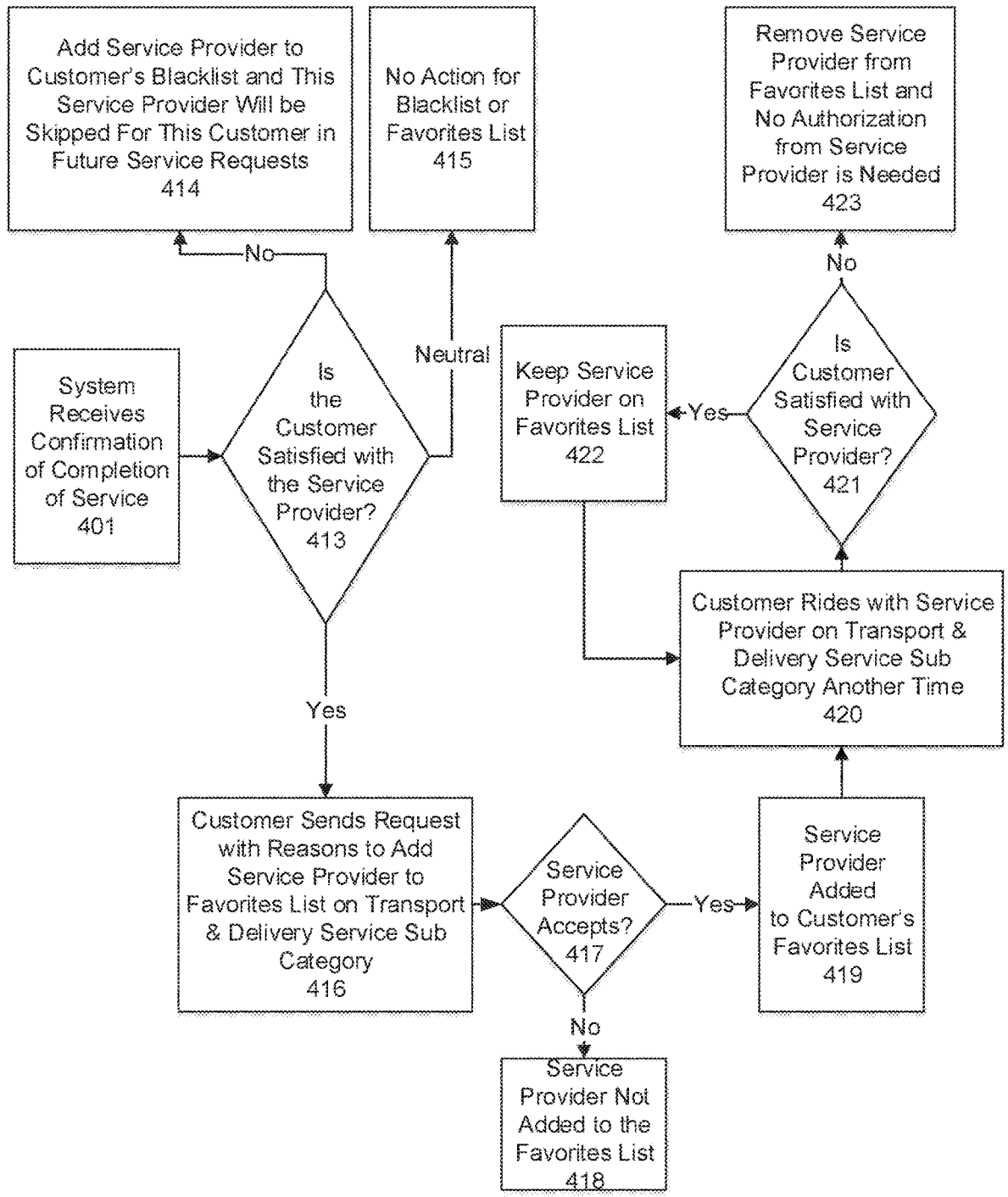
FIG. 4B depicts an exemplary workflow of a customer's favorites list and blacklist management.

FIG. 4B depicts an exemplary workflow of a customer's favorites list and blacklist management. The process for a customer to manage his or her favorites list and blacklist is similar to that of a service provider. One of ordinary skill in the art would appreciate that the same process flow applies to transport service, delivery service, and to both transport and delivery service.

When the system receives a confirmation that service has been completed (Step 401), the customer is queried whether he or she is satisfied with the service provider (Decision 413). If the customer is, for whatever reason, dissatisfied with the service provider and never wants to request a service from this service provider again, he or she has an option of adding this service provider to his or her blacklist with reasons, wherein the system will then skip this customer-service provider match until the customer chooses to remove this service provider from his or her blacklist (Step 414). The service provider will be notified that he or she has been added to a blacklist, but the system may delay notification for a certain time to reduce conflict especially if the blacklisted service provider has not yet left or just left the drop off location. If the customer has a neutral opinion about the service provider, he or she can elect not to add that service provider to neither his or her blacklist nor favorites list (Step 415), and the customer and service provider will not be given priority in a best match later, nor will the system skip over the service provider when the customer is making a service request in the future. The customer may remove the service provider from his or her blacklist at any time. If the customer is satisfied with the service provider, the customer has an option of sending that service provider a request to add that service provider to his or her favorites list in both transport and delivery service subcategory with reasons (Step 416). The service provider will receive that request and decide whether or not he or she would like to be added to that customer's favorites list (Decision 417). If not, then the service provider is not added (Step 418). If the service provider is likewise satisfied with the customer, then he or she accepts the request and is added to the favorites list of that customer (Step 419). This favorites list relationship will be recognized by the system in a later request, and this service provider and this customer will be given priority when the system is looking for a best match for a service request in the future. When the customer completes service in both transport and delivery subcategory another time with that same service provider (Step 420), the customer is once again queried whether he or she is satisfied with that service provider (Decision 421). If yes, then the service provider stays on the customer's favorites list (Step 422), and the process repeats, wherein every time the service provider provides service to that customer (Step 420), the customer is asked if he or she is satisfied with that service provider (Decision 421). If the customer becomes dissatisfied with the service provider at any point, he or she can remove that service provider from his or her favorites list. No authorization is needed from the service provider for the customer to remove him or her from the favorites list (Step 423).

The workflow in FIG. 4B depicts the scenario where a customer wants to add a service provider to either his or her favorites list or blacklist. In some cases, however, a customer may prefer to simply provide feedback about the service provider, where feedback may be positive, negative or neutral, rather than adding the service provider to either his or her favorites list or a blacklist. When providing feedback, a customer may choose from a variety of preset feedback options or enter his or her own customized feedback message. As previously disclosed, this feedback will be stored in the database of the system and may be used for multiple purposes, for example, in selecting a best matching service provider for a customer, in improving quality of service for both customers and service providers or for referral purposes as further disclosed in FIGS. 6B and 6D.

One of ordinary skill in the art would appreciate that favorites lists and blacklists may each be separated based on the type of service e.g., for transport service, delivery service, or for both transport and delivery service. In some cases, a customer may choose to add a service provider to his or her favorites list for transport service only or for delivery service only, whereas in some other cases a customer may choose to add a service provider to his or her favorites list for both transport and delivery service. In certain embodiments, whenever a customer chooses to add a service provider to the blacklist, the system may provide a means for the customer to provide reasons why he or she is adding that service provider to his or her blacklist. One of ordinary skill in the art would also appreciate that whenever a customer adds a service provider to his or her favorites list, that customer is automatically added to that service provider's favorites list as well. Similarly, whenever the customer removes a service provider from his or her favorites list, that customer is automatically removed from that service provider's favorites list as well.

The same logic applies to adding a service provider to the blacklist. A customer may choose to add a service provider to his or her backlist for transport service only, for delivery service only or for both transport and delivery service. Different interfaces would be used by the customer to perform the steps of adding the service provider to his or her favorites list from that of adding a service provider to his or her blacklist. Whenever adding a service provider to the blacklist, the customer needs to provide reasons why he or she is adding the service provider to his or her blacklist. The process doesn't have to happen immediately upon completion of the service request.

One of ordinary skill in the art would appreciate that the same workflow would apply if a customer decides to add a service provider to his or her favorites list or blacklist a long time after completion of the service. In order to do so, the customer would have to go to his or her service request history to retrieve a service provider that he or she had completed service requests with in the past and would like to add to either his or her favorites list or blacklist. Upon retrieval of that service provider, the customer would have to follow the same steps starting with Step (413) to complete the process. One of ordinary skill in the art would appreciate that any number of service providers could be added to or removed from either a favorites list or blacklist at any time upon customer's discretion. In addition, one of ordinary skill in the art would appreciate that the process depicted herein is not exclusive nor does it require the particular order shown to achieve desirable results.

Figure 5:
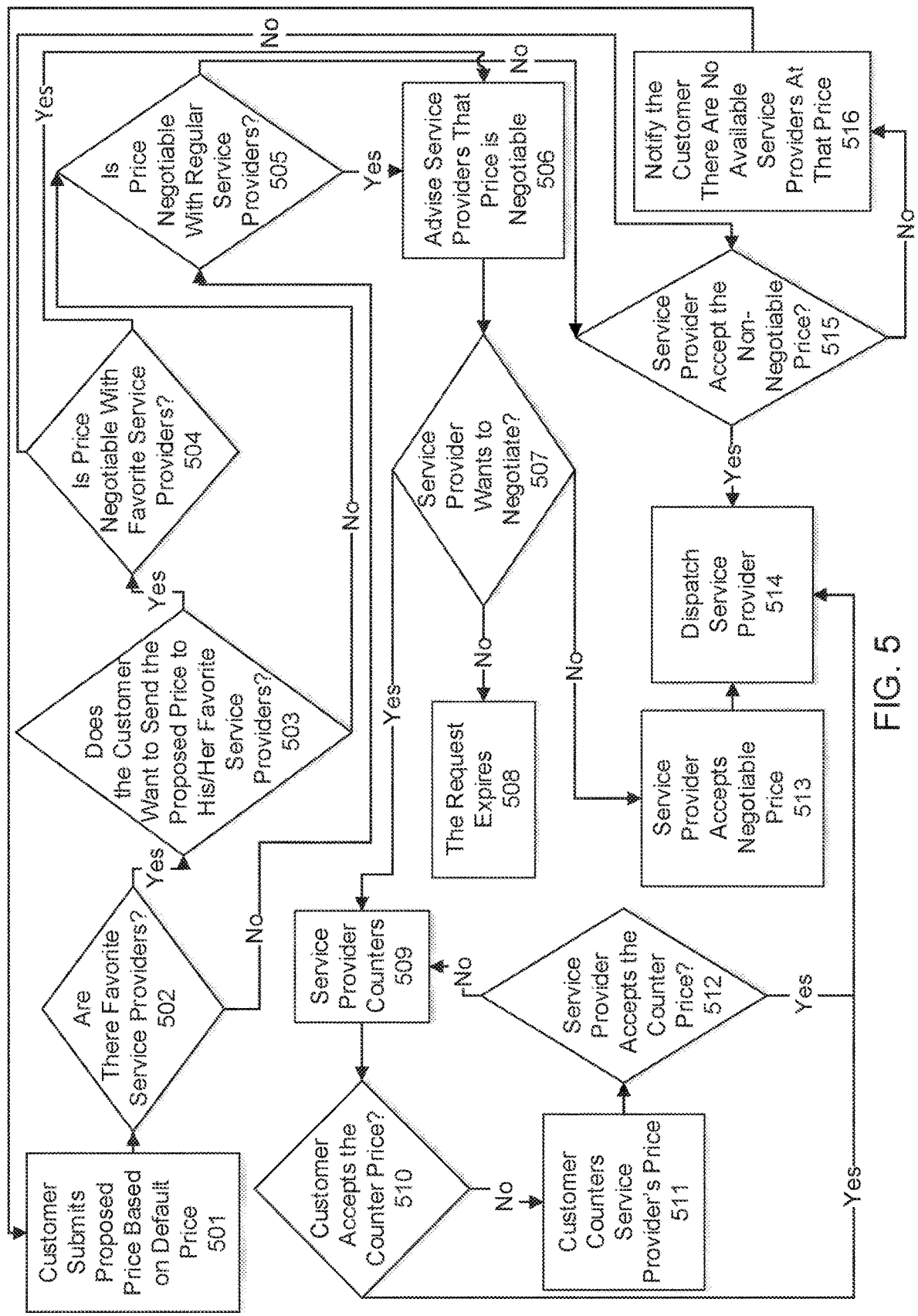
FIG. 5 depicts an exemplary workflow of a price negotiation between a service provider and a customer.

FIG. 5 depicts an exemplary workflow of a price negotiation between a service provider and a customer. In this exemplary embodiment of the present invention, a customer may submit his or her proposed price for a service request to the system (Step 501). The customer's proposed price may be based on the default price and one or more processors may determine when the proposed price is higher or lower than or equal to the default price. One of ordinary skill in the art would appreciate that regardless of the type of service, the price negotiation process between a service provider and a customer remains same, except that there may be a difference in a default price for both transport and delivery service. In a case of a customer requesting a combination of services, the price charged to the customer may be derived from the default price for transport service and delivery service.

For simplicity, this figure only depicts the scenario of the customer proposing a price for transport service. The system will query the customer regarding who the customer would like to send the proposed price to, depending on whether the customer has or does not have any favorite service providers (or any favorite service providers available) (Decision 502). If there are favorite service providers available, the customer can decide whether he or she wants to send the price proposal to one or more of those available favorite service providers (Decision 503). If the customer wants to send out the price proposal to any of those favorite service providers, he or she decides whether his or her proposed price will be negotiable or non-negotiable with the favorite service providers (Decision 504). If there are no favorite service providers or no favorite service providers available or if the customer does not want to send out his or her proposed price to any of the favorite service providers, then the customer will decide whether his or her proposed price will be negotiable or non-negotiable with any regular service provider (Decision 505). The process is the same regardless of whether the service provider is a favorite service provider or a regular service provider once it has been established whether the customer will be negotiating or not negotiating with one or more service providers.

In case of the customer setting a price which he or she determines to be negotiable, then service providers will be advised of that (Step 506). Then it is the service provider's decision whether to negotiate (Decision 507). The service provider has three options on a negotiable price proposal. If the service provider does not want to take the service request at all, he or she declines both negotiation and the request, and the request expires (Step 508). If the service provider doesn't want to negotiate but still wants to provide the service request, he or she accepts the original negotiable price as is (Step 513) and is then dispatched (Step 514). The third option available to the service provider is to negotiate the price. The service provider makes a counter (Step 509), which is sent to the customer. Then the customer may choose whether he or she accepts the counter (Decision 510). If the customer accepts the counter, the service provider is dispatched by the system (Step 514). If the customer does not accept the counter, then the customer counters the counter (Step 511), and the negotiation cycles back to the service provider. Then the service provider is presented with a decision of whether to accept the counter price (Decision 512). If the service provider accepts the counter price, then the service provider is dispatched (Step 514). If the service provider does not accept the counter, he or she counters that counter (Step 509). The process repeats until the service provider and the customer both agree on the price, whereupon the service provider is dispatched (Step 514).

In the case of the customer setting a price which he or she determines to be non-negotiable, the request is routed to the customer's favorite service providers (or any other service providers if the customer does not have available service providers on his or her favorites list), who either accept or don't accept the non-negotiable price (Decision 515). If the service provider accepts the non-negotiable price, then he or she is dispatched (Step 514). If the service provider does not accept the request, then the customer is notified that the service request has not been accepted at the price he or she proposed (Step 516). The customer may then, upon notification, revise the original service request and resubmit a new price proposal (Step 501). Two lines missing.

FIG. 5 may connect with FIG. 7L regarding the customer choosing which service provider he or she would like to send a service request to.

One of ordinary skill in the art would appreciate that FIG. 5 only depicts one of the possible scenarios for price negotiation between a service provider and a customer. Depending on different situations, the system could receive an initial price proposal from either a service provider or a customer. Accordingly, the initial price proposal could be countered by both a customer and a service provider. In addition, one of ordinary skill in the art would appreciate that the process depicted herein is not exclusive nor does it require the particular order shown to achieve desirable results.

Figure 6A:
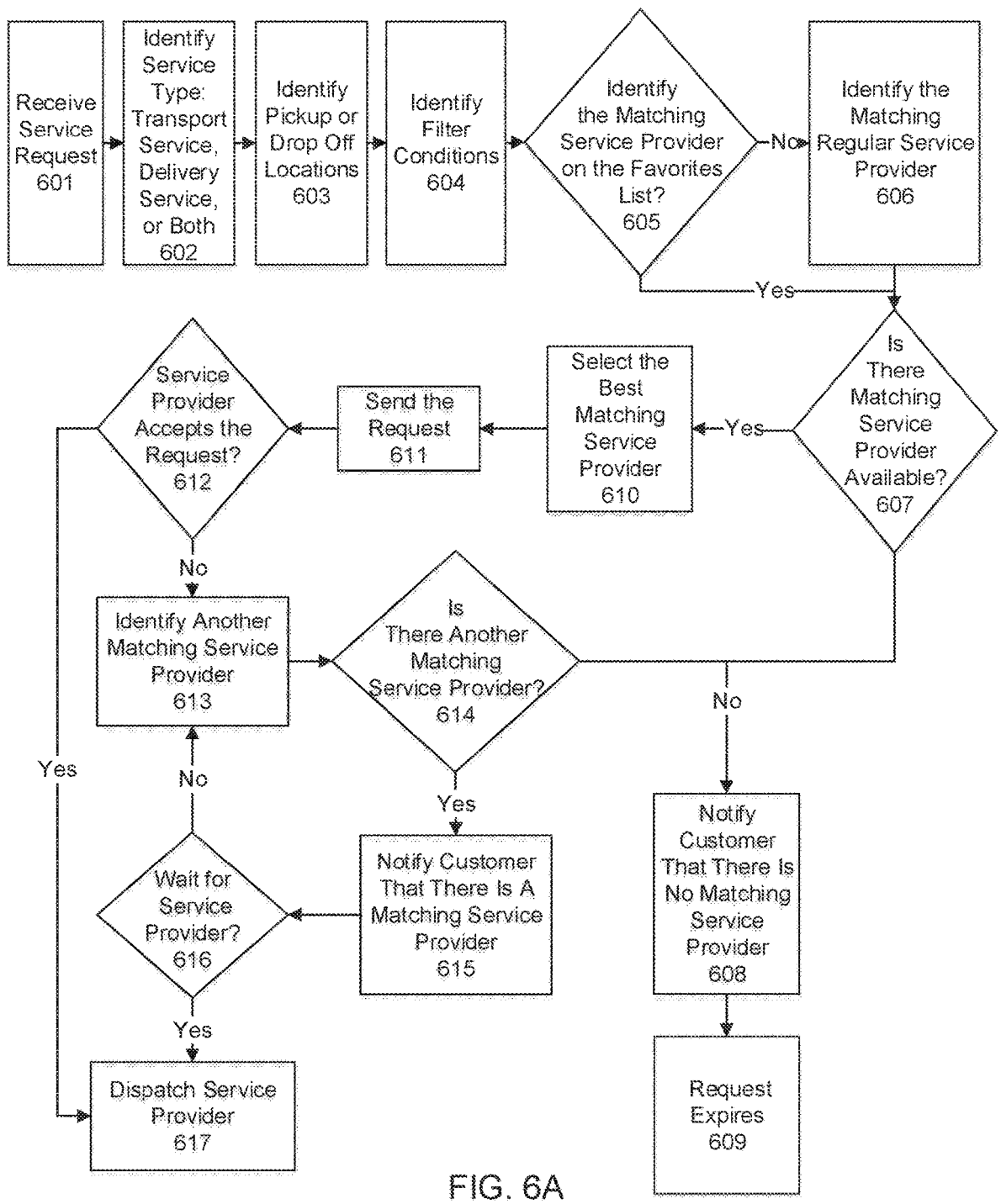
FIG. 6A depicts an exemplary workflow of a customer selecting and the system dispatching a best matching service provider.

FIG. 6A depicts an exemplary workflow of a customer selecting and the system dispatching a best matching service provider. When the system receives a service request (Step 601), the system identifies the type of the service request (Step 602) which may be transport service, delivery service or both transport and delivery service. The system identifies pickup or drop off locations for the customer or for goods to be delivered as indicated in the customer's service request (Step 603). Next, the system identifies filter conditions (Step 604), and whether there are matching service providers on the customer's favorites list (Decision 605). If there are no matching service providers on the customer's favorites list, the system identifies the matching regular service provider (Step 606). Then the system identifies whether this regular matching regular service provider is available (Decision 607). If there is a matching service provider on the customer's favorites list, the system identifies whether this matching favorite service provider is available (Decision 607). Then, once the matching available service provider is identified, the customer selects the best matching service provider (Step 610). If there are no matching service providers available, the customer is notified of that (Step 608), and the request expires (Step 609). If there is a matching service provider available, then the system will send the request to that service provider (Step 611). The matching service provider receives the request and is given the option to accept or not to accept the request (Decision 612). If the service provider accepts the request, he or she is dispatched to carry out the service request (Step 617). If the service provider declines the request, the system identifies another best matching service provider (Step 613). The system then determines if another matching service provider is available (Decision 614). If there is no matching service provider available to carry out the request, then the customer is notified of that (Step 608) and the request expires (Step 609). If the best matching service provider is available, the system notifies the customer of that (Step 615). Then the system queries the customer whether he or she is willing to wait for that service provider (Decision 616). If the customer is not willing to wait, the process cycles back to identifying another matching service provider (Step 6E) until a service provider is dispatched. If the customer is willing to wait, then the system dispatches the service provider when that service provider becomes available (Step 617).

It is to be understood by the one skilled in the art that the process described in FIG. 6A is not exclusive, and that the way the system assists a customer in selecting a best matching service provider could differ in the steps from the steps described herein. In addition, one of ordinary skill in the art would appreciate that the process depicted herein does not require the particular order shown to achieve desirable results.

Figure 6B:
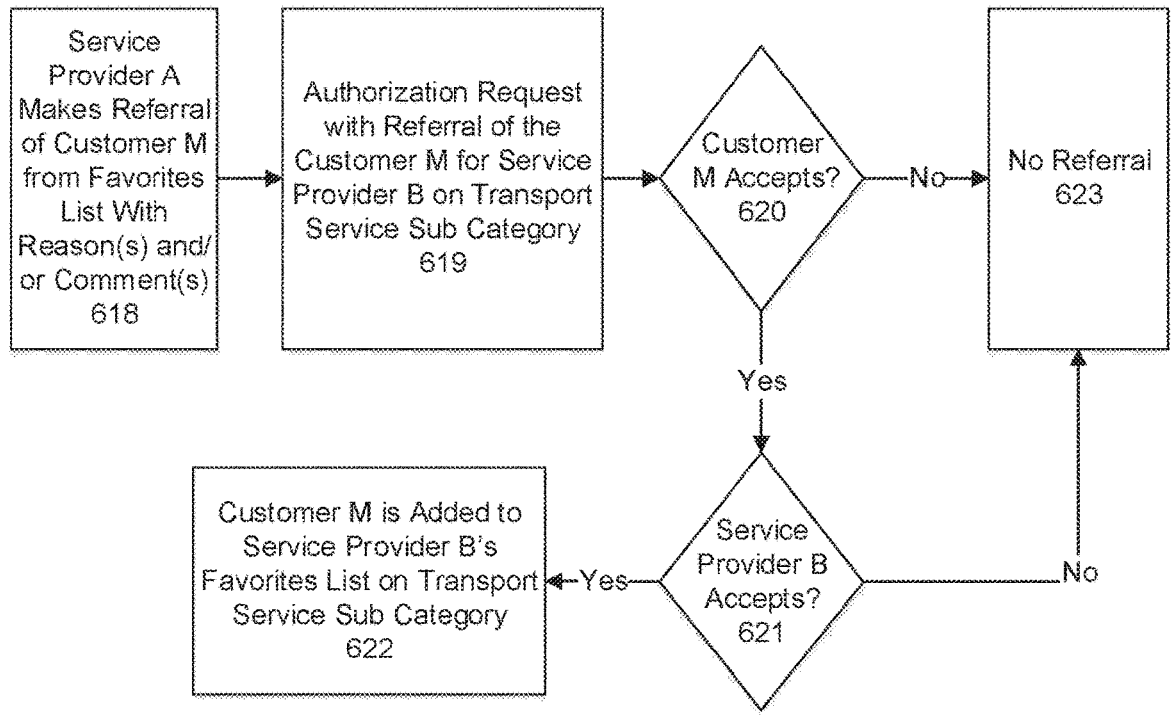
FIG. 6B depicts an exemplary workflow of a service provider referring a favorite customer.

FIG. 6B depicts an exemplary workflow of a service provider referring a favorite customer. If Service Provider A wants to make a referral from his or her favorites list of Customer M (Step 618), the referral may include information about the referred customer, such as customer's profile and reasons for the referral. The service provider sends an authorization request with the referral of the customer to Service Provider B in the transport service subcategory (Step 619). Such authorization request also needs to be accepted by Customer M, so the authorization request identifies to Customer M who is making the referral and to whom the referral is being made. Then Customer M has the choice of accepting being referred or not accepting being referred (Decision 620). If Customer M does not accept the referral request, then there is no referral (Step 623). If Customer M accepts, then the system notifies Service Provider B that he or she has a referral pending his or her approval, and he or she now has the option of accepting it or turning it down based on the reasons and/or comments provided by Service Provider A (Decision 621). If Service Provider B turns the referral down, there is no referral (Step 623). If Service Provider B accepts the referral that was accepted by Customer M, Customer M is added to Service Provider B's favorites list in the transport service subcategory (Step 622).

One of ordinary skill in the art would appreciate that a service provider may refer individual customers, groups of customers or entire favorites lists to one or several other service providers, and that the workflow would be the same as depicted in FIG. 6B. At the same time, a service provider may accept a referral of individual customers, partial or entire groups of customers or entire favorites lists without any limitations.

Additionally, one of ordinary skill in the art would appreciate that the workflow depicted in FIG. 6B also applies to delivery service and both transport and delivery service. For a favorites list referral, a service provider may refer a customer to another service provider, wherein such referred customer may be on his or her favorites lists for transport service or delivery service or the favorites list for both transport and delivery service. Favorites list referrals require an approval of the customer who is being referred and an approval of the service provider who that customer is being referred to. In case that the second service provider, Service Provider B, wants to add a referred customer, Customer M, to his or her favorites list for another subcategory, for instance delivery service, Service Provider B needs to send an authorization request to Customer M to be added to his or her favorites list not only for transport service subcategory but for delivery service subcategory as well. One of ordinary skill in the art would appreciate that the process depicted herein is not exclusive nor does it require the particular order shown to achieve desirable results.

Figure 6C:
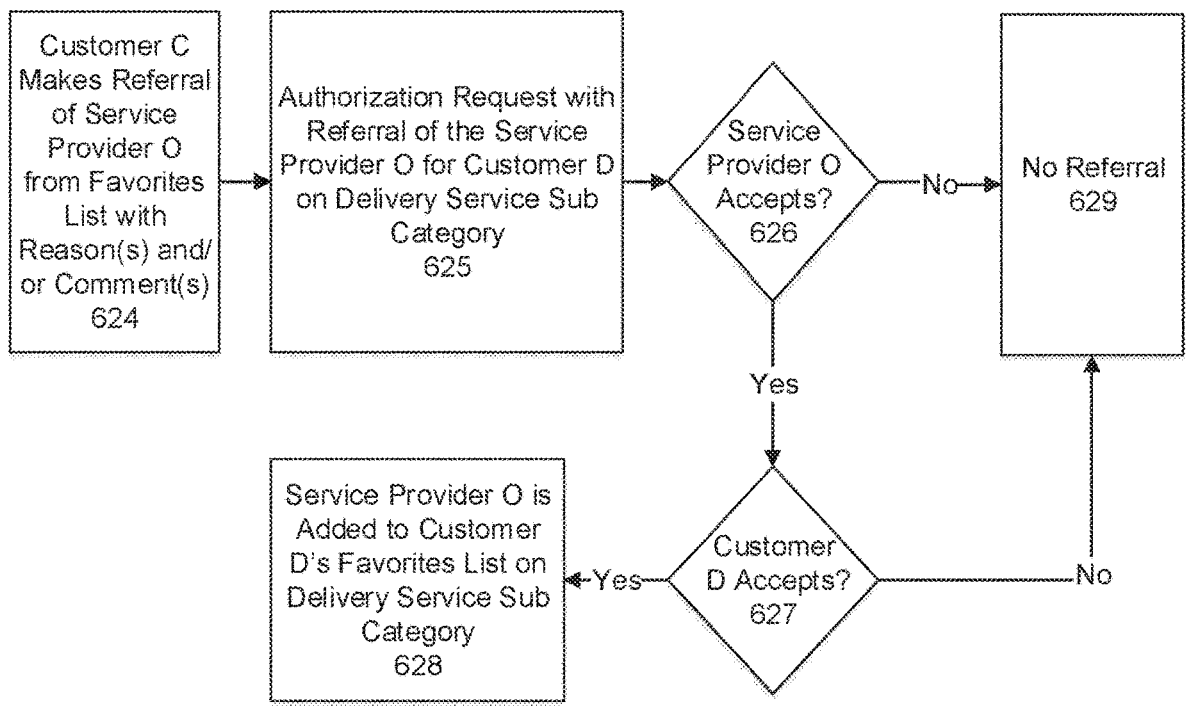
FIG. 6C depicts an exemplary workflow of a customer referring a favorite service provider.

FIG. 6C depicts an exemplary workflow of a customer referring a favorite service provider. If there is a service provider on Customer C's favorites list, Customer C then can make a referral of Service Provider O to other customer D (Step 624). The referral may include information about the referred service provider, such as service provider's profile and reasons for the referral. The authorization request with the referral request of the service provider is sent from Customer C to Customer D in the delivery service subcategory (Step 625). But such referral needs first to be accepted by the service provider, Service Provider O, before Customer D can accept it, Service Provider O then has the choice of accepting being referred or not accepting being referred (Decision 626). If Service Provider O does not accept, then there is no referral (Step 629). If Service Provider O accepts, the system notifies Customer D that he or she has a referral pending approval, and he or she now has the option of accepting it or turning it down based on reasons for the referral and/or comments (Decision 627). If Customer D turns the referral down, there is no referral (Step 629). If he or she accepts the referral that was accepted by the Service Provider O, that service provider is added to Customer D's favorites list in the delivery service subcategory (Step 628).

One of ordinary skill in the art would appreciate that a customer may refer individual service providers, groups of service providers or entire favorites lists to one or several other customers and the process flow would be the same as depicted in FIG. 6C. At the same time, the customers whom may accept referrals of individual service providers, partial or entire groups of service providers or entire favorites lists without any limitations.

Additionally, one of ordinary skill in the art would appreciate that the workflow depicted in FIG. 6C also applies to transport service and both transport and delivery service. For favorites list referral, a customer may refer a service provider to another customer, wherein such referred service provider may be on his or her favorites lists for transport service or delivery service or the favorites list for both transport and delivery service. In exemplary embodiments, a favorites list referral requires an approval of the service provider who is being referred and an approval of the customer whom the service provider is being referred to. In case that the second customer, Customer wants to add a referred service provider, Service Provider O, to his or her favorites list for another subcategory, for instance transport service, Customer D needs to send an authorization request to Service Provider O to be added to his or her favorites list not only for delivery service subcategory but for transport service subcategory as well. One of ordinary skill in the art would appreciate that the process depicted herein is not exclusive nor does it require the particular order shown to achieve desirable results.

Figure 6D:
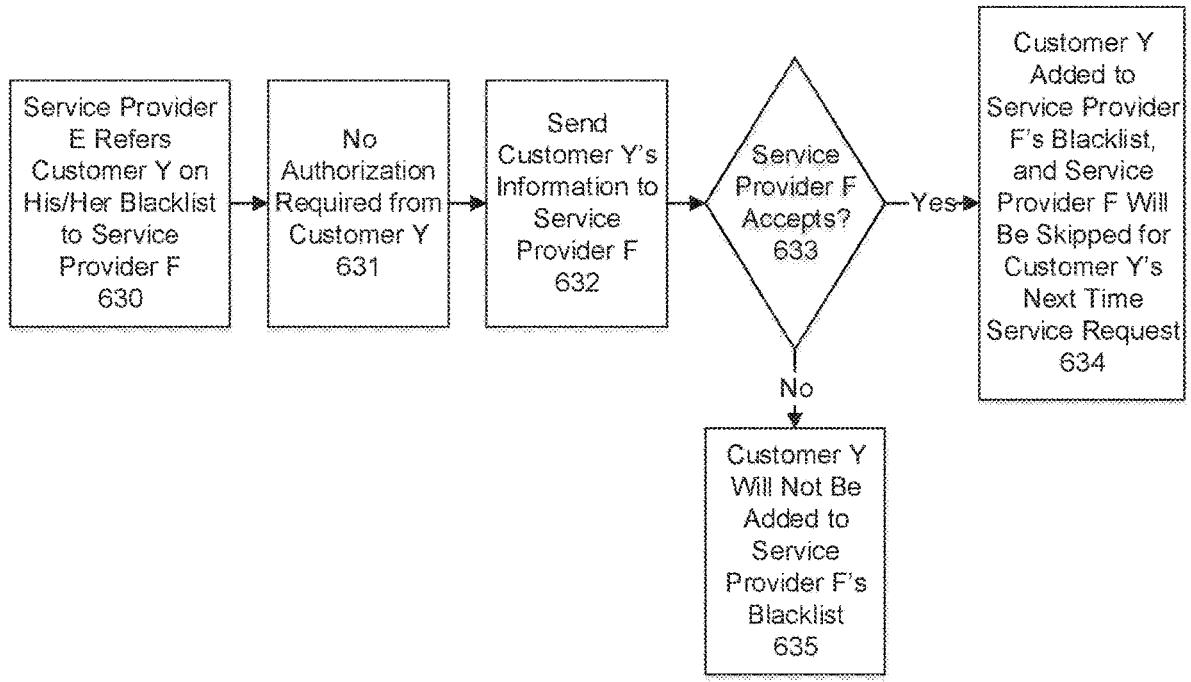
FIG. 6D depicts an exemplary workflow of a service provider referring a blacklisted customer.

FIG. 6D depicts an exemplary workflow of a service provider referring a blacklisted customer. Like favorite customers, blacklisted customers can also be referred to another service provider. For example, if Service Provider E has a customer, Customer Y, on his or her blacklist whom he or she wants to refer to Service Provider F, he or she indicates that he or she would like to make a referral (Step 630). The referral may include information about the referred customer, such as the service customer's profile and reasons for the referral. Unlike favorites list referrals, this workflow requires no authorization from the customer who is on Service Provider E's blacklist (Step 631). Customer Y's information is sent to Service Provider F, who receives the information (Step 632) and decides whether to accept the referral (Decision 633). If Service Provider F accepts the referral, Service Provider E's blacklisted customer, Customer Y, is added to the blacklist of Service Provider F, and this service provider will be skipped for the Customer Y's request next time (Step 634). If the service provider decides not to add the customer, then Service Provider E's blacklisted customer is not added to his or her blacklist (Step 635).

One of ordinary skill in the art would appreciate that a service provider may refer individual customers, groups of customers or entire blacklists to one or several other service providers, and that the workflow would be the same as depicted in FIG. 6D. At the same time, a service provider may accept a referral of individual customers, entire or partial groups of customers or entire blacklists without any limitations.

Additionally, one of ordinary skill in the art would appreciate that the same workflow depicted in FIG. 6D also applies to any type of service, whether transport service, delivery service or both transport and delivery service. For a blacklist referral, a service provider may refer a customer to another service provider regardless of the service subcategory, wherein such referred customer is on his or her blacklist for transport service or delivery service or the blacklist for both service subcategories. A blacklist referral requires no approval or authorization of the customer who is being referred. However, the service provider who the customer is being referred to may choose whether to accept the referral for only one subcategory of service, such as only transport service or only delivery service, or to add the referred customer to his or her blacklist for both subcategories. One of ordinary skill in the art would appreciate that the process depicted herein is not exclusive nor does it require the particular order shown to achieve desirable results.

Figure 6E:
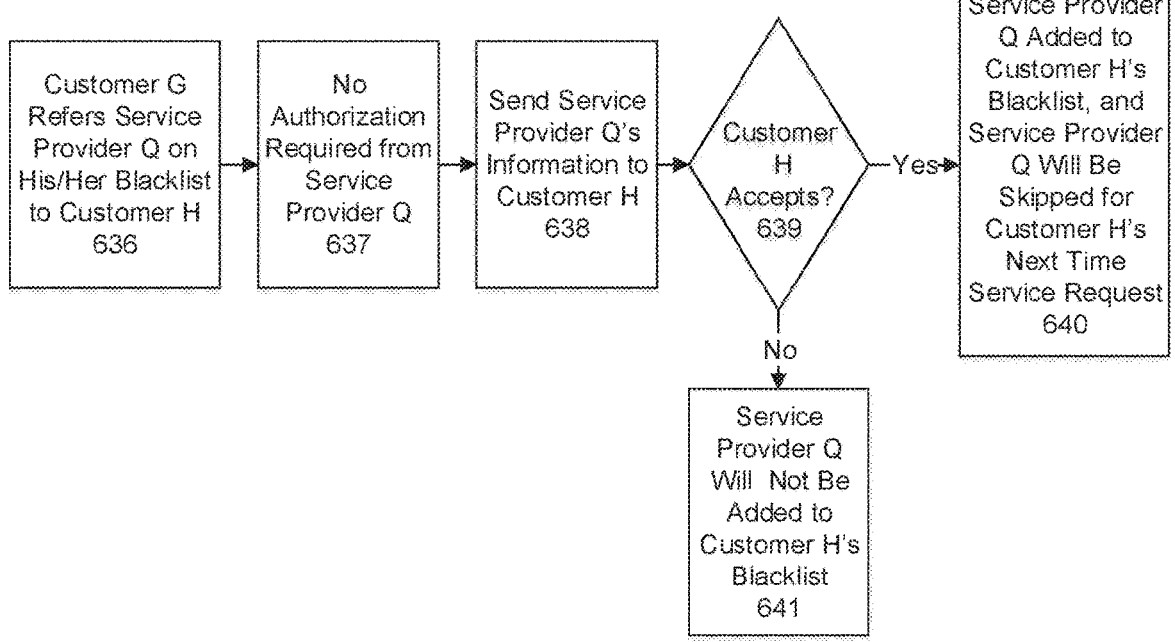
FIG. 6E depicts an exemplary workflow of a customer referring a blacklisted service provider.

FIG. 6E depicts an exemplary workflow of a customer referring a blacklisted service provider. Like favorite service providers, blacklisted service providers can also be referred to another customer. The referral may include information about the referred service provider, such as service provider's profile and reasons why the service provider was blacklisted. For example, Customer G has Service Provider Q on his or her blacklist and he or she wants to refer Service Provider Q to Customer H. (Step 636). Such referral may be initiated by the request of Customer G and accepted by Customer H or initiated by Customer H and accepted by Customer G. Unlike favorites list referrals, this workflow requires no authorization from Service Provider Q, who is on Customer G's blacklist (Step 637). The service provider's information is sent to Customer H, who receives the information about Service Provider Q (Step 638) and decides whether to accept the referral (Decision 639). If accepted, Service Provider Q is added to the Customer H's blacklist, and this service provider will be skipped for this customer's request next time (Step 640) If not, then Service Provider Q is not added to the blacklist (Step 641).

One of ordinary skill in the art would appreciate that a customer may refer individual service providers, groups of service providers or entire blacklists to one or several other customers, and that the workflow would be the same as depicted in FIG. 6E. At the same time, a customer may accept a referral of individual service providers, entire or partial groups of service providers or entire blacklists without any limitations.

Additionally, one of ordinary skill in the art would appreciate that the same workflow depicted in FIG. 6E also applies to any type of service, whether transport service, delivery service or both transport and delivery service. For a blacklist referral, a customer may refer a service provider to another customer regardless of the type of service, wherein such referred service provider may be on a blacklist for transport service or delivery service or the blacklist for both transport and delivery service. A blacklist referral requires no approval of the service provider who is being referred. However, the customer whom the service provider is being referred to may choose whether to accept the referral for only one subcategory of service, such as transport service or delivery service, or to add the referred service provider to the blacklists for both subcategories. One of ordinary skill in the art would appreciate that the process depicted herein is not exclusive nor does it require the particular order shown to achieve desirable results.

Figure 7A:
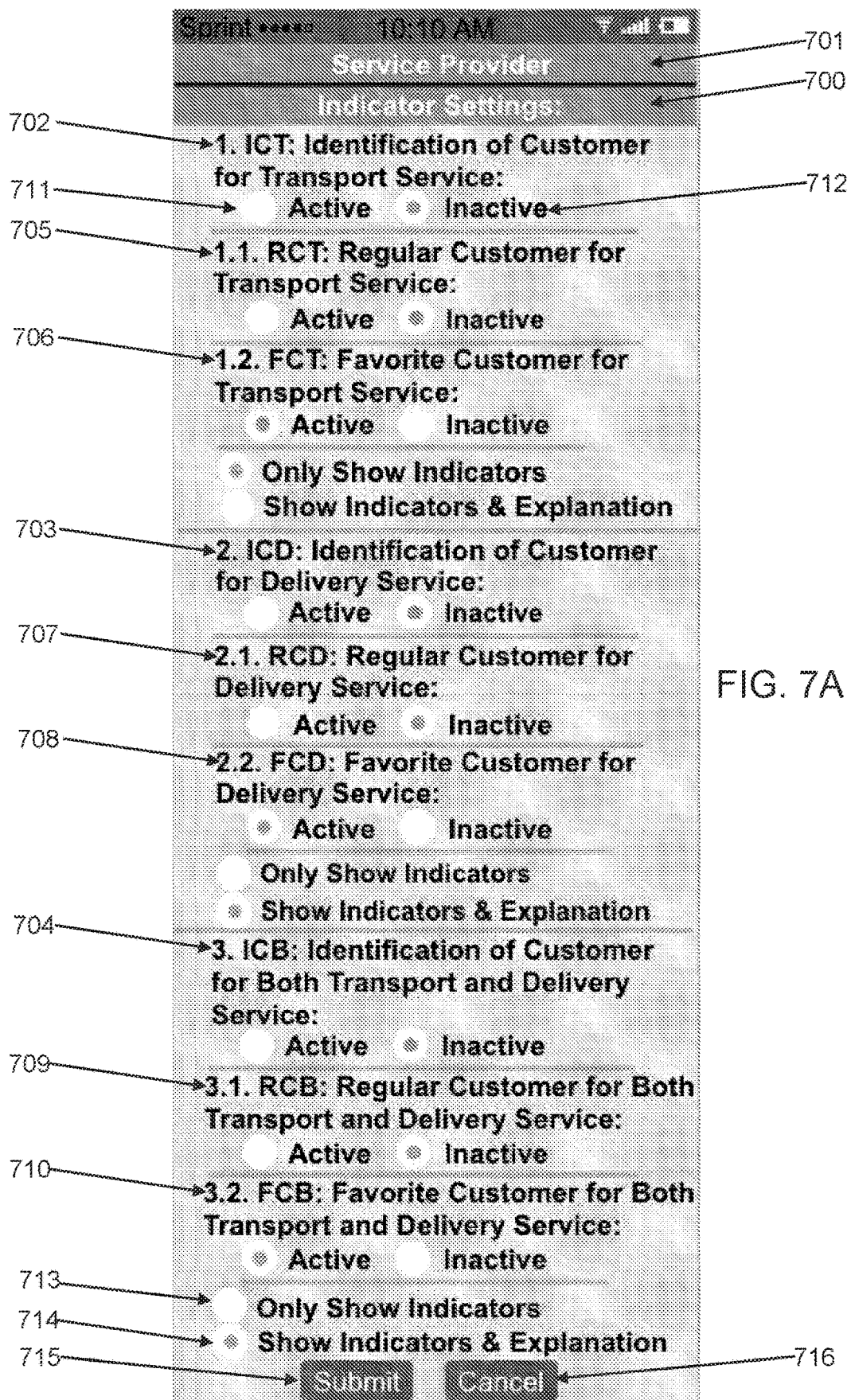
FIG. 7A depicts exemplary indicator settings for a service provider to view a customer's identification information.

FIG. 7A depicts exemplary indicator settings (700) for a service provider (701) to view a customer's identification information. The customers are categorized based on whether they are "regular" customers or "favorite" customers. Further, they are subcategorized based on three types of service: a customer for transport service "ICT" (702), a customer for delivery service "ICD" (703), or a customer for both transport and delivery service "ICB" (704). The customers are then assigned indicators based on whether a customer is a "regular" customer for transport service "RCT" (705) or a "favorite" customer for transport service "ICT" (706); a "regular" customer for delivery service "RCD" (707) or "favorite" customer for delivery service "FCD" (708); or a "regular" customer for both transport and delivery service "RCB" (709) or "favorite" customer for both transport and delivery service "FCB" (710).

The service providers may choose which customers' indicators they want to see by making them active (711) or inactive (712). For example, by making the "ICT" set of indicators (702) inactive (712), the service providers won't see information of any customers in the transport service subcategory. Additionally, the service providers have an option of only showing the indicators (713) or showing the indicators and explanation (714). After identifying the indicator settings (700), the service providers either submit (715) or cancel (716) their selections.

One of ordinary skill in the art would appreciate that the process of indicator settings is bi-directional, and a customer may first preset the indicators he or she allows service providers to see. At the same time, a service provider may preset in the indicator settings (700) what information he or she wants to see about customers.

Figure 7B:
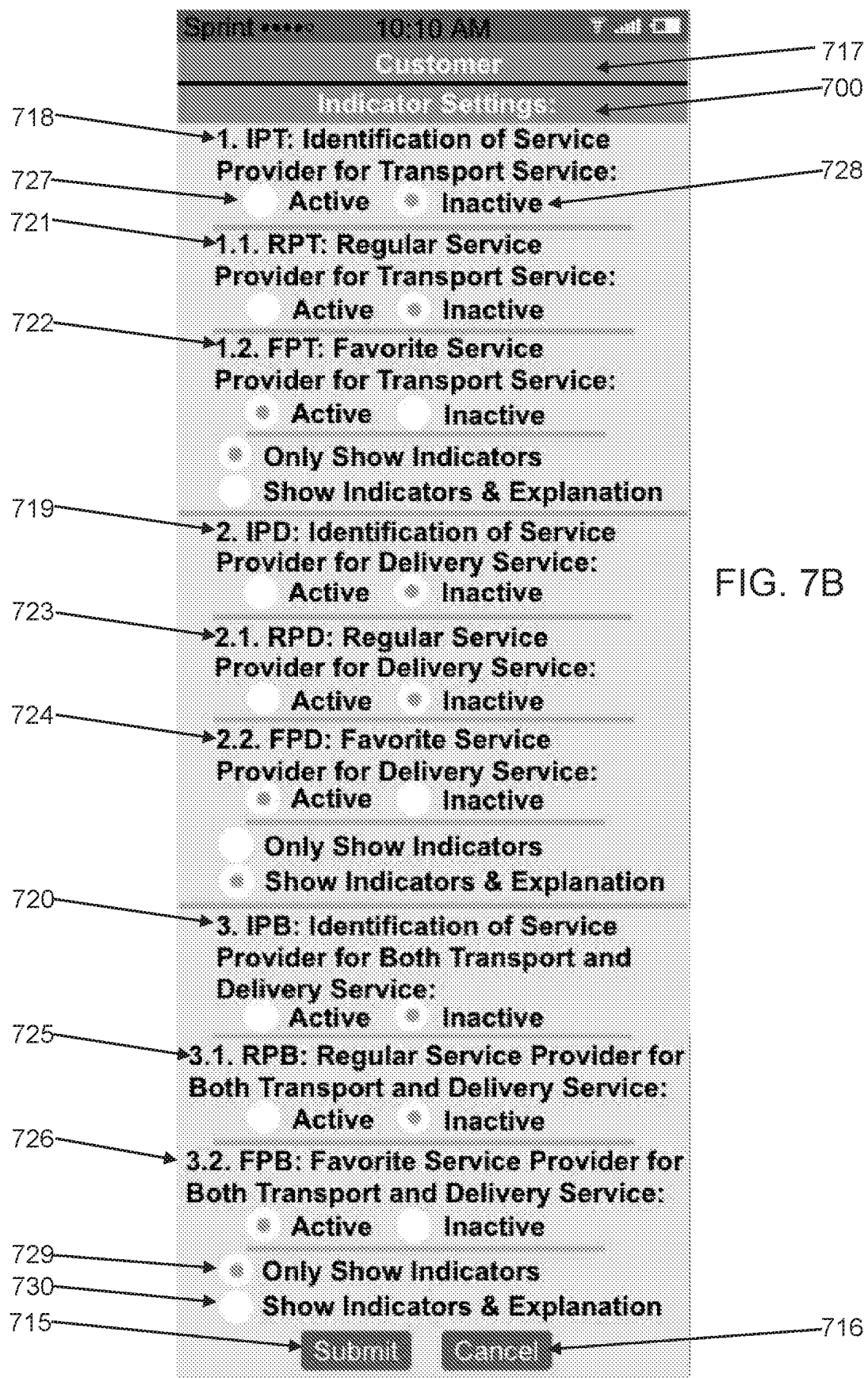
FIG. 7B depicts exemplary indicator settings for a customer to view a service provider's identification information.

FIG. 7B depicts exemplary indicator settings (700) for a customer (717) to view a service provider's identification information. The service providers are categorized based on whether they are "regular" service providers or "favorite" service providers. Further, they are subcategorized based on three types of service: a service provider for transport service "IPT" (718), a service provider for delivery service "IPD" (719), or a service provider for both transport and delivery service "IPB" (720). The service providers are then assigned indicators based on whether a service provider is a "regular" service provider for transport service "RPT" (721) or a "favorite" service provider for transport service "FPT" (722); a "regular" service provider for delivery service "RPD" (723) or a "favorite" service provider for delivery service "FPD" (724); or a "regular" service provider of both transport and delivery service "RPB" (725) or a "favorite" service provider of both transport and delivery service "FPB" (726).

The customers may choose which service providers' indicators they want to see by making them active (727) or inactive (728). For example, by making the "IPT" set of indicators (718) inactive (728), customers won't see information of any service providers in transport service subcategory. Additionally, the customers have an option of only showing the indicator (729), or showing the indicators and explanation (730). After identifying the indicator settings (700), the customers either submit (715) or cancel (716) their selections.

One of ordinary skill in the art would appreciate that the process of indicator settings is bi-directional, and the service providers may first pre-set the indicators they allow customers to see. At the same time, the customers may preset in the indicator settings (700) what information they want to see about service providers.

Figure 7C:
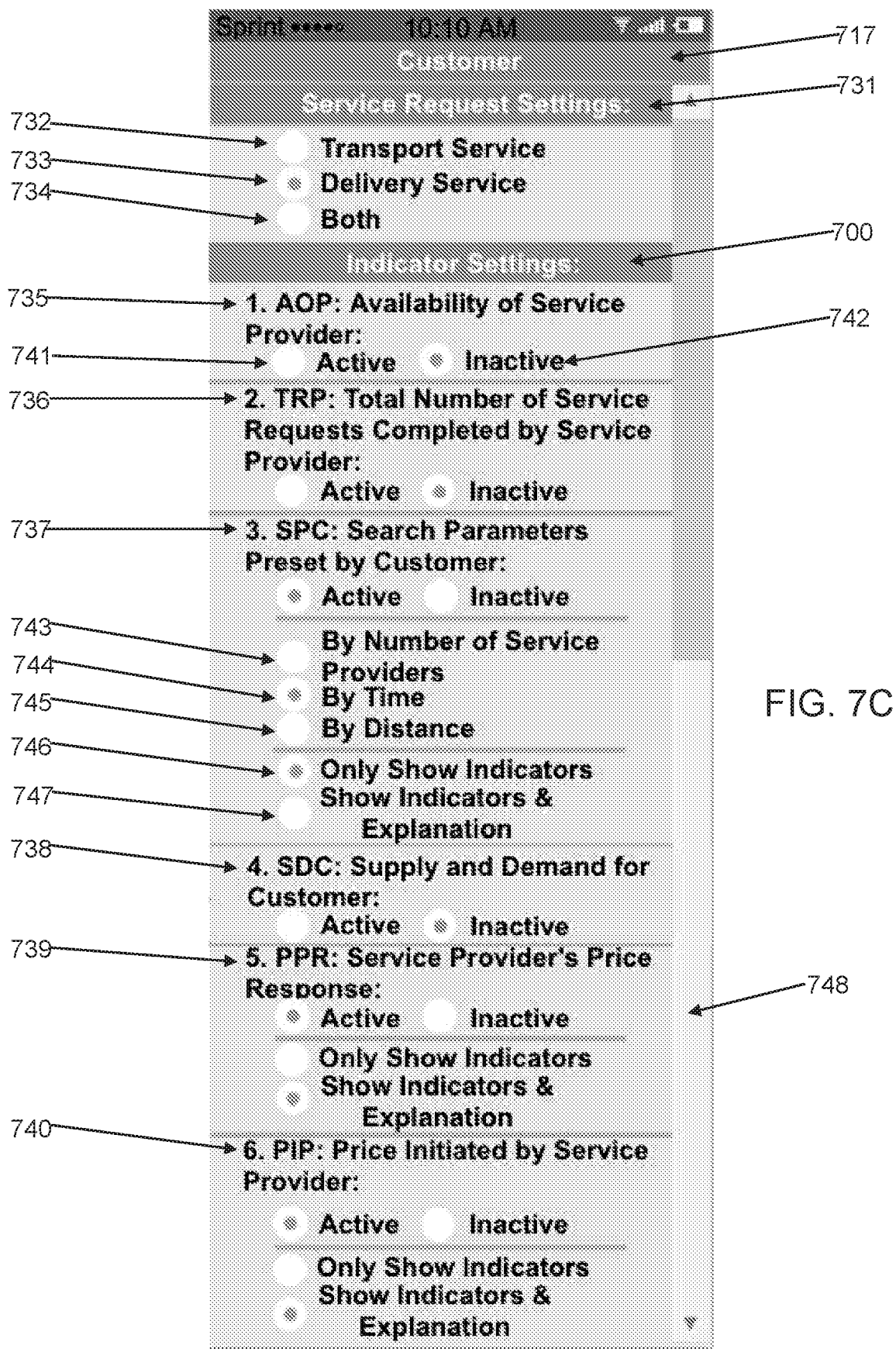
FIGS. 7C-7D depict exemplary customer's interfaces for service request and indicator settings.

FIG. 7C depicts an exemplary customer's interface for service request and indicators settings (717). The first step after the registration is to preset the type of service that customers want to request in service request settings (731). There are three possible service options: transport service (732), delivery service (733), or both transport and delivery service (734).

The indicator settings (700) will show different sets of indicators, such as the "AOP" set of indicators that provides information about the availability of service providers (735); the "TRP" set of indicators for total number of service requests completed by a service provider within a certain period of time (736); the "SPC" set of indicators that shows electronic map display information within the search parameters preset by the customer (737); the "SDC" set of indicators for the total number of available service providers within the search parameters preset by the customer compared to total number of available service requests within the same search parameters, which is the supply and demand information from a customer's perspective (738); the "PPR" set of indicators to indicate response from service provider to price proposal initiated by the customer (739); the "PIP" set of indicators for the price proposal initiated by the service provider (740);

Each of the sets of the indicators may be set as active (741) or inactive (742) at customer's discretion. Other settings include settings for the search parameters, whether they are defined by number of service providers (743), by time (744), by distance (745). The customers may choose which set of indicators they want to see; where they may choose to see individual sets of indicators, all sets of indicators or any combination of sets of indicators of their choice. For each set of indicators, the customers will have an option to choose whether they want the system to show only the indicators (746), or to show the indicators and explanation (747).

One of ordinary skill in the art would appreciate that the process of indicator settings is bi-directional, and a service provider may first preset the indicators he or she allows customers to see. At the same time, a customer may preset in the indicator settings what information he or she wants to see about service providers. In addition, one of ordinary skill in the art would appreciate that the list of indicators depicted in FIG. 7C is not exclusive, and that other indicators, as further shown in FIG. 7D, can be included and accessed via the scroll bar (748).

Figure 7D:
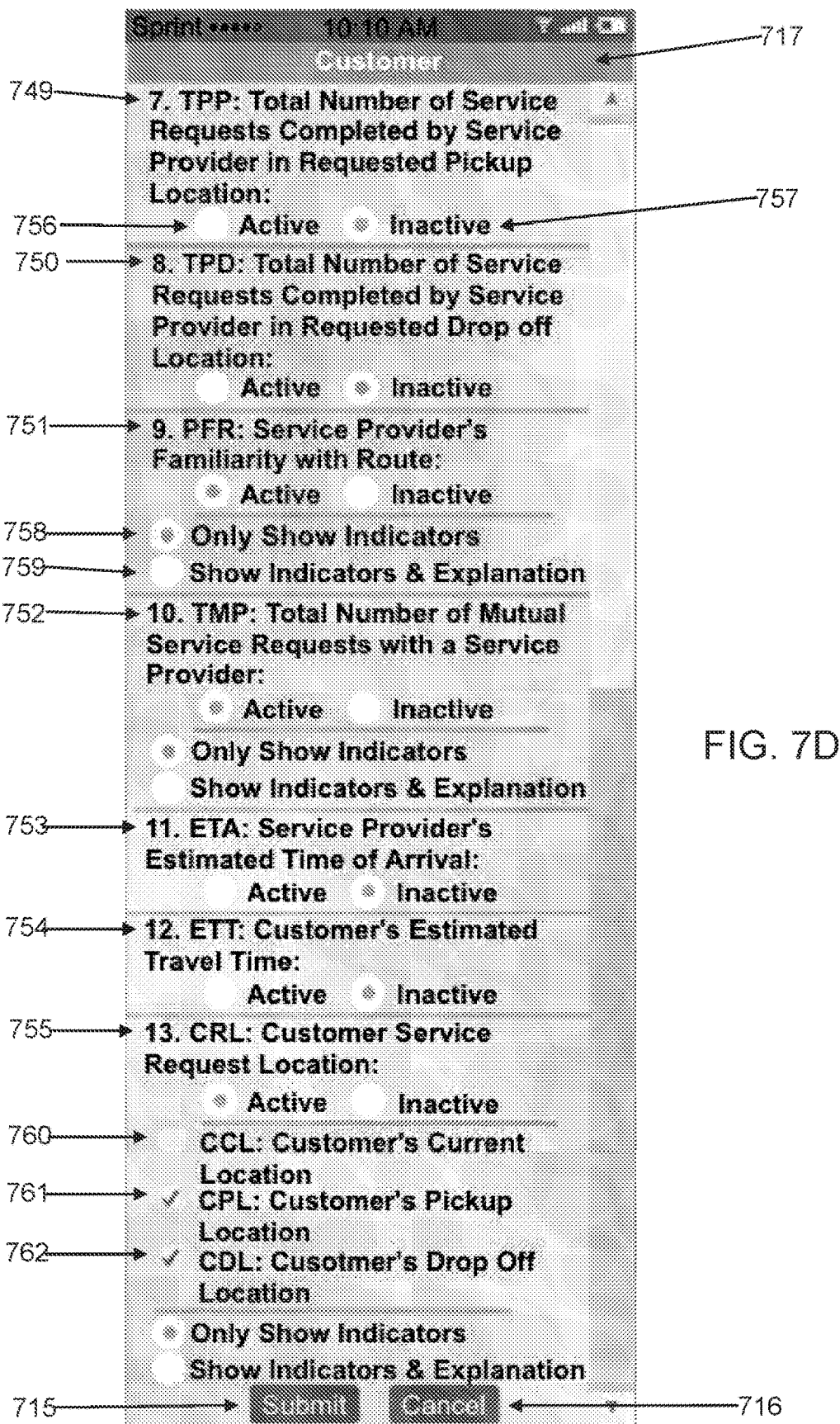

FIG. 7D depicts a continuation of the exemplary customer's interface for service request and indicators settings (717). The indicator settings in this figure show further sets of indicators, such as the "TPP" set of indicators to identify the total number of service requests completed by a service provider based on geographic zone of the requested pickup location (749); "TPD" set of IA indicators to identify total number of service requests completed by a service provider based on geographic zone of the requested drop off location (750); the "PFR" set of indicators to identify the familiarity of a service provider with the requested route (751); the "TMP" set of indicators to identify the total number of mutually completed service requests by a service provider with that customer (752); the "ETA" set of indicators to identify service provider's estimated time of arrival based on the customer's pickup location and the service provider's current location (753); "ETT" set of indicators to identify the estimated travel time between the pickup location and drop off location (754); the "CRL" set of indicators to identify different locations indicated in the service request (755) including "CCL," customer's current location (760), "CPL," customer's pickup location (761), and "CDL," customer's drop off location (762).

Each of the sets of the indicators may be set as active (756) or inactive (757) at customers' discretion. The customers may choose which set of indicators they want to see, where they may choose to see individual sets of indicators, all sets of indicators or any combination of sets of indicators of their choice. For each set of indicators, the customers will have an option to choose whether they want the system to show only the indicators (758), or to show the indicators and explanation (759). After identifying the settings (700), the customers either submit (715) or cancel (716) their selections.

One of ordinary skill in the art would appreciate that the process of indicator settings is bi-directional, and a service provider may first preset the indicators he or she allows customers to see. At the same time, a customer may preset in the indicator settings what information he or she wants to see about service providers. In addition, one skilled in the art would appreciate that the detailed explanations of the indicators may be viewed at any time by clicking on the indicator in the indicator settings (700) or viewed in the profile information as further described in FIGS. 7G and 7H.

Figure 7E:
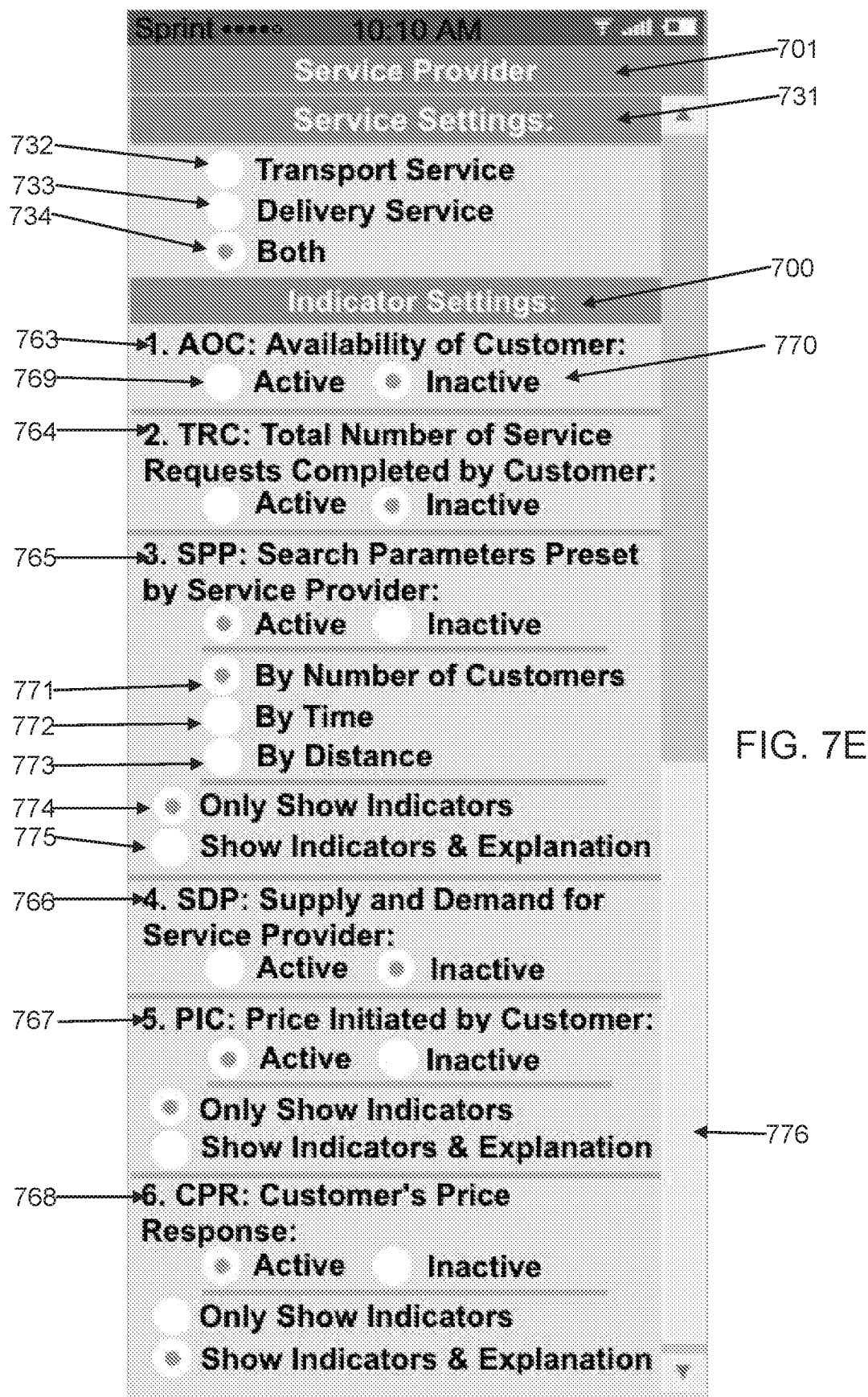
FIGS. 7E-7F depict exemplary service provider's interfaces for service and indicator settings.

FIG. 7E depicts an exemplary service provider's interface for service and indicators settings (701). The first step after the registration is to identify type of service that service providers preset to provide in service settings (731). In this example, there are three possible service options: transport service (732), delivery service (733), or both transport and delivery service (734). The indicator settings (700) will show different sets of indicators, such as the "AOC" set of indicators to indicate whether a customer is available (763); the "TRC" set of indicators for total number of service requests completed within a certain period of time by the customer (764); the "SPP" set of indicators that shows electronic map display information within the search parameters preset by the service provider (765); "SDP" to identify the supply and demand regarding number and the location of active potential customers on the electronic map display within preset parameters (766); the "PIC" set of indicators for the price initially proposed by the customer (767); and the "CPR" set of indicators to indicate response from customer to proposed price from the service provider (768).

Each of the sets of the indicators may be active (769) or active (770) by discretion of the service providers. Other settings include settings for the search parameters, whether the parameters are defined by number of customers (771), by time (772), or by distance (773). The service providers may choose which sets of indicators they want to see, wherein they may choose to see individual sets of indicators, all sets of indicators or any combination of sets of indicators of their choice. For each set of indicators, both the customers and service providers, will have an option to choose whether they want the system to only show the indicators (774), or to show the indicators and explanation (775).

Figure 7F:
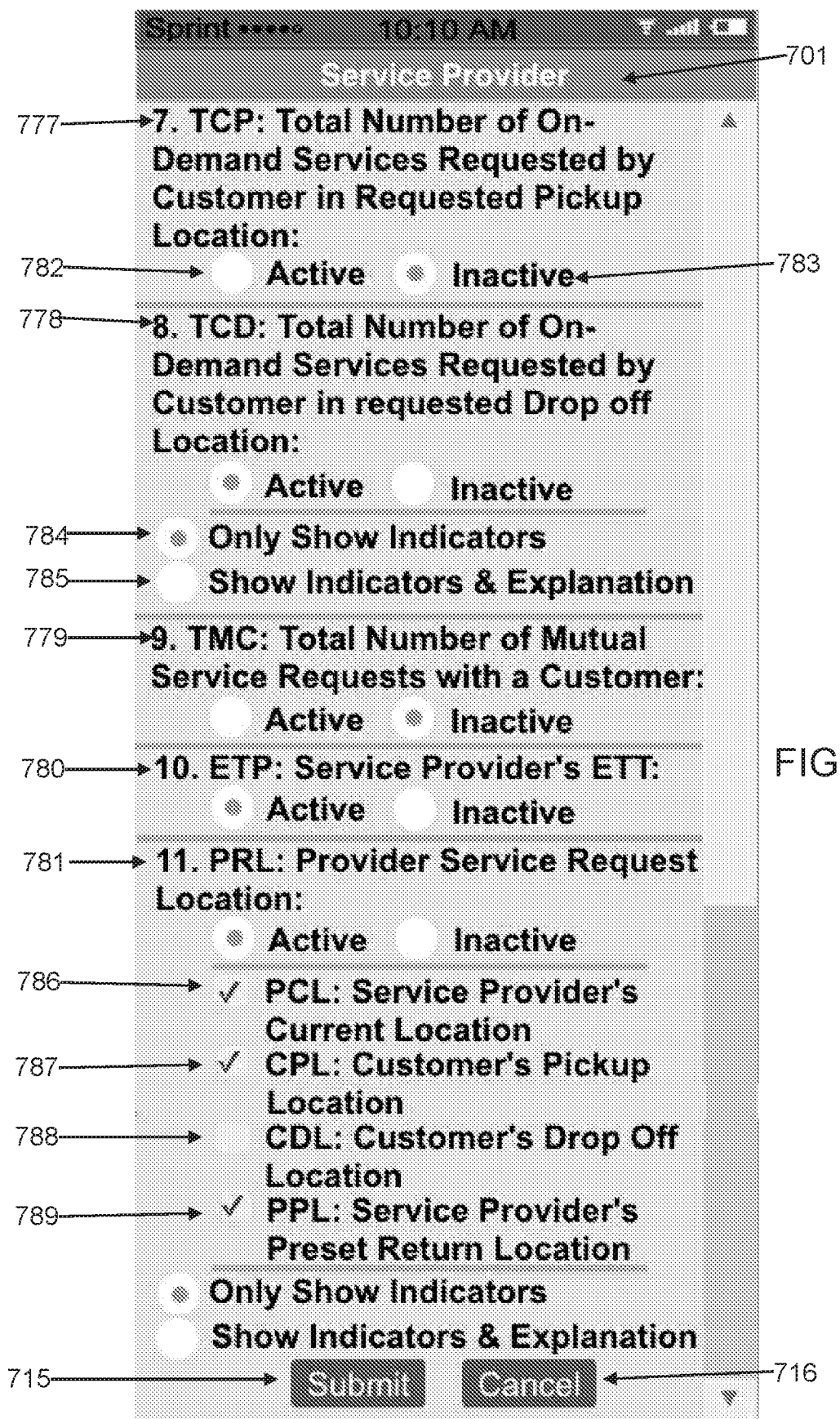

One of ordinary skill in the art would appreciate that the list of indicators depicted in FIG. 7E is not exclusive, and that other indicators, as further shown in FIG. 7F, can be included and accessed via the scroll bar (776). One skilled in the art would also appreciate that the system may assist a service provider in selecting a best matching customer based on available indicators and filter options. Similarly to a customer, a service provider may identify which of the indicators he or she want the customers be filtered by, wherein it could be any one or more or any combination of indicators that the service provider deems important for making deals with the customers.

FIG. 7F depicts a continuation of the exemplary service provider's interface for service and indicators settings (701). The indicator settings will show different sets of indicators, such as the "TCP" set of indicators to identify the total number of completed service requests by a customer within certain period of time based on the pickup location (777); the "TCD" set of indicators to identify the total number of completed service requests by the customer within a certain period of time based on the drop off location, (778): the "TMC" set of indicators to identify the total number of mutual completed service requests by the customer with that same service provider 779); the "ETP" set of indicators shows how long the service provider may be underway in carrying out a service request (780); the "PRL" set of indicators to indicate the different locations indicated in the service request (781) including "PCL," the service provider's current location (786), "CPL," customer's requested pickup location (787), "CDL," customer's requested drop off location (788) and "PPL" for the service provider's preset return location (789).

Each of the sets of the indicators may be active (782) or inactive (783) by discretion of the service providers. The service providers may choose which sets of indicators they want to see, wherein they may choose to see individual sets of indicators, all sets of indicators or any combination of sets of indicators of their choice. For each set of indicators service providers will have an option to choose whether they want the system to only show the indicators or to show the indicators and explanation. After identifying the settings, the service providers either submit (715) or cancel (716) their selections. One of ordinary skill in the art would appreciate that the detailed meanings of the indicators may be viewed at any time by clicking on the indicator in the indicator settings or viewed in the profile information as further described in FIGS. 7G and 7H. In addition, one of ordinary skill in the art would appreciate that the list of indicators depicted in FIG. 7F is not exclusive, and that other indicators can be included.

Figure 7G:
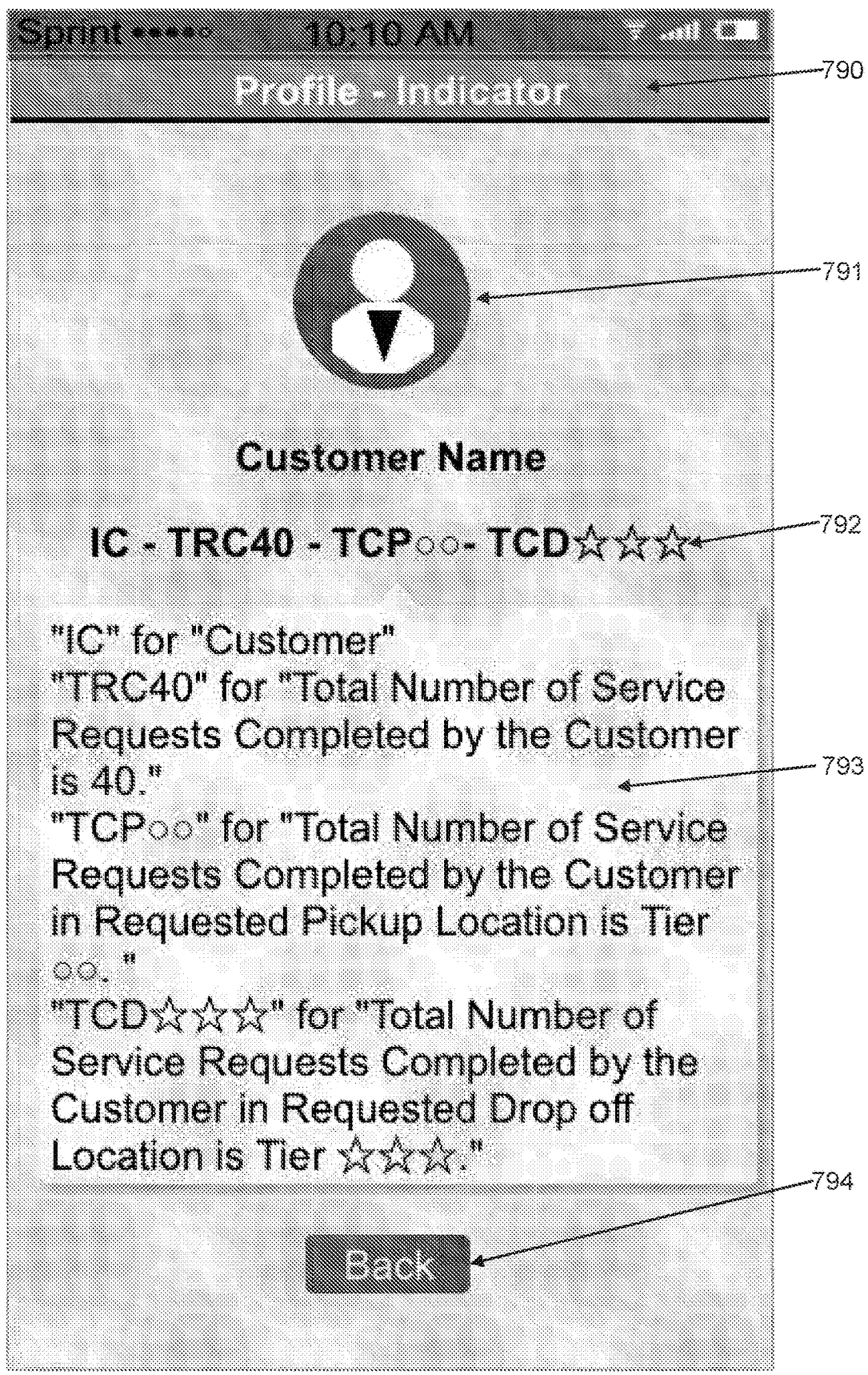
FIG. 7G depicts an exemplary profile of a customer.

FIG. 7G depicts an exemplary profile of a customer (790) assigned to customers and displayed to service providers, but that may be seen by both service providers and customers. For example, if a user wants to see the profile of a customer, the user may go to that customer's profile (790). The service provider would then see a photo of the customer (791); if the customer has uploaded one, and that customer's indicators IC-TRC40-TCP∘∘-TCD* (792). Below the indicator, the user will see explanation for the indicators (793). In this case, the "IC" would stand for the "Identification of Customer." "TRC40" would identify that total number of service requests completed by that customer is 40; "TCP∘∘" would identify that the tier of the total number of service requests completed by the customer based on zone of the requested pickup location is no, which could be any numeric range as identified in the system; "TCD*" would identify that the total number of service requests completed by the customer based on zone of the requested drop off location is ***, which could also be any numeric range as identified in the system. After viewing the customer's profile, the user may click the "Back" button to go back (794).

Figure 7H:
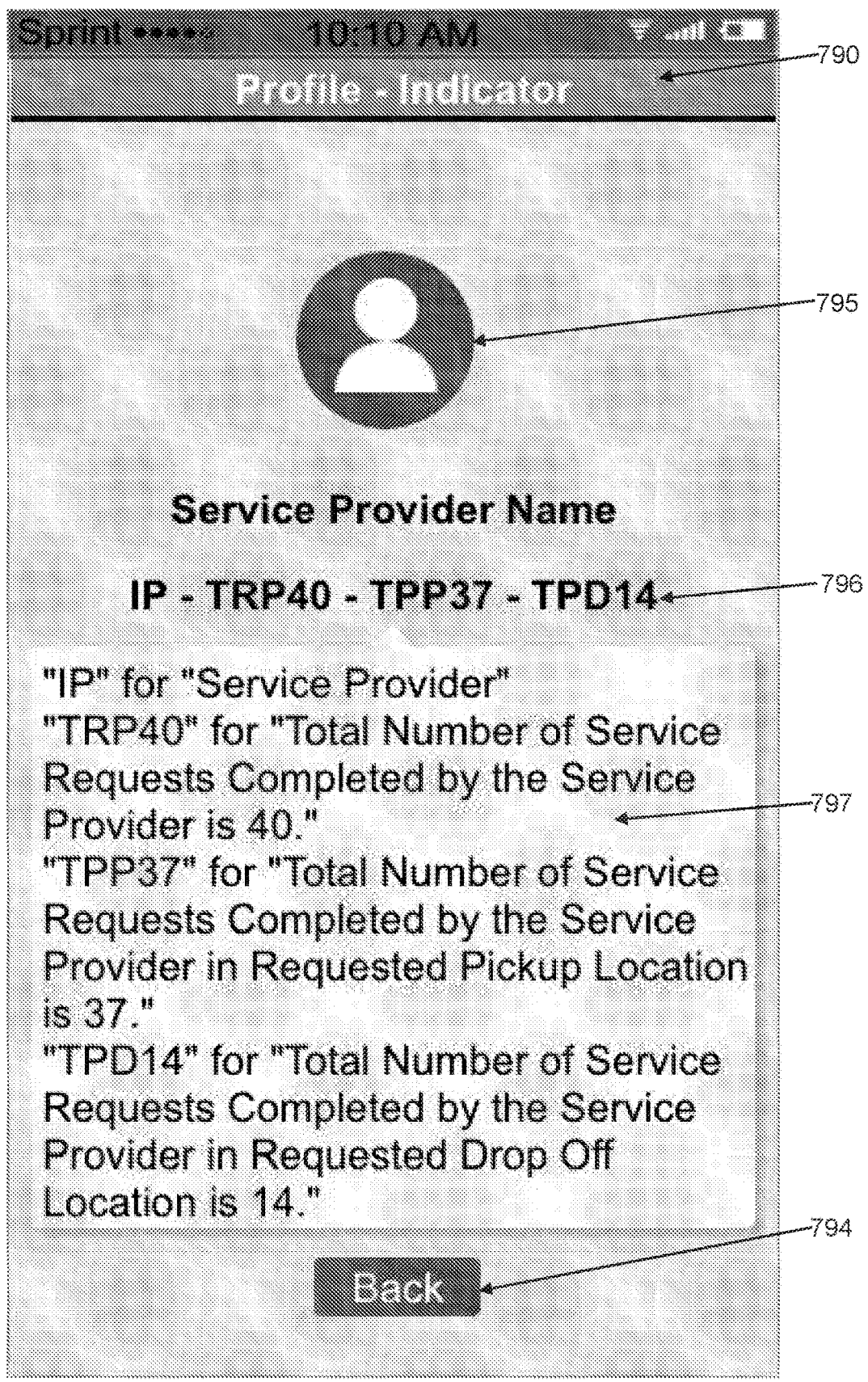
FIG. 7H depicts an exemplary profile of a service provider.

FIG. 7H depicts an exemplary profile of a service provider (790) assigned to service providers and displayed to customers, but that may be seen by both service providers and customers. For example, if a user wants to see the profile of a service provider, the user may go to that service provider's profile (790). The customer would then see a photo of the service provider (795), if the service provider has uploaded one, and that service provider's IP-TRP40-TPP37-TPD14 (796). Below the indicator, the user would see explanation for the indicators (797). In this case, the "IP" would stand for the "Identification of Service Provider"; "TRP40" would identify that the total number of service requests completed by that service provider is 40; "TPP37" would identify that the total number of service requests completed by the service provider based on zone of pickup location is thirty-seven; "TPD14" would identify that the total number of service requests completed by the service provider based on zone of drop off location is fourteen. After viewing the service provider's profile, the user may click the "Back" button to go back (794). One of ordinary skill in the art would appreciate that FIGS. 7G and 7H only depict random sets of indicators for illustrative purposes. The actual indicators may vary depending on the service providers' settings and their service request history.

FIG. 7I depicts an exemplary indicators matrix of user classification. There are two user types: service providers, type one, and customers, type two. Service Providers are identified with the indicator "IP." The overall user type of customers is identified with "IC" set of indicators. Service providers are assigned the first set of indicators and the customers are assigned the second set of indicators. Each of the user types is further divided into two different categories, which are "regular" service providers and "favorite" service providers, and "regular" customers and "favorite" customers, respectively. Thus, the first and second sets of indicators first connect with the data provided by a user during the registration process to reflect applicable user type information. Then, these sets of indicators connect with a user's favorites list to reflect another user's category.

Additionally, each of the categories is further divided into three subcategories depending on the type of service being provided or requested. Regular service providers are divided into: "RPT," regular transport service providers, "RPD," regular delivery service providers and "RPB," regular service providers of both transport and delivery service. Favorite service providers are divided into: "FPT," favorite transport service providers, "FPD," favorite delivery service providers and "FPB," favorite service providers of both transport and delivery service. The same applies for the customers who are also divided into regular customers and favorite customers. Regular customers are divided into: "RCT," regular transport customers, "RCD," regular delivery customers and regular customers of both transport and delivery service "RCB". Favorite customers are divided into: "FCT," favorite transport customers, "FCD," favorite delivery customers and "FCB," favorite customers of both transport and delivery service. Thus, the first and second sets of indicators also connect with the data provided by a user in the service request or service settings to reflect applicable type of service. One of ordinary skill in the art would appreciate that the matrix of user classification depicted in FIG. 7I is not exclusive, and that other means could be used to classify the users.

FIG. 7J depicts an exemplary indicators matrix for a service provider and a customer. In addition, the service provider user type is further divided into categories depending on whether the service provider is "regular" or "favorite." The following indicators are used: "RPT"/"FPT" for "Regular Service Provider for Transport Service," and for "Favorite Service Provider for Transport Service," respectively; "RPD"/"FPD" for "Regular Service Provider for Delivery Service," and for "Favorite Service Provider for Delivery Service," respectively; "RPB"/"FPB" for "Regular Service Provider for Both Transport and Delivery Service," and for "Favorite Service Provider for Both Transport and Delivery Service," respectively; "RCT"/"FCT" for "Regular Customer for Transport Service," and for "Favorite Customer for Transport Service," respectively; "RCD"/"FCD" for "Regular Customer for Delivery Service," and for "Favorite Customer for Delivery Service," respectively; "RCB"/"FCB" for "Regular Customer for Both Transport and Delivery Service," and for "Favorite Customer for Both Transport and Delivery Service," respectively.

C. The third set of indicators is for customers to identify available service providers: "AOP" for "Availability of a Service Provider." This set of indicators is meant to display a service provider's availability status at least on the electronic map display. In this example, more than just simply "available" is shown; the service provider has preset when he or she will become available, shown by "AOP15." The "15," in this case, stands for when he or she will become available, in approximately fifteen minutes. Thus, the third set of indicators connects with numbers to reflect how soon a service provider will become available.

D. The fourth set of indicators is provided to identify available customers: "AOC" for "Availability of a Customer." This set of indicators is meant to display availability status of a customer at least on the electronic map display. This set of indicators shows when a customer has made a service request and is currently in the process of looking for a best matching service provider. In this example, more than just simply "available for negotiation" is shown; the customer has preset when his or her service request will expire, shown by "AOC15." The "15," in this case, stands for when his or her service request will expire, in approximately fifteen minutes. Thus, the fourth set of indicators connects with numbers to reflect for how long a customer will remain available for.

E. The fifth set of indicators is "Total Number of Service Requests Completed by a Service Provider," "TRP," which is identified with different indicators according to the type of service. "TRP40" stands for the actual number of service requests completed, forty. Thus, the fifth set of indicators connects with numbers to reflect the total number of mutually completed service requests.

F. The sixth set of indicators, "SPC," is for "Search Parameters Preset by a Customer." According to an exemplary embodiment of the present invention, a customer has three search parameters to choose from when searching for potential available service providers; such as by number identifying a desired number of potential available service providers that the customer wants to negotiate with; by time identifying potential available service providers estimated time of arrival at the requested pickup location is within a certain time; and by distance identifying potential available service providers whose current location is within a certain distance from the requested pickup location. "SPC10 Min," for example, stands for a ten-minute search parameter preset by a customer to locate all potential service providers whose estimated time of arrival is within ten minutes. A customer has an option to preset one or more or any combination of such search parameters resulting in one or more or any combination of geographic zones surrounding his or her requested pickup location and displayed on his or her electronic map display. Along with potential available service providers, the system performs a search for potential available customers who are currently requesting the same type of service as the type of service the customer wants to request. These potential available customers are identified by the system within the same geographic zones resulting from one or more search parameters preset by the customer to search for potential available service providers. When identifying a pool of potential available customers, the customer him/herself is also included in this pool. Even if the customer deactivates this sixth set of indicators, he or she will still be counted as a potential available customer when reflecting a total number of potential available customers. As a result; the system reflects one or more geographic zones surrounding the customer's requested pickup location with a pool of potential available service providers and a pool of potential available customers who are located within these one or more geographic zones. Thus, the sixth set of indicators connects with one or more or any combination of search parameters preset by a customer and their identifications. One of ordinary skill in the art would appreciate that geographic zones reflected by the system according to the search parameters preset by the customer could be identified by different colors, shapes, or not be identified at all which, however, will not affect identification of potential available service providers and customers within these geographic zones.

G. The seventh set of indicators, "SDC," is for "Supply and Demand for a Customer". This set of indicators reflects supply and demand conditions for a customer within one or more geographic zones based on one or more of search parameters preset by that customer. For example, "SDC30/3" stands for the actual number of service providers, thirty; vs. the actual number of service requests, three, within one of the search parameters preset by a customer, whether by number, time, or distance. The system will provide a customer with a different set of supply and demand indicators for each of the search parameters preset by the customer. By identifying supply and demand for a customer, this seventh set of indicators assists the customer in negotiating a price for his or her service request. Thus, the seventh set of indicators connects with two sets of numbers, one for supply and one for demand, to reflect current supply and demand conditions for a customer within one or more geographic zones defined based on one or more search parameters preset by the customer.

H. The eighth set of indicators is "PPR" for "Service Provider's Price Response." For example, "PPR-G/Y/R-$11; 10% ↑; $1 ↑" identifies the response from a service provider to the proposed price from the customer; where "G/Y/R" stands for "Green/Yellow/Red"; "$11; 10% ↑; $1 ↑" stands for an $11 response price, which is ten percent or one dollar higher than the default price. Thus, the eighth set of indicators connects the dollar amount for a service provider's price response with a default price to reflect the difference between the two with the use of colors, percentages; and up or down arrows. It is to be understood by one skilled in the art that the representation of the difference between a service provider's price response and a default price is not limited to colors, percentages, and up or down arrows.

FIG. 7K depicts a continuation of the exemplary indicators matrix for a service provider and a customer.

Shown in this figure are sets of indicators to provide information about service providers that could be applied to three subcategories of service, such as transport service, delivery service and both transport and delivery service. The service provider user type is further divided into categories depending on whether the service provider is "regular" or "favorite." The following indicators are used: "RPT"/"FPT" for "Regular Service Provider for Transport Service," and for "Favorite Service Provider for Transport Service," respectively; "RPD"/"FPD" for "Regular Service Provider for Delivery Service," and for "Favorite Service Provider for Delivery Service," respectively; "RPB"/"FPB" for "Regular Service Provider for Both Transport and Delivery Service," and for "Favorite Service Provider for Both Transport and Delivery Service," respectively.

I. The ninth set of indicators, "PIP" is "Price Initiated by a Service Provider." For example, "PIP-G/Y/R-$11; 10% ↑; $1 ↑" would stand for price initiated by a service provider, where "G/Y/R" stands for "Green/Yellow/Red"; "%" for percent of difference; "$11; 10% ↑;$1 ↑" stands for an $11 price, which is ten percent or one dollar higher than the default price. Thus, the ninth set of indicators connects the dollar amount for a price initiated by a service provider with a default price to reflect the difference between the two with the use of colors, percentages, and up or down arrows. It is to be understood by one skilled in the art that the representation of the difference between a price initiated by a service provider and a default price is not limited to colors, percentages, and up or down arrows.

J. The tenth set of indicators, "TPP," is for "Total Number of Service Requests Completed by a Service Provider in Requested Pickup Location." For example, "TPP☐☐" would stand for total number of service requests completed by a service provider in requested pickup location by applicable tier, where squares represent tiers. Thus, the tenth set of indicators connects with numbers to reflect a total number of service requests completed by a service provider in requested pickup location.

K. The eleventh set of indicators, "TPD," is for "Total Number of Service Requests Completed by a Service Provider in Requested Drop Off Location," For example, "TPD△△" would stand for total number of completed service requests by a service provider in requested drop off location by applicable tier, where triangles represent tiers. Thus, the eleventh set of indicators connects with numbers to reflect a total number of service requests completed by a service provider in requested drop off location.

L. The twelfth set of indicators, "PFR," is "Service Provider's Familiarity with the Route." For example, "PFR10%" would illustrate familiarity of a service provider with the route in the customer's service request and "/0%" would indicate that his or her familiarity is ten percent. Thus, the twelfth set of indicators connects with percentages to reflect a service provider's degree of familiarity with the requested route.

M. The thirteenth set of indicators, "TMP," is for "Total Number of Mutual Service Requests with a Service Provider". For example, "TMP231" would stand to show the actual number of service requests completed by the customer with a particular service provider, two hundred thirty-one. Thus, the thirteenth set of indicators connects with numbers to reflect a total number of mutually completed service requests.

N. The fourteenth set of indicators, "ETA," is for "Service Provider's Estimated. Time of Arrival." For example, "ETA28" stands to illustrate the estimated time of arrival, where "28" stands to show the actual minutes of travel from a service provider's current location to the customer's pickup location, twenty-eight minutes. Thus, the fourteenth set of indicators connects with numbers to reflect a service provider's estimated time of arrival.

FIG. 7L depicts a continuation of the exemplary indicators matrix for a service provider and a customer.

Shown in this figure are sets of indicators to provide information about customers that could be applied to three subcategories of service, such as transport service, delivery service and both transport service and delivery service. The customer user type is further divided into categories depending on whether the customer is "regular" or "favorite." The following indicators are used: "RCT"/"FCT" for "Regular Customer for Transport Service," and for "Favorite Customer for Transport Service," respectively; "RCD"/"FCD" for "Regular Customer for Delivery Service," and for "Favorite Customer for Delivery Service," respectively; "RCB"/"FCB" for "Regular Customer for Both Transport and Delivery Service," and for "Favorite Customer for Both Transport and Delivery Service," respectively.

O. The fifteenth set of indicators, "ETT," is provided for a customer to identify estimated travel time from the pickup location to the drop off location. "ETT33," for example, stands for estimated travel time, where "33" is the actual number of minutes, thirty-three. Thus, the fifteenth set of indicators connects with numbers to reflect a customer's estimated travel time.

P. The sixteenth of indicators, "CRL," provides information about customer's service request location. This set of indicators provides information about at least three distinct locations, each of which has its own definition. In this example, "CCL," "CPL" and "CDL" are listed. These three indicators stand for "Customer's Current Location," "Customer's Pickup Location," and "Customer's Drop Off Location," respectively. Thus, the sixteenth set of indicators connects with location identifications for a customer's current location, customer's pickup location, and customer's drop off location.

Q. The seventeenth set of indicators, "TRC," is "Total Number of Service Requests Completed by a Customer." For example, "TRC40" stands to show the total number of service requests completed by the customer, where "40" stands for the actual number of service requests completed, forty. Thus, the seventeenth set of indicators connects with numbers to reflect a total number of service requests completed by a customer.

R. The eighteenth set of indicators, "SPP," is for "Search Parameters preset by a Service Provider." According to an exemplary embodiment of the present invention, a service provider has three search parameters to choose from when searching for potential available customers, such as by number identifying a desired number of potential available customers that the service providers wants to make deals with; by time identifying potential available service providers whose location is within a certain time away from the service provider's current location; and by distance identifying potential available customers whose pickup location is within a certain distance from the service provider's current location. "SPP10Mi," for example, stands for a ten-mile search parameter preset by a service provider to locate all potential customers whose requested pickup location is within ten miles away from the service provider's current location. A service provider has an option to preset one or more or any combination of such search parameters resulting in one or more or any combination of geographic zones surrounding his or her current location and displayed on his or her electronic map display. Along with potential available customers, the system performs a search for potential available service providers who are currently providing the same type of service as the type of service the service provider chose to provide. These potential available service providers are identified by the system within the same geographic zones resulting from one or more search parameters preset by the service provider to search for potential available customers. When identifying a pool of potential available service providers, the service provider him/herself is also included in this pool. Even if the service provider deactivates this eighteenth set of indicators, he or she will still be counted as a potential available service provider when reflecting a total number of potential available service providers. As a result, the system reflects one or more geographic zones surrounding the service provider's current location with a pool of potential available service providers and a pool of potential available customers who are located within these one or more geographic zones. Thus, the eighteenth set of indicators connects with one or more or any combination of search parameters preset by a service provider. Thus, the eighteenth set of indicators connects with one or more or any combination of search parameters preset by a service provider and their identifications.

One of ordinary skill in the art would appreciate that geographic zones reflected by the system according to the search parameters preset by the service provider could be identified by different colors, shapes, or not be identified at all which, however, will not affect identification of potential available service providers and customers within these geographic zones.

S. The nineteenth set of indicators, "SDP," is for "Supply and Demand for a Service Provider". This set of indicators reflects supply and demand conditions for a service provider within one or more geographic zones based on one or more of search parameters preset by that service provider. For example, "SDP23/3" stands for the actual number of service providers, twenty-three, vs. the actual number of service requests, three, within one of the search parameters preset by a service provider, whether by number, time, or distance. The system will provide a service provider with a different set of supply and demand indicators for each of the search parameters preset by the service provider. By identifying supply and demand for a service provider, this nineteenth set of indicators assists the service provider in negotiating a price for a received service request. Thus, the nineteenth set of indicators connects with two sets of numbers, one for supply and one for demand, to reflect current supply and demand conditions for a service provider within one or more geographic zones defined based on one or more search parameters preset by the service provider.

T. The twentieth set of indicators, "PIC," is for "Price Initiated by a Customer." For example, "PIC-G/Y/R-$11; 10% ↑; $1 ↑" would stand for price initiated by a customer, where "G/Y/R" stands for "Green/Yellow/Red"; "%" for percent of difference; "$11; 10% ↑; $1 ↑" stands for an $11 price, which is ten percent or one dollar higher than the default price. Thus, the twentieth set of indicators connects the dollar amount for a price initiated by a customer with a default price to reflect the difference between the two with the use of colors; percentages, and up or down arrows. It is to be understood by one skilled in the art that the representation of the difference between a price initiated by a customer and a default price is not limited to colors, percentages, and up or down arrows. One of ordinary skill in the art would appreciate that different sets of indicators could be used to provide information about service provider and customers, and that different abbreviations and symbols could be adopted in place of abbreviations used therein.

FIG. 7M depicts a continuation of the exemplary indicators matrix for a service provider and a customer. Shown in this figure are sets of indicators to provide information about service providers and customers that could be applied to three subcategories of service, such as transport service, delivery service and both transport and delivery service. The service provider user type is further divided into categories depending on whether the service provider is "regular" or "favorite." The following indicators are used: "RPT"/"FPT" for "Regular Service Provider for Transport Service," and for "Favorite Service Provider for Transport Service," respectively; "RPD"/"FPD" for "Regular Service Provider for Delivery Service," and for "Favorite Service Provider for Delivery Service," respectively; "RPB"/"FPB" for "Regular Service Provider for Both Transport and Delivery Service," and for "Favorite Service Provider for Both Transport and Delivery Service," respectively; "RCT"/"FCT" for "Regular Customer for Transport Service," and for "Favorite Customer for Transport Service," respectively; "RCD"/"FCD" for "Regular Customer for Delivery Service," and for "Favorite Customer for Delivery Service," respectively; "RCB"/"FCB" for "Regular Customer for Both Transport and Delivery Service," and for "Favorite Customer for Both Transport and Delivery Service," respectively.

U. The twenty first set of indicators, "CPR," is for "Customer's Price Response." For example, "CPR-G/Y/R-$11; 10% ↑; $1 ↑" identifies the response from a customer to the proposed price from a service provider, where "G/Y/R" stands for "Green/Yellow/Red"; "$11; 10% ↑; $1 ↑" stands for an $11 response price, which is ten percent or one dollar higher than the default price. Thus, the twenty first set of indicators connects the dollar amount for a service provider's price response with a default price to reflect the difference between the two with the use of colors, percentages, and up or down arrows. It is to be understood by one skilled in the art that the representation of the difference between a customer's price response and a default price is not limited to colors, percentages, and up or down arrows.

V. The twenty second set of indicators, "TCP," is for "Total Number of On-Demand Services Requested by a Customer in Requested Pickup Location." For example, "TCP∘∘" would stand for total number of on-demand services requested by a customer in requested pickup location by applicable tier, where circles represent tiers. Thus, the twenty second set of indicators connects with numbers to reflect a total number of services requested by a customer in requested pickup location.

W. The twenty third set of indicators, "TCD," is for "Total Number of On-Demand Services Requested by a Customer in Requested Drop Off Location." For example, "TCD***" would stand for total number of on-demand services requested by the customer in requested drop off location by applicable tier, where stars represent tiers. Thus, the twenty third set of indicators connects with numbers to reflect a total number of services requested by a customer in requested drop off location.

X. The twenty fourth set of indicators, "TMC," is for "Total Number of Mutual Service Requests with a Customer." For example, "TMC123" would stand to show the actual number of service requests completed by a service provider with a particular customer, one hundred twenty-three. Thus, the twenty fourth set of indicators connects with numbers to reflect a total number of mutually completed service requests.

Y. The twenty fifth set of indicators, "ETP," is provided for a service provider to identify his or her estimated travel time. For example, "ETP50" stands for estimated travel time for a service provider, where "50" is the actual number of minutes, fifty. This estimated travel time could be calculated in two ways: from the service provider's current location to the requested drop-off location, or from the service provider's current location to the return location preset by that service provider. Thus, the twenty-firth set of indicators connects with numbers to reflect a service provider's estimated travel time.

Z. The twenty sixth set of indicators "PRL," provides information about a service provider's service request location. This set of indicators provides information about at least four distinct locations, each of which has its own definition. In this example, "PCL," "CPL", "CDL," and "PPL" are listed. These four indicators stand for "Service Provider's Current Location," "Customer's Pickup Location," "Customer's Drop Off Location," and "Service Provider's Preset Return Location," respectively. Thus, the twenty sixth set of indicators connects with location identifications for a service provider's current location, customer's pickup location, customer's drop off location, and service provider's return location.

One of ordinary skill in the art would appreciate that different sets of indicators from the ones depicted in FIGS. 7J-7M could be used to provide information about service provider and customers, and that different abbreviations and symbols could be adopted in place of abbreviations used therein.

Figure 7N:
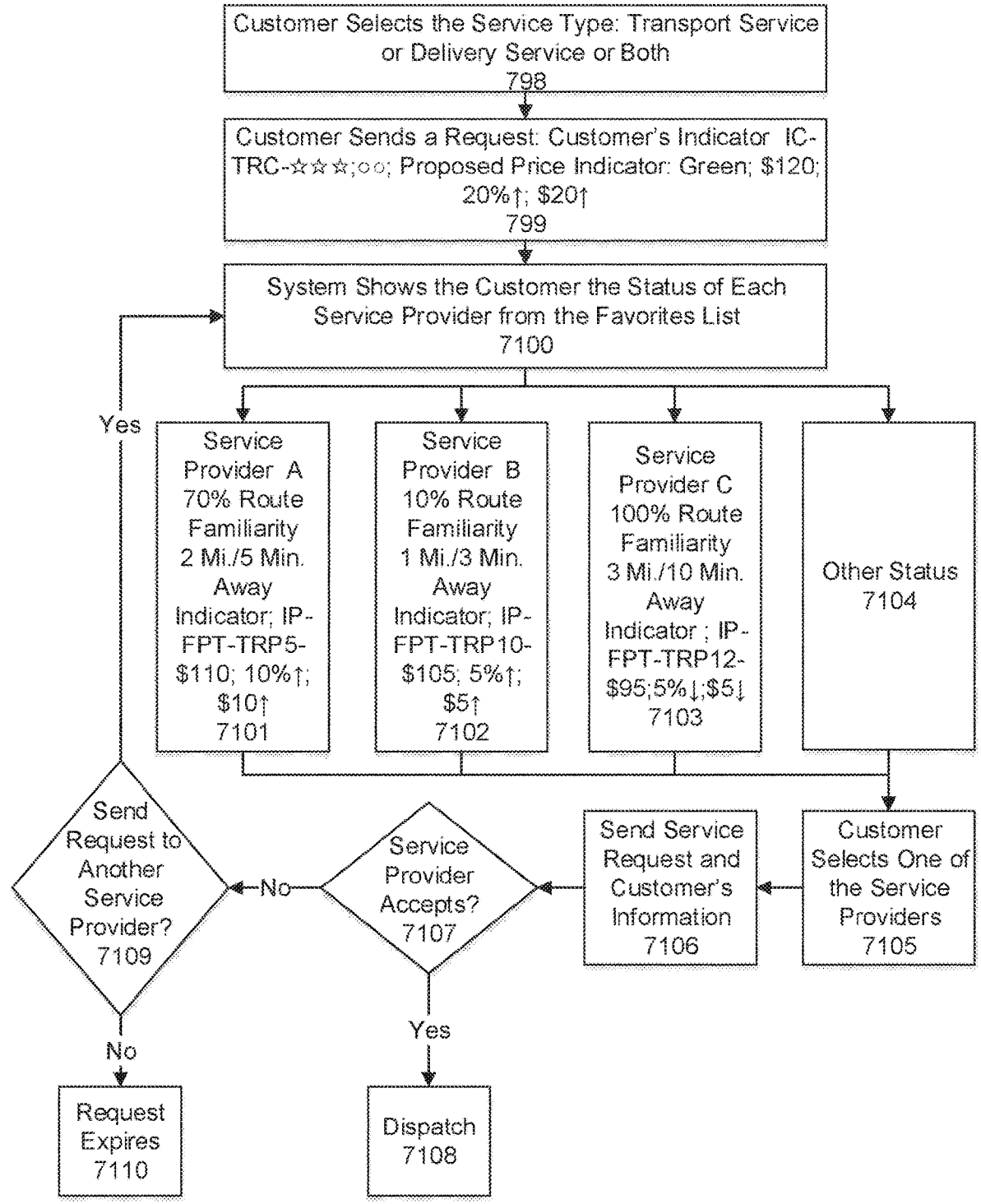
FIG. 7N depicts an exemplary workflow of selecting a service provider from a favorites list based on the service provider's real-time status.

FIG. 7N depicts an exemplary workflow of selecting a service provider from a favorites list based on the service provider's real-time status. The system stores all past service request records in the database. Based on those records, the system is able to match service request histories with the requested service from customers. It is understood by the ordinary skilled in the art that there are indicators based only on transport service information, indicators based only on the delivery service information, and indicators which are based on both transport and delivery service. For simplicity, this figure only depicts one scenario where indicators are based on transport service.

The customer first identifies the type of service request as transport service, delivery service or both transport and delivery service (Step 798). Customer sends a request and has an indicator IC-TRC-*; ○○; proposed price indicator. Green; $120; 20% ↑; $20↑ (Step 799), which stands for a proposed price of one hundred and twenty dollars, which is twenty percent or twenty dollars above the default price. The system shows to the customer the status of each service provider from the customer's favorites list (Step 7100). For example, favorite Service Provider A for transport service has a 70% matching route familiarity with the requested route and is currently 2 miles (5 minutes away) from the customer, and his indicators show that he is "IP-FPT-TRP5-$110; 10%↑; $10 ↑" (Step 7101). This set of indicators means that favorite Service Provider A has completed total number of five service requests and his proposed price is $110, which is $10 or 10% above the default price. Favorite Service Provider B for transport service has a 10% matching route familiarity with the requested route and is currently 1 mile away from the customer (3 minutes away), and her indicators reflect that she is "IP-FPT-TRP10-$105; 5% ↑; $5 ↑" (Step 7102). These indicators mean that favorite service provider B for transport service has completed total number of ten service requests and her proposed price is $105, which is $5 or 5% above the default price. Favorite Service Provider C for transport service has a 100% route familiarity with the requested route and is currently 3 miles away from the customer (10 minutes away), and her indicators reflect that she is "IP-FPT-TRP12-$95, 5% ↓; S5 ↓" (Step 7103). This indicator means that favorite service provider C for transport service has completed total number of twelve service requests and her proposed price is $95, which is $5 or 5% below the default price. There are also other service providers on the favorites list who have other statuses (Step 7104), which are displayed to the customer. The customer then selects a favorite service provider among those displayed (Step 7105**).

The customer's service request along with the customer's information is then sent to the selected service provider (Step 7106). Based on the service request and customer's information, the favorite service provider may accept or decline the service request (Decision 7107). If the favorite service provider accepts, then he or she is dispatched to carry out the service request (Step 7108). If the favorite service provider does not accept, then the customer is queried whether he or she would like to send the request to another favorite service provider (Decision 7109). If the customer does not want the system to find another service provider, then the request expires (Step 7110). If the customer does want to find another favorite service provider, then the system will again show the customer the statuses of each service providers from the customer's favorites list (Step 7100). The process of selecting a favorite service provider will then repeat from there until the customer selects a service provider, the service provider accepts the service request, and the service request is dispatched to that service provider. One of ordinary skill in the art would appreciate that the process depicted herein is not exclusive nor does it require the particular order shown to achieve desirable results.

Figure 7O:
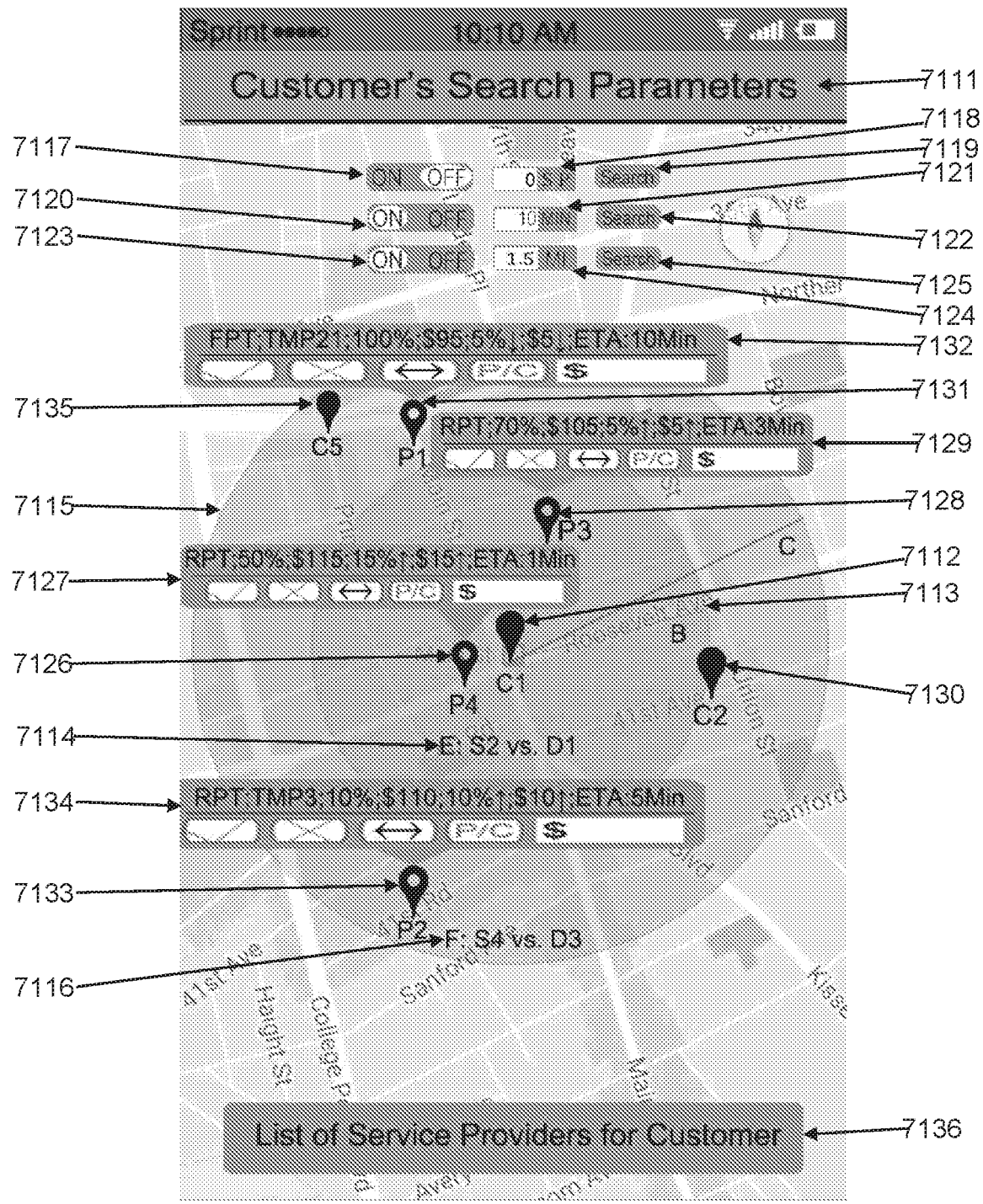
FIG. 7O depicts an exemplary interface for a customer's search parameters.

FIG. 7O depicts an exemplary interface for a customer's search parameters (7111). In this depiction, Customer C1 (7112) presets his or her search parameters to search for available potential service providers for his or her type of service request. In addition to search for potential available service providers, the system will perform a search for other available customers who are currently requesting the same type of service and whose current location is within the search parameters preset by this customer. The customer has three search parameters which he or she can choose from. He or she can perform a search using one or more or any combination of search parameters. The customer has an option to perform a search by the number of service providers he or she wants to negotiate with. In this depiction, this search option is turned off (7117) and the number of service providers is therefore displayed as zero (7118). To activate this search parameter, the customer needs to turn it on (7117), enter the desired number (7118), and click the "Search" button (7119).

The customer also has an option to perform a search by time. To do so, he or she will need to activate this option by turning it on (7120), enter the number for the time within which he or she wants the pickup to occur, for instance, 10 minutes (7121), and click the "Search" button (7122). The customer also has an option to perform a search by distance. To do so, the customer will need to activate distance search by turning it on (7123). Once on, the customer will enter the number for the distance within which he or she wants the system to perform a search, for instance, 1.5 miles (7124) and click the "Search" button (7125). The customer will then see his or her pool of available potential service providers identified by the system within the preset search parameters by both time (7113) and distance (7115) on his or her electronic map display. In this depiction, search parameter B (7113) reflects the geographic zone resulting from the search by time within the ten-minute parameters which identifies two service providers, P4 (7126) and P3 (7128) and one customer requesting services, customer C1 him/herself (7112), as seen from the "S2 vs. D1" set of indicators E (7114) displayed within that parameters, where "S" stands for supply and "D" stands for demand. Service Provider P4's information is provided by a set of indicators (7127) showing "RPT; 50%; $115; 15% ↑; $15 ↑; ETA:1 Min" meaning that he or she is a regular service Provider for transport service "RPT," and that he or she has a 50% route familiarity with the requested route in the service request. His or her proposed price is $115, which is 15 percent or $15 higher than the default price, and his or her estimated time of arrival to the requested pickup location is 1 minute, "ETA: 1 Min."

In addition to Service Provider P4's indicators information, there are also various action buttons that allow the customer to perform different actions regarding Service Provider P4's price proposal, pressing the button with a check mark allows the customer to accept the final price with this service provider; pressing the X button allows the customer to reject this service provider; pressing the bi-arrow button allows the customer to exchange supply and demand information with Service Provider P4; pressing the "P/C" button allows the customer to make a price proposal or counter the price proposed by Service Provider P4. To make his or her price proposal or to counter Service Provider's 4 price proposal, the customer would first enter the amount into the input box on the very right to initiate the negotiation process and then press the "P/C" button (7127). Service Provider P3' information is provided by another set of indicators (7129), showing "RPT; 70; $105,5% ↑; $5 ↑ETA:3 Min." In addition to Service Provider P3's indicators information, there are same action buttons as for Service Provider P4 that allow the customer to perform different actions regarding Service Provider P3's price proposal, such as to accept, reject or initiate the negotiation process (7129).

In this depiction, search parameter C (7115) reflects the geographic zone resulting from the search by distance within 1.5 miles which identifies two more service providers, P1 (7131) and P2 (7133) and two more customers requesting services, customer C2 (7130) and C5 (7135), as seen from the "S4 vs. D3" set of indicators (7116) displayed within that parameters, where "S" stands for supply and "D" stands for demand. Service Provider P1's information is provided by a set of indicators (7132) and Service Provider P2's information is provided by another set of indicators (7134). Service Provider P1's indicators (7132) show "FPT; TMP21; 100%; $95.5% ↓;$5↓; ETA:10 Min." Service Provider P1's indicators are also accompanied by action buttons to allow the customer to perform different actions regarding Service Provider P1's price proposal, Service Provider P2's indicators (7134) show "RPT; TMP3; 10%;$110; 10% ↑;$10 ↑; ETA5 Min." Service Provider P2's indicators are also accompanied by action buttons to allow the customer to perform different actions regarding Service Provider P2's price proposal.

If the customer needs detailed explanation of the information provided by the indicators for each of the displayed service providers, he or she can click on the "List of Service Providers for Customer" button (7134), which will take him or her to the corresponding interface (7136).

One of ordinary skill in the art would appreciate that the interface depicted in FIG. 7O is for illustrative purposes only and there could be other variations to the interface depicted herein.

Figure 7P:
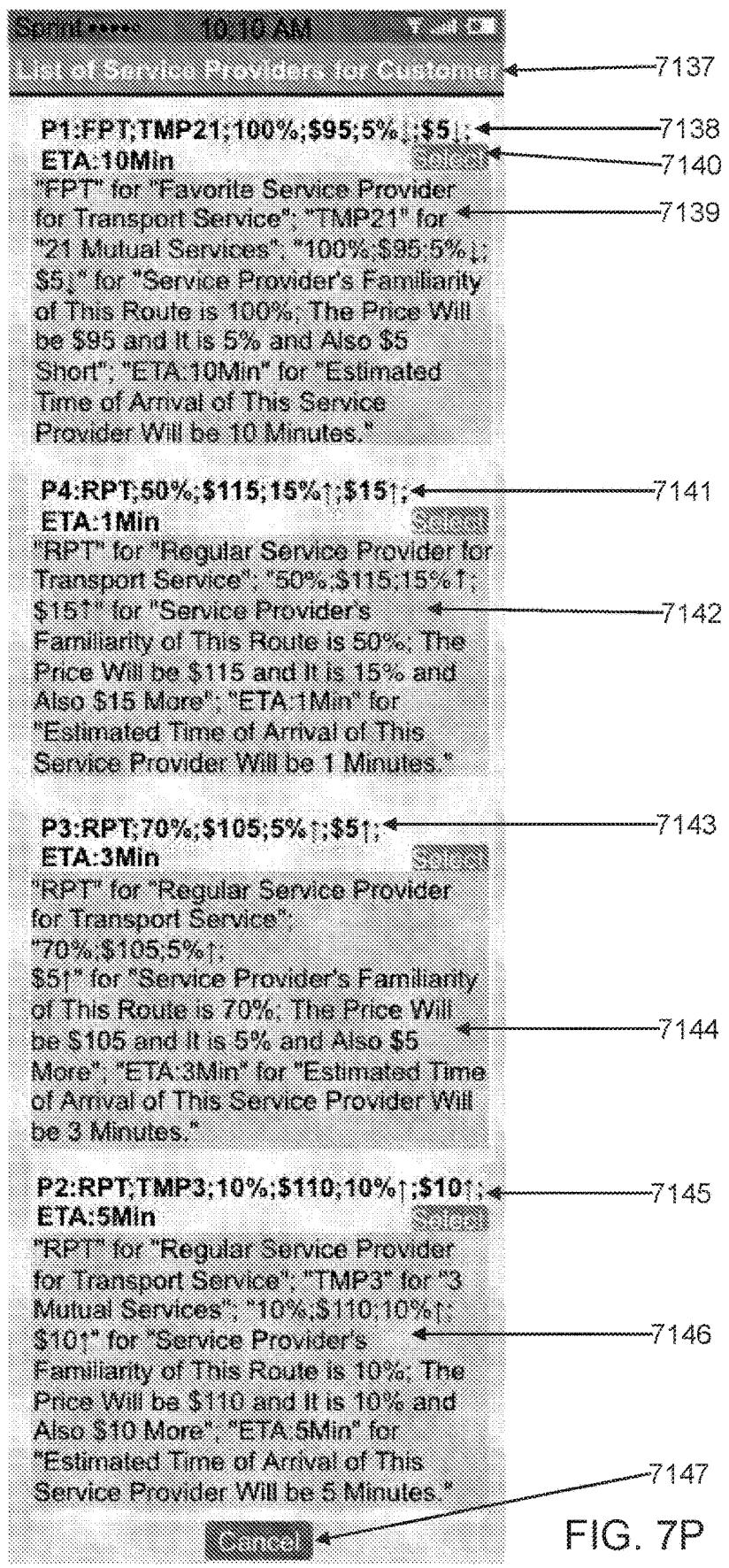
FIG. 7P depicts an exemplary list of service providers for a customer.

FIG. 7P depicts an exemplary list of service providers for a customer (7137). In this figure, the customer sees four service providers and the condensed version of the indicators that the customer would like to see about them: Service Provider P1 (7138), Service Provider P4 (7141), Service Provider P3 (7143), and Service Provider P2 (7145) are listed on this interface. Regarding Service Provider P1 (7138), the customer sees that this service provider is his or her favorite service provider for transport service, "FPT"; that Service Provider P1 has previously completed twenty one service requests with the customer, "TMP21"; that he or she has a hundred percent familiarity with the requested route; that he or she has initiated a price proposal of $95, which is five percent or $5 lower than the default price; and that he or she will arrive at the customer's pickup location within ten minutes, "ETA:10 Min" (7139). If the customer would like to select this service provider, he or she may click the "Select" button (7140), accepting thereby the final price and dispatching this service provider.

With respect to Service Provider P4 (7141), the customer sees that this service provider is a regular service provider for transport service, "RPT"; that he or she has a fifty percent familiarity with the requested route; that he or she has initiated a price proposal of $115, which is fifteen percent or fifteen dollars higher than the default price; and that he or she will arrive at the customer's pickup location within one minute, "ETA:1 Min" (7142). In regards to Service Provider P3 (7143), the customer sees that Service Provider P3 is a regular service provider for transport service, "RPT," who has a seventy percent familiarity with the requested route. It is also shown that he or she has initiated a price proposal of $105, which is five percent or $5 higher than the default price. It is also shown that Service Provider P3 would arrive at the customer's pickup location in three minutes, "ETA:3 Min" (7144). As for Service Provider P2 (7145), the customer sees that he or she is a regular service provider for transport service "RPT", that he or she completed three mutual service requests with Customer C1, "TMP3"; that he or she has a ten percent familiarity with the requested route, and that his or her initiated price proposal is $110, which is ten percent or $10 higher than the default price. Also, the customer sees that the estimated time of arrival for Service Provider P2 is five minutes, "ETA:5 Min" (7146). To select any of these service providers, the customer needs to press the "Select" button. If the customer wants to go back to the electronic map display for Customer's Search Parameters (7111), he or she needs to click the "Cancel" button (7147). One of ordinary skill in the art would appreciate that the list of service providers for a customer depicted in FIG. 7P is for illustrative purposes only as there could be other service providers with other indicators from the ones depicted herein.

Figure 7Q:
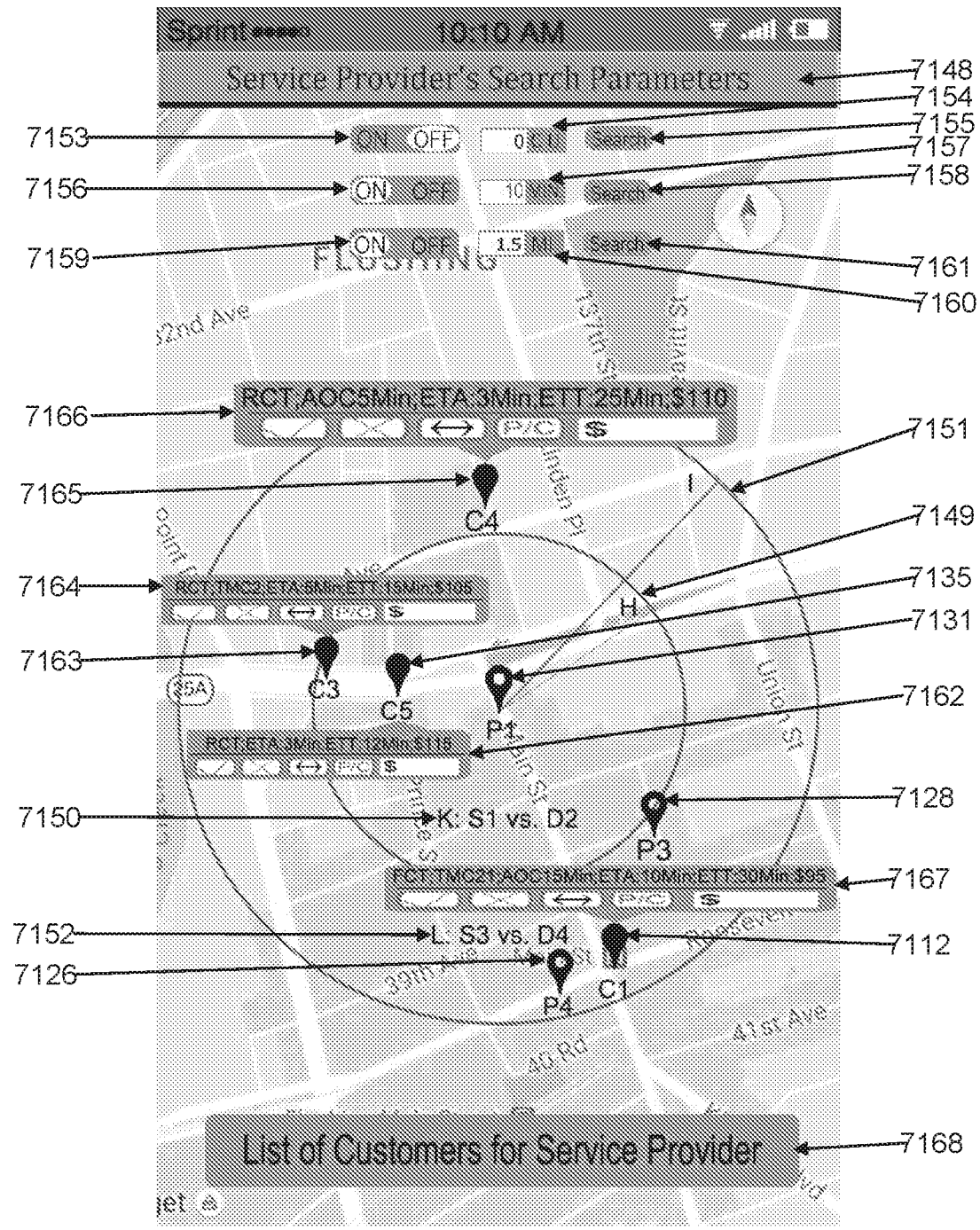
FIG. 7Q depicts an exemplary interface for a service provider's search parameters.

FIG. 7Q depicts an exemplary interface for a service provider's search parameters. This interface is shown on the touch-screen electronic map display of the service provider's computing device (7148), which he or she can interact with by making deals with potential customers. In this depiction, Service Provider P1 (7131), enters his or her search parameters to search for potential available customers who are currently requesting services in the area surrounding his or her current location. In addition to search for potential available customers for his or her type of service, the system will perform a search for other available service providers who are currently available to provide the same type of on-demand services that Service Provider P1 has preset to provide. The service provider has three search parameters which he or she can choose from. He or she can perform a search using one or more or any combination of search parameters. The service provider has an option to perform a search by the number of customers he or she wants to make deals with. In this depiction, this search option is turned off (7153) and the number of customers is therefore displayed as zero (7154). To activate this search parameter, the customer needs to turn it on (7153), enter the desired number (7154), and click the "Search" button (7155). The service provider also has an option to perform a search by time. To do so, he or she will need to activate this option by turning it on (7156), enter the number for the time within which he or she is ready to perform the pickup, for instance, 10 minutes (7157), and click the "Search" button (7158). The service provider also has an option to perform a search by distance. To do so, he or she will need to activate this option by turning it on (7159), enter the number for the number of miles within which he or she is ready to perform the pickup, for instance, 1.5 miles (7160), and click the "Search" button (7161). The service provider will then see his or her pool of potential available customers identified by the system within the preset search parameters by both time (7149) and distance (7151) on his or her map display. In this depiction, search parameter H (7149) reflects the geographic zone resulting from the search by time within the ten-minute parameter which identifies two customers, C3 (7163) and C5 (7135) and one service provider, Service Provider P1 him/herself (7131), as seen from the "S1 vs. D2" set of indicators K (7150) displayed within that parameter, where "S" stands for supply and "D" stands for demand. Customer C3's information is provided by a set of indicators (7164) showing "RCT; TMC2; ETA:5 Min; ETT:15 Min;$105" meaning that he or she is a regular customer for transport service "RCT," and that he or she has completed two mutual service requests with Service Provider P1, "TMC2"; also that the estimated time of arrival to the pickup location of Customer C3 is five minutes "ETA:5 Min," that estimated travel time from the requested pickup location to the requested drop off location is fifteen minutes, "ETT:15 Min," and that his or her proposed price is $105.

In addition to Customer C3's indicators information, there are also various action buttons that allow the service provider to perform different actions regarding Customer C3's price proposal: pressing the button with a check mark allows the service provider to accept the service request from this customer; pressing the X button allows the service provider to reject this customer's service request; pressing the bi-arrow button allows the service provider to exchange supply and demand information with Customer C3; pressing the "P/C" button allows the service provider to make a price proposal or counter the price proposed by Customer C3. To make his or her price proposal or to counter Customer C3's price proposal, the service provider would first enter the amount into the input box on the very right to initiate the negotiation process and then press the "P/C" button (7164). Customer C5's information is provided by another set of indicators (7162), showing "RCT; ETA:3 Min; ETT:12 Min; $115." In addition to Customer C5's indicators information, there are same action buttons as for Customer C3 that allow the service provider to perform different actions regarding Customer C5's price proposal, such as to accept, reject or initiate the negotiation process.

In this depiction, search parameter I (7151) reflects the geographic zone resulting from the search by distance within the 1.5 mile search parameter identifies two more customers, C1 (7112) and C4 (7165) requesting services and two more service providers currently providing services, service providers P3 (7128) and P4 (7126), as seen from the "S3 vs. D4" set of indicators L (7152) displayed within that search parameter, where "S" stands for supply and "D" stands for demand. Customer C1's information is provided by a set of indicators (7167) and Customer C4's information is provided by another set of indicators (7166). Customer C1's indicators (7167) show "FCT: TMC21; AOC15 Min; ETA: 10 Min; ETT:3 Min; $95," Customer C1's indicators are also accompanied by action buttons to allow the service provider to perform different actions regarding Customer C1's price proposal. Customer C4's indicators (7166) show "RCT; AOC:5 Min; ETA; 3 Min; ETT:25 Min; $110." Customer C4's indicators are also accompanied by action buttons to allow the service provider to perform different actions regarding Customer C4's price proposal.

If the service provider needs detailed explanation of the information provided by the indicators for each of the displayed customers, he or she can click on the "List of Customers for Service Provider" button (7168), which will take him or her to the corresponding interface (7169).

It, is to be understood by one skilled in the art that the indicators vary in this example due to at least two factors. The first factor is that the customers may not have provided all of the information they possibly can when making their service request for example, Customer C3 (7163) did not provide timing information for the "AOC" indicator, so the service provider may not know how long this customer's service request will remain active for. The second factor has to do with which sets of indicators Service Provider P1 wants to have displayed to him or her which is solely at his or her discretion, as is the order in which those indicators are displayed. In this example, it is shown that the service provider preset not to have the complete set of pricing indicators displayed to him or her, as the indicators that indicate the difference between the price proposed by customers and the default price are not included.

Figure 7R:
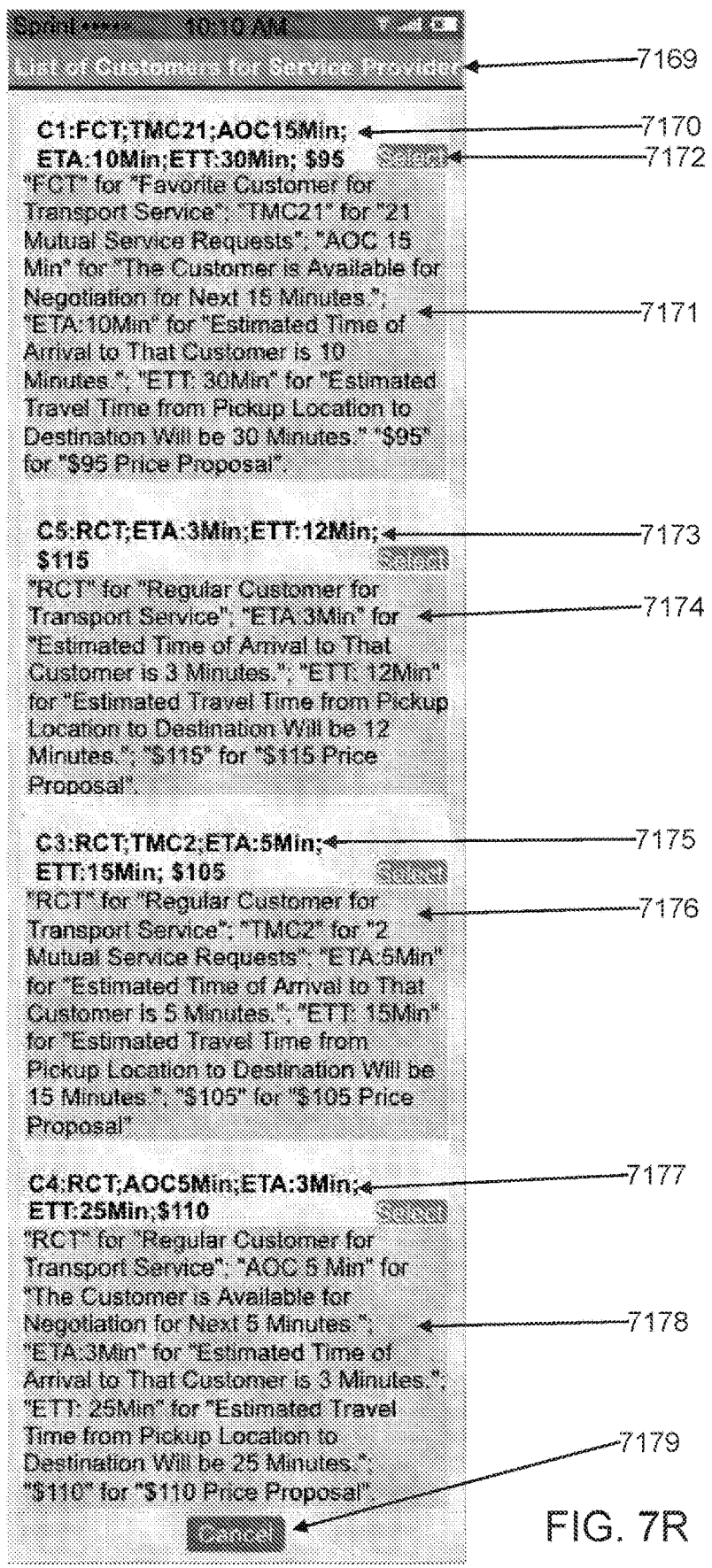
FIG. 7R depicts an exemplary list of customers for a service provider.

One of ordinary skill in the art would appreciate that the interface depicted in FIG. 7O is for illustrative purposes only and there could be other variations to the interface depicted herein. FIG. 7R depicts an exemplary list of customers for a service provider (7169). In this figure, the service provider sees four customers and the condensed version of the indicators that the service provider would like to see about them: Customer C1 (7170), Customer C5 (7173), Customer C3 (7175), and Customer C4 (7177) are listed on this interface. Regarding Customer C1, the service provider sees that Customer C1 (7170) is on his or her favorites list for transport service, "FCT," with whom the service provider has completed twenty-one mutual service requests, "TMC21." Further, the service provider sees "AOC15 Min" which means that Customer C I will be available for negotiation for the next fifteen minutes; that it would take ten minutes to arrive at the requested pickup location, "ETA:10 Min."; that the service request would take thirty minutes to complete, as seen by "ETT:30 Min.," and that his or her price proposal is $95 (7171). If the service provider would like to select this customer, he or she may click the "Select" button (7172), accepting thereby the final price and notifying the customer of his or her request acceptance. With respect to Customer C5 (7173), service provider sees that this customer is a regular service provider for transport service, "RCT"; that it would take three minutes to arrive at the requested pickup location, "ETA:3 Min"; that the service request would take twelve minutes to complete, as seen by "ETT:12 Min," and that his or her price proposal is $115 (7174). The next listed customer is Customer C3 (7175), whose indicators show that he or she is a regular customer for transport service, "RCT," and that he or she has completed two mutual service requests with this service provider; "TMC2." that it would take five minutes to arrive at the requested pickup location, "ETA:5 Min"; that the service request would take fifteen minutes to complete, as seen by "ETT: 1.5 Min.," and that his or her proposed price is $105 (7176). In regards to Customer C4 (7177), the service provider sees that this customer is a regular customer for transport service, "RCT." Further, the service provider sees "AOC5 Min" which means that Customer C3 will be available for negotiation for the next five minutes; that it would take three minutes to arrive at the requested pickup location, "ETA:3 Min."; that the service request would take twenty-five minutes to complete "ETT:25 Min."; and that his or her price proposal is $110 (7178). The service provider may select any customer for his or her request by clicking the "Select" button. If the service provider would like to go back to the previous page; he or she can click the "Cancel" button (7179) to go back to the electronic map display.

One of ordinary skill in the art would appreciate that the list of customers for a service provider depicted in FIG. 7R is for illustrative purposes only as there could be other customers with other indicators from the ones depicted herein.

Figure 7S:
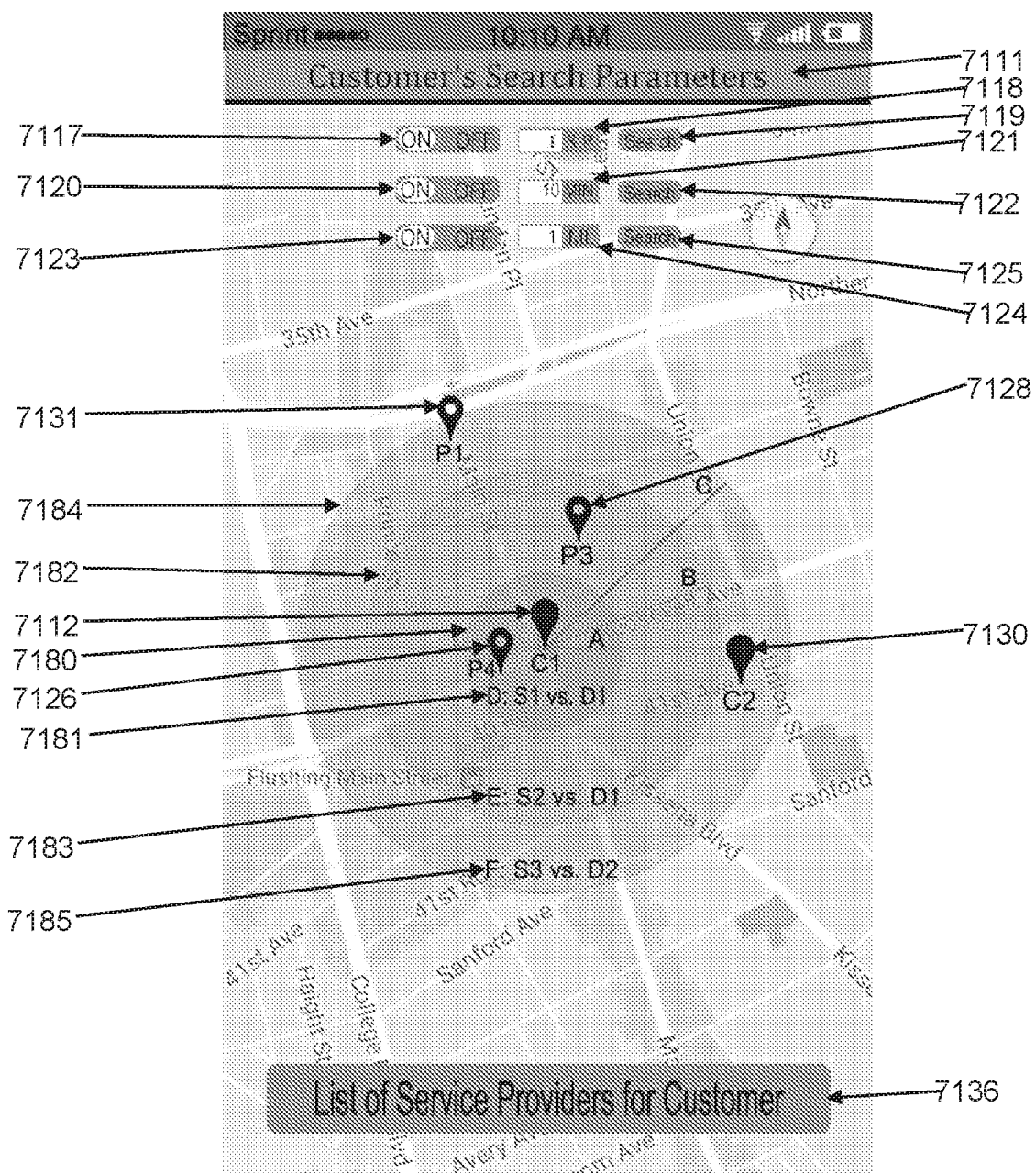
FIGS. 7S-7T depict exemplary interfaces for a customer's search parameters.

FIG. 7S depicts an exemplary interface for a customer's search parameters, which shows potential available service providers based on customer's search parameters (7111). In this figure, the customer, Customer C1 (7112); is displayed three options for search parameters, which he or she can choose from. He or she can perform a search using one or more or any combination of search parameters. The customer has an option to perform a search by the number of service providers he or she wants to negotiate with. To do so, he or she will need to activate this option by turning it on (7117), enter the desired number of service providers, for instance; one (7118); and click the "Search" button (7119). The customer also has an option to perform a search by time. To do so, he or she will need to activate this option by turning it on (7120), enter the number for the time within which he or she wants the pickup to occur, for instance, 10 minutes (7121); and click the "Search" button (7122). The customer has a third option to perform a search by distance. To do so, the customer will need to activate distance search by turning it on (7123). Once on, the customer will enter the number for the distance within which he or she wants the system to perforin a search, for instance, 1 mile (7124), and click the "Search" button (7125). The system will then perform a search in accordance with the customer's preset search parameters by distance, time, and the desired number of service providers.

According to this exemplary depiction, search parameter A (7180) is based on the desired number of service providers; search parameter B (7182) is based on time; and search parameter C (7184) is based on distance. Search parameter A, in this example, reflects the geographic zone with one service provider, P4 (7126) and one customer, Customer C1 him/herself (7112). As a result, based solely on this search parameter, the system has identified that the supply is one service provider, P4, and the demand is one customer, C1, as indicated by the S1 vs. D1 set of indicators D (7181) within this search parameter. Search parameter B reflects the geographic zone with two service providers, P4 and P3 (7128), and zero additional customers. As a result, the supply and demand within this search parameter is indicated by the S2 vs. D1 set of indicators E (7183). Search parameter C reflects the geographic zone with a total of three service providers, P4, P3, and Pt (7131) and one other customer, C2 (7130) in addition to C1. As a result, the identified supply and demand within this search parameter is indicated by the S3 vs. D2 set of indicators F (7185), where there are three potential available service providers and two customers. If the customer needs to see detailed information about each of the displayed service providers, he or she can click on the "List of Service Providers for Customer" button (7136), which will take him or her to the corresponding interface (7137).

Figure 7T:
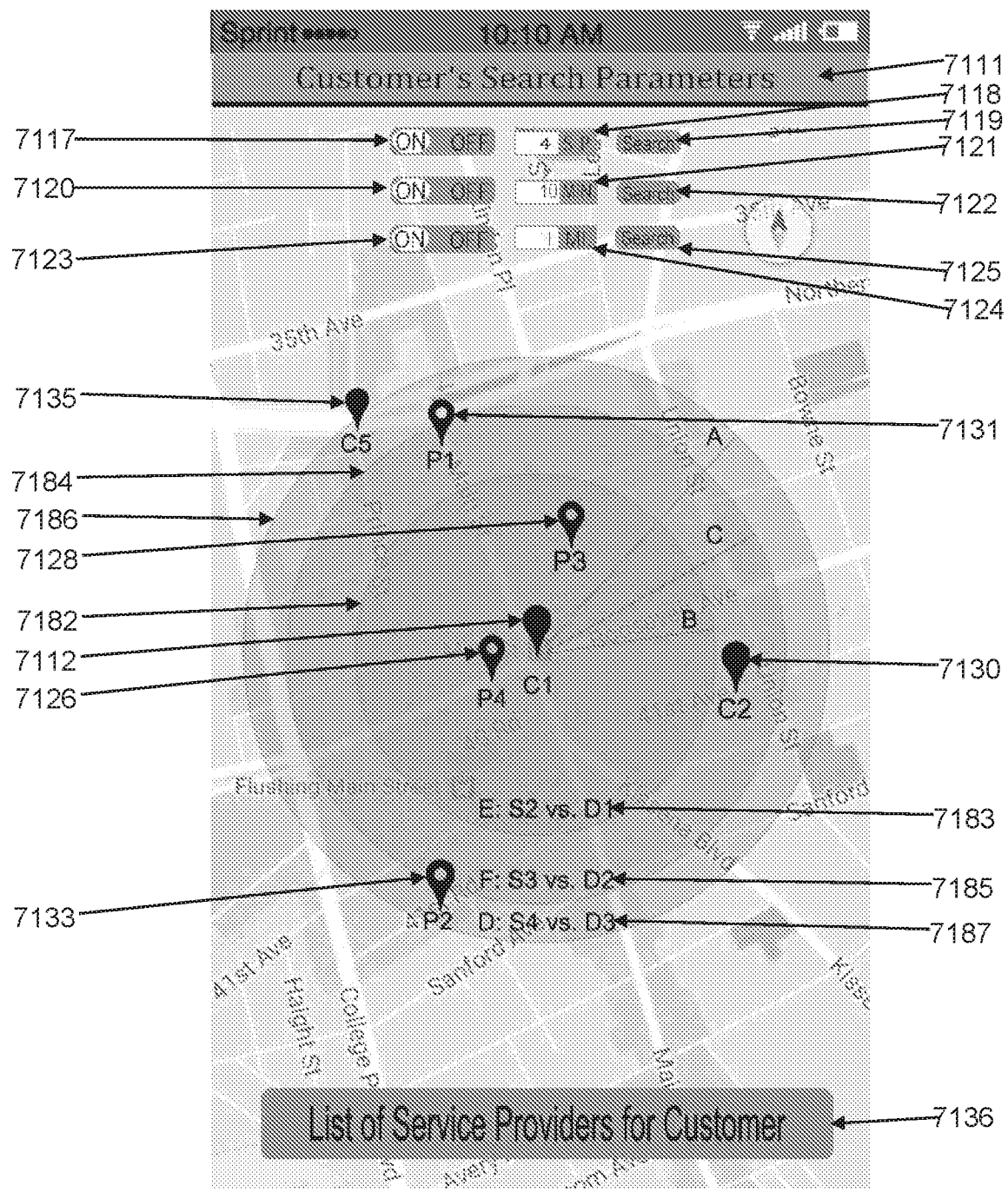

FIG. 7T depicts another exemplary interface for a customer's search parameters (7111). In this figure, the customer, Customer C1 (7112), is displayed three options for search parameters, which he or she can choose from. He or she can perform a search using one or more or any combination of search parameters. The customer has an option to perform a search by the number of service providers he or she wants to negotiate with. To do so, he or she will need to activate this option by turning it on (7117), enter the desired number of service providers, for instance, four (7118), and click the "Search" button (7119). The customer also has an option to perform a search by time. To do so, he or she will need to activate this option by turning it on (7120), enter the number for the time within which he or she wants the pickup to occur, for instance, 10 minutes (7121), and click the "Search" button (7122). The customer has a third option to perform a search by distance. To do so, the customer will need to activate distance search by turning it on (7123). Once on, the customer will enter the number for the distance within which he or she wants the system to perform a search, for instance, 1 mile (7124), and click the "Search" button (7125). The system will then perform a search in accordance with the customer's preset search parameters by distance, time, and the desired number of service providers.

According to this depiction, search parameter B (7182) is based on time and reflects the smallest sized geographic zone within which the system has identified two service providers, service provider P3 (7128) and service provider P4 (7126), and one customer, Customer C1 him/herself (7112). As a result, based solely on time search parameter, the system has identified the supply and demand as two service providers and one customer, which is shown by the S2 vs. D1 set of indicators E (7183) on the electronic map display. Search parameter C (7184) is based on distance and reflects the second largest geographic zone. As seen from the example, this search parameter has produced one more service provider, P1 (7131) and one more customer, C2 (7130), resulting in the supply and demand shown by the S3 vs. D2 set of indicators F (7185). Search parameter A (7186) is based on number of service providers Customer C1 wants to negotiate with and reflects the largest geographic zone out of all. Based on this search parameter, one more service provider, P2 (7133) has been identified by the system along with one more customer, C5 (7135), which brings the number of possible service providers to the total of four and the number of potential available customers to the total of three shown by the S4 vs. D3 set of indicators D (7187). If the customer needs to see detailed information about each of the displayed service providers, he or she can click on the "List of Service Providers for Customer" button (7136), which will take him or her to the corresponding interface (7137).

In this depiction, the customer's largest sized search parameter, search parameter A, relates to the number of available potential service providers the customer wants to negotiate with. According to exemplary embodiments, when the system fails to identify a desired number of available potential service providers that the customer would like to have displayed to him or her using time and distance search parameters, it automatically expands the search parameters to reach that desired number of available potential service providers. The extreme point of such search parameters is the location of one or more service providers whose current location is the farthest away from the center point, the customer's pickup location. In this depiction, the extreme point for search parameter A is based on the location of service provider P2 (7133).

One of ordinary skill in the art would appreciate that the interfaces depicted in FIGS. 7S-7T are for illustrative purposes only, and there could be other variations to the interface for a customer's search parameters depicted herein.

Figure 7U:
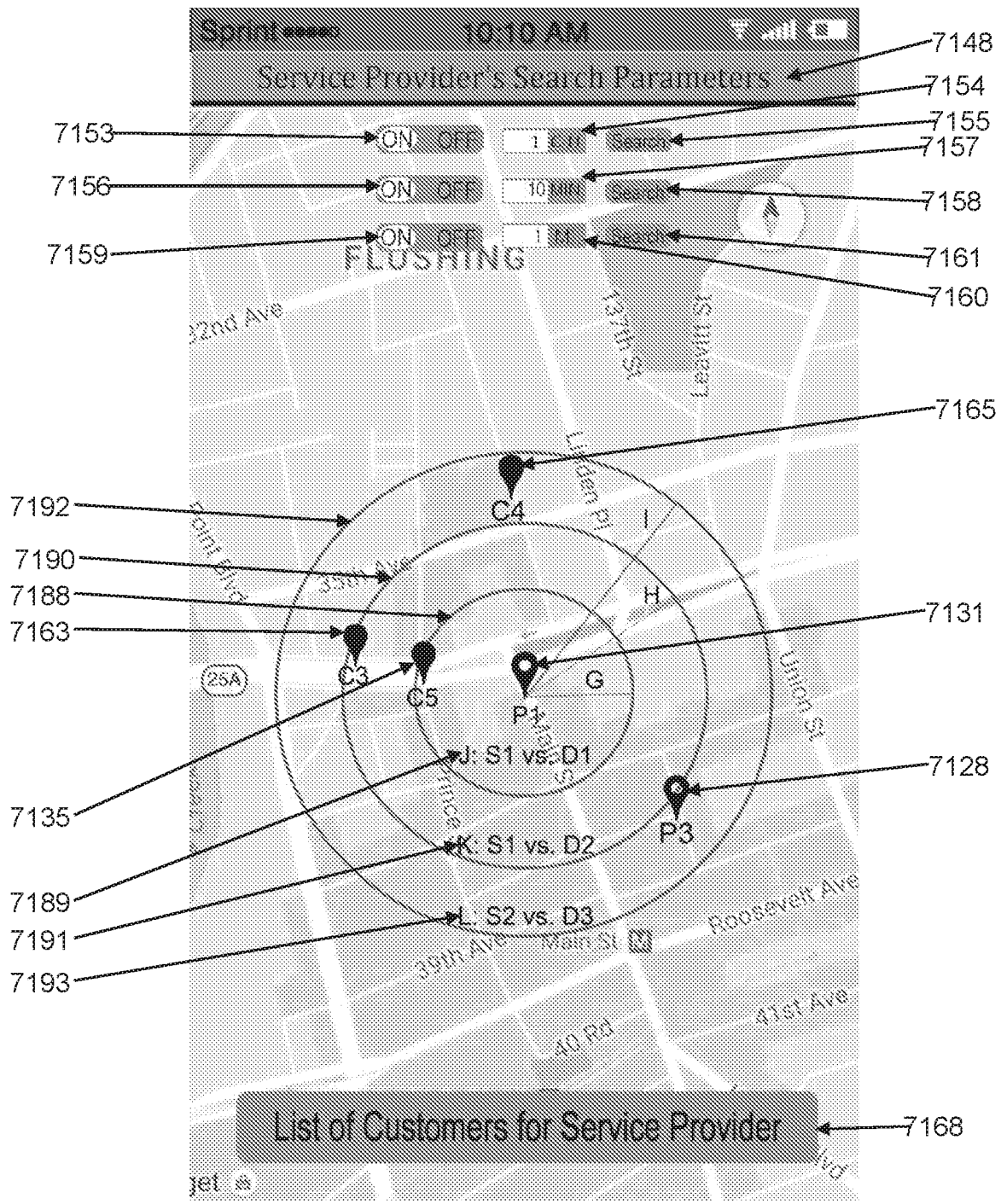
FIGS. 7U-7V depict exemplary interfaces for a service provider's search parameters.

FIG. 7U depicts an exemplary interface for a service provider's search parameters, which shows potential available customers based on service provider's search parameters (7148). In this figure, the service provider, P1 (7131), is displayed three search parameters, which he or she can choose from. He or she can perform a search using one or more or any combination of these search parameters. The service provider has an option to perform a search by the number of customers he or she wants to make deals with. To do so, he or she will need to activate this option by turning it on (7153), enter the desired number of customers, for instance, one (7154), and click the "Search" button (7155). The service provider also has an option to perform a search by time. To do so, he or she will need to activate this option by turning it on (7156), enter the number for the time within which he or she wants to perform the pickup, for instance, 10 minutes (7157), and click the "Search" button (7158). The service provider has a third option to perform a search by distance. To do so, the service provider will need to activate distance search by turning it on (7159). Once on, the service provider will enter the number for the distance within which he or she wants the system to perform a search, for instance, 1 mile (7160) and click the "Search" button (7161). The system will then perform a search in accordance with the service provider's preset search parameters by desired number of customers, the time and distance.

According to this depiction, search parameter G (7188) is based on the number of customers that Service Provider P1 (7131) wants to make deals with and is the smallest sized geographic zone within which the system has identified one customer, C5 (7135) and one service provider, Service Provider P1 him/herself. As a result, based solely on this search parameter, the system has identified the supply and demand as one service provider and one customer, which is shown by the S1 vs. D1 set of indicators J (7189) on the electronic map display. Search parameter H (7190) is based on time and reflects the second largest geographic zone. As seen from the example, this search parameter has produced one more customer, C3 (7163) and zero additional service providers, resulting in the supply and demand as shown by the S1 vs. D2 set of indicators K (7191). Search parameter I (7192) is based on distance and reflects the largest geographic zone out of all. Based on this search parameter, one more customer, C4 (7165) and one more service provider, P3 (7128) has been identified by the system, which brings the number of possible customers to the total of three and the total number of service providers to the total of two, shown by the S2 vs. D3 set of indicators L (7193). If the service provider needs to see detailed information about each of the displayed customers, he or she can click on the "List of Customers for Service Provider" button (7168), which will take him or her to the corresponding interface (7169).

In this depiction, the service provider's smallest sized search parameter, search parameter A, relates to the number of available potential customers that the service provider wants to make deals with. According to exemplary embodiments, when the system identifies a certain number of available customers that the service provider would like to have displayed to him or her within a smaller search parameter than the search parameter of time or distance search parameter, it automatically shrinks the search parameters to only display the desired number of customers who are within the shortest time away from the service provider.

Figure 7V:
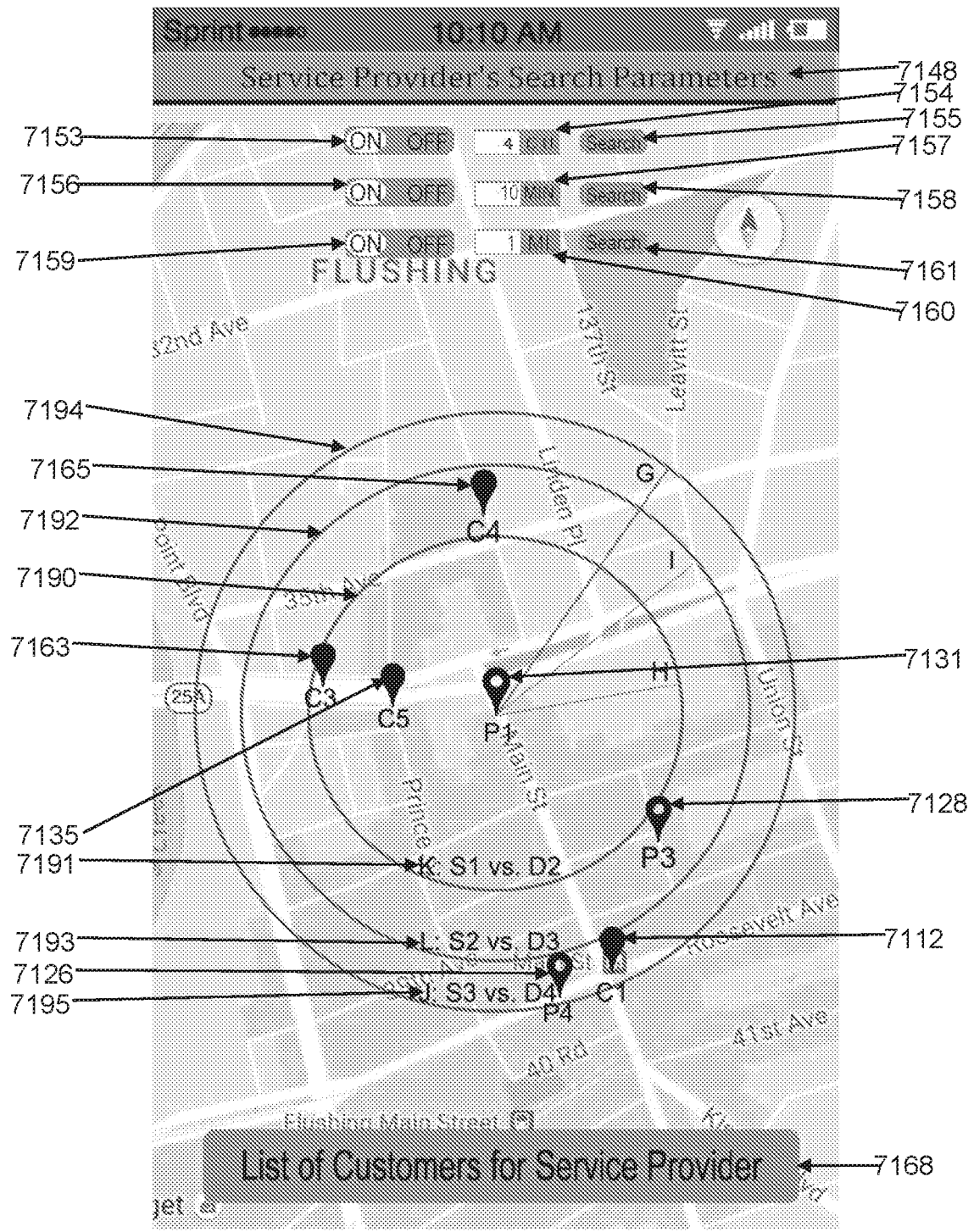

FIG. 7V depicts another exemplary interface for a service provider's search parameters, which shows potential available customers based on service provider's search parameters (7148). In this figure, the service provider, P1 (7131), is displayed three search parameters, which he or she can choose from. He or she can perform a search using one or more or any combination of these search parameters. The service provider has an option to perform a search by the number of customers he or she wants to make deals with. To do so, he or she will need to activate this option by turning it on (7153), enter the desired number of customers, for instance, four (7154), and click the "Search" button (7155). The service provider also has an option to perform a search by time. To do so, he or she will need to activate this option by turning it on (7156), enter the number for the time within which he or she wants to perform the pickup, for instance, 10 minutes (7157), and click the "Search" button (7158). The service provider has a third option to perform a search by distance. To do so, the service provider will need to activate distance search by turning it on (7159). Once on, the service provider will enter the number for the distance within which he or she wants the system to perform a search, for instance, 1 mile (7160) and click the "Search" button (7161). The system will then perform a search in accordance with the service provider's preset search parameters by distance, time, and the desired number of customers.

In this depiction, search parameter H (7190) is based on time and reflects the smallest sized geographic zone within which the system has identified two customers, customer C3 (7163) and customer C5 (7135). As a result, based solely on time search parameter, the system has identified the supply and demand as one service provider, service provider P1 him/herself, and two customers, which is shown by the S1 vs. D2 set of indicators K (7191) on the electronic map display. Search parameter I (7192) is based on distance and is the second largest geographic zone. As seen from the example, this search parameter has produced one more customer, C4 (7165) and one more service provider, P3 (7128), resulting in the supply and demand as show by the S2 vs. D3 set of indicators L (7193). Search parameter G (7194) is based on the number of customers Service Provider P1 wants to make deals with and reflects the largest geographic zone out of all. Based on this search parameter, one more customer, C1 (7112), and one more service provider, P4 (7126) has been identified by the system, which brings the number of possible customers to the total of four and the number of service providers to the total of three, shown by the S3 vs. D4 set of indicators J (7195). If the service provider needs to see detailed information about each of the displayed customers, he or she can click the "List of Customers for Service Provider" button (7168), which will take him or her to the corresponding interface (7169).

In this depiction, the service provider's largest sized search parameter, search parameter A, relates to the number of available potential customers that the service provider wants to make deals with. According to exemplary embodiments, when the system fails to identify a desired number of available potential customers that the service provider would like to have displayed to him or her using time and distance search parameters, it automatically expands the search parameters to reach that desired number of available potential customers. The extreme point of such search parameters is the location of one or more customers whose current location is the furthest away from the center point, the service provider's current location. In this depiction, the extreme point for search parameter A is based on the location of customer C1 (7112). One of ordinary skill in the art would appreciate that the interfaces depicted in FIGS. 7U-7V are for illustrative purposes only, and there could be other variations to the interface for a service provider's search parameters depicted herein.

It is to be understood by one skilled in the art, that the interfaces along with all the elements depicted in FIGS. 7O, 7Q, 7S, 7T, 7U, and 7V are for illustrative purposes only.

Figure 8A:
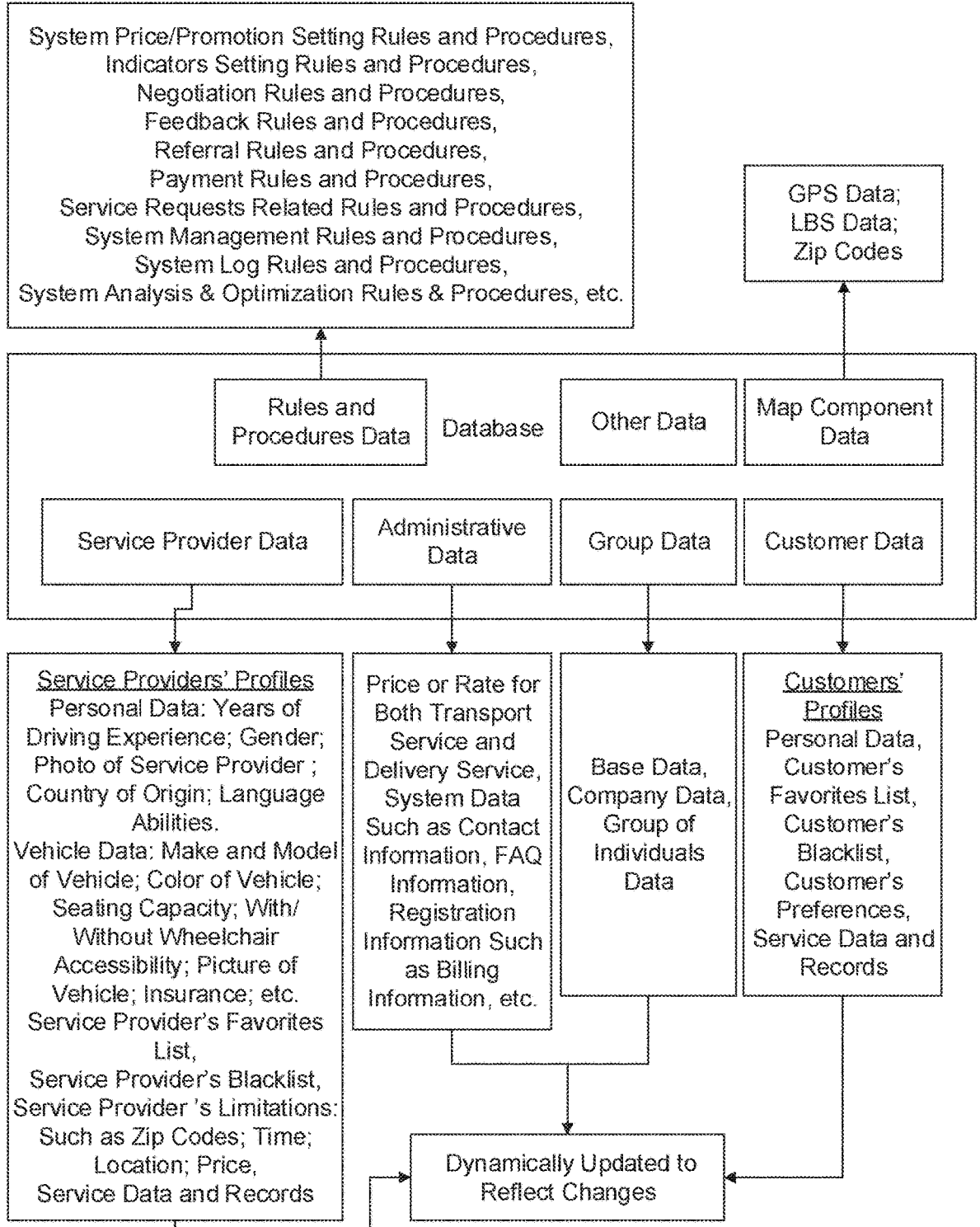
FIG. 8A depicts a schematic diagram of exemplary database components.

FIG. 8A depicts a schematic diagram of exemplary database components. The system accesses all the information stored in the database. The database contains information for both delivery service and transport service. The database includes rules and procedures data, service provider data, administrative data, group data, customer data, map component data, as well as other data.

Rules and procedures data includes system price, promotion setting rules and procedures as well as rules and procedures for indicators setting, negotiation, feedback, referral, payment, service requests, system management, system log, system analysis and optimization, etc.

The map component data stores map data for all delivery service and transport service requests that are identified by the GPS and LBS. The GPS and LBS data determine the location of the computing devices in different ways, for example, through receiving location-based resources.

Service provider data includes service providers' profiles, such as personal data including a photo of the service provider and years of his or her driving experience, gender, country of origin, and language abilities. The database also includes data related to service provider's vehicle, such as make and model, color, seating capacity and accessibility, insurance status, and even pictures of the vehicle. Additional information in the service provider's profile may include such information as service provider's favorites list and blacklist, limitations related to zip codes, time, location, and price, as well as service data and records.

The database further includes administrative data comprising prices and rates, system data, such as contact and FAQ information, registration details regarding customers and service providers, for instance, billing information or other information related to administering the on-demand service application. Group data includes base data, company data, or a group of individuals data. Customer data comprises customers' profiles including personal data, customer's favorites list, customer's blacklist, customer's preferences, service requests data, and records.

One of ordinary skill in the art would appreciate that this database syncs dynamically, so that whenever there are changes or updates in data blocks, the server and database will dynamically update the data accordingly to reflect the latest changes. In addition to that, there is at least one backup database that will backup primary database in case of data loss in the primary database. In addition, one of ordinary skill in the art would appreciate that the database components may vary from the ones depicted herein.

Figure 8B:
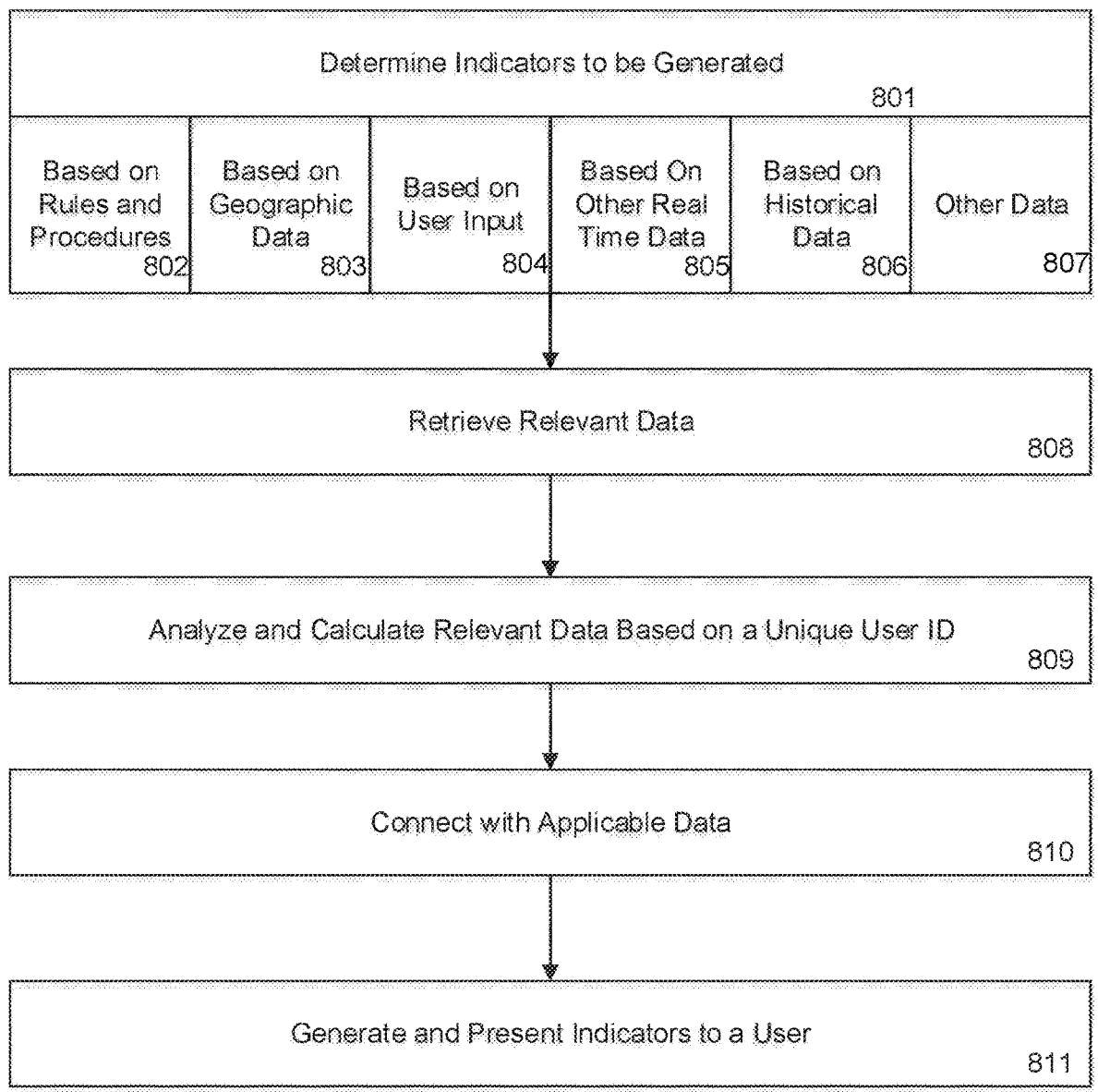
FIG. 8B depicts an exemplary workflow of generating indicators.

FIG. 8B depicts an exemplary workflow of generating indicators. First, the system determines indicators to be generated (801) based on at least the following factors: rules and procedures (802), geographic data (803), user input (804), other real-time data (805), historical data (806), and other data, such as preset preferences, limitations to reflect through indicators (807), where user input gives context to the system for the system to query relevant rules and procedures, geographic, historical, other real-time data, and other data from the database. The system then retrieves the data relevant to the indicators to be generated (808), analyzes and calculates relevant data based on a unique user ID (809). Once the data has been analyzed, the system connects indicators with applicable data to provide relevant information for a user (810). Finally, the system generates and presents indicators to a user (811). One of ordinary skill in the art would appreciate that the process described herein not exclusive, and that the process of generating one or more sets of indicators could include the steps that differ from the steps described herein.

FIG. 9A depicts exemplary service preferences for a customer (900) that include but not limited to preferences related to pickup location (901), drop off location (902), make, model, and type of vehicle (903), years of driving experience (904), number of completed service requests (905), seating capacity (906), gender (907), language spoken (908), service provider category (Step 909), accessibility (910), pets accommodation (911), baby seat availability (912), ETA (estimated time of arrival) (913), familiarity (914), price negotiations (915), weight of goods (916), and size of goods (917). Pickup location preference (901) allows a customer to identify his or her pickup location. Drop off location preference (902) allows a customer to identify his or her drop off location (902). Make, model and type of vehicle preference (903) allows a customer to specify the make, model, and type of vehicle he or she prefers for his or her service request. Years of driving experience preference (904) allows a customer to preset the number of years he or she prefers his or her service provider to have. Number of completed service requests preference (905) allows a customer to specify the number of service requests that a service provider should have completed to receive a service request from this customer.

Seating capacity preference (906) allows a customer to specify the number of passengers for his or her service request. Gender preference (907) allows a customer to choose a service provider of a certain gender. Language spoken preference (908) allows a customer to choose a service provider speaking a certain language. Service provider category (909) allows a customer to preset a preference to regular or favorite service providers. Accessibility preference (910) allows a customer to preset a preference for service providers whose vehicle is equipped for special accessibility or who can provide some sort of special accessibility equipment, for example, a customer can preset to send his or her service request to service provider whose vehicle is equipped to transport of deliver a bicycle, or who can provide a wheelchair. Pets accommodation (911) allows a customer to preset a preference for service requests who are able to accommodate pets or who can provide some sort of special equipment for transporting and delivering pets. Baby seat availability preference (912) allows a customer to request a service provider who can provide a baby seat. ETA preference (913) allows a customer to send his or her service request to service provider whose estimated time of arrival is within certain time. Familiarity preference (914) allows a customer to preset a certain percentage for how familiar a service provider should be with a requested route. Price negotiations preference (915) allows a customer to preset an automatic rejection of any price proposal initiated by a service provider or any price response from a service provide which is a certain amount or a percentage above the default price. Weight of goods preference (916) allows a customer to request a service provider who can handle and accommodate goods of certain weight. Size of goods (917) allows a customer to request a service provider who can handle and accommodate goods of certain size. According to the exemplary embodiment of the present invention, a customer can preset his or her preferences to let the system know what he or she prefers his or her service to be like.

One of ordinary skill in the art would appreciate that the list of customer's service preferences depicted in FIG. 9A is for illustrative purposes only, and that a customer could have other preferences related to his or her service request.

FIG. 9B depicts exemplary service limitations for a service provider (918) that include but not limited to limitations related to customer category (919), service time (920), return location and time (921), service area (922), accessibility (923), number of passengers (924), type of goods (925), weight of goods (926), size of goods (927), allergy (928), pets accommodation (929), baby seat (930), price negotiations (931), payment method (932). Customer category limitation (919) allows a service provider to preclude him or her from receiving service requests from customers of certain category, for example, to not provide services to regular customers. Service time limitation (920) allows a service provider to preset the time he or she is not available to provide service. This could be the time passed which a service provider is not willing to work. Return location and time limitation (921) allows a service provider to preset a certain location where he or she wants to be at a certain preset time. Service area limitation (922) allows a service provider to preset one or more geographic zones where he or she is not willing to provider services, for example, based on one or more zip codes. Accessibility limitation (923) allows a service provider to preclude him or her from receiving service request which require special accessibility or some sort of special accessibility equipment, for example, a service provider can preset to automatically reject service requests which involve transporting or delivering bicycles, or which require a service provider to provide a wheelchair.

Number of passenger's limitation (924) allows a service provider to limit the number of passenger he or she can have in his or her car at a time, for example, to no more than three passengers. Type of goods limitation (925) allows a service provider to define the type of goods he or she is not willing to deliver, for example, high value or fragile goods. Weight of goods limitation (926) allows a service provider to preset a certain limit to the weight of goods he or she is willing to deliver. Size of goods limitation (927) allows a service provider to preset a limit to the size of goods he or she is willing to deliver. Allergy limitation (928) allows a service provider to define items he or she is not willing to deliver or transport due to his or her allergies to these items. Accommodation for pets limitation (929) allows a service provider to preclude him or her from receiving service requests which involve transporting or delivering pets or which require some sort of special equipment for transporting and delivering pets. Baby seat limitation (930) allows a service provider to preclude him or her from receiving service requests which require a baby seat. Price negotiations limitation (931) allows a service provider to preset an automatic rejection of any service requests with the price a certain amount or a percentage bellow the default price. Payment limitation (932) allows a service provider to preclude him or her from receiving service requests from a customer who use a certain payment method, for example, to automatically reject any cash paying service requests. According to the exemplary embodiment of the present invention, a service provider can preset his or her limitations to let the system know what he or she does not want in providing his or her services.

One of ordinary skill in the art would appreciate that the list of service provider's service limitations in FIG. 9B is not exclusive, and that a service provider could have other limitations related to his or her service.

Figure 9C:
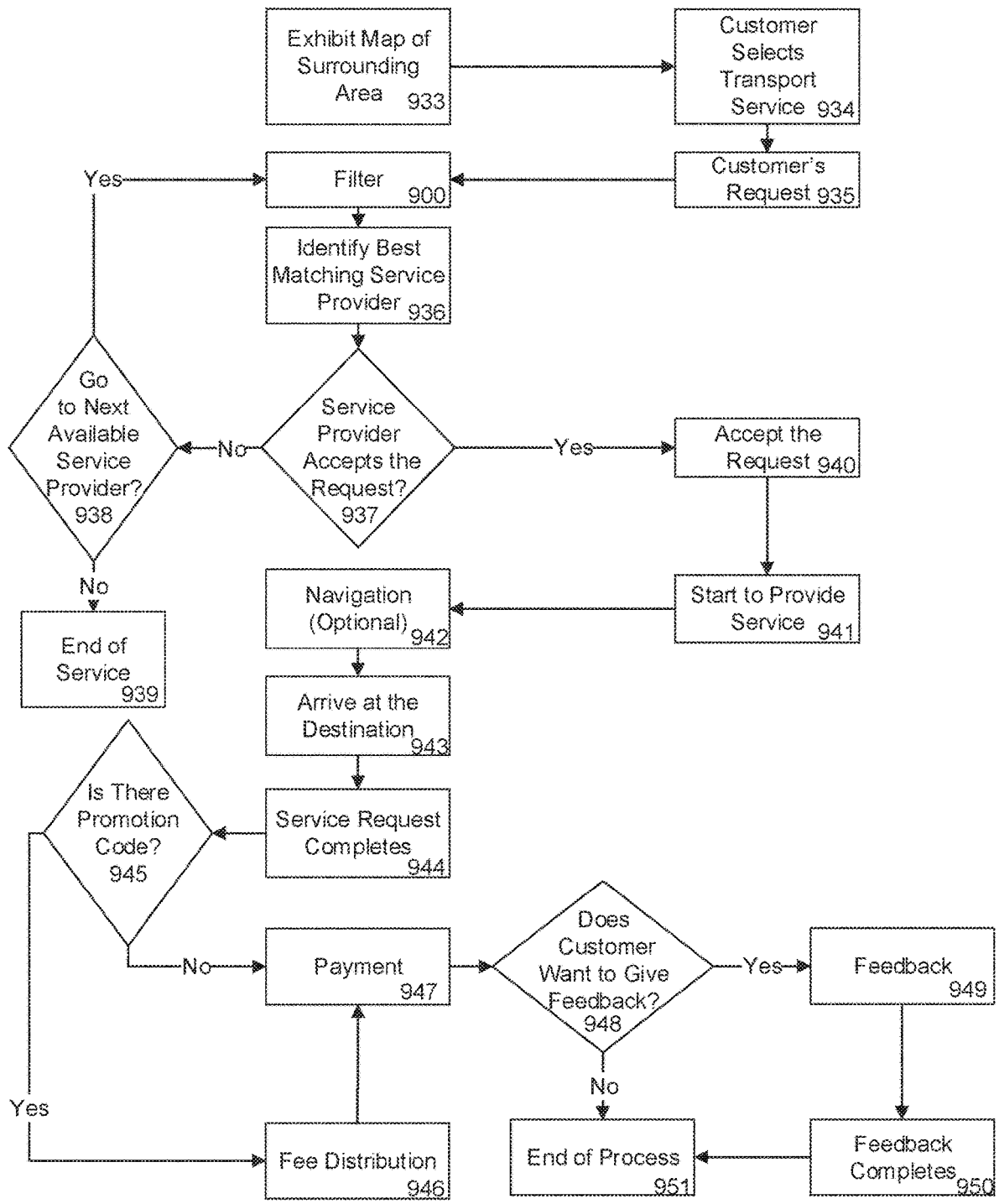
FIG. 9C depicts an exemplary workflow for a customer to request a transport service.

FIG. 9C depicts an exemplary workflow for a customer to request a transport service. The customer starts by requesting to view the map of surrounding area (Step 933) and selecting the type of service as transport service (Step 934). Then the customer confirms a request (Step 935). The customer can then use the filter (Step 900) to identify the best matching service provider (Step 936). The service provider then accepts or declines the service request (Decision 937). If the service provider rejects the request, then the request goes to the next available service provider (Decision 938), who is matched with the service request based on the filter options (Step 900) until a service provider accepts the request (Step 940), and the service provider is dispatched to carry out requested service (Step 941). Or, if there is no next available service provider to accept the request, then the service ends (Step 939).

After a service provider accepts the request (Step 940), he or she is dispatched to carry out the service request (Step 941). While carrying out the requested service, the service provider has an option of using navigation (Step 942). Once he or she arrives at the destination (Step 943), the system marks the service request as complete (Step 944). The system requests if there is a promotion code (Decision 945), if there is a promotion code, the system performs fee distribution (Step 946) and then requests the customer to make a payment (Step 947). If there is no promotion code, the system requests the customer to make a payment (Step 947). After payment for the service request is made and processed, the customer is offered to provide feedback (Decision 948). If they do not want to give feedback, the process ends (Step 951). If the customer would like to give the service provider feedback, he or she provides the feedback (Step 949) and after completing the feedback (Step 950), the process ends (Step 951).

One of ordinary skill in the art would appreciate that FIG. 9C does not depict the entire workflow of the customer's request activity in the system. For example, Step 900, filter options, may include several other steps that could include choosing vehicle specifications (black, livery, luxury, etc.), and a price proposal initiated by the customer which is depicted in FIG. 5. The system will provide a user-friendly environment to give the necessary notifications to a user.

Figure 9D:
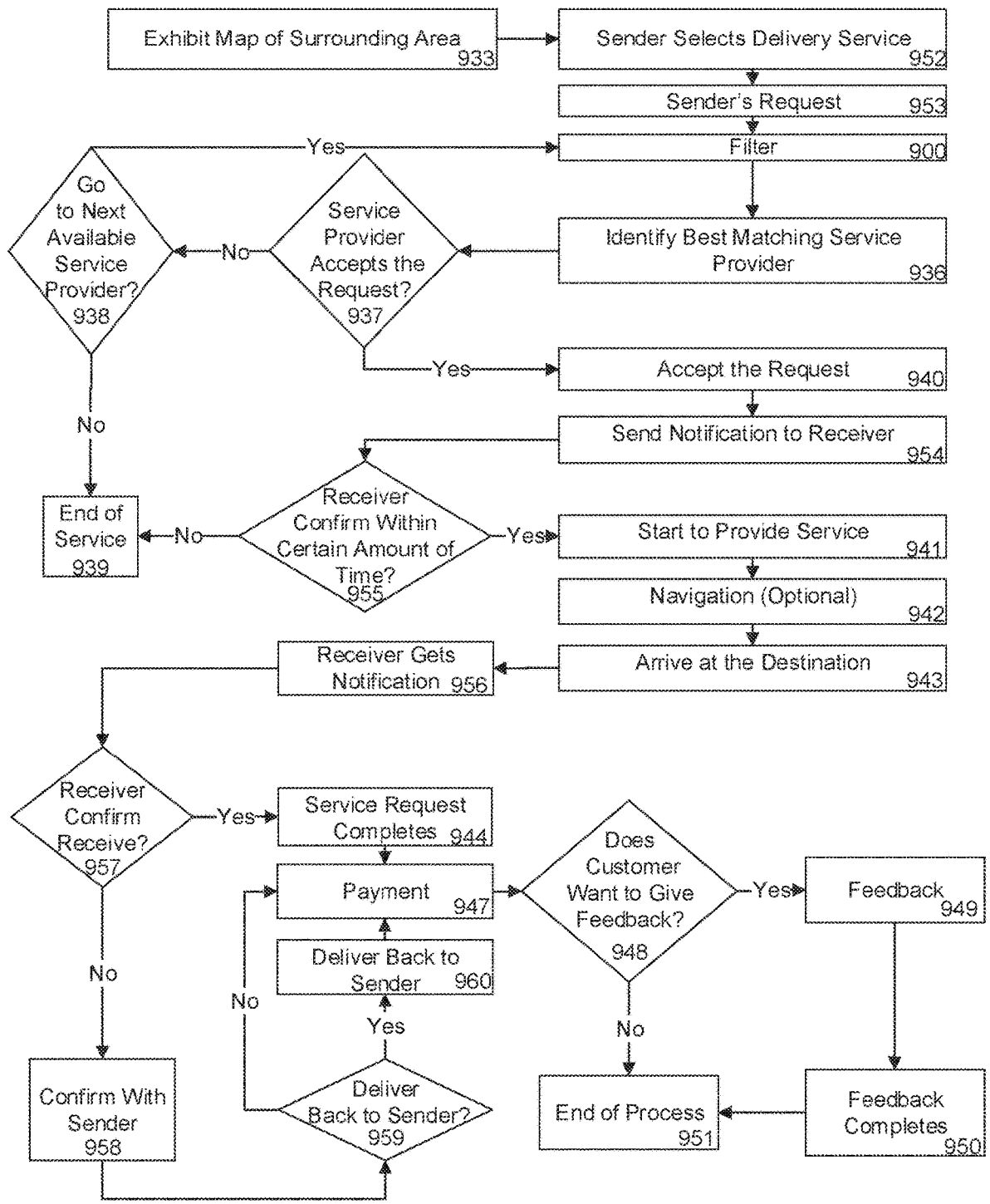
FIG. 9D depicts an exemplary workflow for a customer to request a delivery service.

FIG. 9D depicts an exemplary workflow for a customer to request a delivery service. The workflow for delivery service is similar to the workflow for transport service depicted in FIG. 9C. The customer starts by requesting to view the map of surrounding area (Step 933) and selecting delivery service as the type of service to be requested (Step 952). The customer then makes a service request (Step 953) and in that request he or she has filter options (Step 900). After the system identifies the best matching service provider (Step 936), the system will send the request to the service provider who best matches the filter options. The service provider either accepts or declines the service request (Decision 937). If the service provider rejects the request, then the request goes to the next available service provider (Decision 938), who is matched with the service request based on the filter options (Step 900) until the service provider accepts (Step 940), and notification is sent to receiver (Step 954). The receiver needs to confirm within a certain time that he or she is expecting the delivery (Decision 955). If receiver doesn't confirm, the service provider doesn't accept the delivery and the service ends (Step 939). If the receiver confirms the delivery, the service provider is dispatched to provide the service (Step 941). The service provider has an option of using navigation (Step 942) and upon arrival to the destination location (Step 943), the receiver gets notified of the service provider's arrival (Step 956) and receiver needs to confirm the receipt of the delivery (Decision 957). If receiver confirms the receipt of the delivery, the service request completes (Step 944) and the payment is requested (Step 947). Once the payment is made and processed, the customer has an option to give a feedback (Decision 948). If the customer wants to give a feedback, he or she provides the feedback (Step 949) and the feedback is complete (Step 950), which completes the process (Step 951). If the customer doesn't want to provide a feedback, the process ends (Step 951).

If the receiver doesn't confirm the receipt of the delivery, the service provider confirms with the sender (Step 958), whether the sender wants the delivery back (Decision 959). If the sender doesn't want the delivery back, the process goes to payment (Step 947). If the sender wants the delivery back, the service provider delivers it back to the sender (Step 960). After that the process goes back to payment (Step 947). Upon completion of the payment the customer is asked whether he or she wants to provide the feedback (Decision 948). If the customer doesn't want to give feedback, the process ends (Step 951). If customer wants to provide feedback, he or she provides feedback (Step 949). Upon completion of the feedback (Step 950), the process ends (Step 951).

One of ordinary skill in the art would appreciate that FIG. 9D does not depict the entire workflow of a customer requesting delivery service from a service provider. For example, Step 900, filter options for delivery services could include urgency of the delivery, experience of the service provider transporting similar type of goods, etc. According to the filter options and other possible process steps, the system will provide a user-friendly environment to give the necessary notifications to a user.

Figure 10A:
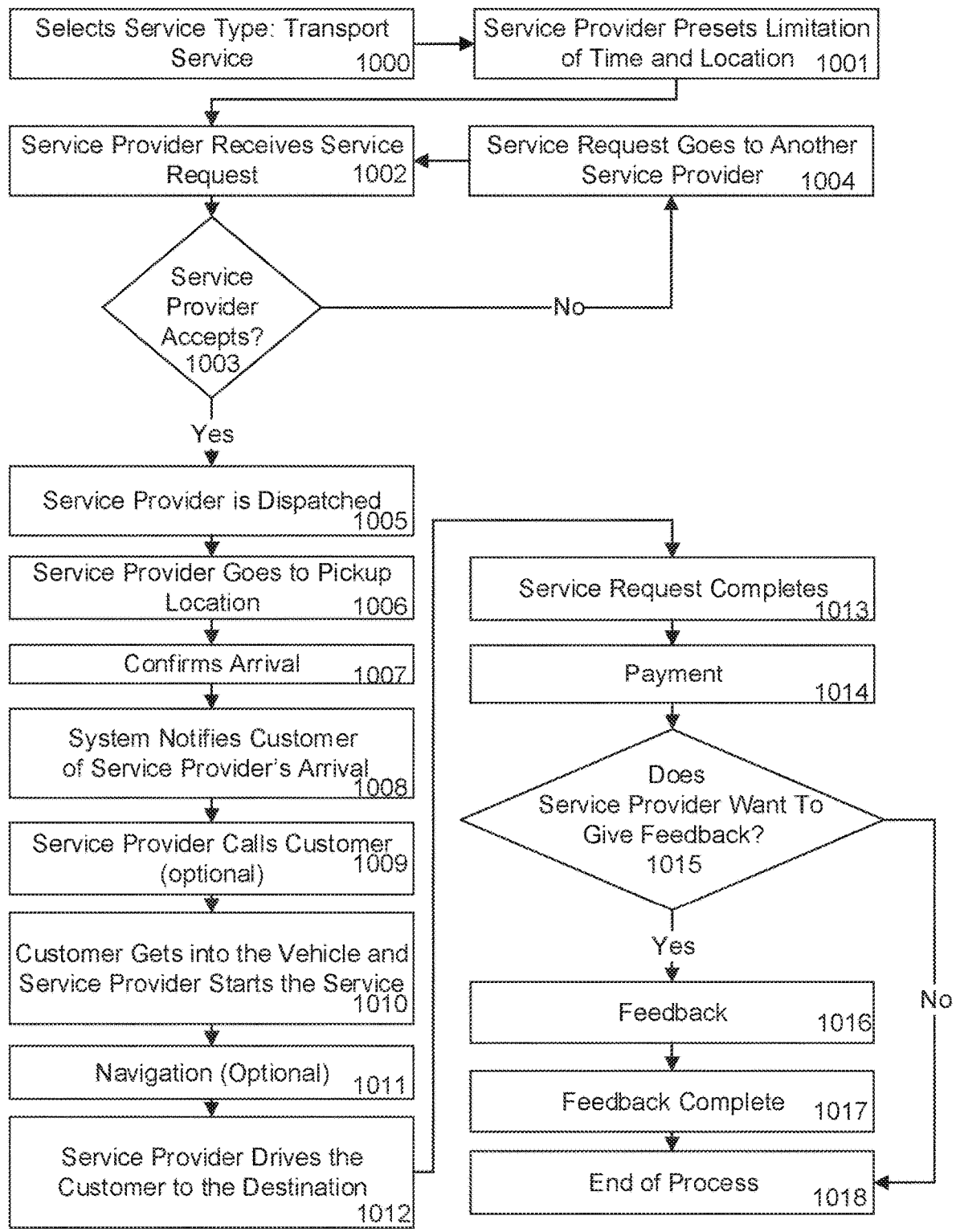
FIG. 10A depicts an exemplary workflow of a service provider providing transport service.

FIG. 10A depicts an exemplary workflow of a service provider providing transport service. The service provider starts selecting the type of service he or she wants to provider, for example, transport service (Step 1000). The service provider then presets his or her limitations of time and location (Step 1001). Then the service provider receives a service request (Step 1002), and decides whether he or she accepts the request (Decision 1003). If the service provider rejects the service request, the service request goes to another available service provider (Step 1004) wherein the process cycles back to the service provider receiving the service request (Step 1002) until a service provider accepts the service request. If the service provider accepts the request, the service provider is dispatched (Step 1005), and he or she goes to a pickup location (Step 1006). Once the service provider arrives at the pickup location, he or she confirms the arrival (Step 1007). The system then notifies the customer of service provider's arrival (Step 1008). If the service provider wishes, he or she may place an optional call to the customer to notify him or her of his or her arrival (Step 1009). The customer then gets into the vehicle and the service provider starts carrying out the service (Step 1010). The service provider has an option of using the navigation (Step 1011). The service provider drives the customer to the destination location (Step 1012). Upon arrival, the service request is identified as complete (Step 1013), and the customer makes a payment (Step 1014). Upon the customer's payment, the service provider has an option to provide feedback (Decision 1015). The service provider may choose to skip giving feedback, in which case the process ends (Step 1018). If the service provider chooses to give feedback, the service provider gives feedback (Step 1016), and once he or she is done giving feedback (Step 1017), the process ends (Step 1018).

Because of limited space, FIG. 10A connects in part or in full with FIG. 5 regarding negotiation of service request prices between customers and service providers, which may take place after the service provider receives the service request (Step 1002). After both parties agree on the price, the process continues with Step 1005 as depicted in FIG. 10A.

One of ordinary skill in the art would appreciate that a service provider's activity may differ slightly depending on whether the service provider provides transport or delivery service or both. Even though there may be slight differences in the process steps depending on the type of service, the main concept remains the same. For simplicity purposes, FIG. 10A only depicts the workflow of a service provider's activity in the system for transport service requests.

Figure 10B:
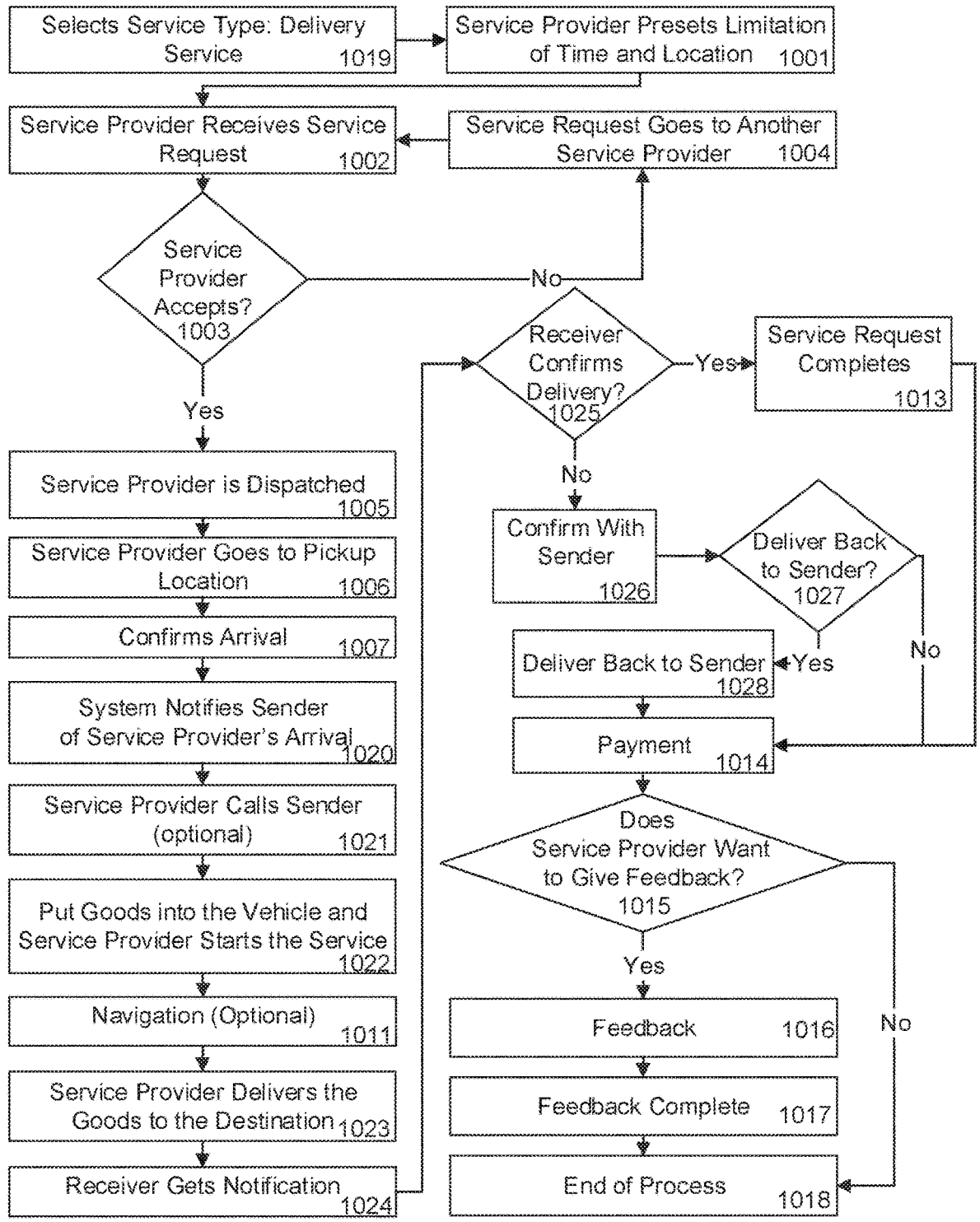
FIG. 10B depicts an exemplary workflow of a service provider providing delivery service.

FIG. 10B depicts an exemplary workflow of a service provider providing delivery service. The service provider starts by selecting the type of service he or she wants to provider, for example, delivery service (Step 1019). The service provider then presets his or her limitations of time or location (Step 1001). Then the service provider receives a service request (Step 1002) and decides whether he or she accepts the request (Decision 1003). If the service provider rejects the service request, the service request goes to another available service provider (Step 1004), wherein the process cycles back to the service provider receiving the service request (Step 1002) until a service provider accepts the service request. If the service provider accepts the request, the service provider is dispatched (Step 1005), and he or she goes to a pickup location (Step 1006). Once the service provider arrives at the pickup location, he or she confirms the arrival (Step 1007). The system then notifies the customer (sender) of the service provider's arrival (Step 1020). If the service provider wishes, he or she may place an optional call to the customer (sender) to notify him or her of his or her arrival (Step 1021). The service provider picks up delivery items and starts carrying out the service (Step 1022). The service provider has an option to use navigation 1011). The service provider delivers the items to the destination location (Step 1023).

The receiver gets delivery notification (Step 1024). The receiver then has to confirm the receipt of the delivery (Decision 1025). If the receiver confirms the delivery, then service request completes (Step 1013) and the process goes to payment (Step 1014). If the receiver doesn't confirm the delivery, the service provider confirms with the customer (sender) (Step 1026), whether he or she wants the items to be delivered back (Decision 1027). If the customer (sender) wants the delivery back, then the service provider delivers the items back (Step 1028). Afterwards, the process proceeds to payment (Step 1014). If the customer (sender) does not want the delivery back, the process goes directly to payment (Step 1014). Upon the customer's payment, the service provider has an option to provide feedback to the customer (sender) (Decision 1015). The service provider may choose to skip giving feedback, in which case the process ends (Step 1018). If the service provider chooses to give feedback, the service provider gives feedback (Step 1016), and after he or she is done giving feedback (Step 1017), the process ends (Step 1018).

Because of limited space, FIG. 10B connects in part or in full with FIG. 5 regarding negotiation of service request prices between customers and service providers, which may take place after the service provider receives the service request (Step 1002). After both parties agree on the price, the process continues to (Step 1005) as depicted in FIG. 10B.

One of ordinary skill in the art would appreciate that the workflow of a service provider providing delivery service is not exclusive. The workflow steps could vary depending on many factors, for example, filter options, delivery confirmation, etc.

Figure 11A:
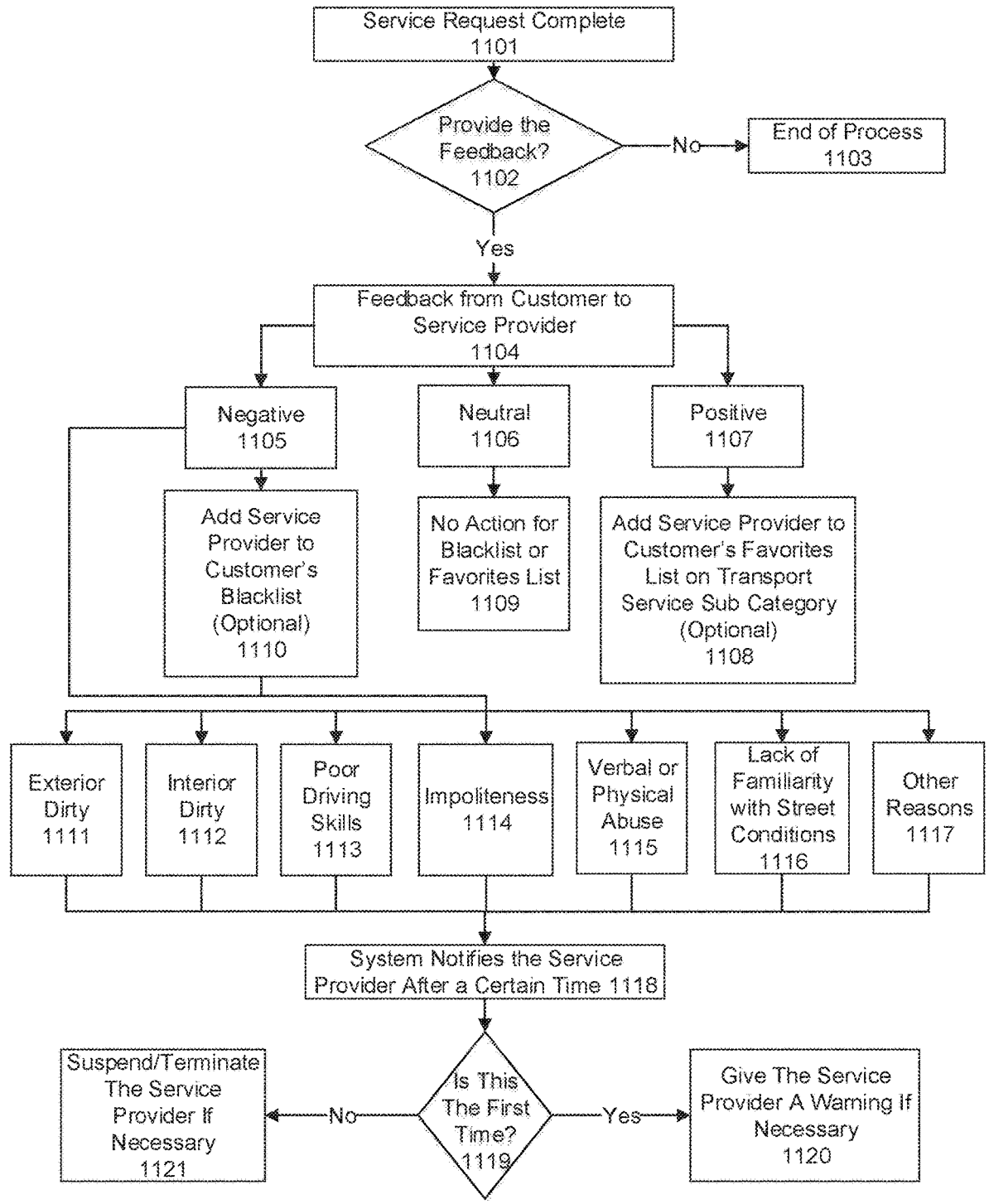
FIG. 11A depicts an exemplary workflow of a customer providing negative feedback to a service provider.

FIG. 11A depicts an exemplary workflow of a customer providing negative feedback to a service provider. Upon completion of the service request (Step 1101) and receipt of payment, the customer has a choice to provide feedback (Decision 1102). If the customer decides to not provide feedback, the process ends (Step 1103). If the customer decides to provide feedback (Step 1104), the feedback is provided based on three categories: Negative (Step 1105), Neutral (Step 1106) or Positive (Step 1107). Whether the feedback is negative, neutral or positive depends on how the customer felt about the service provided by the service provider. When a customer gives positive feedback, the customer has an option of adding the service provider to his or her favorites list on, for example, transport service subcategory (Step 1108), or he or she may provide simply neutral feedback that will not affect the selection of this service provider in the future, as the customer is not adding the service provider to a favorites list or a blacklist (Step 1109). When a customer provides negative feedback, he or she has an option of adding the service provider to his or her blacklist giving specific reasons why he or she wants to add that service provider to his or her blacklist (Step 1110). The customer may specify the reasons for his or her negative feedback. In case of transport service, these reasons may include how dirty or clean the exterior of the vehicle was (Step 1111), how dirty or clean the interior of the vehicle was (Step 1112), poor driving skills (Step 1113), impoliteness (Step 1114), verbal or physical abuse (Step 1115), lack of familiarity with street conditions (Step 1116), or other relevant reasons (Step 1117). It may be a different set of reasons for delivery service. The system will then notify the service provider whether he or she has been given negative feedback or blacklisted after a certain time (Step 1118). Such notification will be sent to the service provider certain time after such negative feedback was provided. The system, depending on whether this is the first time this service provider has been given negative feedback and for what reasons, will determine what is to be done (Decision 1119); if this is the first time this service provider has been notified of negative feedback, the system may give this service provider a warning (if necessary) (Step 1120). If negative feedback is recurring, the system may suspend or otherwise terminate the service provider (if necessary) (Step 1120).

All the feedback information will be stored in the database of the system and further used to identify the best service provider-customer match by analyzing and processing this information to notify or warn the service providers who have received negative feedback about the reasons for this negative feedback. The service providers may further use this information to improve the service.

One of ordinary skill in the art would appreciate that FIG. 114 only depicts the workflow for transport service. It is also to be understood that feedback may be provided for transport or delivery service. The procedure of providing feedback for different types of service would be the same but could differentiate in reasons for providing negative feedback. Steps 1101-1110 and 1118-1121 would be the same for the delivery service.

Figure 11B:
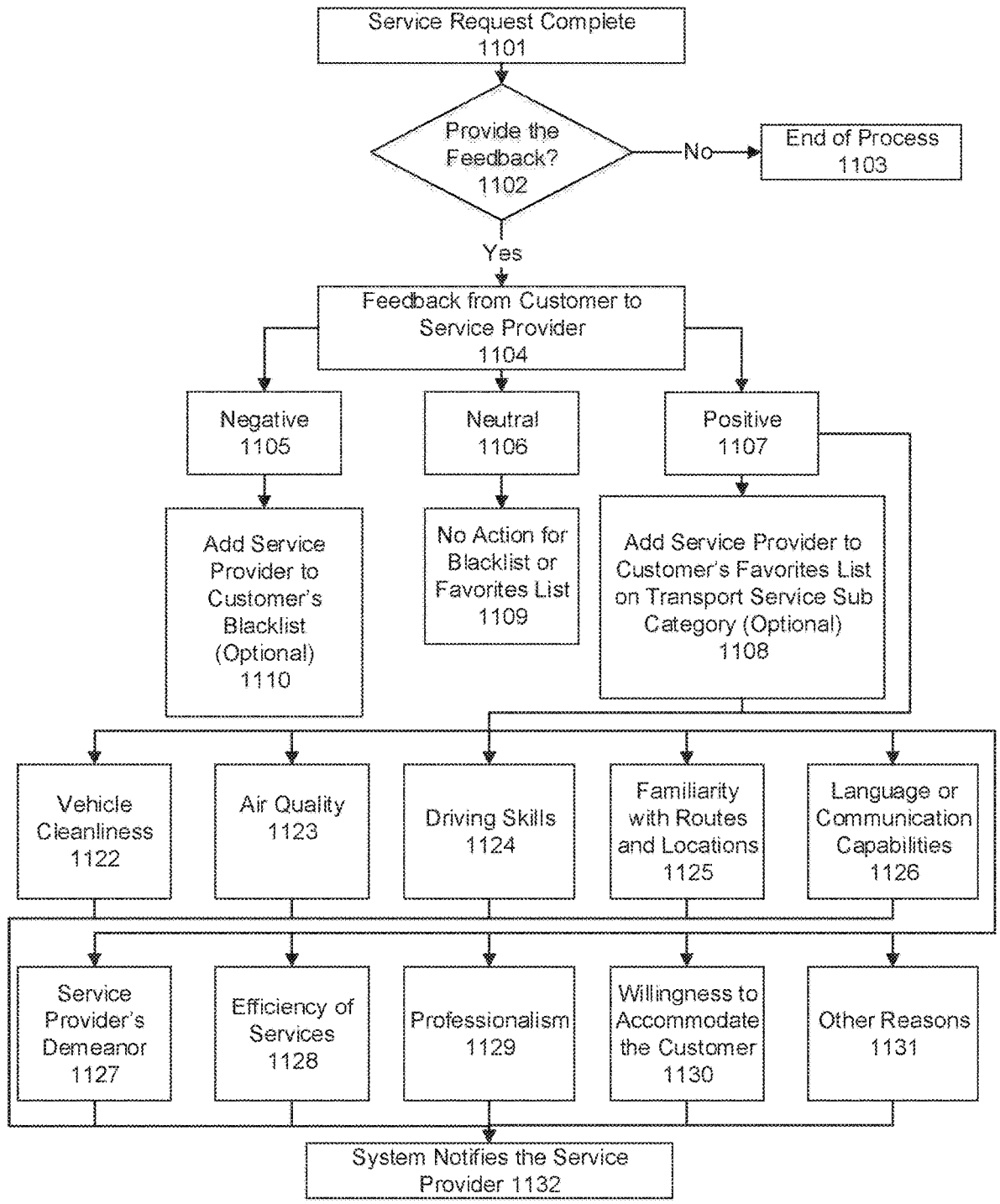
FIG. 11B depicts an exemplary workflow of a customer providing positive feedback to a service provider.

FIG. 11B depicts an exemplary workflow of a customer providing positive feedback to a service provider. Upon completion of the service request (Step 1101) and receipt of payment, the customers have a choice to provide the feedback (Decision 1102). If the customers decide to not provide a feedback, the process ends (Step 1103). If the customer decides to provide a feedback (Step 1104), the feedback is provided based on three categories: Negative (Step 1105), Neutral (Step 1106) or Positive (Step 1107). Whether the feedback is negative, neutral or positive depends on how the customer felt about the service provided by that service provider. When a customer gives positive feedback, the customer has an option of adding the service provider to his or her favorites list on, for example, transport service subcategory and give reasons why he or she wants to add this service provider to his or her favorites list (Step 1108), or he or she may simply provide neutral feedback that will not affect the selection of this service provider in the future, as the customer is not adding the service provider to a favorites list or a blacklist (Step 1109). When a customer provides negative feedback, he or she has an option of adding the service provider to his or her blacklist providing reasons why (Step 1110). The customer may explain reasons why he or she wants to give service provider positive feedback. In case of transport service, these reasons may include vehicle cleanliness (Step 1122), air quality (Step 1123), driving skills (Step 1124), familiarity with routes and locations (Step 1125), language or communication capabilities (Step 1126), service provider's demeanor (Step 1127), efficiency of service (Step 1128), professionalism (Step 1129), willingness to accommodate the customer (Step 1130), or other reasons (Step 1131).

Based on the feedback and reasons provided in the feedback, the system may notify the service provider whether he or she has been added to a favorites list (Step 1132). All the feedback information will be stored in the database of the system and further used to identify the best service provider-customer match by analyzing and processing this information.

One of ordinary skill in the art would appreciate that the workflow of a customer providing positive feedback to a service provider could differs depending on whether a customer wants to add a service provider to his or her favorites list or simply provide feedback.

Figure 12A:
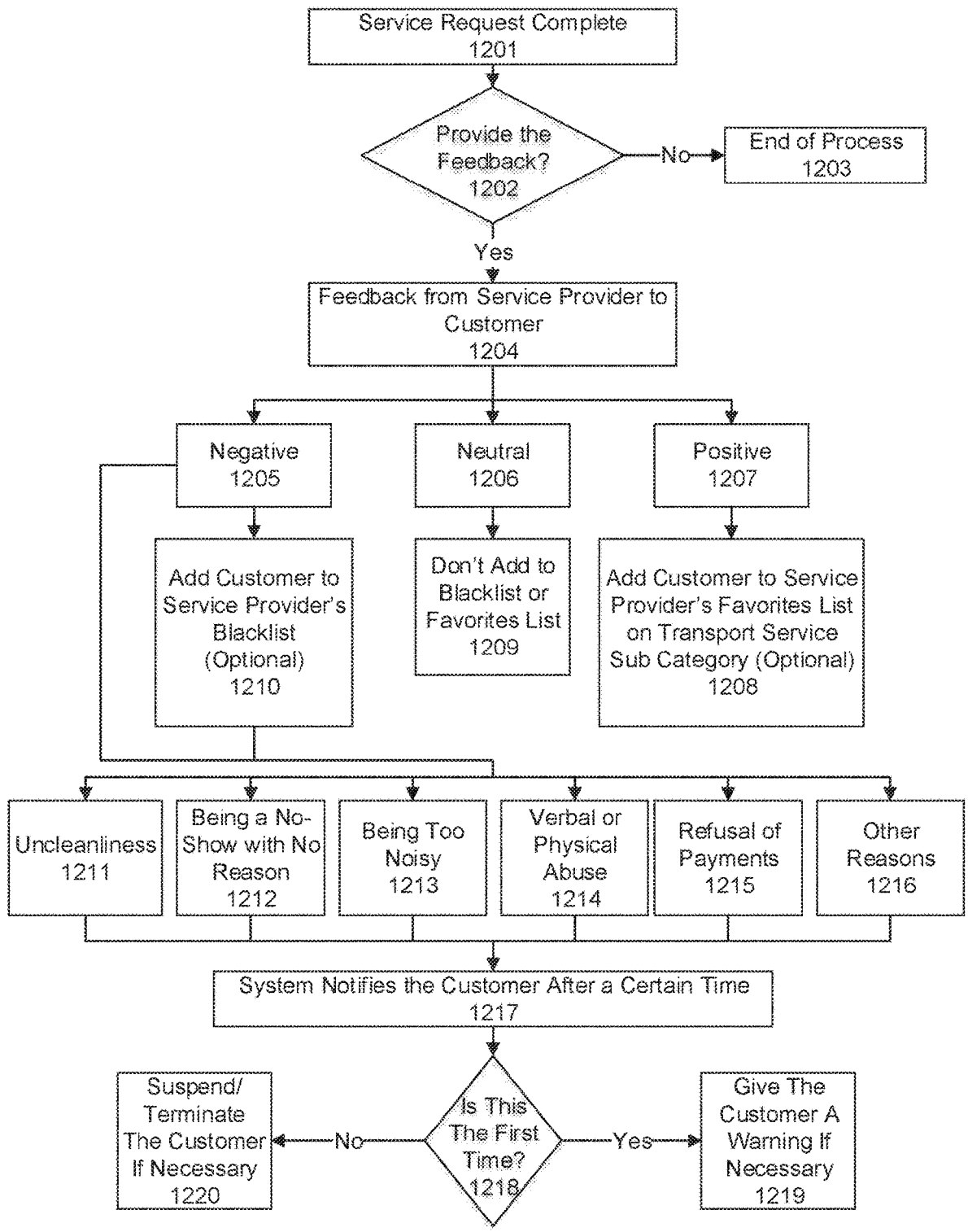
FIG. 12A depicts an exemplary workflow of a service provider giving negative feedback to a customer.

FIG. 12A depicts an exemplary workflow of a service provider giving negative feedback to a customer. Upon completion of the service request (Step 1201) and receipt of payment, the service provider has an option to provide feedback (Decision 1202). If the service provider decides to not provide a feedback, the process ends (Step 1203). If the service provider decides to provide feedback (Step 1204), the feedback is provided based on three categories: Negative (Step 1205), Neutral (Step 1206) or Positive (Step 1207). Whether the feedback is negative, neutral, or positive depends on how the service provider felt about the customer to whom he or she has provided the service. When a service provider gives that customer positive feedback, the service provider has an option of requesting to add that customer to his or her favorites list on, for example, transport service subcategory (Step 1208), or he or she provides simply neutral feedback that will not affect the selection of this customer in the future, as the service provider is not adding the customer to a favorites list or a blacklist (Step 1209). When a service provider provides negative feedback, he or she has an option of adding the customer to his or her blacklist giving specific reasons why he or she wants to add that customer to his or her blacklist (Step 1210).

One of ordinary skill in the art would appreciate that there may be different reasons for negative feedback depending on the type of service. When adding the customer to a blacklist for one subcategory of service, the service provider may decide whether he or she wants to add the customer to a blacklist for another subcategory of service as well. The customer may explain the reasons if he or she wants to give the service provider negative feedback. In case of the transport service, these reasons could include but not limited to uncleanliness (Step 1211), the customer being a no-show without providing a reason (Step 1212), the customer being too noisy (Step 1213), verbal or physical abuse (Step 1214), the customer refusing to pay (Step 1215), or any other reason for negative feedback (Step 1216). Based on reasons provided in the negative feedback, the system will notify the customer that he or she has been blacklisted after a certain time (Step 1217). The system, depending on whether this is the first time this customer has Teen given negative feedback and for what reasons, will determine what is to be done (Decision 1218); if this is the first time this customer has been notified of negative feedback, the system may give this customer a warning (if necessary) (Step 1219). If negative feedback is recurring, the system may suspend or otherwise terminate the customer (if necessary) (Step 1220).

All feedback information will be stored in the database of the system and further used to identify the best service provider-customer match by analyzing and processing this information to notify or warn the customers that they have been put on the blacklist. The customers are further notified of the reasons why they have been put on the blacklist, so that they take appropriate measures.

Figure 12B:
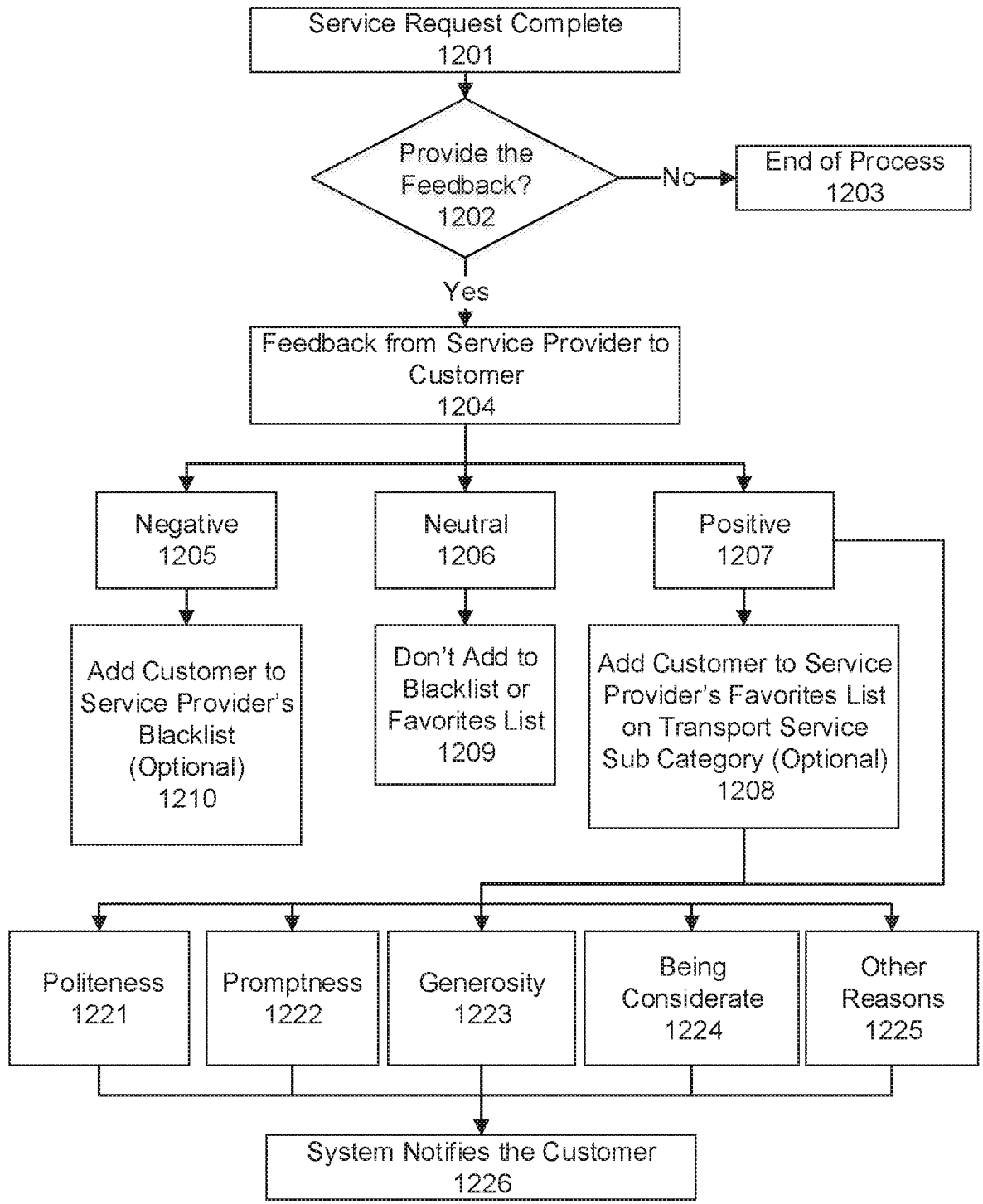
FIG. 12B depicts an exemplary workflow of a service provider giving positive feedback to a customer.

One of ordinary skill in the art would appreciate that a service provider could provide feedback to a customer regardless of whether the customer requested transport or delivery service. The procedure of providing feedback for different types of service would be the same but could differ in reasons for providing negative feedback. Steps 1201-1210 and 1217-1220 would be the same for delivery service FIG. 12B depicts an exemplary workflow of a service provider giving positive feedback to a customer. Upon completion of the service request (Step 1201) and receipt of payment, the service provider has a choice to provide feedback (Decision 1202). If a service provider decides to not provide feedback, the process ends (Step 1203). If the service provider decides to provide feedback (Step 1204), the feedback is provided based on three categories: Negative (Step 1205), Neutral (Step 1206) or Positive (Step 1207). Whether the feedback is negative, neutral, or positive depends on how the service provider felt about the customer to whom he or she has provided the service. When a service provider gives positive feedback, the service provider has an option of adding that customer to his or her favorites list on, for example, transport service subcategory and give the reasons why he or she wants to add this customer to his or her favorites list (Step 1208), or he or she may simply provide neutral feedback that will not affect the selection of this customer in the future, as the service provider is not adding the customer to a favorites list or a blacklist (Step 1209). When a service provider provides negative feedback, he or she has an option of adding the customer to his or her blacklist providing reasons why (Step 1210). One of ordinary skill in the art would appreciate that there may be numerous reasons for giving the positive feedback depending on whether the service request was for transport service or delivery service. When adding the customer to a favorites list for one subcategory of service, the service provider may decide whether he or she wants to add that same customer to his or her favorites list for another subcategory of service as well. The customer may provide reasons for a positive feedback. For transport service, these reasons could include but not limited to politeness (Step 1221), promptness (Step 1222), generosity (Step 1223), being considerate (Step 1224), other reasons (Step 1225).

Based on the feedback and provided reasons, the system will notify the customer that he or she has been added to that service provider's favorites list (Step 1226). One of ordinary skill in the art would appreciate that the workflow of service providers providing positive feedback to customers could differ depending on whether the service provider wants to add the customer to the favorites list or simply provide feedback.

A number of illustrative embodiments of the present invention have been described in detail herein with reference to the accompanying drawings. Nevertheless, it is to be understood by one skilled in the art that the invention is not limited to these precise embodiments. Rather, various modifications may be made without departing from the spirit and scope of the invention. For example, the workflows depicted in the figures do not require the particular order of steps shown. Both the steps and the order in which these steps are performed may vary substantially without sacrificing the functionality of the invention. Accordingly, it is intended that the scope of the invention be defined by the appended claims.

The functions and operations presented herein are not inherently related to any particular computer or other apparatus. Various specialized systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a many of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language. While multiple embodiments are disclosed, still other embodiments of the present invention will become apparent to those skilled in the art from this detailed description. It is to be understood, that for the purpose of providing simplified figures that are easy to understand, that many of the concepts detailed in the previous section have been condensed for brevity; however, it is contemplated that the details described may be incorporated into the approach of the description below in any feasible manner.

Exemplary embodiments described herein are illustrative, and many variations can be introduced without departing from the spirit of the disclosure or from the scope of the appended claims. Further elements and/or features of different exemplary embodiments may be combined with each other and/or substituted for each other within the scope of this disclosure and appended claims; even if descriptions of exemplary embodiments did not mention that possibility, it is not intended that lack of description is to mean an impossibility. The invention is capable of myriad modifications in various obvious aspects, all without departing from the spirit and scope of the present invention. It is not intended that the examples used in any or all figures is the intended final display. It should be obvious to one skilled in the art that these are examples of potential customized settings that have been preset by the customers and service providers and are displayed as part of the potential display.

The invention claimed is:

1. A computer-implemented method for pairing a customer with a service provider for an on-demand transportation service, the method comprising:

receiving a service request and one or more preset preferences of a customer from a customer computing device;

displaying, on a display screen of the customer computing device, an interactive electronic interface containing a menu of two or more search parameters for the customer, each of the two or more parameters being adjustable by the customer to launch an application for each of the two or more parameters to be simultaneously seen on the display screen;

displaying, in response to one or more inputs by the customer to the two or more search parameters, a graphical representation of the electronic interface containing:

one or more sets of indicators corresponding to each of one or more available service providers that match the one or more preset preferences, and two or more identifications through at least a Global Positioning System (GPS) receiver corresponding to the one or more inputs provided by the customer to the two or more search parameters including a maximum number of available service providers from the customer computing device and at least one of the following group comprising: (i) the one or more available service providers within a time span arrival to a pick-up location of the customer, (ii) one or more available service providers within a distance span for arrival to the pick-up location;

in response to a number of the one or more available service providers within the distance span or the time span not reaching the maximum number of the one or more available service providers as input by the customer, adjusting the one or more inputs to expand the time span or the distance span to increase the number of the one or more available service providers displayed; or in response to a number of the one or more available service providers within the distance span or the time span exceeding the maximum number of the one or more available service providers as input by the customer, adjusting the one or more inputs to contract the time span or the distance span to reduce the number of the one or more available service providers displayed;

wherein the one or more sets of indicators reflect transportation service relevant data corresponding to each of the one or more available service providers;

selecting a service provider by the customer computing device from the one or more available service providers; and receiving a set of confirmation data of acceptance from the computing device of the service provider.

2. The method according to claim 1, further comprising:

displaying one or more geographic zones representative of at least one of the one or more inputs provided by the customer for the one or more search parameters on the interactive electronic interface, wherein the one or more geographic zones surround the pick-up location of the customer and include an interactive electronic map displaying, as selected by the customer, at least one of:

a first geographic zone indicative of the time span for arrival, a second geographical zone indicative of the distance span for arrival, or a third geographical zone indicative of the maximum number of the one or more available service providers, and wherein the menu of the one or more adjustable search parameters remains seen on the interactive electronic interface with respective applications of one or more search parameters not selected by the customer in an un-launched state.

3. The method according to claim 2, further comprising:

displaying the one or more identifications corresponding to each of the one or more geographic zones displayed on the electronic map; and displaying a ratio of all customers with respect to the one or more available service providers for at least one of the first, second or third zones.

4. The method according to claim 2, further comprising:

in response to display of the one or more identifications being constrained by other of the one or more inputs, adjusting, according to an order of priority assigned by the customer, the other of the one or more inputs such that the one or more identifications are displayed without constraints.

5. The method according to claim 1, wherein the one or more sets of indicators reflect service relevant data of the one or more available service providers and include at least one of a level of familiarity, an identification status, an availability, profile data, a total number of service requests completed by a service provider within a period of time, a total number of service requests completed by a service provider within a geographic zone based on a requested pick-up location, a total number of service requests completed by a service provider within a geographic zone based on a requested drop-off location, a price proposal by the customer, a response to the price proposal initiated by the customer, a price proposal initiated by the one or more available service providers, a customer price response, supply and demand for the one or more service providers, a course of dealings between the customer and the one or more available service providers, an estimated time of arrival to a pick-up location, an estimated travel time from the pick-up location to a drop off location, a return location, whether a price proposal is above a default price provided by the system, whether a price proposal is below a default price provided by the system, or whether a price proposal is equal to a default price provided by the system.

6. The method according to claim 1, further comprising:

retrieving, from a database, a set of historical GPS location data associated with previously traveled routes for at least one of the one or more service providers, wherein the GPS location data is received from a GPS receiver of one or more computing devices associated with the one or more service providers;

calculating a level of familiarity with a route of the service request for at least one of the one or more available service providers by (i) comparing a set of GPS location data for the route of the service request with the set of historical GPS location data, and (ii) determining a matching relationship between the set of GPS location data for the route and the set of historical GPS location data for the one or more service providers, wherein the matching relationship is defined as a percentage of the set of GPS location data for the route that matches directly or indirectly the set of historical GPS location data associated with the previously traveled routes of the at least one of the one or more available service providers; and displaying the calculated level of familiarity of the one or more available service providers via a level of familiarity indicator set.

7. The method according to claim 1, further comprising:
receiving one or more preset limitations for one or more service providers;
identifying the one or more available service providers by comparing the one or more preset limitations with the one or more preset preferences; and
receiving, from the customer via the at least one customer computing device, an indication of a selected service provider from the one or more available service providers.

8. The method according to claim 7, further comprising:
assigning, based on the one or more preset preferences, one or more first factor identifiers from a first set of factor identifiers to each of the one or more preset preferences; assigning, based on the one or more preset limitations for, one or more second factor identifiers from a second set of factor identifiers to each of the one or more preset limitations;
comparing the one or more first factor identifiers with the one or more second factor identifiers to determine a match between the one or more preset preferences and the one or more preset limitations;
precluding a first set of one or more service providers from receiving the service request for being at least one of: (i) incompatible with the service request as determined by at least the comparing, or (ii) on a blacklist of the customer; identifying a second set of the one or more service providers by at least the comparing and the precluding; and
receiving an indication from the customer of a selected service provider from the second set of the one or more available service providers based at least in part on information displayed through the one or more sets of indicators.

9. A computer-implemented system for pairing a customer with a service provider for an on-demand transportation service, the system comprising:
a server communicatively coupled to one or more computing devices via a network, wherein the one or more computing devices includes one or more location identifiers configured to generate location data corresponding to one or more locations, and wherein the server includes at least one non-transitory computer-readable storage medium with computer readable instructions stored therein, a database, and a processor for executing the computer readable instructions to:
receive a service request and one or more preset preferences of a customer from at least one customer computing device;
display, on a display screen of the at least one customer computing device, an interactive electronic interface containing a menu of one or more adjustable search parameters for a customer, each of the one or more parameters being selectable by the customer to launch an application each of the one or more parameters to be simultaneously seen on the display screen; and
display, in response to one or more inputs by the customer indicative of at least one of the one or more search parameters, a graphical representation of the electronic interface containing:
one or more sets of indicators corresponding to each of one or more available service providers that match the one or more preset preferences, and one or more identifications corresponding to the one or more inputs provided by the customer of: (i) a maximum number of the one or more available service providers, (ii) the one or more available service providers within a time span for arrival to a pick-up location of the customer, (iii) the one or more available service providers within a distance span for arrival to the pick-up location, or (iv) one or more additional customers within the time span or the distance span, wherein the one or more sets of indicators reflect transportation service relevant data corresponding to each of the one or more available service providers;
in response to a number of the one or more available service providers within the distance span or the time span not reaching the maximum number of the one or more available service providers as input by the customer, adjust the one or more inputs to expand the time span or the distance span to increase the number of the one or more available service providers displayed; or
in response to a number of the one or more available service providers within the distance span or the time span exceeding the maximum number of the one or more available service providers as input by the customer, adjust the one or more inputs to contract the time span or the distance span to reduce the number of the one or more available service providers displayed.

10. The system according to claim 9, wherein the processor further executes the computer-readable instructions to:
display one or more geographic zones representative of at least one of the one or more inputs provided by the customer for the one or more search parameters on the interactive electronic interface, wherein the one or more geographic zones surround the pick-up location of the customer and include an interactive electronic map displaying, as selected by the customer, at least one of:
a first geographic zone indicative of the time span for arrival, a second geographical zone indicative of the distance span for arrival, or a third geographical zone indicative of the maximum number of the one or more available service providers, and wherein the menu of the one or more adjustable search parameters remains seen on the interactive electronic interface with respective applications of one or more search parameters not selected by the customer in an un-launched state.

11. The system according to claim 10, wherein the processor further executes the computer-readable instructions to:
display the one or more identifications corresponding to each of the one or more geographic zones displayed on the electronic map; and
display a ratio of all customers with respect to the one or more available service providers at least one of the first, second or third zones.

12. The system according to claim 9, wherein the processor further executes the computer-readable instructions to:
in response to display of the one or more identifications being constrained by other of the one or more inputs, adjust, according to an order of priority assigned by the customer, the other of the one or more inputs such that the one or more identifications are displayed without constraints.

13. The system according to claim 9, wherein the one or more sets of indicators reflect service relevant data of the one or more available service providers and include at least one of a level of familiarity, an identification status, an availability, profile data, a total number of service requests completed by a service provider within a period of time, a total number of service requests completed by a service provider within a geographic zone based on a requested pick-up location, a total number of service requests completed by a service provider within a geographic zone based on a requested drop-off location, a price proposal by the customer, a response to the price proposal initiated by the customer, a price proposal initiated by the one or more available service providers, a customer price response, supply and demand for the one or more service providers, a course of dealings between the customer and the one or more available service providers, an estimated time of arrival to a pick-up location, an estimated travel time from the pick-up location to a drop off location, a return location, whether a price proposal is above a default price provided by the system, whether a price proposal is below a default price provided by the system, or whether a price proposal is equal to a default price provided by the system.

14. The system according to claim 9, wherein the processor further executes the computer-readable instructions to:

retrieve, from a database, a set of historical GPS location data associated with previously traveled routes for at least one of the one or more service providers, wherein the GPS location data is received from a GPS receiver of one or more computing devices associated with the one or more service providers; calculate a level of familiarity with a route of the service request for at least one of the one or more available service providers by (i) comparing a set of GPS location data for the route of the service request with the set of historical GPS location data, and (ii) determining a matching relationship between the set of GPS location data for the route and the set of historical GPS location data for the one or more service providers, wherein the matching relationship is defined as a percentage of the set of GPS location data for the route that matches directly or indirectly the set of historical GPS location data associated with the previously traveled routes of the at least one of the one or more available service providers; and display the calculated level of familiarity of the one or more available service providers via a level of familiarity indicator set.

15. The system according to claim 9, wherein the processor further executes the computer-readable instructions to:

receive one or more preset limitations for one or more service providers;

identify the one or more available service providers by comparing the one or more preset limitations with the one or more preset preferences; and receive, from the customer via the at least one customer computing device, an indication of a selected service provider from the one or more available service providers.

16. The system according to claim 15, wherein the processor further executes the computer-readable instructions to:

assign, based on the one or more preset preferences, one or more first factor identifiers from a first set of factor identifiers to each of the one or more preset preferences;

assign, based on the one or more preset limitations for, one or more second factor identifiers from a second set of factor identifiers to each of the one or more preset limitations;

compare the one or more first factor identifiers with the one or more second factor identifiers to determine a match between the one or more preset preferences and the one or more preset limitations;

preclude a first set of one or more service providers from receiving the service request for being at least one of: (i) incompatible with the service request as determined by at least the comparing, or (ii) on a blacklist of the customer; identify a second set of the one or more service providers by at least the comparing and the precluding; and receive an indication from the customer of a selected service provider from the second set of the one or more available service providers based at least in part on information displayed through the one or more sets of indicators.

\* \* \* \* \*